US012368583B2

(12) United States Patent
Taylor

(10) Patent No.: US 12,368,583 B2
(45) Date of Patent: Jul. 22, 2025

(54) DATA SECURITY USING RANDOMIZED FEATURES

(71) Applicant: Mark Taylor, Falls Church, VA (US)

(72) Inventor: Mark Taylor, Falls Church, VA (US)

( * ) Notice: Subject to any disclaimer, the term of this patent is extended or adjusted under 35 U.S.C. 154(b) by 903 days.

(21) Appl. No.: 17/339,935

(22) Filed: Jun. 4, 2021

(65) Prior Publication Data

US 2022/0358236 A1 Nov. 10, 2022

Related U.S. Application Data

(63) Continuation-in-part of application No. 17/221,335, filed on Apr. 2, 2021, now abandoned, which is a
(Continued)

(51) Int. Cl.
*H04L 9/08* (2006.01)
*G06F 16/22* (2019.01)
(Continued)

(52) U.S. Cl.
CPC ............ *H04L 9/0869* (2013.01); *G06F 16/22* (2019.01); *G06F 16/24562* (2019.01);
(Continued)

(58) Field of Classification Search
CPC ....... H04L 9/0869; H04L 9/12; H04L 9/0618; H04L 9/0643; H04L 9/0894; G06F 16/22;
(Continued)

(56) References Cited

U.S. PATENT DOCUMENTS

| 8,200,639 B2 * | 6/2012 | Dahiwadkar | G11B 5/024 707/662 |
| 2008/0052432 A1 * | 2/2008 | Wilson | G06F 3/0689 710/104 |

(Continued)

FOREIGN PATENT DOCUMENTS

| CN | 102710630 B | * | 3/2016 | |
| EP | 1365304 A2 | * | 11/2003 | G06F 21/105 |

(Continued)

*Primary Examiner* — Shewaye Gelagay
*Assistant Examiner* — Carlton Johnson
(74) *Attorney, Agent, or Firm* — L/O ALEXIS J SAENZ

(57) ABSTRACT

Data security using randomized features, provides improved protection of user data, within a cloud infrastructure. Files received are broken apart into data blocks then randomly written into storage locations that are recorded in sequence into a key comprising an array of pointers. Data blocks may be randomly sized between maximum and minimum parameters. Storage locations may first be tested to prevent unwanted overwrites of preexisting data, undersized locations may receive a partial write, plus a pointer to an overflow location into which the remainder of data is written. Randomized data storage is separate and isolated from pointers based key storage via separate communication channels, and separate storage infrastructures. Download speeds may be boosted via parallel processing of data blocks out of storage and into reassembly according to the pointers key sequence. Re-assembled files may be worked upon then saved back into the cloud infrastructure.

20 Claims, 51 Drawing Sheets

Related U.S. Application Data continuation of application No. 17/151,086, filed on Jan. 15, 2021, now Pat. No. 11,956,352.

(51) Int. Cl.
    *G06F 16/2455* (2019.01)
    *G06F 40/00* (2020.01)
    *G10L 15/26* (2006.01)
    *H04L 9/12* (2006.01)

(52) U.S. Cl.
    CPC .............. *G06F 40/00* (2020.01); *G10L 15/26* (2013.01); *H04L 9/12* (2013.01)

(58) Field of Classification Search
    CPC .... G06F 16/24562; G06F 40/00; G06F 40/20; G06F 40/30; G10L 15/26
    See application file for complete search history.

(56) References Cited

U.S. PATENT DOCUMENTS

| | | | | |
|---|---|---|---|---|
| 2009/0055547 A1* | 2/2009 | Hudson | ................ | H04L 67/288 709/231 |
| 2017/0123713 A1* | 5/2017 | Fisher | .................... | G06F 3/064 |
| 2020/0356534 A1* | 11/2020 | R | ............................ | G06F 9/526 |

FOREIGN PATENT DOCUMENTS

| | | | | |
|---|---|---|---|---|
| TW | 201407368 A | * | 2/2014 | ............ G06F 16/13 |
| WO | WO 8707462 | * | 12/1987 | |

* cited by examiner

Run-Time Example of Possible TRIPL Creation Process

Device A initiates TRIPL creation via request to Device B

Device B agrees

Device A generates a pointer to its seed data array which points to "3" the pointer / value is sent to device B Both devices record the pointer to "3" at their 1st TRIPL array index location, or with pointer index value 1

Device B generates a pointer to its seed data array which points to "j" the pointer / value is sent to device A Both devices record the pointer to "j" at their 2nd TRIPL array index location, or with pointer index value 2

Device A generates a pointer to its seed data array which points to "u" the pointer / value is sent to device B Both devices record the pointer to "u" at their 3rd TRIPL array index location, or with pointer index value 3

Device B generates a pointer to its seed data array which points to "<" the pointer / value is sent to device A Both devices record the pointer to "<" at their 4th TRIPL array index location, or with pointer index value 4

Device A generates a pointer to its seed data array which points to "y" the pointer / value is sent to device B Both devices record the pointer to "y" at their 5th TRIPL array index location, or with pointer index value 5

Device B generates a pointer to its seed data array which points to "g" the pointer / value is sent to device A Both devices record the pointer to "g" at their 6th TRIPL array index location, or with pointer index value 6

-------------- BREAK --------------

Process continues until complete TRIPL is negotiated... An array of characters, character strings, or records with an index capability may be used to store the new TRIPL or an array of pointers to the TRIPL may be used in TRIPL encrypted communications.

From 2C(1)

Run-Time Example of Possible TRIPL Creation Process

Continuation string data objects...

Device A generates a pointer to its seed data array which points to "and" the pointer / value is sent to device B Both devices record the pointer to "and" at their 100th TRIPL array index location, or with pointer index value 100

Device B generates a pointer to its seed data array which points to "car" the pointer / value is sent to device A Both devices record the pointer to "car" at their 101st TRIPL array index location, or with pointer index value 101

Device A generates a pointer to its seed data array which points to "computer" the pointer / value is sent to device B Both devices record the pointer to "computer" at their 102nd TRIPL array index location, or with pointer index value 102

--------------- BREAK ---------------

Continuation complex data-objects...

Device B generates a pointer to its seed data array which points to "Initiate emergency procedure. Remove Hard Disc Drives and take them to dead-drop Apache." the pointer / value is sent to device A Both devices record the pointer to "Initiate emergency procedure. Remove Hard Disc Drives and take them to dead-drop Apache." at their 200th TRIPL array index location, or with pointer index value 200

Device A generates a pointer to its seed data array which points to "Link non-text data" the pointer / value is sent to device B Both devices record the pointer to "Link non-text data" at their 201st TRIPL array index location, or with pointer index value 201

Device B generates a pointer to its seed data array which points to "USMC Field manual" the pointer / value is sent to device A Both devices record the pointer to "USMC / Army Field manual for RPG" at their 202nd TRIPL array index location, or with pointer index value 202

Process continues until complete TRIPL is negotiated... An array of characters, character strings, or records with an index capability may be used to store the new TRIPL or an array of pointers to the TRIPL may be used in TRIPL encrypted communications.

BEFORE PRE-ENCRYPTION CIPHER

AFTER PRE-ENCRYPTION CIPHER

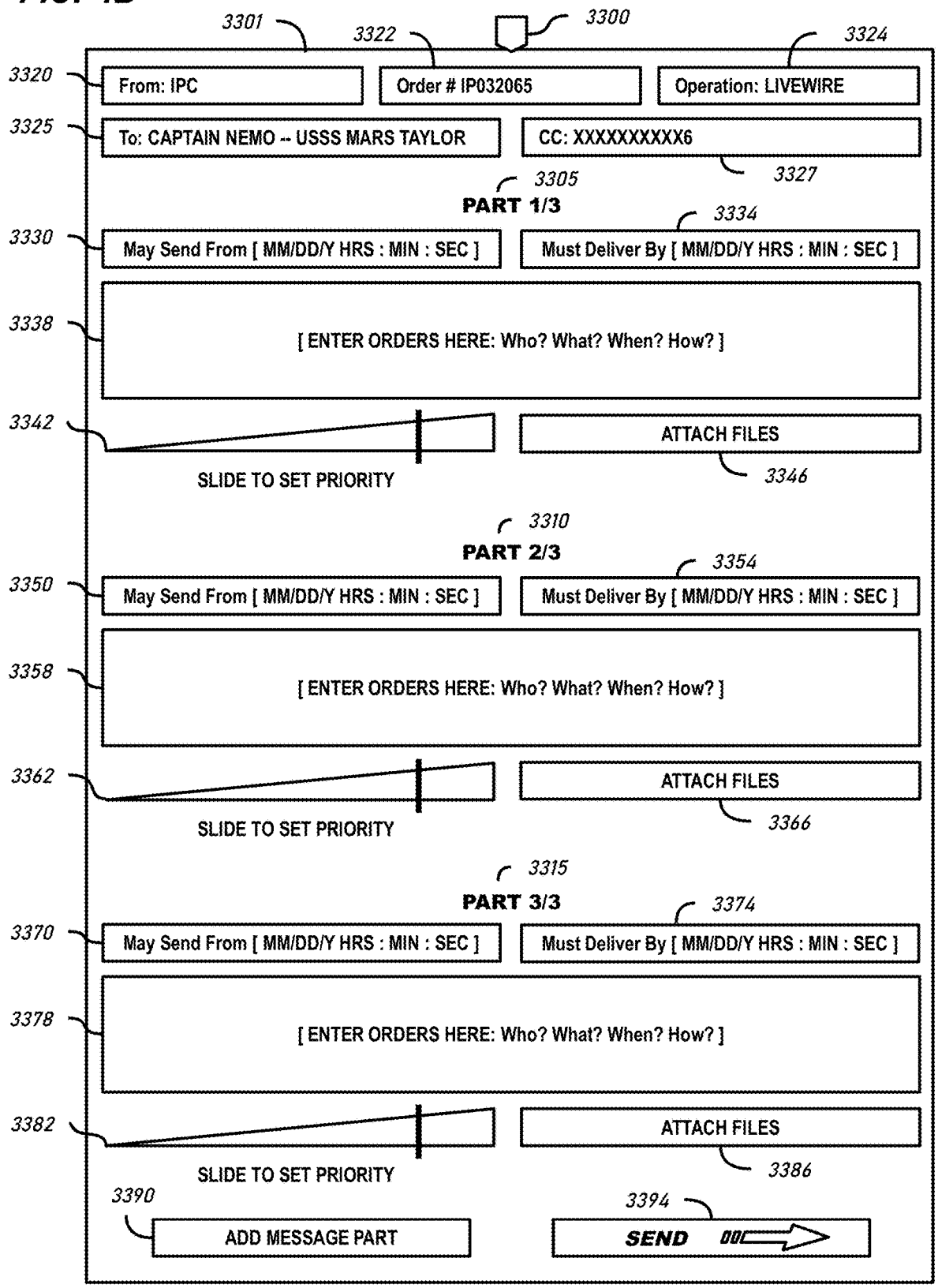

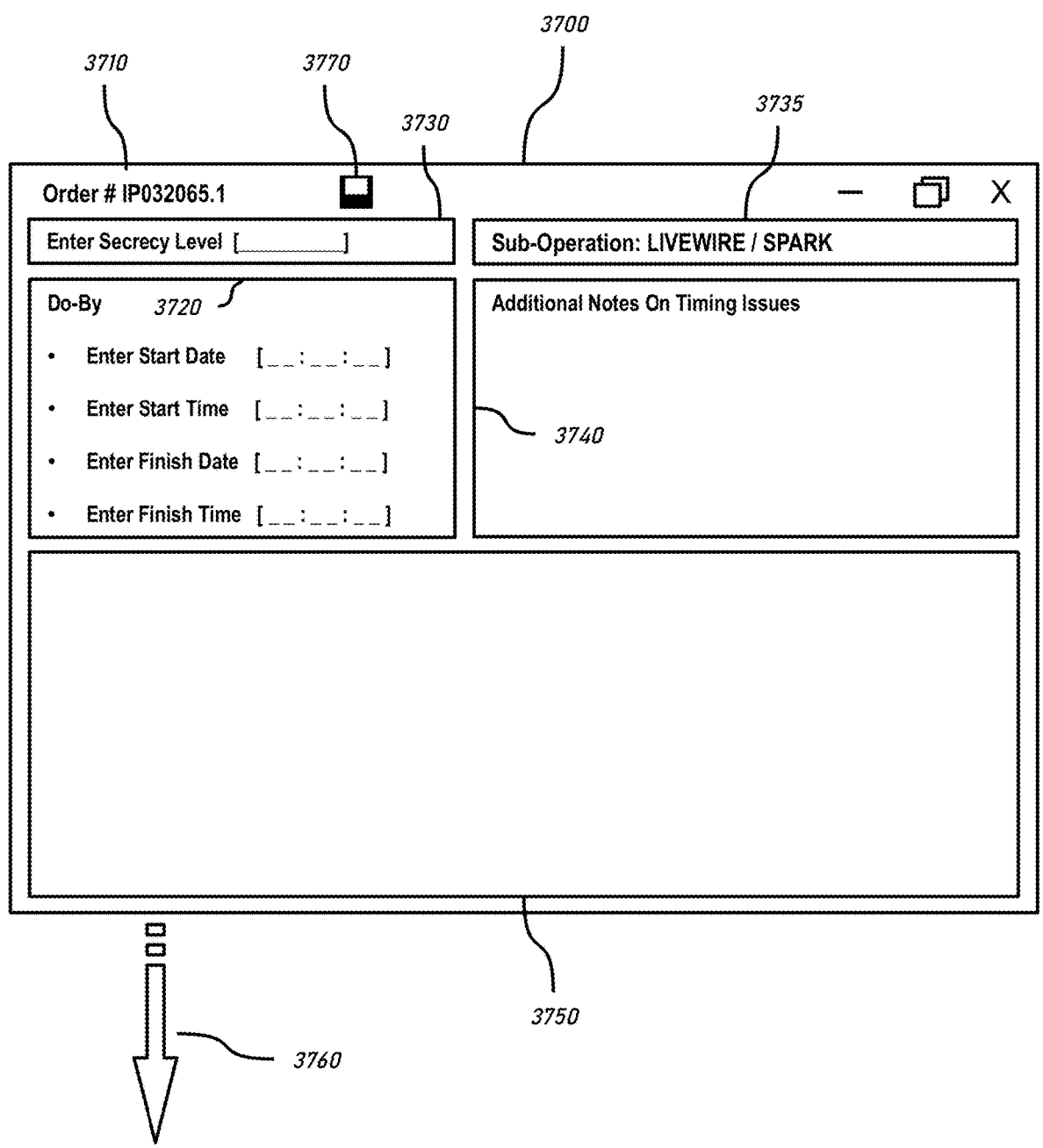

FIG. 4B(ii)

```
                                          3777
                                           |
                                          3701
                                           |
   3710         3770                       |
    |            |                        3735
    |            |     3730                |
    |            |      |                  |
┌───┴────────────┴──────┴──────────────────┴──────────────────────── — □ X ┐
│ Order # IP032065.1     ▭                                                  │
│ ┌──────────────────────────────┐  ┌───────────────────────────────────┐  │
│ │ Enter Secrecy Level [ ULTRA ]│  │ Sub-Operation: LIVEWIRE / SPARK   │  │
│ └──────────────────────────────┘  └───────────────────────────────────┘  │
│ ┌──────────────────────────────────────────────────────────────────────┐ │
│ │ If an adversary were to intercept and decipher this message or message part, could it reduce the chances of │
│ │ mission success, or endanger lives?                                                                          │
│ │                                                                                                              │
│ │ Y/N [ Y ]                                                                                                    │
│ │                                                                                                              │
│ │ Continue to next question.                                                                                   │
│ │                                                                                                              │
│ │ How much time would there need to be before the mission execution or start time for such interception and    │
│ │ deciphering to reduce the chances of success of the mission, or endanger lives. Estimate and enter values?   │
│ │                                                                                                              │
│ │    Weeks [__]     Days [__]     Hours [__]     Minutes [02]     Seconds [30]                                 │
│ │                          ————————— Thank You —————————                                                       │
│ │                                                                                                              │
│ │ The May Send From time for this message and any part of this message shall be no sooner than 2           │
│ │ minutes and 30 seconds prior to the Must Deliver By time.                                                │
│ │                                                                                                              │
│ │ Once within 2 minutes and 30 seconds of the Must Deliver By time, manual system override ASAP and / or send  │
│ │ immediately options may be used if the message is not sent automatically.                                    │
│ └──────────────────────────────────────────────────────────────────────┘ │
└──────────────────────────────────────────────────────────────────────────┘
```

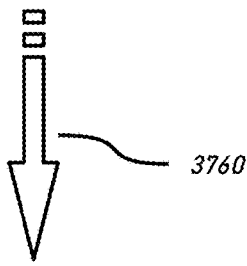

3760

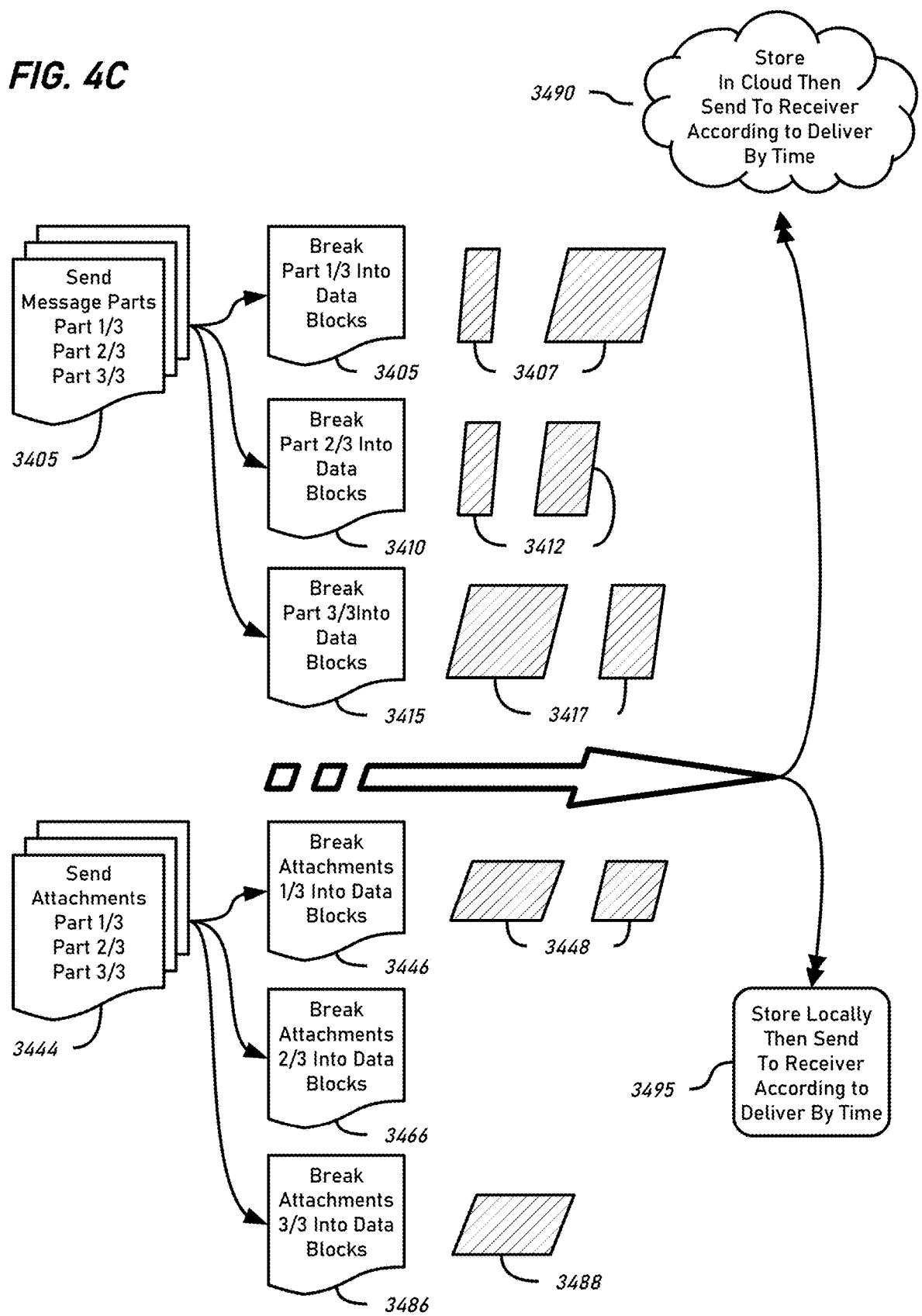

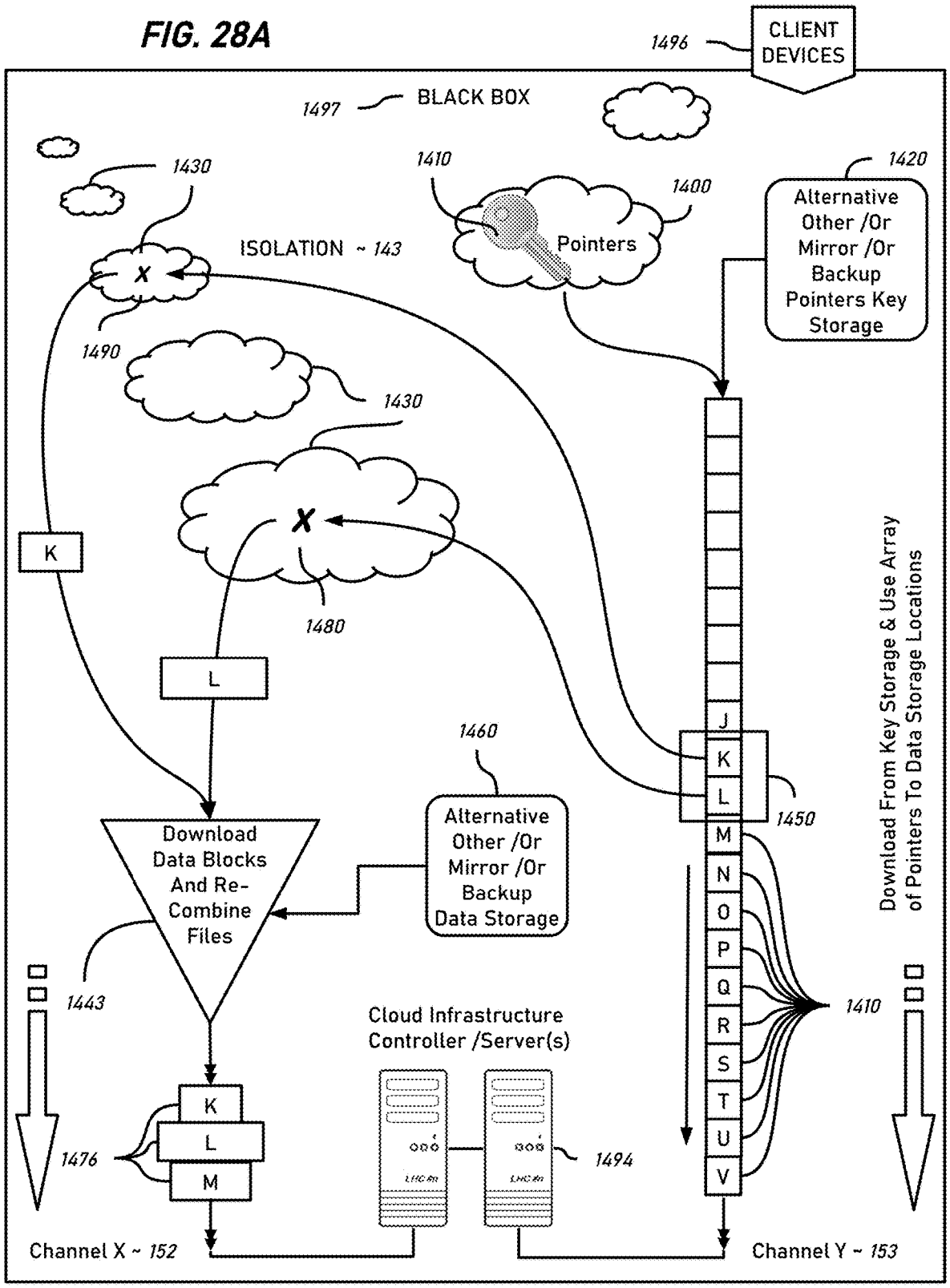

2510

2520

2530

2540

2550

2560

DATA SECURITY USING RANDOMIZED FEATURES

CROSS-REFERENCE TO RELATED APPLICATIONS

This application claims benefit under 35 U.S.C. § 119(e) of U.S. of U.S. application having Ser. No. 17/151,086 filed Jan. 15, 2021, and Ser. No. 17/221,335 filed Apr. 2, 2021, which are hereby incorporated by reference in their entirety.

FIELD

The subject disclosure relates to cloud-based information technologies, data security, encryption, decryption, ciphers, data security, data protection in storage, data protection in transit, and secure communications. It furthermore relates to artificial intelligence, machine learning, quantum computing, and information processing systems architecture. Civilian, military and intelligence examples and applications of these subject technologies are included.

BACKGROUND

Unfortunately, at the time of filing this patent application there is a tsunami of intellectual property theft. In which the Inventor has suffered more than most at the hands of intelligence agencies and cyber-criminals. There is an adverse economic impact, and a reputational cost which is that many of the Inventor's original works will probably never be credited to him. Because the intellectual property thieves managed in some cases to exploit them, or file for patent protection upon them before the Inventor. Which bitter experience illustrates amply the need for better more secure IT for high value information. Such as early drafts of inventions and patent specifications.

As the world's premier producer of high value intellectual property, and advanced defense technologies the United States has also suffered and is still suffering from industrial scale intellectual property theft. Mainly but by no means exclusively by China. Plus, the rising menace of Russian hacking which is also occurring on an industrial scale. Indeed, hacking and some of the colorful characters involved in Russian hacking activities, appear to be backed by one or more of their intelligence agencies FSB, SVR and GRU. The achievements of which appear to be a matter of national pride for modern Russia.

Industrial and economic espionage is a high-value, low risk crime that many nation-states and corporations indulge in. Yet the chances of being prosecuted for intellectual property theft are exceedingly small indeed. Even though the value of some intellectual property can be exceptionally high. Consequently, for a smart high-tech criminal, it is a safer and better paying crime than most others. For which very few people are ever caught and even fewer are prosecuted.

The US military also needs more secure information systems, networks, and communications, right down to the level of reducing signal noise/leakage from systems such as missiles, tanks, and aircraft. Because this noise may be captured by signals intelligence (Sig-Int) eavesdropping. Signal noise and leakage can allow eavesdroppers to reconstruct the information on a display screen from nothing more than signal leakage. This is why the U.S. prohibits its employees who may possess sensitive information from using a personal computer in hotels within the Peoples Republic of China.

The main protective technology in the prior art is the cryptographic encryption of data. For which many programs have been created. Ciphers and codes have a long history which began with spying and the passing of secret messages.

The McKinnon case also illustrates the practical inability to prosecute hackers across borders. Which in that case turned not even on matters of law per se. British man Garry McKinnon hacked sensitive US systems and was detected. When challenged about the hacking he claimed to have been looking for evidence of UFOs. U.S. agencies sought to extradite Garry McKinnon. But their efforts were rebuffed ostensibly because they were so unpopular with the British public—that their government declined his extradition to the U.S.

However, it may also be the case that Garry McKinnon was under the influence of a British military intelligence psychological operation. Who may have been manipulating him (as a patsy, as some suspect Lee Harvey Oswald was for someone) to do for them something that they could not risk doing themselves. For which they had needed the cover of plausible deniability.

The subject of UFOs and the reverse engineering of allegedly extra-terrestrial technologies being of keen interest to the British military, military intelligence officers and defense contractors alike. Because this suppressed subject is in fact of extreme interest and importance to many militaries. In relation to which most of them believe that the U.S. may have a head start.

Criminal hackers also steal then sell secrets to state actors. State actors may hide behind such non state "Hacktors" or use psychological operations and manipulation to get them to do deniable work for them. Imagine a person who has been brainwashed and trained via brainwashing and then caused to undertake controversial hacking activities. Without comprehension of what he or she is doing, or who they are in fact serving.

Intelligence agencies seek to steal military secrets and intellectual property. Organized criminals steal intellectual property and other commercially valuable information for economic gain. There is considerable crossover between state and criminal intellectual property theft. That may be further blurred by the use of brainwashed patsies and mercenary activities.

So called "Zero-Day" vulnerabilities and exploits have generated an industry and market in which hackers and crackers break apart software to find them. Which is probably not technically illegal, and for which probably even U.S. intelligence agencies will pay.

Much economic crime is comprised of the theft of financial information. There is also a thriving black-market for stolen credit and debit cards on the Dark Web.

Furthermore, there is also an increasing risk from perverts who may wish to steal images and illegally access the rising number of devices with cameras to spy on and photograph children or people they are unlawfully stalking. This storm has not yet broken in the media.

Mobile devices are perhaps one of the greatest security threats posed to most organizations, and to individuals and their privacy. This is because they are carried with us and can yield large amounts of personal data. Particularly offensive dangers are posed by pedophiles accessing the phones of children, to track and stalk them, and to take pictures of them and to groom, train and control them. Yet many parents find it comforting to be able to track their children using mobile phones.

A very large part of our modern lives is now documented, organized and stored online in live systems. Banks, retailers, governments, and the military have huge amounts of data housed online. The U.S. Military has its own version of the Internet, with its own data centers and cloud infrastructure.

This technological progress is a modern marvel and has enabled a great deal of human progress and productivity gains. Such as the exemplary behemoth that is Amazon with its awesome supply line and user base. Indeed, in Amazon's and eBay's favor, online shopping is an under-sung "green" success story and solution which is much less polluting than would be an equivalent number of consumers driving to and from shopping malls to buy all the goods they buy on Amazon. Unfortunately, ecommerce systems, and their data are extremely attractive targets. Which can and do suffer large-scale data theft.

The most vulnerable time for data is generally not while it is traveling over networks, but whenever and wherever it is stored. Worse still, humans tend to prefer to store large amounts of data in the same place, and in standardized formats. This is not to say that real-time data-theft from interception is not a risk. But that it is probably not the biggest problem for consumers. Protection against interception and decryption is however of vital importance for the military. Because loose lips may sink ships.

Data which is just sat on a server long-term such as the entirety of user data possessed by Facebook, Wells Fargo, or Google is like a "Data-Buffalo", a big stationary target. Hackers try extremely hard to break into these big stationary targets. Whether it is perverts trying to get at children's data on Instagram, or financial crime, or espionage—the systems that are often most in need of protection are the back-end systems. Those which hold the databases, including the databases held locally on user devices such as cellphones and personal computers.

Securing streaming media is important for the protection of the intellectual property rights; and so that they can be metered and paid for. The motion-picture industry is a valuable jewel. Of great importance to the state of California, the U.S. and Canada in particular. From which piracy injures that industry and the North American economy. The problems of streaming media and public Wi-Fi use are in some ways similar to some of the problems faced by the military. Military data in transit needs robust, fault tolerant systems, that are also secure.

Military applications are more demanding, because they have to protect the data created and needed by war fighters, in real time, and in life-or-death situations. So, both Hollywood and the U.S. military can benefit from improved protection of data streaming technology; and users of public Wi-Fi may benefit from improvements to device-to-device security.

Clearly, as information technology evolves and new risks emerge with each new addition to the technology, so too the defenses against abuse need to evolve. Unfortunately, most encryption can be hacked by hostile intelligence agencies. Furthermore, just as humans have now lost the battle for superiority in Chess to computers if humans have not already lost the battle over cryptography to computers. Then they probably soon will lose it to Artificial Intelligence, and Quantum computing systems.

For all these diverse reasons these subject technologies are much needed in a diverse range of applications.

SUMMARY

In one aspect of the disclosure, a cloud data storage infrastructure operating a data security system is disclosed. The system comprises: a connection to a telecommunications network coupled to one or more client devices; a supply of data from one or more client devices being received into memory or data storage of a server computing device; and a machine executable code loaded into the server computing device wherein steps of the code are executed by a computer processor in the server computing device; wherein, the code is configured to: receive a data file, disassemble the data file into blocks of data; generate addresses for random storage locations in a cloud based network for each of the blocks of data, store the blocks of data into the random storage locations within the cloud data storage infrastructure, and record the addresses of the random storage locations into an array of pointers.

In another aspect of the disclosure a computer program product for operating a data security system in a cloud data infrastructure is disclosed. The computer program product comprises: one or more computer readable storage media, and program instructions collectively stored on the one or more computer readable storage media. The program instructions comprise: receiving a data file, disassembling the data file into blocks of data; generating addresses for random storage locations in a cloud based network for each of the blocks of data, storing, through the telecommunications network, the blocks of data in the random storage locations within a data storage infrastructure of the cloud based network, and recording the addresses of the random storage locations into an array of pointers.

Consequently, it should be understood that many other possible configurations and combinations of the subject technology will become readily apparent to those skilled in the art from this specification generally and the following detailed description, wherein various configurations of the subject technology are shown and described by way of illustration. As will be realized, the subject technology is capable of other and different configurations or combinations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIGS. 2C(1) and 2C(2) are a block and flow diagram defined process of a run-time series of process steps according to an aspect of the subject technologies.

FIG. 4B is a screen dialogue and data entry window which is part of a graphical user interface according to an aspect of the subject technologies.

FIG. 4B(i) is a screen dialogue and data entry window which is part of a graphical user interface according to an aspect of the subject technologies.

FIG. 4B(ii) is a screen dialogue and data entry window which is part of a graphical user interface according to an aspect of the subject technologies.

FIG. 4C is a block flow system diagram of the breaking apart and transmission of a message according to aspects of the subject technologies.

FIG. 28A is a mixed schematic and block flow system diagram of secure cloud storage and data downloads in accord with various aspects of the subject technologies.

DETAILED DESCRIPTION

Figure 1:
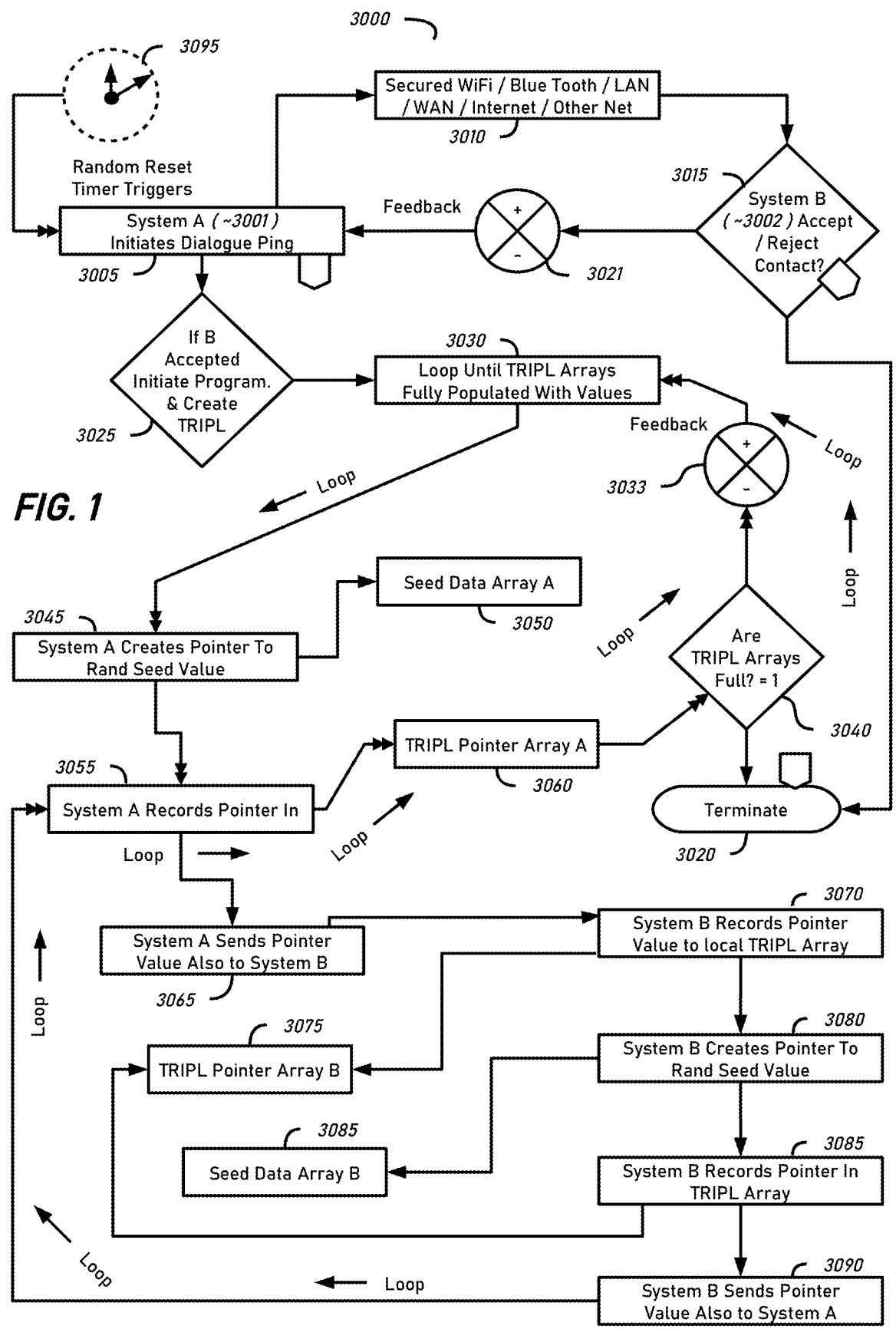
FIG. 1 is a mixed schematic and systems block, flow diagram of two systems establishing contact and cooperating according to various aspects of the subject technologies.

The detailed description set forth below is intended as a description of various configurations and/or combinations of the subject technology and is not intended to represent the only possible configurations and/or combinations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

In general, embodiments of the subject technology improve upon the state of the art, and/or their applications. Alternative variant embodiments can also improve upon the state of the art in the systems into which they are incorporated, and/or their applications. In the drawings this symbol "&" means "and", this symbol "/" "or" and this combination "&/" means "and/or".

There are many systems that may be modified to incorporate aspects of the subject technologies to provide new and improved or upgraded systems—that are in fact too numerous to define all possible permutations. Such implementations and variants are intended to be included herein. This specification and the exemplary embodiments provided herein are intended to be illustrative and not restrictive.

There are many threats to the security of data as it travels over the Internet, and when it is stored on devices with an Internet connection. Users keep ever more of their data online in their personal "Cloud". This trend looks set to continue for the foreseeable future. Users can seamlessly access their data from various devices over the Internet twenty-four hours a day seven days a week.

Cloud data backups also offer reliable ways to keep user data, and backups safe for emergencies in which the bulk of the data stored on a PC, Tablet or Smart Phone might otherwise be lost. Encryption programs are used for all aspects of personal and commercial IT security. Secure transactions and financial data are known to be of only limited utility against the world's various intelligence agencies. Who have extensive code breaking expertise, that began with the code breaking at Bletchley Park in England in World War II, and the work of inter alia Dr. Alan Turing a gifted mathematician, and Tommy Flowers a brilliant telecommunications engineer. Their task was to decipher the German Enigma and other codes and ciphers that had been used to conceal the meaning of German communications.

With the advent of high-powered computers, modern code breakers seem to have gained the upper hand. So that, it is probably the case at the time of filing this patent application that whatever mathematical puzzles can be created by one human, or artificial intelligence almost certainly can be deciphered by another human, or artificial intelligence. Consequently, data owners and especially the US military could really use a paradigm shift back in their favor.

Furthermore, computers that play Chess have now convincingly proven themselves to be capable of consistently beating the best human players. The strategy game Go has gone the same way. And with Artificial Intelligence (AI), and/or Machine Learning (ML) and/or Quantum computing, things might look set to get even worse for data owners. It appears we are headed for times when computers create encryption programs and other computers crack them. So, it seems the arms race between more sophisticated encryption and decryption is all set to leave humans behind in an endless mathematical arms race.

These subject technologies, however, are intended to provide a different approach, from the purely abstract mathematical arms race. The problem with all encryption-based security measures is that they all rely on abstract mathematics. Which is embodied in programs that transmute the original data into data which can only be decrypted by reversing the abstract mathematical steps made in the creation of the encrypted data. This may be the "Achilles' heel" of the technology in the state of the art. Because what one mathematician can encrypt, an equally talented mathematician can decrypt. Powerful modern computers increase the speed and complexity of the calculations. But as both sides have access to powerful modern computers, progress tends to cancel out.

The subject technologies seek to take some of the abstract math out the equation, save that some math can be used to disguise the fact that this technology does not rely purely on mathematics per se. Though it is logical, and thus amenable to computer processing and control.

These subject technologies are intended to create logical IT systems and methods for leveraging unique data, data structures and protocols into a form which is incapable of being predicted, deciphered, faked, or altered without detection using any known mathematical decryption technique. There is math in there, but it is subtle.

Randomization may be introduced and combined with logic and programs in these subject technologies where it is helpful to create new systems and methods for data protection. As well as attributing meaning to structure according to logical protocols.

The military have to work in contested environments and contested electromagnetic spectrum. They have to communicate secret time sensitive orders, strategic and targeting data reliably and securely. Even when adversaries are intercepting and decrypting or jamming those communications the military has to be able to communicate securely and reliably.

There are commonalities between these military needs and the needs of civilians. The Inventor's approach is to design robust solutions for military applications, and where helpful to adapt his solutions to civilian applications.

The encryption used on the Internet is not very secure. It may fend off some criminals but not all, and it will certainly not stop professional spies. So, the Inventor has created a new transient type of cipher-logic and programs, for use between two nodes which may be two battlefield computers or radios, or two civilian devices such as phones, or computing tablets. The Inventor calls this aspect of the subject technologies "Time Randomizing Interface Protocol Language Encryption" (TRIPLE).

In which two devices may use a randomizing interface protocol to create a one-time use unique language known as a transient random interface protocol language (TRIPL). That is known only to themselves, and which may be used for a random time period. After which it is replaced by another TRIPL.

One of the problems with ciphers that the military may use globally against global adversaries is that sophisticated adversaries have the research capabilities to crack the ciphers and encryption of the prior art if they are used sufficiently often to merit the effort. The Inventor analyzed this problem in the context of these subject technologies. The result was creation of his "Time Randomizing Interface Protocol Language Encryption" (TRIPLE), these use a succession of TRIPL that are transient (existing only from one time period to another). The time period of which transience may also be randomized. In order to minimize the benefit to be gained from cracking and deciphering any one iteration of them. To provide an interface language that is governed by randomized protocols according to these subject technologies.

TRIPLE may provide a solution to battlefield and local encryption, and also for encryption for use across wider networks. TRIPLE creates a unique randomized cipher that exists only between the two communicating points or nodes on a network that is used only between those communicating nodes and used by them only fleetingly. Before being re-set to a newly created TRIPL. The earlier TRIPL may be used during the creation of the next TRIPL and so onward. By adjustment of the timing of replacement of the TRIPL being used, the characters that make up that TRIPL may be individually replaced on a rolling basis, so that the TRIPL is constantly transient, and constantly evolving to the next TRIPL while in use. So that once two nodes are operating securely using TRIPLE, it is very difficult to break into those communications in an efficient and timely manner. Data traveling over networks may travel through many TRIPLE ciphers that are then destroyed, and never recorded or used again.

So that eavesdroppers may intercept communications over time that include use of many unique TRIPL none of which are ever the same again, and which may last only minutes, or even seconds before being replaced. Each TRIPLE interface being programmed to randomly negotiate a new TRIPL at randomly timed intervals, and to operate like a "black-box" so that devices can be communicating over networks that are using different unique TRIPL all of which are like black-boxes. Which allows devices on the inside of the TRIPLE interfaces to work just like regular devices plugged into black-box communications like a bespoke router only they can communicate with.

TRIPLE may thus create a constantly moving target, that it is intended not to be worthwhile for hacking attempts. Because the TRIPL may be constantly evolving and will be fully replaced regularly. Also, that hacking one TRIPL will not help to decipher data once that TRIPL is replaced. There is probably no easy way from the outside to know when a TRIPL is replaced. So that they may provide a new way to secure battlefield communications.

TRIPLE can also be used between any two devices with the appropriate software according to these subject technologies. This software may also be provided in firmware for use within networking cards and routers and similarly embedded into systems and hardware. So that TRIPLE may be used for all device to device, or peer to peer communications. Furthermore, as between two devices one unique TRIPL may be used, and a different TRIPLE cipher may be created at every interface between nodes as it routes through a network. The same data may thus pass through one unique TRIPLE for every pair of nodes passed through, and within each such interface the language/cipher may be unique, and time restricted.

The creation of some TRIPL for use in TRIPLE communications are addressed in the descriptive materials pertaining to FIG. 1, FIG. 1A, FIG. 1B, FIG. 1C, FIG. 2, FIG. 2A, FIG. 2B and FIG. 2C, and in those figures themselves. The efficacy of TRIPLE and other forms of encryption may all be boosted by the use of a Pre-Encryption Cipher (PEC) such as the example provided of statistical adjustment of character or repeating pattern frequencies in FIG. 2D, FIG. 2E, FIG. 2F, FIG. 2G. Data streaming aspects are more particularly addressed after the main body of randomizing subject technologies that are explained in FIG. 8, FIG. 8A and on through to FIG. 26, FIG. 27, FIG. 27A, FIG. 28, FIG. 28A and FIG. 29.

Again, in the context of military communications, some messages are important and urgent, some are important but not urgent, some are less important but more urgent, others may be very unimportant and not urgent either. Consequently, it makes sense for the US Navy to prioritize some messages. Especially where bandwidth may be limited such as in submarine communications. Otherwise, personal information from social media might crowd-out vital orders and targeting data traveling from ship to shore and vice versa.

The Inventor has also created additional and related subject technologies for the more efficient use of constrained bandwidth for submarine communications. Which may be made more secure by breaking apart messages and separating them in time, in a such a way that they travel over the network according to their relative priority and "do by" times. So that all orders arrive on time. But where security may be enhanced not only by breaking messages apart but also by saying as little as possible—until the orders are actually needed to be acted upon.

Thus, making it harder for an adversary to find and reassemble all the parts of the message, and even if they can find all the parts. The most important and secret parts are only sent in sufficient time to be executed successfully. So as to deprive an eavesdropper any unnecessary advanced warning in which to attempt to frustrate the purpose of the orders.

Using temporal separation and randomization of timing, along with prioritization and secrecy maximizing timing, limited bandwidth may also be better more efficiently used. By spreading the traffic out more evenly over a period so as to flatten the peak, or the peaks of a demand curve. Thereby improving the effective use of bandwidth and avoiding peaks that may crash into a bandwidth ceiling. These aspects of the subject technologies are addressed in the descriptive materials pertaining to FIG. 3 and FIG. 4, and within those figures.

This bandwidth issue arises in the context of submarine operations because very long wavelength radio signals are best for transmission through seawater. Unfortunately, the longer the wavelength the less information may be modulated into the signal.

As regards data file protection, the Inventor has created further related and complimentary logical systems and methods for randomization of information processing technologies mainly addressed in FIGS. 5 through 29. User data may first be divided into data blocks, the smallest possible example of which would be data bits having the value either zero or one for a binary system.

More complex quantum systems capable of representing probabilities and/or of characteristics of particles and their wave-form functions are addressed towards the end of this detailed description. Even logic and architectures for data structures that are based on an eleven-dimensional string theory-based system are included.

This explanation continues with simple examples for aid of clarity. Within these systems a character such as "H" may be represented by a binary code or other base code which need not concern us for the purposes of this exposition.

The size of the data blocks used may be a variable choice for users to make and may also be randomized between minima and maxima. Minima could be a "1" or "0" or a character or a string of characters or other base units of data, and maxima could be any desired plurality of minima or at least a minimum plus at least a fraction of a minima.

With no encryption this "H" or its binary code can be sent over a network, and hackers and snoopers can hack this data feed to intercept it by various means. However, in normal circumstances the hacker would probably also intercept the character that preceded and followed the "H" if there were any such preceding or following letters.

But what is different about information stored or transmitted according to the subject technology, is that where the individual data blocks go to be stored within the cloud is not necessarily the same from one data block to the next. So that, for example the Cloud computers may have been reconfigured each with its own number or network address. For example, there could be one thousand individual servers within the cloud data center (simplified down for reason of space in the drawings to five possible storage locations). Each with its own number or network address.

The data may be sent to this cloud by dividing it into data blocks (the size of which may or may not be randomized). Then sending each data block to a randomized location within one of the one thousand servers, and the locations to which the data was sent is recorded as a series of pointers; within an array to make a sequential key comprising the location in order of storage of every data block. Which key may further be comprised of sequentially stored pointers.

Storage of which key may be located within another separate specialist location by an organization such as Verisign, or AWS for example. This key may alternatively be stored on the local hard drive or backed up to USB drives or other media perhaps in a hidden drive, or hidden file capable to act like an access dongle. The possibilities are endless, and some of these options are more secure than others. These examples illustrate some but not all possibilities and are not intended to limit or confine the scope of the subject technology.

This key and the storage allocation should not be confused with "hashing functions" those are mainly about efficiency not security per se. Furthermore, while it is true that a hashing function could be based on randomization, and the programs of the subject technology might conceivably be used as part of a hashing function. Due to a modest overlap of suitability, hashing functions are about mathematical efficiency employed for optimization of storage times and access times for data retrieval. Randomization of data storage may provide one efficient method. But these subject technologies are designed to prevent data collisions, and to prevent damage to preexisting data. Whereas hashing functions achieve efficient storage by mathematically avoiding rather than preventing data storage collisions. Consequently, they may sometimes accidentally overwrite data due to collisions and then have to reinstate it or hold two sets of values mapped to the same location. Hashing is mainly about writing and reading data quickly, not about data protection and security.

Figure 15:
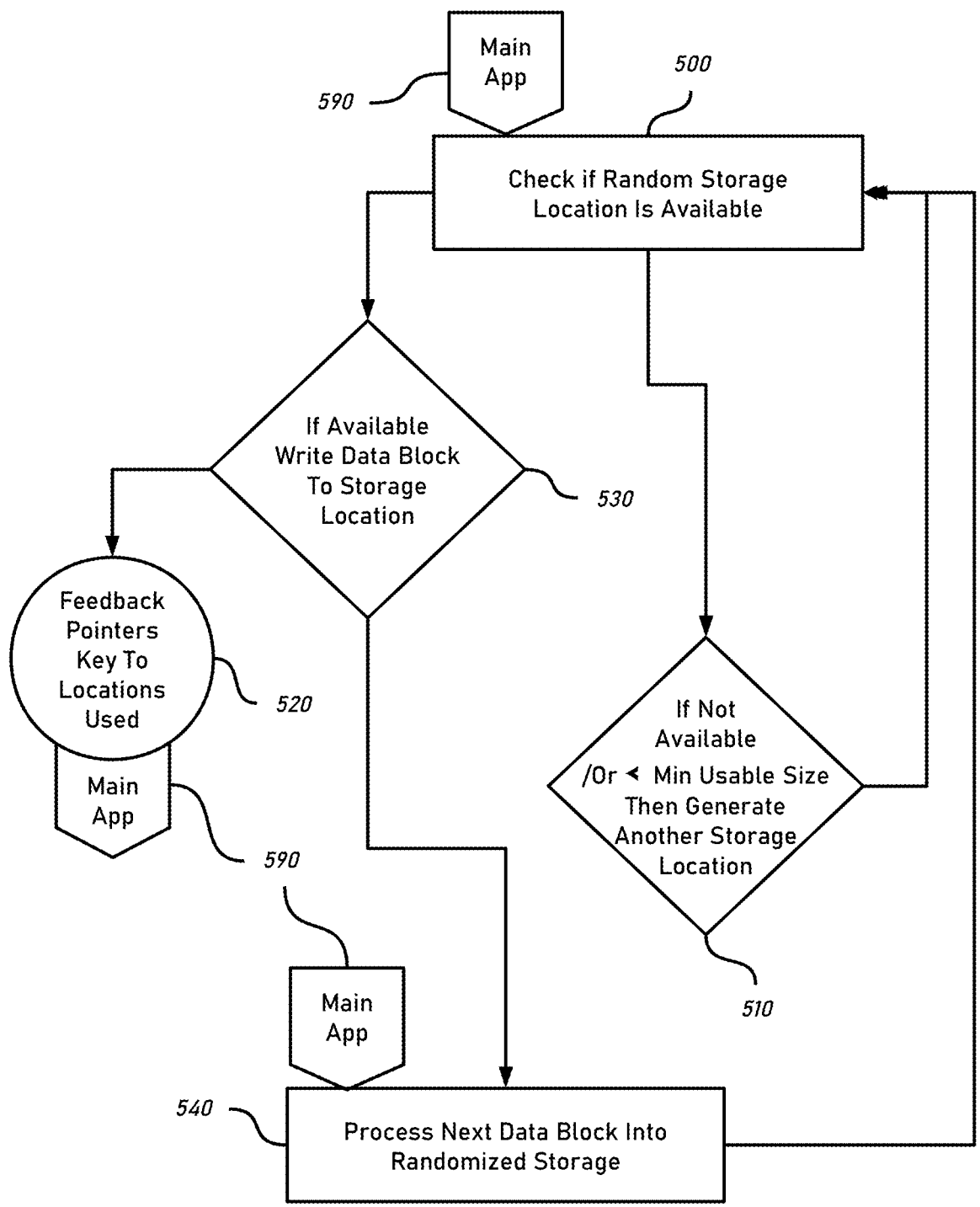
FIG. 15 is a block and flow diagram describing a logic module or program, for writing data blocs to random storage locations according to an aspect of the subject technologies.
Figure 16:
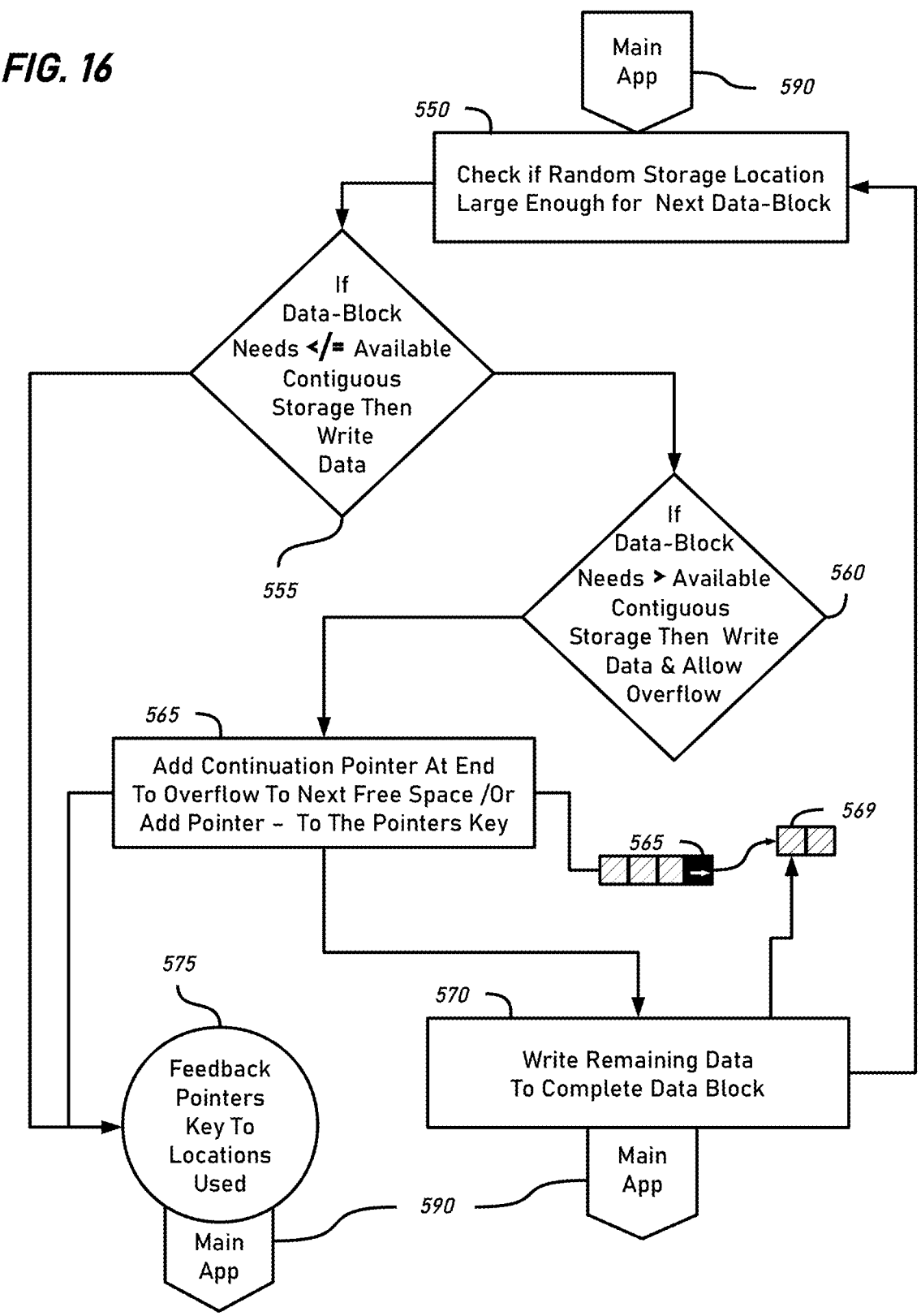
FIG. 16 is a block and flow diagram describing a logic module or program, for writing data blocs to random storage locations according to an aspect of the subject technologies.

Careful study of these subject technologies and the two decision tree programs of FIG. 15 and FIG. 16 contain the Inventor's solutions that are designed implementation as computer program modules to capable to prevent potential data write collisions and/or data overwrites. Potential data write overwrites are detected before any data is written. In these subject technologies, precisely because the objectives and guiding rationale are about data protection and security.

So that in these subject technologies any data in a location selected randomly for writing new data may be logically tested before writing, and if a potential for collision with existing data is indicated—then another data write location may be generated to write the data-block; or where a storage location is available but too small to accommodate the data block, a data-block partial-write—plus an overflow operation may be produced. So that the surplus data overflows and is written to another storage location. In which case the first location includes a pointer to the overflow location; or the pointers-key includes the overflow location.

The basis of selection of data-block storage locations is based on randomization, and data protection. Rather than the potential for efficiency of data writes or access and read times per se.

This fact, however, does not need to preclude the use of the most efficient possible program to achieve the subject technologies. Which may or may not be compatible with any given hashing (efficiency, per se) function. Furthermore, once data is randomized while it might seem illogical, there is no particular problem with subsequently moving it around and storing it according to any particular hashing function, or other management system. Provided that the original pointers key can be updated or augmented to record any changes made.

These subject technologies need not get in the way of efficiency at the macro-level, or micro-level. The subject technologies just should not be confused with such optimization methods and/or "hashing" functions, or similar procedures, nor confused with fragmentation or defragmentation. They are specific things, and not part of these subject technologies. These subject technologies can be made compatible with such other things, but care must be taken. Because disk management programs can damage data processed according to these subject technologies. This need not be a problem, because a terminate and stay resident (TSR) program may be left running in the background on a computer system to modify its behavior to one compatible with these subject technologies. It may be helpful to think of hashing functions being primarily aimed at speeding-up data access times for read and write operations. They usually map to two dimensional constructs called tables.

Fragmentation is also usually expressed to represent disc storage spaces as two-dimensional constructs or tables. This is a natural side effect of the way some disk management systems operate, and the way they are typically processed. There are disk management systems that can defragment fragmented data to enable the disk space to be used more efficiently.

These subject technologies are not primarily aimed at either speed of access per se; nor are they aimed at disk optimization, fragmentation, or defragmentation per se. Indeed, these subject technologies can be set to write very dense unfragmented, even compressed randomized data where slack space may be utilized for storing randomized data. This has an additional benefit in that the more files are randomly intermingled, the more they may each protect the other. There being strength in numbers being a recurring theme of these subject technologies.

The two programs of FIGS. 15, and 16 may be used to achieve dense data-block storage, at or close to the contiguous maximum storage capacity of a storage space, partition, or drive. Though this is not a specific goal pursued in these subject technologies, developers may nevertheless find it useful to be aware of this aspect. The amount of available space may be used to determine the most appropriate data writing program.

Programmers have designed hashing functions, fragmentation, and defragmentation around the notion of tables and two-dimensional maps. Computers do not need to visualize data in ways that are human compatible. In these subject technologies, the key may be comprised of only a one-dimensional array for ease of use and simplicity. Computers, and especially artificial intelligence having no problem conceiving one very long one-dimensional structure. Like a theoretically infinitely extendable street, with specific data at every address.

For example, data is stored randomly into storage, the locations of which are then recorded in a long one-dimensional array. Coordinates in two dimensions are often not necessary. Additional computation and cross referencing of variables in more complex human friendly structures such as tables using some sort of coordinate system for read/write data referencing may thus be avoided. By allowing the computer to work as a computer, rather than super-imposing human comprehension needs onto its data structures.

The ethos of these subject technologies is that they are intended to be minimalist, practical, clean, and as simple and hence as efficient as possible. With the focus on data protection from corruption and security threats.

Figure 27:
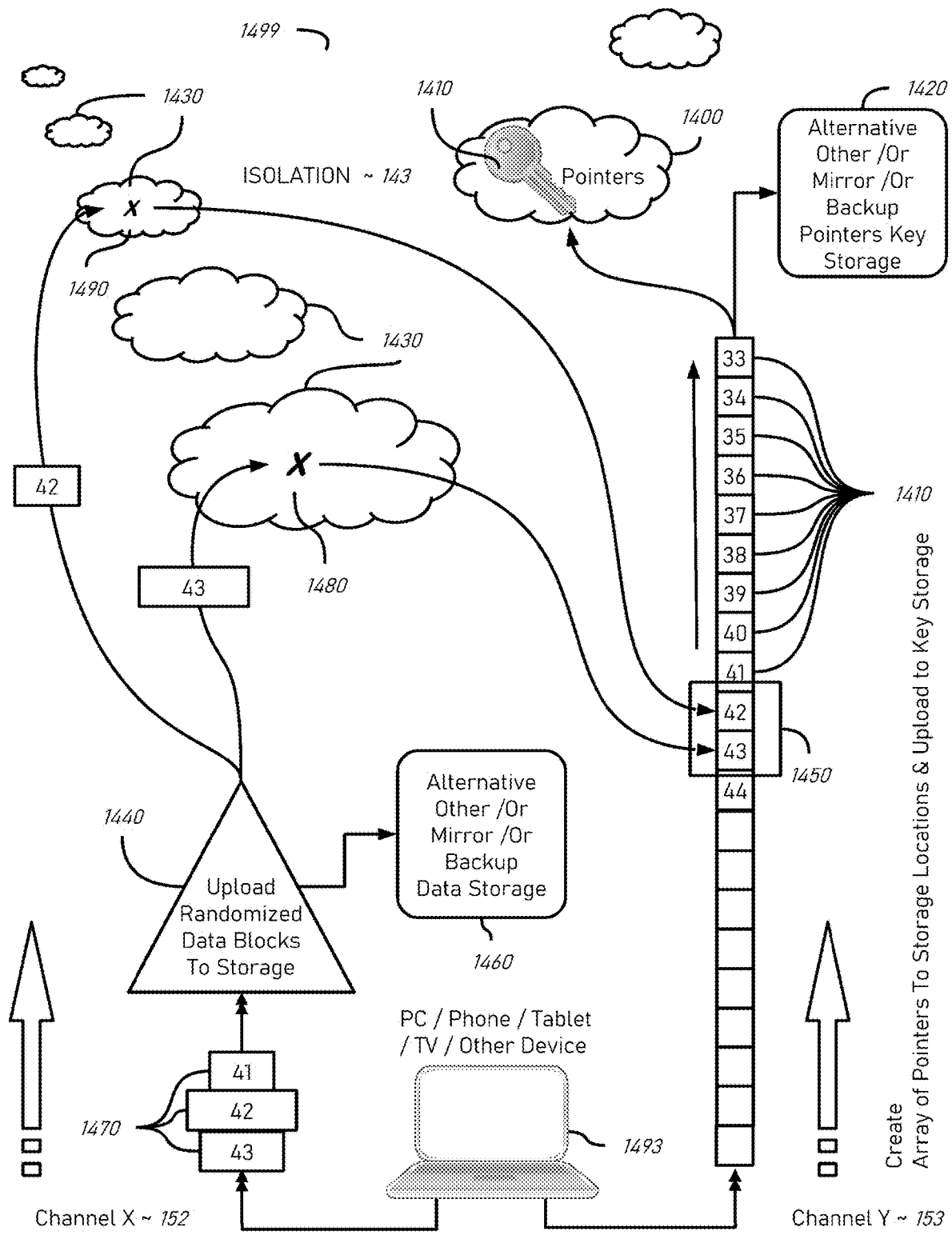
FIG. 27 is a mixed schematic and block flow system diagram of secure cloud storage and data uploads in accord with various aspects of the subject technologies.
Figure 28:
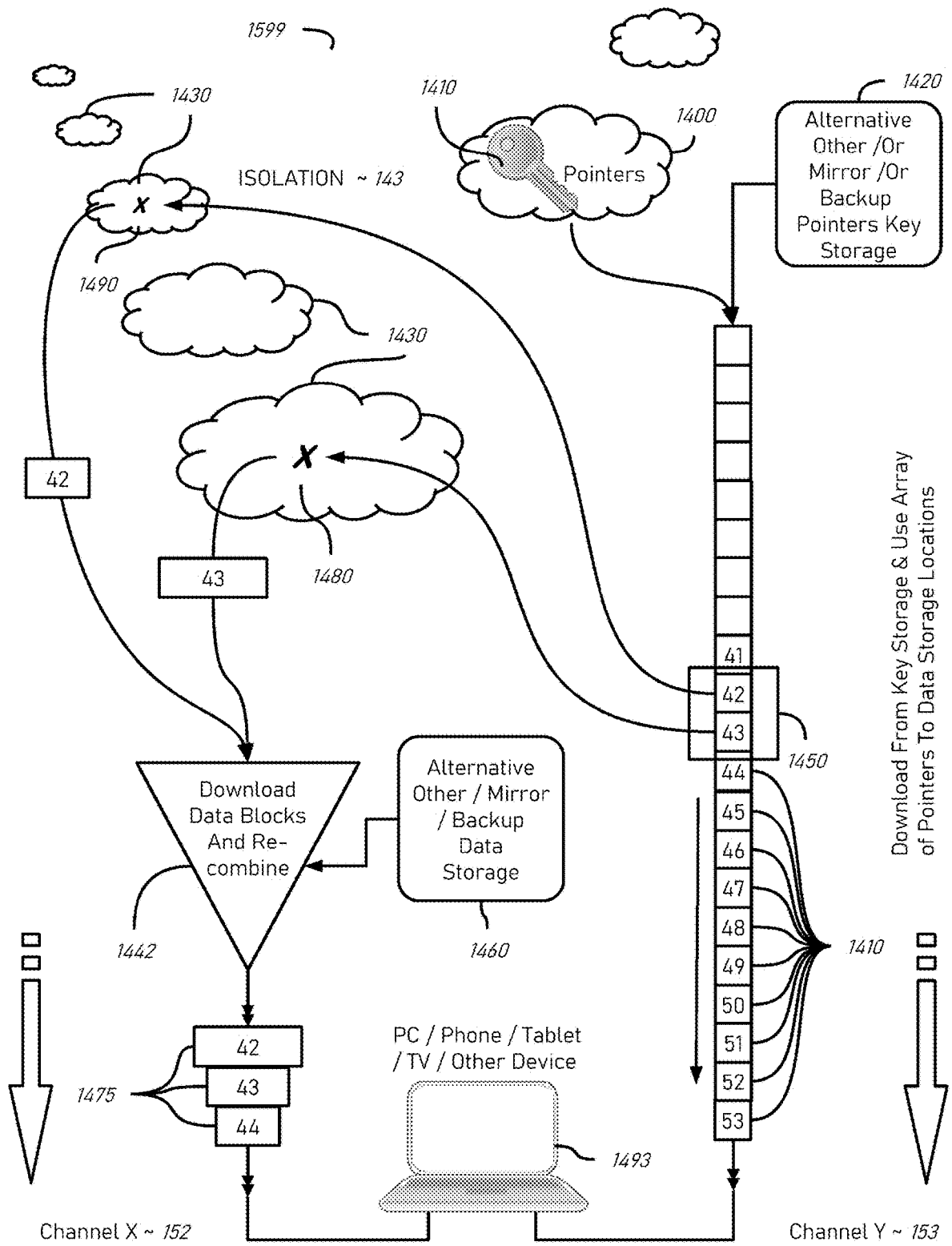
FIG. 28 is a mixed schematic and block flow system diagram of secure cloud storage and data downloads in accord with various aspects of the subject technologies.
Figure 29:
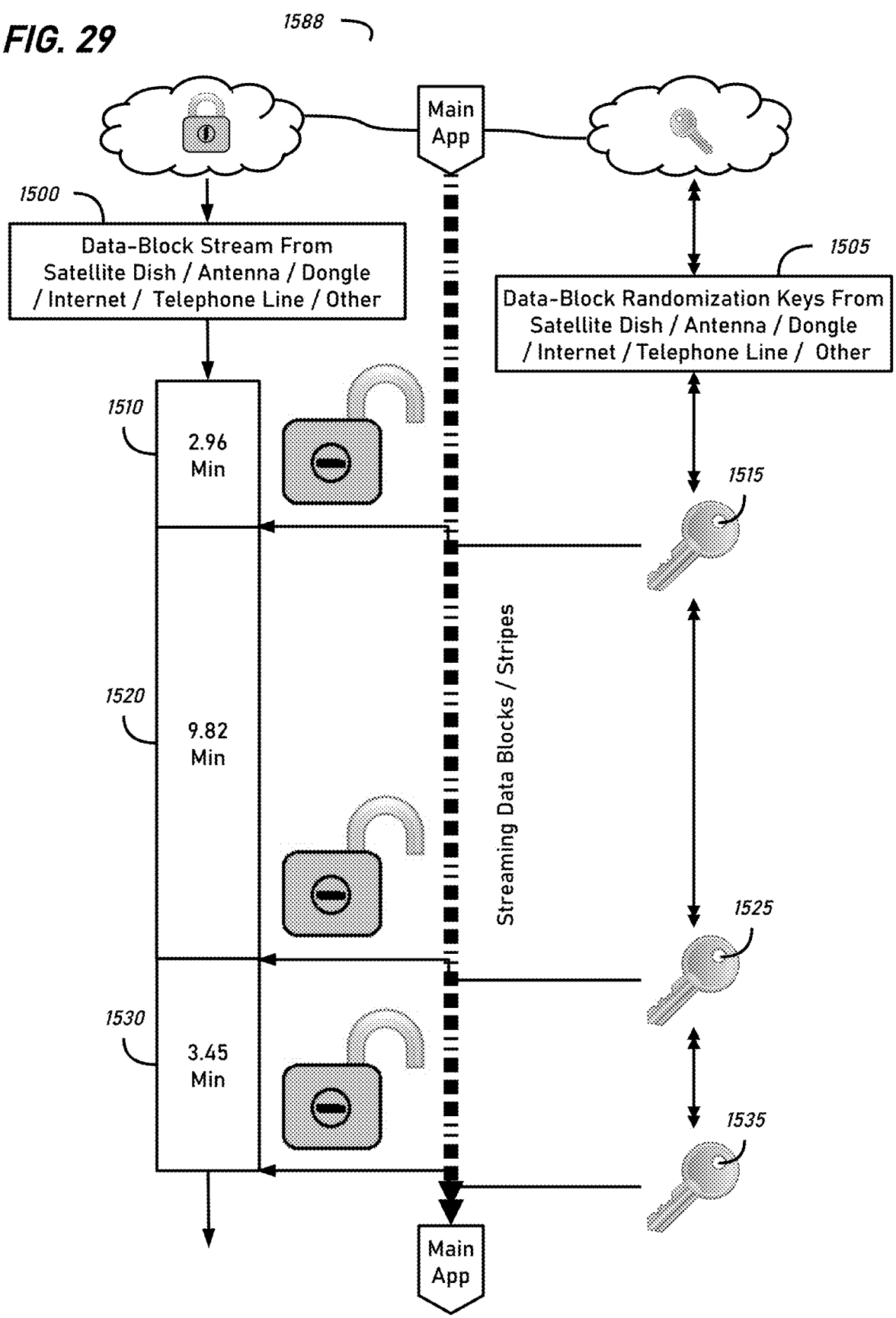
FIG. 29 is a mixed schematic and block flow system diagram of secured streaming downloads in accord with various aspects of the subject technologies.

The pointers key may be comprised of a simple array containing the locations recorded in the sequential order over time, of where each block of data was sent for example. To retrieve the data from the cloud, the cloud computers are requested to return whatever was stored at each specific location identified by the pointers key for reassembly back into their original order. A good way to visualize this as shown in FIGS. 27 through 29 is rather like a zipper, which clicks data blocks apart for storage, and zips the same data blocks back together to resemble it, back into their original order.

It may be appreciated that this process could be virtualized and/or scaled down to run on just one device such as the internal storage of an iPhone, Android smartphone, or PC hard drive, and it could still provide a serviceable data protection and security capability. Which in the absence of the key would be close to impossible to reconstruct. Similarly, the subject technology may run on just a suitably programmed CPU working with only RAM or flash memory. Those choices and applications will vary as this technology proliferates into devices and networks.

Major targets for hackers are servers holding financial and user data. Presently this is relatively easy for them. Because the files are in one place and will even have helpful end markers between files. How nice of the systems designers to make our files so easy to find and to add bookends to parse each file.

Whereas if hackers were to steal the entire contents of the one thousand cloud servers of a data center configured according to these subject technologies—there is no presently known decryption program which could reassemble any user or account data that has been stored according to these subject technologies. It would just be a mountain of useless gibberish without the key comprised of the sequential location pointers, and comprehension of what it is, relative to the data blocks to which the pointers correlate.

Possession of one user's key of pointers may only identify that user's data within the system. If stolen it cannot be used to identify the data of any other user. So that for a hack to succeed in getting mass user data, it could only work if all the keys relating to all of it were also stolen. Thus, making the technical challenge for hackers potentially insurmountable. Even more so where users are free to store their keys in a variety of locations, none of which may be co-located with their data.

Furthermore, a behemoth like AWS might have a thousand data centers. Each with a thousand servers and be able to randomize storage over a truly awesome amount of cloud locations. There is strength in numbers in IT, as there is in nature, for herding animals such as Wilder-Beast and other herding animals, flocks and swarms that are confronted by a predatory species. That is based on leveraging the mathematics of scale.

Suffice to say that the bigger the number of files stored as data blocks into random locations, within available storage—the harder to crack they all become. And if the pointers key is also kept online similarly according to these subject technologies, but at a different location. Then the user experience may be similar in terms of performance to that possible in the less secure current state of the art. Where for example the user device pulls both key and data down from the cloud only as needed as shown in FIG. 27, and FIG. 28. Then together they can provide a seamless and fast access to user data that is similar to the present level of user experience. But with improved data protection and security.

Because the only way to reassemble one user's data is to access the correct locations and to reassemble the data back into the correct order regardless of where they are stored in the Cloud. The Cloud data itself may thus be rendered useless to hackers who are looking to steal user data in bulk. Because it is probably going to be impossible for any hacker, however gifted, even armed with quantum super computers and PhD qualified mathematicians to ever know or discover the randomized order and/or locations into which any specific user's data was stored in the Cloud.

Perhaps Artificial Intelligence and Quantum Computing might eventually erode data security further. However, as readers will see in progressing through this specification these subject technologies have been defined so that they may also be implemented in whole or in part by AI programs and/or using Quantum computing architectures and programs. That are also part of these subject technologies. Those aspects and advanced concepts of these subject technologies are explained further below—with reference to FIGS. 30 through 39.

The storage record on the user's device, USB drive, or cloud key storage provider is the only key capable to recover the data—like a virtual dongle. Furthermore, even if hackers managed to get the key of one user, it would be of no help to them whatsoever with the rest of the data in the Cloud or data center! So that, it is hoped that all the big data handling corporations such as Facebook, AWS, Google, Apple, and Microsoft will want to use these subject technologies to keep their user data safe. Certainly, the Inventor hopes to license it to all of them as well as to the Department of Defense (DoD).

Vitally though, there are also benefits to be gained at the macro level for data holding organizations including Banks and retailers. Who can also reap benefits from these subject technologies. Because even if one user is careless with his or her data key or dongle, it will give no clue nor any way to access anything else. With the miniaturization of flash memory and chips onto bank cards, these may also be made capable of holding enough data to be used to store randomization keys comprised of arrays of pointers and/or unique historic user or tally data.

It is hoped by the inventor that the subject technologies will herald the end of large-scale data thefts from commercial, military, intelligence, and government systems. That would be a huge breakthrough in the fight against cybercrime and bad state actors.

Whenever users are operating a device which is accessing the Internet it must do so via various protocols and data interface standards etc., one of which is that the device must have an Internet Protocol (IP) address. Mostly IP addresses are provided to end users by Internet Service Providers (ISP) and mostly while the ISP may in its Terms and Conditions promise to deliver a floating changeable IP address; in reality most of the time end users get the same IP address. Furthermore, end users can request that they be given a fixed unchanging IP address. Anyone who hosts their own website for example will probably need a fixed IP address so that surfers can find it reliably. Whereas most surfers do not need a fixed IP address. Users can also apply directly to ICANN for a fixed IP address.

IP addresses map to geographic locations. When users visit websites the website operator can look up their IP address to discern their approximate location. This seems to have escaped the attention of many banks and financial institutions who are concerned primarily with establishing the identity of their users. However, this approach is creeping into use for intellectual property licensing. Probably because they are carved up according to geographic and jurisdictional rules.

However, these measures can sometimes be circumvented by using proxies, and/or Virtual Private Networks (VPN) that have geographically distant proxies in another country for example. IP addressing can thus be used in addition to the randomization subject technology, to add another layer of verification-security.

In a transaction according to this aspect of the subject technologies tally data such as the IP address plus date and time stamps of the last time the banking website was accessed can be recorded on the device such as a PC, Smart Phone or Tablet or bank card. Furthermore, an entire history of previous access data, comprising IP addresses and dates can be recorded on devices and bank records. Historical data can be saved and used as a virtual "tally-stick" or comparator which should be identical at both ends.

However, where a user accesses their bank account from a new device, the bank may compare the data of the new device. A failure to tally can thus flag either that the legitimate client is using a new device, or that a fraudster is attempting to access the account. So that where the tally data does not match, further checks may be triggered to ensure that the current user is the true account owner and not a fraudster.

In another case a new device may replace an old device, so the IP addresses may be similar or identical, but no tally data exists on the new device. Again, extra challenge questions may be used. After which a new tally file can be written to the new device. Tally data may be ported to a new device from an old device.

Challenge questions may include one such as: "Is this the first time you have used this device to access your account?" Further challenge questions may be added to ensure the user's ID is verified and tied to the new device. Of more concern to financial and business institutions may be when the IP address does not tally with previous IP and geographic data. Again, when the IP address and/or the system time zone running on a device tracks to hacking hot spots in Russia, China or South America as opposed to the user's home country. Then this sort of discrepancy may be used to raise a red flag; and trigger extra security checks.

Thus, by use of the IP addresses and the tallying of historical interactions recorded as between a user's device and the networked service; service providers may screen out hackers using stolen log-in data; but who cannot provide tally data of IP address usage, and event logging histories from previous logins—nor answer challenge questions. Thus, suspicious transactions may be declined, and the incidence of thefts may be reduced.

Artificial Intelligence programs may also be used to identify variations in user behavior patterns and may raise red flags accordingly. This may be accomplished by recognizing activity as being outside of expected parameters.

In the case of streaming media one or more data blocks can take the form of a "stripe" of data written to or read from a specific cloud storage location. The locations of which stripes can switch among a population of servers. On which the streaming data is being or has been randomized.

A sequential reading of a stripe of pointers can be used to access and buffer the streaming of media such as cinematographic works, or live events to consumer viewing devices. An appropriate timing window can be used to buffer the streaming data and streaming pointer keys needed to call it from the host locations may provide, like a time sensitive key. Timing windows need only be accurate at the time they are needed to point to the data blocks to be streamed. Timing windows may also have their period of transience time randomized.

So that data streaming can be monetized and paid for down to very precise time limits, and any time that is not paid for the key stream of pointers to call the data blocks to build the stripes that make up the stream can end as soon as the supply of pointers is used-up. So that one hours' worth of pointer stream will allow the viewer or maybe an online gamer one hour of media stream, or online gaming access. That may be randomly downloaded or accessed in random length data stripes or blocks from a plurality of servers.

Users need not be aware of this complexity as pointers keys may be downloaded in parallel threads with stripes or data blocks. Data threads may stream through different ports as systems designers may prefer. Indeed, port usage offers a further possibility for randomization.

These aspects of the subject technologies may prove very useful and well suited to secure pay per view entertainment, online gaming, and for keeping communications secure, as well as aiding in metering and monetizing them. Because for security applications the randomized stripes of randomized data blocks can be switched not only between server locations but also between channels in the case of secure voice and video communications, or any communications.

In the case of secure networks such channel switching may be introduced along with the server switching. So that even live communications data may be caused to randomly channel switch, randomly route-switch, and randomly server or location within server switch according to the steam of pointers. A stream of pointers may also similarly be provided through channel switching, route-switching, and server or location within server switching. Reading data ahead of its due time into a buffer may be used to smooth the process out for users.

In secure communications as the military may need, channel-hopping radio communications might also be used to provide the stream of pointers for other streaming or live communications. Channel-hopping requires both nodes to "hop" or switch channels according to a shared program. Which is sufficiently unpredictable (or pseudo-random) to prevent eavesdroppers being able to correctly guess the next channel hop or switching event. For the users of channel-hopping communications they may be relatively unawares of, and hence unimpeded by the fact their devices are continuously switching channels.

The possibilities are endless for routing the streams of pointers differently than the streams of data blocks. So that interception of either one will not easily yield useful time sensitive information to an adversary. So that switching data channels according to a preset but secret program, as well as these subject technologies randomizing attributes of the data itself, can be leveraged. Thereby to make it very difficult for an adversary to get enough data blocks or stripes to be able to resemble them, even where some channels are intercepted some of the time. These subject technologies can be used in the modern battle space for networked communications.

Time shifting stripes of data may also be used to move data blocks such as a frame of audio-visual data relative to other frames within a sequence. The frame may be randomly shifted out of sequence; and the pointers needed to shift a data stream back into the correct order to play correctly used as a means to scramble and unscramble data providing a modest time delay of a second or so. Which can be tolerated in two-way communications. This capability would have overwhelmed older IT equipment, but with the speeding-up of processors and data-streaming rates, these steps are now capable of viable use. Without causing excessive delays. Indeed, the overheads of using these subject technologies will shrink further as IT and data-stream transfer rates increase over the life of this patent.

Say for example audiovisual communications are two way—but are time randomized by up to one second in each direction. So that communications can be made more secure with an acceptable delay. To render communications incapable of being unscrambled quickly. This may be used to add an extra layer of security on to all the other layers of randomization disclosed for high security situations and applications.

Less time sensitive data may be randomized over much longer periods of hours for even more security. So that time shifted randomization may provide a powerful tool for safeguarding and prioritizing those military communications that are of vital importance; but are not ultra-urgent. Because not everything that is important is urgent, and not everything that is urgent is important.

Military email and systems for giving orders of a non-urgent nature may be temporally randomized, so long as they arrive in time to be used without any adverse consequences. For an example scenario, the joint Chiefs have been notified that Internet connectivity is fluctuating in locations suggesting possible undersea data incursions.

In message level one the most urgent, the nearest US Navy submarine is tasked to sail to the affected fiber optical infrastructure location. At some point en-route the reasons for going (a level two urgency) may need to arrive, and as the submarine is getting into the zone where special operations are to be conducted; the most vital and most secret information can stroll in last (as a level three urgency). Even though it may be premier in importance, and the secrecy needs of which are the highest. So that such randomized and/or prioritized timing of information stripes or blocks is another layer of randomization or pseudo-randomization within a timing window that can be useful. Especially where secrecy needs are high, and bandwidth may be low. As can be the case for submariners and within parts of the US Navy. To smooth out the demand for bandwidth and maximize the randomization and security of the data. Getting the right orders at the right time, or at least in-time in every possible sense, may be used to increase the overall security of communications. Which may preserve the element of surprise and hence improve mission success rates. Helping to better protect the lives of our war fighters.

Another benefit of which methodology is that the space in between the parts of this highly secret message can be filled with less important chatter which an eaves dropper will find it very difficult or impossible to disentangle from the more important information. We may think of this as adding security by temporal randomization and the entanglement of important information with unrelated information. That may also be pseudo-randomly dispersed into times of low demand for bandwidth, so it becomes time shifted for travel over a network or other infrastructure. A pointers-based key may be used to reassemble the messages, from their data blocks or stripes.

Furthermore, the bandwidth optimization of available communications channels may become of vital importance in modern warfare with a near peer, or rival superpower as China may become during the life of this patent specification. This is because an advanced adversary would likely try to deprive the U.S. military of its advanced sensing, targeting and communications capabilities.

Space assets may be massively reduced, and suddenly the effective use of the remaining bandwidth could be of truly vital strategic importance. Consequently, these subject technologies may be of keen interest for U.S. military planners and strategists alike. They may be leveraged in adverse situations so that the most important communications, sensor and targeting data can still reach the people and systems who need them to arrive intact, and on time. The issues of battle degradation in the course of a major war and mitigation of systems damage are huge topics for future conflicts where technological superiority may no longer be taken as a given.

Communications may also benefit from randomization in real-time. Here is a simple example. The interfaces of two systems may begin to communicate with each other for the first time. Their programming tells them to agree on the meaning of a set of characters to create a simple transient randomizing interface protocol language (TRIPL) for use in encryption. They both generate a random number between maxima and minima. They exchange their initial numbers add them together and divide them by two to agree the common number rounded-up to the nearest integer represents an "A"; then they repeat the process until they have completed the alphabet and all the numbers needed for a number base system and any other symbols that may be desired. Thereafter they have a common set of characters in a language that only they know. It is random and exists nowhere else in the Universe.

They may use this language for a random time period. Then once one or other randomly timed between maxima and minima triggers a reset, they may create a new randomized language for use over another random time period, or they may periodically agree new values for characters individually also on a rolling basis. Users at either end of the randomization bridge do not know or need to know how their secure time randomizing interface protocol language encryption (TRIPLE) connection works only that it does.

Voices can be converted to text, and text can be converted to speech. So that synthetic speech can be communicated as text using such a simple TRIPLE protected communication channel. This may be of considerable utility for battlefield communications and for sensitive telephone calls to be made by CIA operatives who are in hostile locations. Via an application that converts the speech to text, applies TRIPLE and disguises their voices in calls back to Langley for example. So those agents cannot be identified by their voices, and their conversations can be secure.

More complex implementations can be made to communicate more complex data such as images and video as well. Even without complex implementations binary data which is very simple can be converted to bigger bases agreed similarly randomly. Then the numbers represented by randomly chosen numbers that correlate to the base in which the numbers are being expressed.

It not being possible to list all the possibilities for these randomized TRIPL interfaces. These are just a few examples at the simple end of what is possible using these subject technologies. Having introduced various aspects, in the context of a few examples of the subject technologies and an outline of which drawings are most applicable to them— more specific aspects are now explained in more depth in relation to the drawings.

Similar terminologies: transient random interface protocol language (TRIPL) and time randomizing interface protocol language encryption (TRIPLE) may have similar and overlapping meanings. TRIPLE is achieved, using a TRIPL. So, all TRIPLE includes use of a TRIPL, the time randomizing aspect of TRIPLE is where one TRIPL is replaced by another, in the broader TRIPLE process. Timing replacements may be randomized on a rolling basis for characters of the TRIPL once it has been created and/or for the whole TRIPL. TRIPLE systems and methods may be used by information processing machines, and humans may in some cases operate under a TRIPLE system or method and create TRIPL. The efficacy of encryption, including TRIPLE may be increased by using a PEC to adjust the statistical frequencies of characters; so as to make it harder for code breakers to infer or guess the values of characters or patterns in the underlying data based on statistical analysis.

FIG. 1 is a system flow diagram. It shows how two systems or devices may operate together to create and operate according to a randomized interface creation protocol that is provided by a process implemented as a program running on both a first system "A" 3001 and a second system "B" 3002. Provided both systems have the necessary attributes they may be considered to be compatible. But the systems do not have to be identical. The system 3000 may be run on any two or more compatible coupled and cooperating systems. Furthermore, the program may reside in firmware and run on a computer processor unit and operate upon flash memory within a networking card in either system, and/or it may reside in a hard drive and run on a computer processor and operate upon a random-access memory within a device such as a personal computer, or mobile phone or tablet. It might also similarly run in the apparatus of a router, and even with its processing, memory, and storage in different physical locations such as over a network. So that it should be understood that these subject technologies are not tied to any particular configuration of hardware, so long as the available hardware is capable of cooperating to perform the task of creating the transient randomized interface protocol language; then implementing and using it to allow the two systems A 3001 and B 3002 to communicate—using the transient randomized interface protocol language they have created for encryption and decryption. Then after a random period of time (its period of transience), one or other system may generate a randomly timed reset signal or "ping" which uses the current transient randomized interface protocol language, in communications while a new transient randomized interface protocol language is created the same way as the first. This random resetting and creation of new transient randomized interface protocol languages continues until the communication link is terminated.

It should be understood that once two systems have created a common transient randomized interface protocol language, they may resume using it at their next connection, or they may start-over and generate a new transient randomized interface protocol language. This may be done all at once, or on a rolling basis, while communications continue using the old, or the evolving transient randomized interface protocol language as new pointer-values, or pointers to characters replace the old ones. The process may more securely protect the changes to the language if this is done on a rolling basis while communications continue even as the language is evolving. It constitutes a new language when just one of its values is changed as part of such rolling process. This aspect is developed further in the combined system 3003 operating in FIG. 1C. That may also be randomly timed 3096.

Furthermore, it should also be appreciated that using a transient randomized interface protocol language (TRIPL) according to these subject technologies does not preclude the use of any other encryption. So that there is no need for any loss of security when moving to or adding time randomized interface protocol language encryption (TRIPLE) to an already secured interface. Because the TRIPL interface can run and generate the TRIPL underneath otherwise encrypted communications if so desired; so that communications may be otherwise and TRIPL encrypted simultaneously. Which should confuse hackers who may crack, for example, a HTTPS or SSL protected data stream overlaid onto a TRIPL encrypted data stream. A TRIPL encrypted data-stream may also be used as-is without any other encryption.

The system 3000 may or may not be operating underneath any other encryption, and/or behind a firewall. Such additional detail is not shown. What is shown is that system A 3001 initiates creation of the TRIPL with a signal that may be called a ping 3005. The initiation signal or ping travels over any of the following Wi-Fi, Blue Tooth, Local Area Network, Wide Area Network, Internet, or another channel 3010. Which channel may or may not already be secured by another encryption. For example, the two systems could be in a shared home environment, or a battle space, or even between earth and a satellite. The system 3000 may be implemented across domains, so long as the basic hardware apparatus and software are correctly installed and operating normally.

When system B 3002 receives the initiation signal or ping from system A 3001, then the system decides to accept or reject the initiation of the TRIPL creation process to create system 3000. System 3000 shows an off-page connector. The detail is not shown, maybe an artificial intelligence or human intelligence decides whether or not to accept the request to initiate creation of the TRIPL based communication. Maybe this option is in a preset menu the choices of which may be automatically set to accept or reject TRIPL creation requests. If the decision is to reject the request, then the communication is terminated 3020. Again, there is no need to see the details of the termination. If, however the initiation request is accepted, then this is notified by way of a feedback signal from system B 3002 that goes back to system A 3005. System A 3005 then decides to initiate the program 3025 to create a TRIPL for use in the system 3000 comprised of system A 3001 and system B 3002 working together to create, agree, and share the TRIPL. So that the system can create and run time randomizing information processing language encryption (TRIPLE). The program is set to run a repeating loop 3030 until the arrays (in the memory of system A 3001 and system B 3002) are fully populated with the values comprising the TRIPL.

The actions within the loop 3033 are as follows. System A 3001 creates a pointer 3045 to a random location in the seed data array 3050, then system A 3001 records that pointer 3045 in the TRIPL pointer array 3060. System A 3001 then also sends the same pointer value to system B 3002, and system B 3002 records the pointer value 3070 into its own TRIPL pointer array 3075. So now the first pointer value is stored in the first locations of both the TRIPL pointer arrays of systems A 3001 and B3002.

System B 3002 now responds by randomly creating a pointer 3080 to a location in its seed data array 3085, system B 3002 records this pointer 3085 into its TRIPL array 3075, and system B 3002 sends the same pointer value also to system A 3001, 3090. System A 3001 records the pointer from system B 3002, 3055 into its local TRIPL pointer array 3060. Then system 3000 tests to see if the pointer arrays are full 3040. It only needs to test the local pointer array of system A 3001, 3060 to see if there are any spaces left in the array, or if a counter has reached a preset target value with each write operation. If the pointers array test returns the answer of full (or equals one), then the loop may terminate 3020 because the TRIPL pointers key will be complete for both systems A and B. In this example, this is the first time through the loop, so the test will return a logical "no" or zero value, and this will feedback to cause the loop to run again and to generate a second pointer value that is again duplicated in the pointers arrays of systems A and B. The loop will continue to allocate pointers to seed data values or data objects until the logical test returns a "true" for the logical test of whether the pointers array is full. This can be a test on the array or may be determined by using a counter of a variable value returning a test value as being equal to the desired number of pointers required.

Persons of skill in the art may appreciate that in the creation of the TRIPL pointer array that it is filled in the sequence in which the process occurs over time. This characteristic enables TRIPL arrays to be indexed from their first value and first index location to their last. A counter may be used to cycle through the values of an array, and the counter may correlate to the index location with or without there being a parallel index array per se.

Furthermore, where a seed data value or data object is pointed to at random for inclusion, a logical test may be performed to check to ensure this seed data element has not already been used; and if used another seed data element or data object may be chosen. The size of the seed data set will affect the probabilities of two identical pointers to any individual data element of the seed data. Similarly, the complexity of the TRIPL generated will affect the size of the TRIPL. Where for example a seed data element has a value capable to convey a meaning such as a whole word, or perhaps even a paragraph rather than a mere character, then a huge amount of information may be conveyed with meaning, using no more than a few pointers.

Once the TRIPL is created it may be used for a period of time 3095, which time periodicity may be randomized. The periodicity of these timer triggered re-set 3095 events may be varied randomly, and the minimum and maximum periods for the range of such periods may be varied according to the preferences of a user and/or system designer or manufacturer. TRIPL may be created all at once, or where a TRIPL exists already, they may be gradually replaced one pointer or data object or character at a time in the background on a rolling basis while communications may continue and adjust to the new values. As provided in the operation of system 3003 of FIG. 1C, which provides for randomly timed pauses between loop cycles to provide a constantly morphing TRIPL 3096. Security may be further improved by the use of a PEC capable to adjust the statistical frequency of occurrence of characters or patterns to make it harder to infer or guess their values. As shown in the graphs of 3155 of FIG. 2D, 3156 of FIG. 2E.

Imagine for an example application that a CIA agent has mobile phone with a TRIPLE application to allow secure communication by TRIPL encrypted speech. He calls his colleagues in Langley. Speech in both directions on the call is first turned into text, then the text is run through a basic TRIPL to produce a stream of pointers. The pointers address text characters capable to reconstruct their speech in each direction. The information is received in near real time, at both ends via synthetic speech. This also has the benefit of disguising the voices of agents on the call in both directions. Anyone trying to intercept this message in transit will get nothing other than a stream of pointer values, which without the seed data set and the TRIPL used will be useless to them. This is a fully time randomizing information protocol language encryption (TRIPLE) implementation.

Furthermore, in the above example an agent's actual voice may be sampled, and if the identity of the agent is known, a synthetic version of his own voice may be used to output his speech at the receiving device.

In such specialist applications seed data sets and TRIPL may be created and installed before the two devices are used. For example, if the CIA wished to include a whole series of fixed protocols into a TRIPL as a hard-wired preinstalled set of meaningful data objects, and/or to use a PEC to boost security?

This may be done before the devices are deployed in a live operation. There may for example be emergency protocols that can be called by the TRIPL which contain comprehensive instructions, or even instruction manuals. Which may be called-up as part of TRIPLE communications. Thus, avoiding the need for the protocols and their detailed instructions to ever pass over potentially hostile networks. So, for example a meaningful data object may be called-up by a pointer to its location. A meaningful data object within the protocol may be: "Abandon mission, destroy the equipment and await extraction." Such sensitive protocols may be stored in memory modules that are capable to self-destruct. Details of which need not concern readers.

Similarly, US Army and Marines may use these technologies to communicate in close to real time, via speech over radio transceivers. Computational communications may also be treated similarly. But they are not covered in detail here because they may be less readily comprehensible to humans in binary or assembler codes or other machine languages. As for the languages that artificial intelligence may eventually produce using these TRIPL technologies and variants. These might be even more difficult to explain to humans in cases such as AI to AI variants. Which is why the Inventor has tried to use examples of the subject technologies set in human scenarios. It should be understood that these examples should not be interpreted as restrictive of these subject technologies and methods of operation to any one class of communications, or apparatus.

Figure 1A:
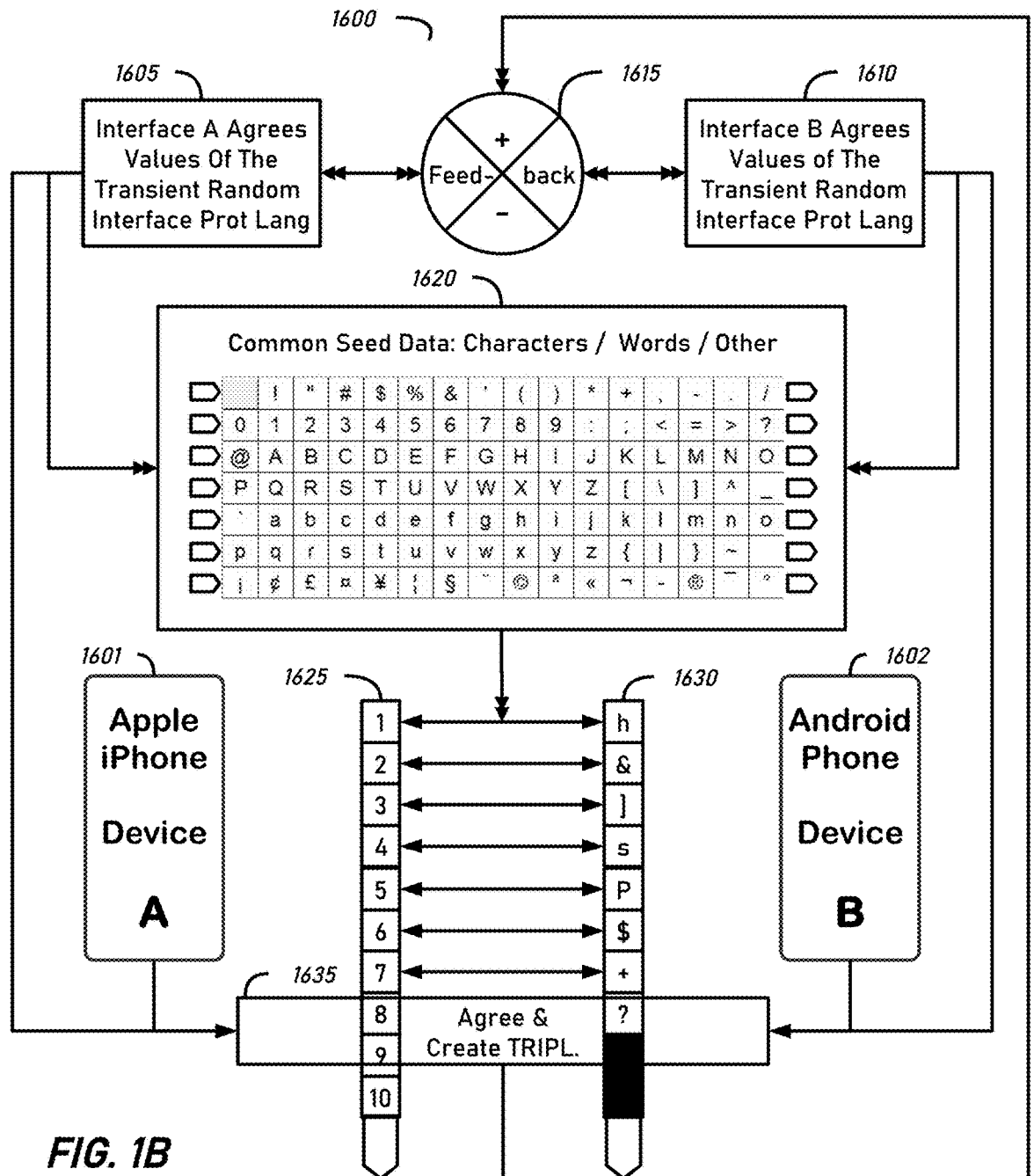
FIG. 1A is a mixed schematic and systems block, flow diagram of two devices establishing contact and cooperating according to various aspects of the subject technologies.

In order to try to keep the TRIPL creation process simple enough to explain one possible embodiment to illustrate its principles, we may assume a base language of our system 3000 is English, or other European languages that use the same basic character set and the numbers zero through nine in base ten and some math symbols. This approach is shown in FIG. 1A. But in reality, it should be clear to persons skilled in the art that, any language, or combination of languages, number, or symbol base system may be used. Indeed. the complexity of the TRIPL can be vastly increased to suit a specific task.

As explained above battlefield communications via voice, a simple speech to text conversion may be used to put the speech into a form that can be simply TRIPL encrypted, and a synthetic voice may be used to convert text back to speech in both directions. So that this simple TRIPL might suit well a battlefield radio communications system, for close to real time secure voice communications. More complex versions may be created for handling image data and targeting data. Furthermore, in the case of artificial intelligence embodiments, the artificial intelligence at either end may be permitted more freedom to decide how they will agree their own TRIPL. Data may in all cases be reduced to binary for digital communications, and binary representations of more complex bases and data objects.

Where two systems do not begin with a shared seed data set, they may create one similarly, or use a data set from a source they can both accesses. For example, an English and/or French and/or Greek and/or the fictional "Klingon" language as created by the Star Trek franchise, or any other language dictionary could be read into an array of seed data and used. Using more complex data objects such as words and even whole protocols that need only a pointer value to convey their entire contents and meaning, may be extremely efficient, and extremely difficult to crack without access to the seed data.

These subject technologies include the use of a pointers key to pull down data that has been randomized into cloud storage. It should be appreciated that some very sophisticated TRIPL may be created where they use seed data that is stored according to those aspects of these subject technologies as shown in FIGS. 28, 28A, 29, 29A, and 30. Even though those figures are primarily addressed to secure cloud storage. They are intended to be compatible with TRIPLE. Indeed, when all the subject technologies of this specification are taken together—they may be capable to provide a paradigm shift for the better in data security. That will be more effective the more of these subject technologies are used together.

There is nothing to stop the two systems A 3001 and B 3002 of system 3000 of FIG. 1 or a similar more complex variant of system 3000 using an online source such as Wikipedia, or a CIA operations manual or the collected works of William Shakespeare as their seed data set. Where for example a pointer points to an entire protocol or complex meaningful data object. Consequently, intelligence agencies might find TRIPLE useful in their communications and in their data storage and access facilities. Say for example a pointer value points to a protocol of what to do in a particular situation, and all that is needed to convey all this information is a pointer to that one single location.

However, in the ubiquitous context of Wi-Fi to web to Wi-Fi communications, or smart phone to smart phone type scenarios as between two TRIPLE capable devices with TRIPL creation applications installed, or embedded into their networking apparatus, these systems will be swapping around mostly binary data. These examples have been made human intelligible by using English and base ten for their seed data sets.

However, seed data sets may be based on binary, or any number base system such as hexadecimal, and image and data handling formats. The complexities of which may be proprietary in some cases. Certainly, some seed data sets may be copyright protected works. Even with potentially incomprehensible artificial intelligence created TRIPL. The essential features of a TRIPL being negotiated and agreed between two systems and expiring 3095 after a random time period. Then the next TRIPL being created using the current iteration can still be applied across all potential applications and devices. Means that eavesdroppers will not know when the TRIPL is replaced according to the randomized timer 3095 periodicity or rolling basis and consequently eavesdroppers will always be chasing an evolving and moving target. This may make it not worth the time and effort needed to crack any one iteration of a TRIPLE interface. Because by the time they might be able to crack one TRIPL, it may have been replaced. Probably never to be used again. So that real-time communications in particular may thus be protected using these subject technologies.

FIG. 1A uses a very basic character set or database of meaningful data objects. The TRIPL system and method 1600 could be equally configured to leverage bigger common seed data character sets or including words or other data objects or patterns capable of carrying more complex meanings and presenting smaller targets within a larger whole. Furthermore, as well as binary systems TRIPL may be created using Quantum computers, operating on Qubits, and this may eventually also be under the control of AI; including the Inventor's own polymorphic artificial intelligence (PAI) (explained below).

Turning now to the detail of the TRIPL 1600 of FIG. 1A, interface A 1605 of device A 1601 which is the interface of one machine or system or black-box module such as a network card or router or Apple iPhone application that has been programmed to agree the values of the TRIPL, with interface B 1610 of device B 1602 which is the interface of another machine or system or Android phone application that has been programmed to agree these values of the TRIPL that is essentially similar. It should be noted that TRIPL interfaces can have their own bespoke CPU and enough randomly accessible memory (RAM), and firmware to store and run the TRIPLE program independently of the machines that they may serve. For example, TRIPLE capable network cards may find favor with PC and Apple Mac users, or be connected through a TRIPLE enabled router, hub, or cluster. Eventually, every mobile device, and Wi-Fi connection that uses radiofrequency (RF) communications or wired connections may interface through a TRIPLE interface.

TRIPLE may be particularly useful for peer to peer, and local device to device connections and any combination thereof. For military battlefield operations because TRIPL operate between two or more nodes, they can vary for a data block passing over a wide area network, so that a different TRIPL may be used between different pairs of nodes. A key benefit being that in war fighting operations the time and effort required to crack any one TRIPL is not worth the effort, because no sooner has one TRIPL been used for a random period of transience—then another replaces it. So that hackers and eavesdroppers are always chasing a moving target where TRIPLE is in use. On top of which channel hopping over wide bandwidths can be used.

Furthermore, there is no incompatibility with adding another type of encryption before or after data are passed through a TRIPL. TRIPLE may be implemented in software, or in hardware such as network cards. It is hoped that network cards will be modified to include the TRIPLE program and enough processing power and memory to use them effectively. But these processes could run on a PC or other system and still be output by regular networking cards and apparatus. This is because the technology is capable of being implemented on a simple slot in card, like a network card for PCs that requires only a modest local CPU, an amount of on-board RAM and firmware to store the program code to run it.

TRIPLE firmware can be capable of receiving updates and using common external seed data. Reader's might see this as like making all network cards and interfaces come up to a basic level of TRIPLE security. Which is entirely achievable with very little change to the hardware, and in a market where small CPU/GPU, RAM, SSD, Flash-Memory and EPROM etc., are being miniaturized and falling in price.

TRIPLE may run on existing hardware with existing interfaces and network cards etc., by utilizing just a small amount of the local device CPU's processing capabilities, RAM, and storage. So that TRIPLE interfaces can be run on many of the smart devices as they already are by deploying them as Apps.

The new level of security that can be added by the constantly changing and evolving TRIPLE is also likely to be very useful for military applications for secure networks. That an adversary will not know how to crack because monitoring the traffic does not help when the TRIPL is constantly changing.

When data moves over longer distances it may pass through multiple TRIPL so that trying to study it along the path should cause confusion as the adversary eavesdropper will be looking at different looking data intercepts when the same data passes through multiple TRIPL. So that even if they can see the same data at multiple locations, they may not be able to know or not realize they may be looking at the same data but differently encrypted.

Even if one TRIPL within TRIPLE communications is cracked it will probably get replaced before any damage is done. This constantly changing nature of TRIPL at the heart of TRIPLE should be capable to allow war fighters enough real time protection for relatively secure battlefield communications. That cannot be cracked quickly enough by an adversary to compromise time sensitive battlefield information.

Interface A 1605 of device A 1601 agrees the values of the TRIPL with a compatible Interface B 1610 of device B, within a feedback process. The creation of the TRIPL is triggered at random time intervals, by a time module present in both interfaces 1642. The interfaces by a feedback process 1615 agree the meaning of the characters, words or other meaningful data objects that comprise common seed data. For example, after the reset "ping" 1640, Interface A and B may take turns to randomly assign characters to numbers, or they could use other ways of selecting agreed values all at once, or on a rolling basis or all at once after the first TRIPL has been created. In this example an array is created in both Interface A and Interface B, where number values or pointers 1625 correlate to one of the characters in the array of meaningful data objects from the common seed data 1620. To create the agreed values 1630 for the TRIPL. In the example it can be seen that the value or pointer 1 correlates to the character "h", and the value or pointer 2 correlates to the symbol "&", and value or pointer 3 correlates to the symbol "]", value or pointer 4 correlates to the character "s,", value or pointer 5 correlates to the character "P", value or pointer 6 correlates to the symbol "$", value or pointer 7 correlates to the symbol "+", and value or pointer 8 correlates to the symbol "?", with the remaining symbols and characters yet to be assigned as the two interfaces create their agreed character set by assigning numbers to them and vice versa as interfaces A and B cooperate to match number values or pointers to characters.

Once they have finished assigning values to meaningful data objects, then they have a common agreed interface protocol in which they may communicate in any language or mix of words from any languages that can use that character set. So that all characters, symbols, and bigger more meaningful data objects are represented by their agreed values and communications are achieved by exchanging streams of these values or pointers. Until the randomly timed 1642 reset ping is triggered again 1640, to initiate replacement of one or more or all of the TRIPL values or pointers.

Whereupon the values of meaningful data objects are randomized and agreed again to the next iteration of a constantly evolving TRIPL. The meaningful data, comprising seed data may be any data object. For example, the entire contents of a dictionary can be given agreed values, multiple language dictionaries can be used, and words of the same meaning can be randomized between languages. So that agreed word-1 may be French, agreed word-2 may be German, agreed word-3 may be Navajo, agreed word-4 may be Spanish, and the TRIPL will create this hybrid transient language for use over a limited time period after which another language is created and so on. So that it is too difficult and/or not worth the effort to try to crack any one TRIPL. Because no sooner has it been cracked than it has been replaced never to be used again.

The maximum seed data that is potentially usable may be as large as the sum of all knowledge that is in electronic form. So that the TRIPL might agree to use a novel as seed data, wherein agreed words are taken by page number, line number and from left to right for example. So that both TRIPL agree to use one or more eBooks as seed data. Furthermore, number bases may be randomized for math functions. So that random number bases may be used for calculations in a similar way. The possibilities are infinite. Star charts could even be used as seed data. This example has been kept relatively simple. Once all the TRIPL agreed values are all set, then the agreed values or pointers to the agreed values can be read into an array, or array of records so that meanings can be attributed to all the agreed values while the language is used. More complex data such as images and sounds, such as spoken text can be used similarly. So that two computers with internet access may even select their seed data randomly from the Internet so long as they can agree the meanings of the agreed values they use, the possibilities may be infinite for the TRIPL that can be created used and then deleted without anyone ever even knowing what the TRIPL was. These subject technologies may include seed data objects, and languages as may be used and created in part or entirely by artificial intelligence to provide TRIPL, for use within TRIPLE that may be utterly incomprehensible to humans.

Figure 1B:
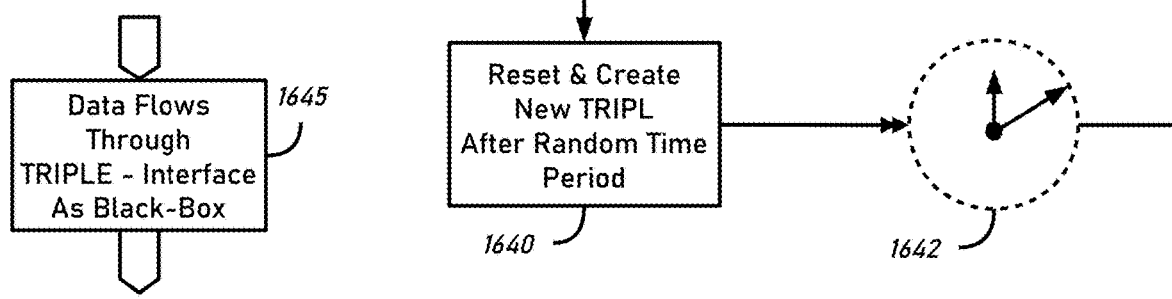
FIG. 1B is a top-level block flow diagram of an aspect of the subject technology used as a black box module according to the subject technologies.

FIG. 1B is the TRIPLE interface between two nodes, where the process internally is not knowable on the outside and there is no need to know the details of the TRIPLE on the inside. So that from the user perspective the TRIPLE interface is a secure black box that may operate over local area networks such as a battle space or office network, or a wide area network across an organization such as the CIA or DoD. The complexity of the TRIPL used internally can be scaled to match security needs in specific applications.

Figure 1C:
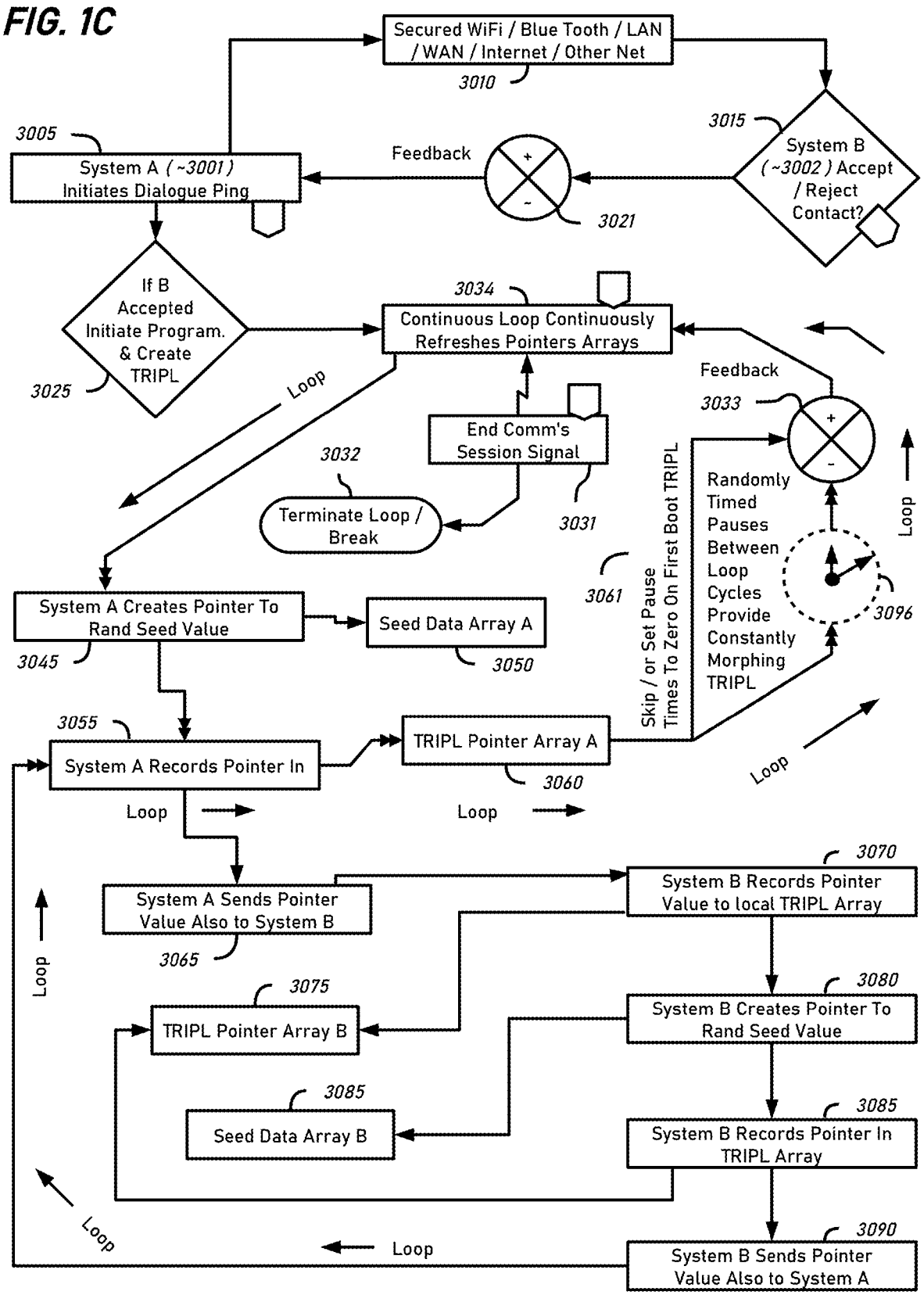
FIG. 1C is a mixed schematic and systems block, flow diagram of two systems establishing contact and cooperating according to various aspects of the subject technologies.

FIG. 1C is the flow diagram of a system and method for creating an agreed TRIPL 3003 which operates two cooperating systems A 3001 and B 3002; and is capable to continuously evolve over time. This is achieved by operating its TRIPL creation process as a continuous loop which continuously refreshes the pointers arrays 3034. TRIPL creation system 3003 may be used after such as system 3001 of FIG. 1, or system 1600 of FIG. 1A has already populated the pointers arrays, or it may be used from beginning to end.

Much the same functionality may also be achieved by adding a randomly timed pause between the looping processes of those alternatives, that may be triggered via a counter or other logical test once the pointers arrays have been initially populated. The key feature being to make whichever implementation to cause the TRIPL to be renewed on a rolling basis, by renewing one character or data pattern. Then pausing the loop for a time period that may be set to operate to pause the loop for random periods of transience between a maximum and a minimum amount of elapsed time.

That periodicity and its randomization features may also be parameters that may be preset or set by users in some alternative embodiments. A non-randomized periodicity could be used. However, adding randomization to the periodicity may help to make decryption and deciphering more difficult for codebreakers. Detail of how those features of timing parameters may be set may vary according to preferences, details of which are not shown.

Because codebreakers seek to identify repeating characters or patterns, for use as a crib or clue and a way in via which to begin to crack ciphers and encryption, it makes sense to use TRIPLE because of the transience of each TRIPL. This finite opportunity to sample any TRIPL before it is replaced limits the amount of data that can be collected based on that specific TRIPL to the data that passes through it during its period of transience. The length of which is a feature that may be randomized to helpful effects. Furthermore, the period of use of any one TRIPL may be made very difficult to parse from the period of transience of another TRIPL, because a replacement TRIPL may be created while using the predecessor. That is the basic form of operation of TRIPLE.

Furthermore, by adding replacement of the TRIPL's individual characters or data patterns one at a time followed by randomly pausing the looping process for replacement on a rolling basis, during another randomly timed period 3096. Then every time one TRIPL character or data pattern is replaced, the TRIPL morphs into a similar but non-identical TRIPL. Causing yet more headaches for would be codebreakers who will be unable to easily see where one TRIPL is replaced by another. Because the process may be thus blurred out across may similar but different TRIPL over time.

During the period of the pause 3096, the current iteration of the TRIPL may use, and so on. The overall effect of which is to produce a continually and randomly evolving series of TRIPL, that may be blurred between versions and hence rendered extremely difficult to parse.

Furthermore, a character or data pattern may over time be re-selected but attributed a different value than in its previous period of transient use. To further confound codebreakers. Because they may be looking at data in which the same character or data pattern comes and goes and has different values during each of its periods of transience. It is highly likely that codebreakers may be driven to experiment with some extreme mathematical techniques to try to find a way to crack such an evolving TIPLE message, or document, or data stream etc.

Assuming this system 3003 is taking over from another system that created a TRIPL that is already being used, then a computer processor could be caused to call and run this module having bypassed earlier steps to begin execution at step 3034 to continuously loop to refresh pointers arrays.

Alternatively, system 3003 may be used from the outset and the pause timer step 3096 bypassed 3061 during the creation of the first TRIPL. The process for populating the TRIPL pointer arrays A 3060, and B 3075 may be identical with system 3000 of FIG. 1 and is not further explained here for that reason. This system 3003 differs in the incorporation of the randomly timed pauses between loop cycles that may provide a constantly morphing TRIPL 3096. Which is suitable for use in operations once the first TRIPL has been created in the pointer arrays. The feedback 3033 may be a logical test condition which may be used to determine whether or not to bypass 3061 the pause timer 3096 in the loop process 3034.

If either system is caused to close down or end the communication session a signal and/or lack of signal 3031 may trigger the termination of or break the loop 3032. So that there is provided a neat process which does not consume power or system resources when not needed. A new communications session and the creation of a new TRIPL or use of an existing stored TRIPL from a previous session, may be begun if either system takes the first step to become System A 3001 by initiating a new dialogue with a ping, over a communication channel 3010 to a second system B 3002. Which may accept or reject the contact 3015, by providing a feedback signal 3021. Then if the second system B accepted the program module may execute 3025 and trigger creation of a TRIPL, by calling the TRIPL creation looping process to run the continuous loop which continuously refreshes pointers arrays 3034. If this is a first boot TRIPL creation, then the randomly timed pauses between loop cycles 3096 may be bypassed 3061 or set to a zero-time period between loops for the first TRIPL creation process. Then begin to run as normal thereafter once the TRIPL arrays are fully populated.

Figure 2:
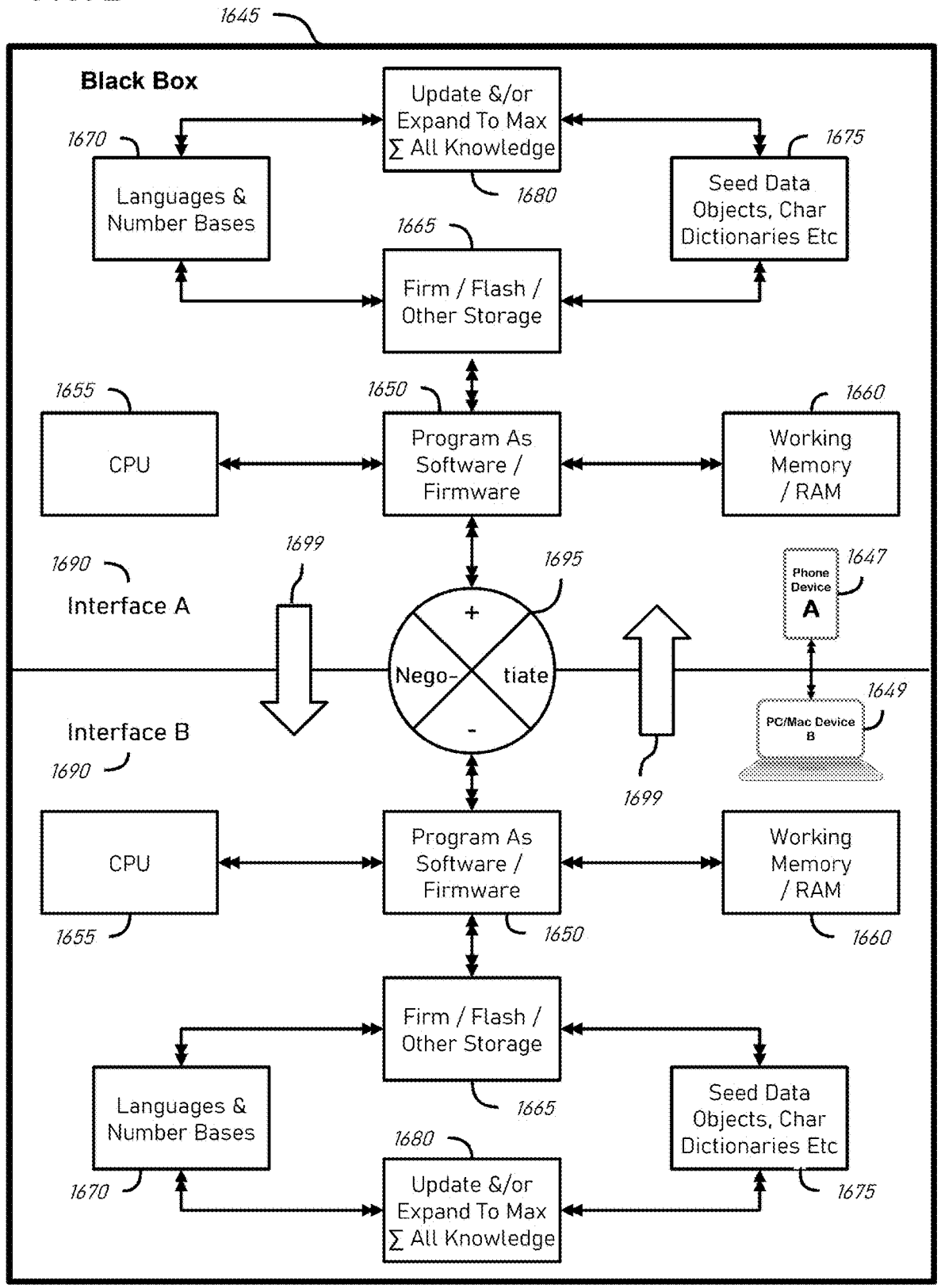
FIG. 2 is block flow system diagram of an aspect of the subject technology used as a black box module according to the subject technologies.

FIG. 2 is an expanded view inside a black box TRIPLE such as system 1645 of FIG. 1B. It shows Interface A and B 1690 as being identical. But they need not be identical in their details so long as they are compatible. Here we see that Interface A belongs to and is part of and is running on Phone Device A 1647, and that Interface B belongs to and is part of and is running on the PC or Apple Mac Device A 1649. The program or application can be provided in software and/or embedded and/or installed into firmware 1650. The program runs on the local CPU 1655 and uses the local working memory or RAM 1660, it may be stored and bootable from local firmware or flash memory 1665, and capable to operate on the various forms of seed data characters, and or dictionaries 1675, and/or known languages in text and/or speech 1670. Which seed data sets may be capable of updates and/or expandable in some systems to a maximum equating to the available on-line sum of human knowledge 1680; so long as the data is in a networked electronic form connected to the TRIPL interface.

The newly created TRIPL data may be stored during its use into either the flash memory 1665 or held in working memory during operation. So that once activated the programs 1650, in both Interface A and B using those resources, use a protocol and feedback process 1695 to create a succession of new TRIPL for use during random length periods of time in TRIPLE communications. That facilitate secure TRIPLE protected two-way communications between Interface A and Interface B 1699. They use a language only they know that will exist only fleetingly during use, after which each will be automatically replaced by a new or evolving TRIPL iteration.

Users however do not need to know any of that, they just need TRIPLE capable network cards, or devices running a TRIPLE App, or other compatible variants to gain end to end encryption with no keys per se, just a succession of secure disposable languages that are transient in nature and mostly not worth the effort to hack.

The principles of a basic TRIPL may be augmented by using AI and Quantum computing. These may be in binary, or any number base system, and they may ascribe meanings to data objects that may or may not make sense to humans. But the TRIPL they may create as between themselves may stay between themselves. It may never need to be or be communicated outside their closed loop, no record of TRIPL needs to be kept. The larger the data sets and seed data they are able to use, the more combinations of possible values and languages they will be able to create.

However, it may not be desired to let them make unduly complicated languages. Which is where a protocol for the agreement of values can be used to constrain the level of complexity, and processing power needed. So that an acceptable rate of data throughput may be preserved by trading it off against the security that comes with increased complexity.

Some TRIPL may be better suited to certain data types. An optimization option for the types of data the TRIPL will mainly be used for may be included in TRIPLE applications and network cards. In later descriptions and figures the capabilities to randomize and distribute the transmittal of data blocks or stripes across maximum and minimum time periods, and data blocks, or stripes of randomized sizes, as well as randomization of the routing of these data blocks or stripes passing through networks is added to these subject technologies. So as to further compliment the overall security of data and communications.

Figure 2A:
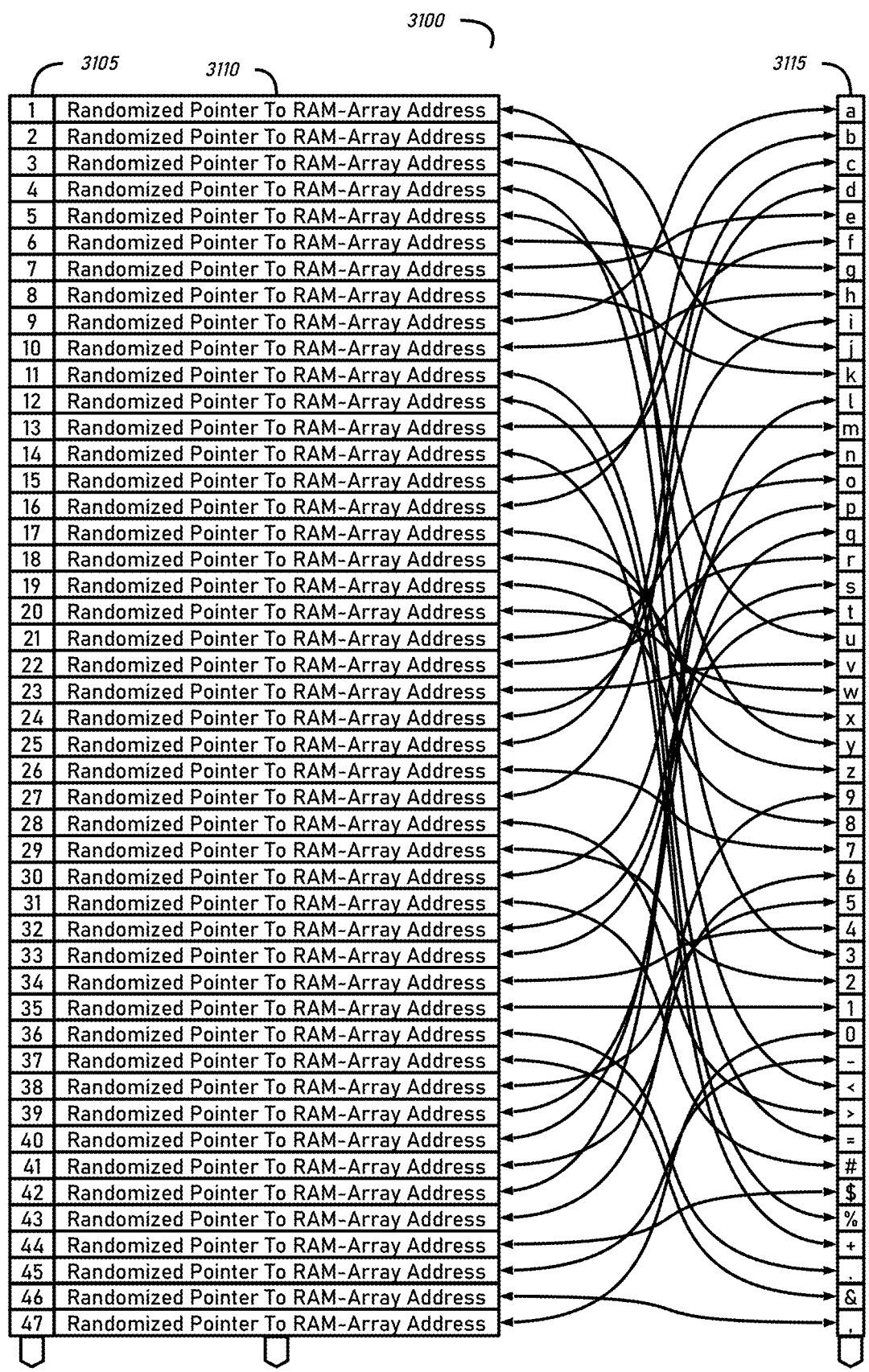
FIG. 2A is a schematic diagram of an array of character values and their index configured according to an aspect of the subject technologies.

FIG. 2A shows the creation of a TRIPL 3100, based on randomized pointers 3110 to an array populated with seed data in the form of alphanumeric characters 3115, and the index location values in the array of pointers 3105.

This randomization of pointers 3110 and the values of the array 3115 may have been preset, or it may have been created in a TRIPL negotiation as explained in relation to previous figures, such as FIG. 1. It may also be left over from a previous communications session between two or more devices or nodes; for use as and when they reconnect. Devices may store multiple previously negotiated or installed TRIPL from previous interactions with other devices. Their historic tally data records may also be used to inform both systems if they recognize each other. To see if they still have a TRIPL in common. If there is no TRIPL in common existing between two devices, they may create this TRIPL as a new TRIPL.

Use of the addressing mechanism of pointers means that these relatively meaningless values of the pointers themselves may be used as the basis of information exchange communications using TRIPLE. This is good because they will most likely be totally alien to and unrecognized per se, by many cryptographers, hackers and crackers who may intercept them.

Furthermore, as previously explained TRIPLE may be used in addition to existing encryption in the art, without conflict. This may permit an additional layer of deception because cryptographers may crack the other encryption only to be left with a stream of meaningless pointer values. Which it is hoped will leave them baffled and may cause them to believe that their decryption efforts must have failed. So that while TRIPLE should not be confused with the encryption available in the art. It may be boosted in efficacy by use in combination with those known encryption technologies. Furthermore, such double encryption with TRIPL plus SSL etc., is a new combination that may have more value than the sum of its parts. For these reasons.

Using an array of pointers 3110 with an index or indexable capability 3105 has other advantages in that it may be more secure than using a TRIPL based on using the randomized characters represented in this example. In the following FIGS. 2B and 2C the distinction as between using the pointers to the values or using the values is not shown for the sake of clarity. It should be understood that though these details as provided in the system of arrays and pointers 3100 of FIG. 2A, are not shown they may be present, or the values may be being used directly.

Figure 2B:
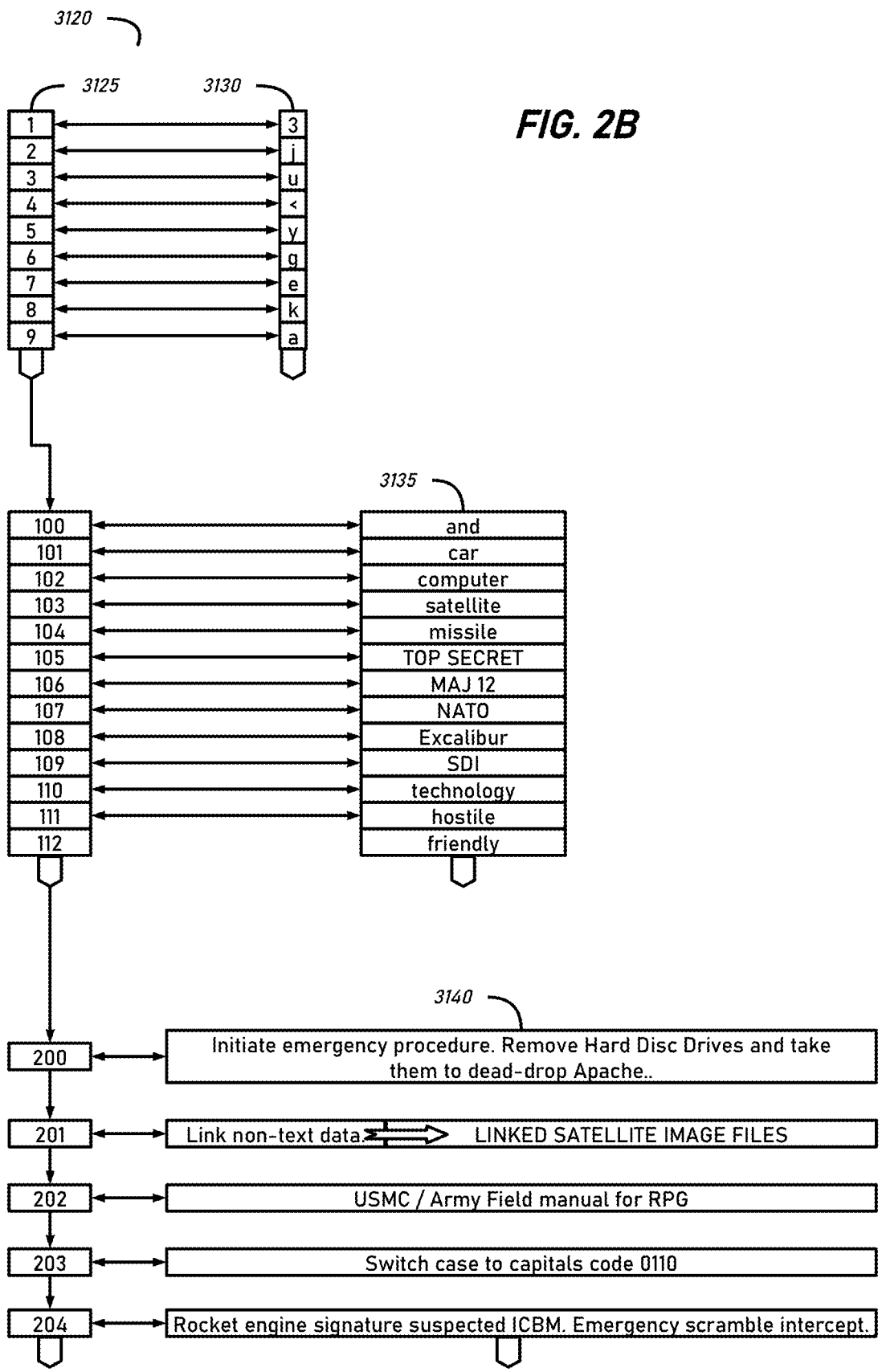
FIG. 2B is a schematic diagram of an array of character values, string values and more complex data object values according to an aspect of the subject technologies.

FIG. 2B shows some extracts 3120 from the same values for the array index 3125 locations 1 through 9 as reproduced in simple form from those of 3100 of FIG. 2A. Here again the $1^{st}$ index location translates or points to the alphanumeric character or value "3", the $2^{nd}$ index location translates or points to the alphanumeric character or value "j", the $3^{rd}$ index location translates or points to the alphanumeric character or value "u", the $4^{th}$ index location translates or points to the alphanumeric character or value "<", the $5^{th}$ index location translates or points to the alphanumeric character or value "y", the $6^{th}$ index location translates or points to the alphanumeric character or value "g", the $7^{th}$ index location translates or points to the alphanumeric character or value "e", the $8^{th}$ index location translates or points to the alphanumeric character or value "k", the $9^{th}$ index location translates or points to the alphanumeric character or value "a".

The figure breaks off the sample of alphanumeric characters or values after the $9^{th}$ index point and resumes at the $100^{th}$ index location. Where the values contained in the array have begun to include more than single alphanumeric characters, and the array contains strings of alphanumeric characters or values 3135. The $100^{th}$ index location translates or points to the alphanumeric character string or value "and", the $101^{st}$ index location translates or points to the alphanumeric character string or value "car", the $102^{nd}$ index location translates or points to the alphanumeric character string or value "computer" and so onward.

Again, after more of the TRIPL strings or values the figure breaks off the sample strings or values; and resumes at the $200^{th}$ index location. Where the values contained in the array have begun to include more than one-word strings of alphanumeric characters or values—and are comprised of longer strings of characters or values that represent multiple words, and or database records comprised of complex data that may even be comprised of data of disparate types 3140.

The 200$^{th}$ index location translates or points to the alphanumeric character string or value "Initiate emergency procedure. Remove Hard Disc Drives and take them to dead drop Apache." The 201$^{st}$ index location translates or points to the alphanumeric character string or value that comprises a link to another data object which is SATELLITE IMAGE FILES. This may be a composite data object that may include strings of descriptive alphanumeric text, hyperlinks, and image data files, perhaps within a database record type of structure. The 202$^{nd}$ index location translates or points to a composite literary work, or booklet, or database called "USMC/Army Field Manual for RPG". The 203$^{rd}$ index location translates or points to an instruction to switch the case of an alphanumeric character "Switch case to capitals code 0110". The 2004$^{th}$ index location translates or points to the alphanumeric character string or value "Rocket engine signature suspected ICBM. Emergency scramble intercept." and so the sample goes on, but further details are not shown in this illustrative sample.

FIG. 2C shows in detail like a sample of program code, the defined process comprised of a run-time example of one possible TRIPL creation processes 3150. Which details the run-time decisions and actions of a pair of devices cooperating to create the TRIPL 3100 of FIG. 2A, and which may also be equivalent to or if implemented as an array of pointers for the TRIPLE application the same as 3120, or its value-based variant 3120 of FIG. 2B, and the further data object examples shown 3135, and 3140 of the examples 3120. Please see the defined process 3150 for its specific run-time actions in detail, as these are very illustrative of the processes of FIGS. 1, 1A, 1B, and 1C. It should be appreciated that there are many possible variants that may be used here that are intended to be within the scope of these subject technologies. Probably the most weird and difficult to understand are the ones that may be created by artificial intelligences operating these systems and methods. Some of which while within the Inventor's contemplation are impractical for use as illustrative tools. Not least because the inventor is not an artificial intelligence and because artificial intelligence may come up with surprising variants, without deviating from these subject technologies. The inclusion of which here would probably not aid this exposition of these subject technologies for a human reader.

The US Navy in particular uses some very long radio wavelengths to communicate with submarines. This is because longer wavelengths are better at penetrating into and through the sea. Unfortunately for the US Navy this bandwidth is limited; and these messages sent using it may be ultra-important and ultra-secret. They may for example one day include orders to find and sink adversary nuclear armed submarines, to save Americans from a nuclear strike. The graph 3155 of FIG. 2D relates to analysis the following sample of text:—

"I was a student in England, with two children Tommy and Holly. It was summer vacation, and we had gone on vacation with only a hundred pounds, a tent, and a full tank of gas.

We went to the seaside town Skegness. The first campsite we tried turfed us off we had to take down our tent and look for somewhere else to camp. We were all tired, and it was dark. So, I decided we would just have to fly pitch anywhere we could.

I drove to the coast where we found a bay, with a wide grass verge. On our radio the DJ said there was a meteor shower that very night. I decided to fly-pitch in the bay, atop the cliffs, with an amazing view out to sea. Thankfully, Tommy loved building tents, and so he did most of the work. While Holly and I organized some food and drinks. I had a four pack of beer. We set up our moonlit supper then sat back and watched the meteor shower. With clear skies, looking out to sea where there was very little light pollution. The meteor shower was the most intense I've ever seen. Music played on the car radio. I explained all about asteroids, meteors and the extinction of the Dinosaurs, and the kids watched the meteor shower with awe and amazement. It was one of those perfect moments in life. When time seems to stand still for a fleeting moment. While all was right with the world, my kids and I were safe and happy together. Then Holly said some words I will never forget, and treasure always: "Dad, you're not like other people's dads or anyone else I know. Other parents are boring, they would never do anything like this. This is really cool!!!" My heart filled with pride and love—in what was one of the happiest moments my children and me ever shared. On the night when we were so poor, we could not afford to stay in a regular hotel or resort or go on a regular vacation like other families."

The sample text was subjected to statistical analysis of the total numbers of specific characters. Organizations that use a specific nomenclature may vary somewhat in their use of language. This statistical analysis may be usefully tabulated, as in the table below: The left most first column shows the character, the second column shows the total number of occurrences "n", and the third column shows the number of occurrences of characters as a decimal fraction of the population. These figures are used to derive a probability-based coefficient for each character which values and listed in the fourth column. These coefficients are rounded to one integer value in the fifth column, rounded to one decimal place in the sixth column, and rounded to two decimal places in the seventh column.

| Char | Number "n" Occurrences | n/population | Probability Coefficient | Coefficient Integer | Coefficient 1 Decimal | Coefficient 2 Decimal |
|---|---|---|---|---|---|---|
| a | 113 | 0.062122 | 1.9879054426 | 2 | 2.0 | 1.99 |
| b | 7 | 0.003848 | 0.1231445849 | 0 | 0.1 | 0.12 |
| c | 25 | 0.013744 | 0.4398020891 | 0 | 0.4 | 0.44 |
| d | 78 | 0.042881 | 1.3721825179 | 1 | 1.4 | 1.37 |
| e | 187 | 0.102804 | 3.2897196262 | 3 | 3.3 | 3.29 |
| f | 30 | 0.016493 | 0.5277625069 | 1 | 0.5 | 0.53 |
| g | 22 | 0.012095 | 0.3870258384 | 0 | 0.4 | 0.39 |
| h | 78 | 0.042881 | 1.3721825179 | 1 | 1.4 | 1.37 |
| i | 92 | 0.050577 | 1.6184716877 | 2 | 1.6 | 1.62 |
| j | 2 | 0.001100 | 0.0351841671 | 0 | 0.0 | 0.04 |

-continued

| Char | Number "n" Occurrences | n/population | Probability Coefficient | Coefficient Integer | Coefficient 1 Decimal | Coefficient 2 Decimal |
|---|---|---|---|---|---|---|
| k | 18 | 0.009896 | 0.3166575041 | 0 | 0.3 | 0.32 |
| l | 66 | 0.036284 | 1.1610775151 | 1 | 1.2 | 1.16 |
| m | 36 | 0.019791 | 0.6333150082 | 1 | 0.6 | 0.63 |
| n | 90 | 0.049478 | 1.5832875206 | 2 | 1.6 | 1.58 |
| o | 121 | 0.066520 | 2.1286421111 | 2 | 2.1 | 2.13 |
| p | 23 | 0.012644 | 0.4046179219 | 0 | 0.4 | 0.40 |
| q | 0 | 0.000000 | 0.0000000000 | 0 | 0.0 | 0.00 |
| r | 83 | 0.045629 | 1.4601429357 | 1 | 1.5 | 1.46 |
| s | 83 | 0.045629 | 1.4601429357 | 1 | 1.5 | 1.46 |
| t | 130 | 0.071468 | 2.2869708631 | 2 | 2.3 | 2.29 |
| u | 31 | 0.017042 | 0.5453545904 | 1 | 0.5 | 0.55 |
| v | 16 | 0.008796 | 0.2814733370 | 0 | 0.3 | 0.28 |
| w | 61 | 0.033535 | 1.0731170973 | 1 | 1.1 | 1.07 |
| x | 2 | 0.001100 | 0.0351841671 | 0 | 0.0 | 0.04 |
| y | 26 | 0.014294 | 0.4573941726 | 0 | 0.5 | 0.46 |
| z | 3 | 0.001649 | 0.0527762507 | 0 | 0.1 | 0.05 |
| . | 24 | 0.013194 | 0.4222100055 | 0 | 0.4 | 0.42 |
| , | 19 | 0.010445 | 0.3342495877 | 0 | 0.3 | 0.33 |
| ; | 1 | 0.000550 | 0.0175920836 | 0 | 0.0 | 0.02 |
| ' | 3 | 0.001649 | 0.0527762507 | 0 | 0.1 | 0.05 |
| ! | 3 | 0.001649 | 0.0527762507 | 0 | 0.1 | 0.05 |
|   | 346 | 0.190214 | 6.0868609126 | 6 | 6.1 | 6.09 |
| Totals | 1819 | 1 | 32 |   |   |   |

Capitalization, and Tab-Shift or paragraph indentations have been ignored and it has been assumed that potential codebreakers know the language of the sample is English. These steps were taken to keep this example simple and for clarity. According to the PEC method of statistical adjustment those characters which occurred at twice the average rate and above according to the integer values of the fifth column of the table were then selected as likely targets. Which most codebreakers would try to identify first. As a way to find a crib, or clue and way to begin to break any code or cipher applied to the text sample.

Probably a codebreaker would try to find the data pattern, probably as a binary representation of the space character, because not only is this six times more likely to occur than any other character. If found as a repeating pattern in the data, it could be used to parse the words of the text sample. Word lengths might then be inferred. This is why the space character " " is the single most dangerous character in the sample. Disguising it makes sense as part of any PEC.

Codebreakers will also know the approximate statistical metrics for text in English even though this text is from the Inventor who has an English accent and style of writing that has taken on some American influences due to living in America. So, it makes sense to also reduce the average frequencies of occurrence of other characters that occur at an above average rate. In this case those with a probability coefficient of two or more according to column five, which has been rounded to integer values. This step identified all the characters with an integer coefficient of "2" or above as "a" equals 2, "e" equals 3, "i" equals 2, "n" equals 2, "o" equals 2, "t" equals 2 plus the space character which equals 6 shown in those columns, and which are indicated 3160 in FIG. 2D.

Figure 2D:
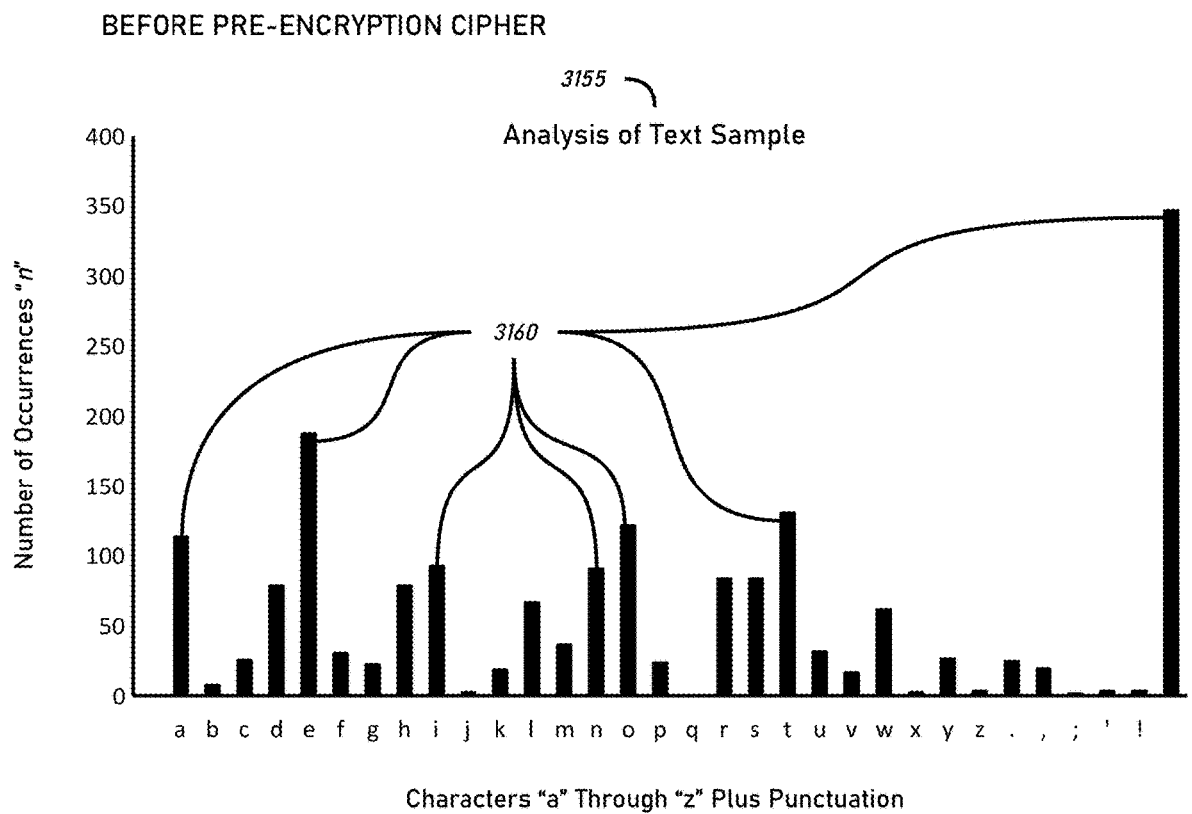
FIG. 2D is a bar chart graphing a statistical analysis of a text sample in accord with an aspect of the subject technologies.

The vertical axis of FIG. 2D shows the number of occurrences "n" as the total number of occurrences of each of the characters indicated on the horizontal axis "a" through "z" plus punctuation. These data are shown as vertical bars 3160 in the bar chart.

Figure 2E:
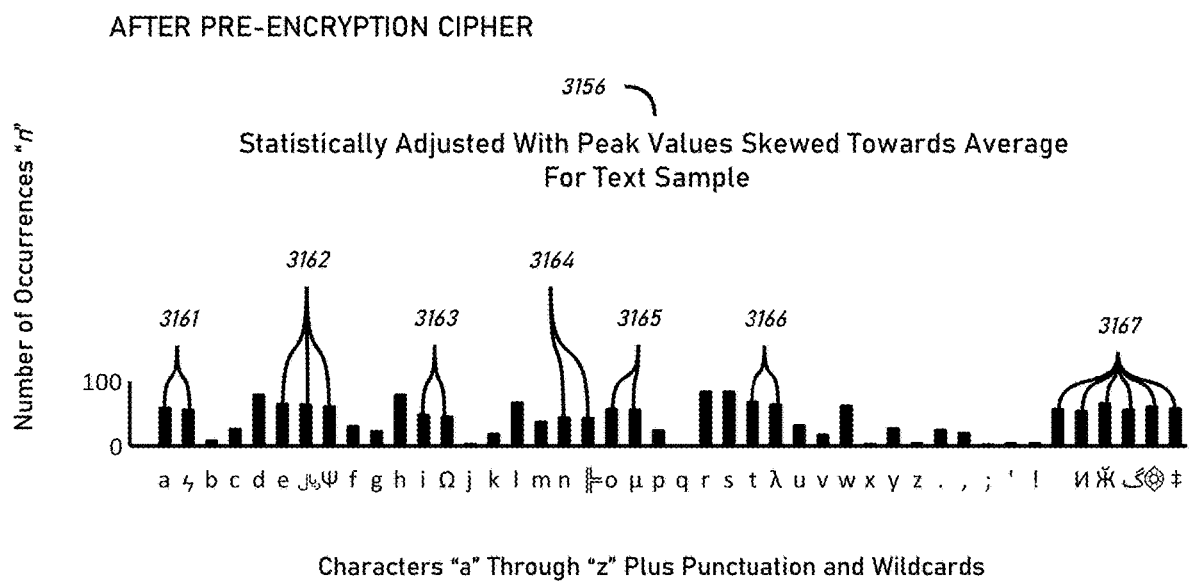
FIG. 2E is a bar chart graphing a statistical analysis of a text sample which has been statistically adjusted in accord with an aspect of the subject technologies.
Figure 2F:
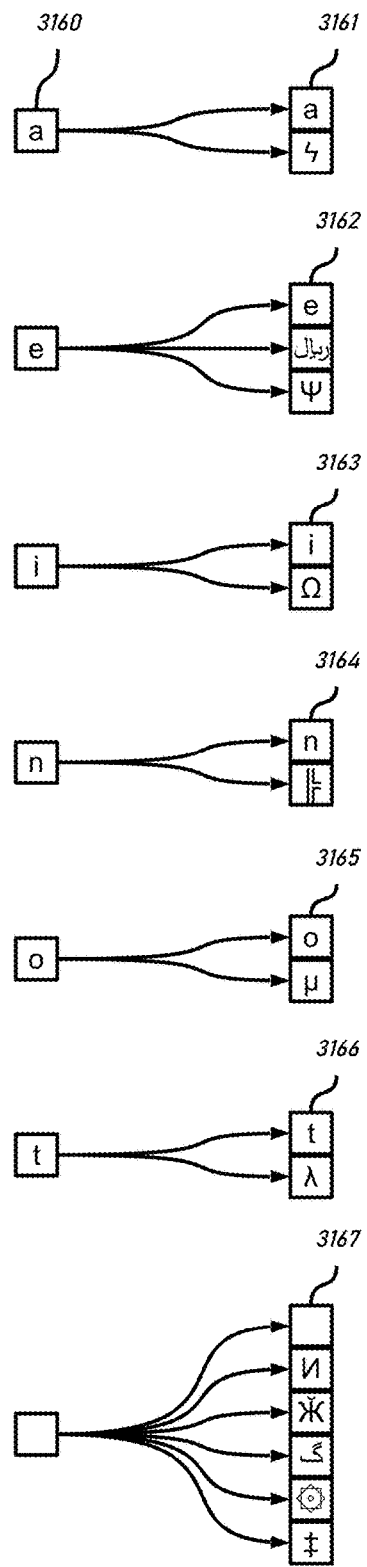
FIG. 2F is a schematic representation of characters from a text sample that have been processed according to aspects of the subject technologies.

The PEC method is to identify the set of most vulnerable characters 3160 that code-breakers will try to use, then to statistically adjust them to blend into the background of less useful data. This is accomplished by adding wild card characters to the set of characters, as shown in FIG. 2E, and FIG. 2F, indicate where the characters 3160 have been randomly reduced to a range of maxima and minima about the average frequency of occurrence by re-distributing their total among the original character values 3160 plus however many wildcard 3161, 3162, 3163, 3164, 3165, 3166, 3167 characters are needed in each case.

So that of the total occurrences of value "a" these are randomly reduced close to the average value by randomly substituting approximately randomly half of them with "ٮ"; "e" substituted by approximately one third "ڸݳ" and one third "ψ" and so on down the values culminating in the space character " " at the bottom of the column of values and wildcards, which had five sixths of their total randomly substituted within maxima and minima totals with the wildcard 3161 characters "и", "ж", "ڎ", "☉", "‡".

It should be apparent to persons skilled in the art, that wildcard characters should be drawn from the same seed data set as any TRIPL they are to be used with and that they should not duplicate any TRIPL character being used within TRIPLE. No TRIPL character or data pattern should be used to represent more than one actual character from the original data unless a bespoke reverse cipher or look-up capability is to be used along with it. Generally, while it may be possible without departing from these subject technologies in some cases it is not a preferred approach in this specification.

Figure 2G:
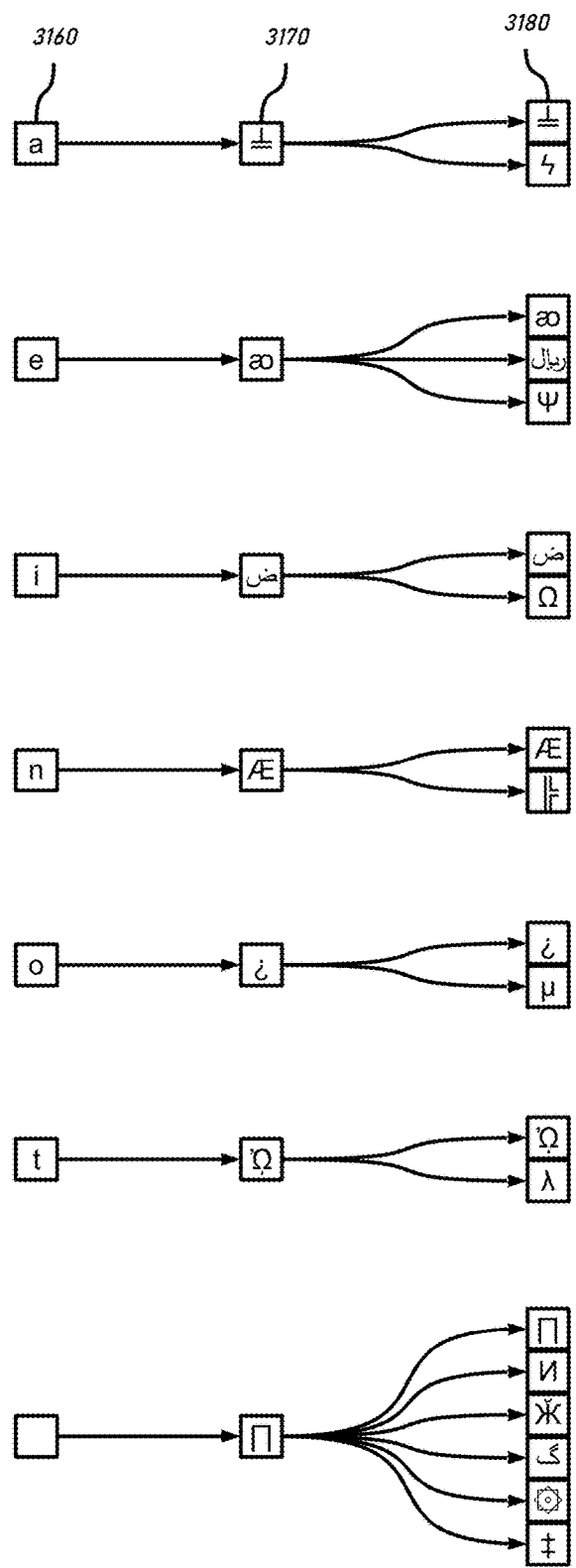
FIG. 2G is a schematic representation of characters from a text sample that have been processed according to aspects of the subject technologies.

FIG. 2G continues this process by substituting the non-wildcard characters 3160 for TRIPL character values so that "a" will be substituted for by "±" 3170, and so on throughout the values in the columns, leading to a TRIPL that has been optimized by the substitution of the PEC wildcards 3161. Now in this figure the PEC wildcards 3161 have been carried through to the final TRIPL, however this has been done mainly for illustrative purposes. In practice programmers who may implement the PEC method may prefer to run the TRIPL creation process on the entire data set after the PEC wildcards have been added. It makes no difference to the relative statistical effects either way. But in this illustration, it is hoped that it is clearer to see the method at work by not substituting (again) the wildcards in the final right column values 3180.

In the case where PEC may be used to make other forms of encryption and ciphers harder to crack, then it may be used either with TIPLE or without it as a stand-alone security booster for otherwise encrypted information. It having the benefit that text processing such as is deployed within PEC and TRIPLE are not very demanding on computer processor resources. Unlike the higher end mathematical encryption which uses intentionally difficult and demanding computation as the main barrier to decryption.

Returning to analysis of the data, the fruits of the PEC process are clearly visible in FIG. 2E. Where it can be seen that the space characters, which were the code-breaker's best hope for an easy way to parse words and crack the code, have been randomly substituted by wildcards so that the space character and the wildcards are all within a small deviation between maxima and minima 3167 and they no longer provide the highest single value, which is now the totals of 83 for "r" and 83 for "s". If the codebreaker takes either "r" or "s" as being the likely crib or clue for the space character it will lead them into chaos. Similarly, the other most commonly occurring characters will no longer provide any clue or usable crib for a codebreaker.

Persons skilled in the art will understand that in this example, characters that were at least twice as likely to occur as the average were reduced and randomized to values approximately around about the average. This could have been done with a different parameter such as the mean value rather than the average. The maxima and minima could have been varied by a different deviation from the mean or average and so on. A PEC application may be programmed with the capability to vary its own parameters, or to allow a human user or an AI user to vary them. Indeed, an integral AI module or function could be included into a PEC application computer program, to intelligently pick the best ways in which to vary these parameters.

So that by applying PEC to content its attributes and underlying data can be better protected by pre-ciphering it into a state where the normal clues cannot easily be identified or used as is represented by the post PEC data analysis of the text sample, wherein the usual best hope cribs or clue characters for "a" 3161, "e" 3162, "i" 3163, "n" 3164, "o" 3165, "t" 3166, and the space " " 3167 character have randomized substitutions with wildcards 3161. So that when they are re-masked by a TRIPL as may be used in TRIPLE communications this will cause them not to stand out from the crowd statistically.

As they otherwise would have been easy to identify without the PEC method causing them to be distinctly randomized around the average. To give no clue to a codebreaker as to their true nature. Persons skilled in the art will consequently understand the importance of the flattening and averaging of the bar graph values 3156 in FIG. 2E. The adjusted totals for original characters and wildcards are shown here for clarity and continuity. Rather than the post TRIPLE values 3180 of FIG. 2I.

Perhaps what is especially clever about PEC in this example is that it does not assume or presume that all characters need to be ciphered. Which is because it is aimed at disrupting the ability of codebreakers to use statistical methods to find cribs with which to begin to crack the code. Which may leave a majority of characters unaffected. This is because it is likely that codebreakers will assume (wrongly) that a cipher or encryption has been equally applied to the whole of the sample text. It is very unlikely they will be able to guess that a partial substitution of characters or data patterns has been intelligently applied to manipulate the statistical rates of occurrence of characters into a form that is less vulnerable to the statistical tools of codebreakers.

This effect plus the continually changing TRIPL of system 3003 of FIG. 1C used in TRIPLE may render these subject technologies capable of providing a very large degree of information security for the relatively low overheads associated with text processing and manipulation. As opposed to the processor resource hungry higher-bit rated encryption alternatives such as 128 k, 256 k and 512 k. When applied across the large data flows of the Internet and large organizations, such as the US military. These less processor intensive encryption and cipher technologies including TRIPLE, and PEC may not only increase the efficacy of information security, but they may also help to reduce power usage in secure systems. Which is always a good thing for economic and environmental reasons. It is not known if there may be a corresponding rise in computer processing power that may be used in attempts to decrypt and decipher secure data.

Indeed, the fact that adversaries of the US military and intelligence services may not have experience of anything like TRIPLE and PEC, may provide a relative capability boost relative to them. For this reason, this specification and some of its subject technologies may need to have export restrictions and secrecy orders placed on them to preserve these advantages. So as to boost and prolong their usefulness for the US military and intelligence services.

Figure 3:
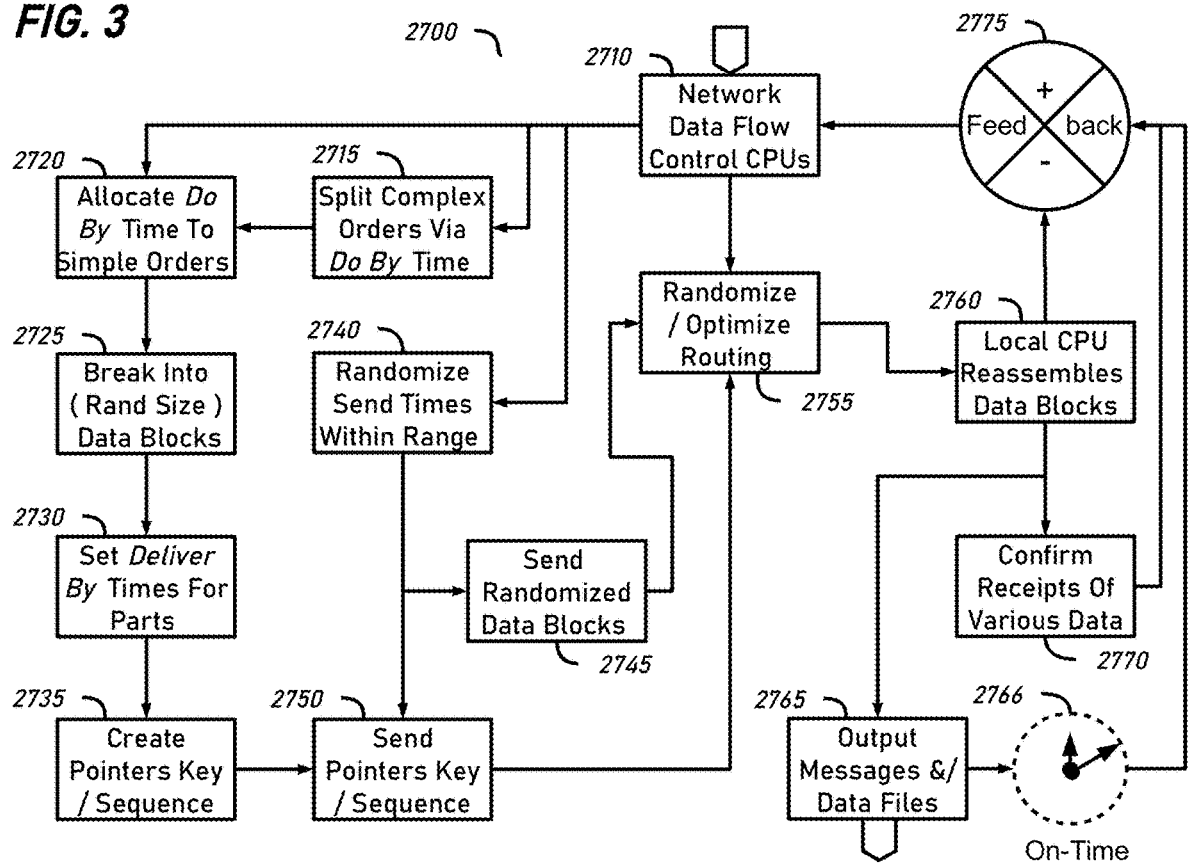
FIG. 3 is a block flow system diagram for wide area network data flow management systems according to various aspects of the subject technologies.

FIG. 3 shows a system 2700 capable to make inter alia US Navy communications more secure, by applying aspects these various subject technologies. Imagine in the present system one message is sent to the best located US Navy submarine: "Proceed to intercept hostile submarine, off southern coast of Taiwan. Precise co-ordinates of the hostile's location will be provided in real time. Proceed to within torpedo range and engage the hostile. Then liaise directly with Navy Seal dive team presently stationed at covert location "Z", in Taiwan to confirm result by recognizance."

This order goes out thirty-six hours before the US Navy submarine can get to the location. It gets intercepted and though the adversary state is not particularly quick at working through their signals-intelligence, they manage to deduce that their submarine is in danger, which allows them time to try to hide, by heading away from the US Navy submarine. The chase drives the adversary submarine South, and another US Navy submarine is now closer. So, the first US Navy Submarine is ordered to break off the pursuit and return to its patrolling mission.

The second US Navy submarine being closer is able to close with the adversary submarine to engage and sink it. The adversaries' signals intelligence was trying to crack those communications but could not crack them quickly enough to save the adversary submarine in the end. Unfortunately, by this time the Navy Seal dive team was out of range to be able to conduct their "need-to-know" intelligence gathering operation at the location where the adversary submarine was sunk.

While the mission may seem like a partial success, it is in fact also a partial failure. Because what the first submarine captain did not need-to-know, was that the main purpose of the mission was to capture some hardware from the guidance and communications circuits of the adversary's nuclear armed missiles. Hardware which due to intelligence revived from an agent inside the adversary's missile program—is believed may have a hacking vulnerability. That may be targeted via interception and spoofing of encrypted periodic monitoring and maintenance signals that have been picked-up by NRO, and which it is believed may have been between the adversary's engineers and the missile's various systems. Where the vulnerability is believed to be. These sensitive circuits are the real prize sought in this daring mission. Because it is believed that they may allow those missiles to have their targeting parameters reprogrammed, for a return to sender exploit. Imagine that! So, no small stakes for the US Navy and their Seal Team on this mission.

This scenario could have been much easier, totally successful and required less than half the resources it took—if only Naval communications had been more secure! It is often forgotten that signals intelligence can turn the tide of a major war. As may those circuits from the adversary's nuclear missiles. Signals Intelligence was of massive benefit to the Allies in World War II. The corollary of which is that the security of our data and communications today is equally if not even more important.

Had these subject technologies been used, then the time at which each detail of the orders needed to be understood and carried out could have been used to break apart the orders, and to optimize for secrecy and efficacy the times, at which the various parts of the orders were delivered, and orders made more specific by the addition of the times things need to be done by.

Here is a re-run using these subject technologies and methods. The only thing the first US Navy submarine needs to know for the first thirty-four hours is the heading and speed they must travel on. If these subject technologies had been applied to this scenario, then only a dull message detailing the required heading and speed is needed for the first thirty-four precious hours. Precious hours that can be used to buy the US Navy submariners and the seal team divers a valuable advantage. The element of surprise! This rather dull and short alternative message either does not get intercepted or does not cause any alarm to the adversary submarine's commanders. They do not know that the US Navy is even aware of their presence and expect to be silently passed in the night. So, they sit still on silent running protocol. This is perfect because their location is known because unknown to them, they passed close to a submarine sensing system. Comprised of very sensitive submarine microphones located in the coastal waters around Taiwan; and which data has been secretly passed-on to the US Navy.

Only as the first US Navy submarine is nearing its torpedo range does the crew need to make ready for battle. Ergo, they do not need to know any more until two hours before they will fire their torpedoes at the adversary submarine. The orders to find and engage the adversary submarine, are sent just two hours out from the planned engagement. This preserves the valuable element of surprise. The first strike catches the adversary submarine cold and is successful. The adversary submarine is sunk just south of Taiwan, and in the right waters that are within range of where the expert Navy Seal team of divers can reach the wreck more quickly than the adversary. The US Navy Seal Team divers who have been incognito off grid at base "Z" in Taiwan are able to rush to the location of the sunken submarine.

Where they succeed in retrieving those key circuits from the nuclear weapons stowed in the magazine of the sunken submarine. After which successful retrieval operation they cover their tracks with explosive detonations in the magazine of the adversary submarine, so as to add subterfuge, that may suggest to investigators that maybe a magazine malfunction sunk their submarine? To get closer to the ideal outcome, in which it is quite possible that the adversary may believe that the US Navy submarine, and the US Navy Seals were either never even there, or not involved. And cause the adversary to waste resources looking for defective detonators in their magazine contents.

Now the US military has the ability to reprogram this adversary's nuclear armed missiles, and to perform a return to sender exploit. To turn them around and aim them back at the adversary—if they are ever launched against America. This example is why the Inventor creates these technologies, and why America funds its military. Sometimes the lives of millions of people, and the outcome of a nuclear war may turn on something so slender! As the ability to keep secrets. It is hoped that readers will see the wisdom and value of making orders simple that are minimal, timely, and timed for maximum security, is a simple but effective method for helping to protect the lives of US military and intelligence personnel, and the American people. To increase the chances of a clean successful mission. By doing something military strategists will recognize as a timeless classic, or gold standard. Which is to provide our war fighters with the benefit of "the element of surprise" ! It is difficult to overstate how important secure communications, or the lack thereof has been throughput military history. It is hoped this example scenario suffices to make the point.

That very simple example is just to illustrate the principle, that timing matters and good timing may aid the cause of effective secrecy! This is because the "need-to-know" may be time critical and timing optimized, so that assets know what they need to know. But only at the time when they actually have a need-to-know, in order to carry out their orders by the desired time (the "do-by time"). Because this do-by time should be identified at the outset because it impacts profoundly upon the security and efficacy of orders.

The time things need to get done; plus, the time they will take to do from start to finish are the parameters that will determine the time at which an asset has a need-to-know and deliver by times have to be designed accordingly to suit these givens.

Effective use of prioritization, and good timing of the "need to know" is a very inexpensive but potentially invaluable piece of know-how, know-when, know-why only, but only at the right time when things need to get done (as close as possible to the "do-by time"). This method, as further explained with reference to the drawings below may be implemented on military systems. It is hoped that the US military will introduce these systems and methods into officer training, using such simple but powerful examples—as well as using them in theater. Because important events may turn on knowledge of and correct use of these subject technologies and methods.

Figure 4:
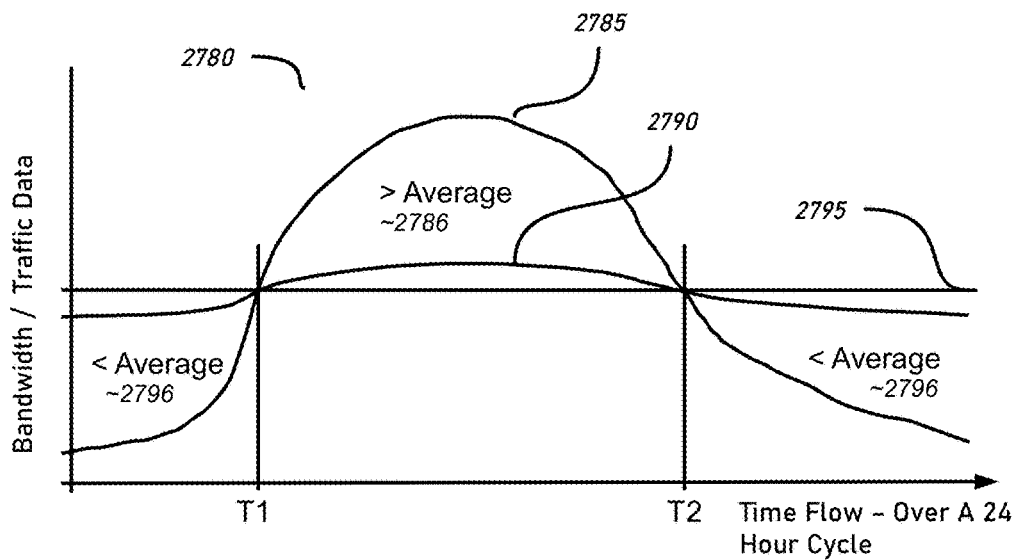
FIG. 4 is a graphical representation of the amount of data flowing over a wide area network before and after addition of aspects of the subject technologies.

The system 2700 has much more detail applicable to live military and intelligence information and communications systems. This is not the only benefit to be gained by adopting a time optimizing communications (TOC) system and method like 2700. FIG. 4 shows how the demand for bandwidth on US Navy systems 2785, may be smoothed out and flattened to the demand curve 2790, which is closer to the average demand for bandwidth 2795. So that not only can the system 2700 improve security, but it may also make the system more efficient and allow it to carry greater overall demand over a rolling twenty-four-hour cycle. By spreading non-urgent or best-delayed data transmissions from the daily peak period of above average demand 2786 (between T1 and T2), into the periods of below average demand 2796.

This time-shifting of non-urgent transmissions over the network also has the effect of mincing up and entangling the total of all messages with each other. Thus, placing a more consistent obstacle of scale in the way of code breakers and eavesdropping adversaries. Who seek only the high value messages, but who are being thus forced to try to decipher them and to disentangle them from the general chatter which is of no strategic or tactical value. This also provides the additional benefit of flattening the demand curve for bandwidth across the network from curve 2785 down to 2790, which is much closer to the average 2795.

In times of plenty, such as peacetime this benefit of flattening the demand curve for bandwidth from 2785 to 2790 may not be immediately apparent. Except in situations such as those faced by US navy submarines. Who may suffer reduced bandwidth associated with difficulties transmitting through sea water. Which applications may be a prime candidate for the application of this aspect of these subject technologies.

However, in the event of a war with a near peer such as China in which a lot of space-based assets may be lost in the early stages of conflict. There is considerable gain to be had and wisdom in building into military communications systems a subsistence or basic survival level capability— according to these subject technologies. So as to make the best possible use of constrained bandwidth in a hard-fought war. Which would be impossible to implement on the fly in such an emergency.

Which capability ideally should be provided as a given piece of infrastructure in military communications and used even in the good times. As best practice for reasons of preserving the element of surprise and because "tight lips may save ships" ! So that what the graph 2780 of FIG. 4 really shows, is wisdom that may save lives, and may also provide additional benefits of providing continuing effective communications even with a severely damaged communications infrastructure, suffering from constrained bandwidth.

To provide for the very modest cost of having smart information handling systems the ability to save lives and continue to fight-on in adverse circumstances. That may one day amount to the difference between winning and losing a conflict with a potent adversary. All for the modest price of building TOC and its security, timing and bandwidth optimizing systems and methods into military communications. According to these subject technologies and as further expanded upon below.

For the sake of completeness, the detail of the system and methods 2700 of FIG. 3 are traversed as follows. This is a module that may be part of a bigger system as indicated by the off-page connections. The diagram uses a block and flow system nomenclature. Wherein, network data flow is controlled by CPUs 2710. In some embodiments, users may enter "do by" times with each aspect of their orders through this system. "Do by" refers to a time deadline or time constraint by which an action described by the message should be performed or completed by the recipient. Process step 2720 is to allocate do by times to simple orders; and process step 2715 may split complex orders apart where possible based on the do by times within a message segment, before passing these as simple form orders to process step 2720. For example, in some embodiments, the system may analyze the message contents and determine various "do-by" times within the message. The system may further determine how (or in what order) message segments may be received based on the extracted do by times associated with message segments. Once all actionable orders have been split by their timing needs, then orders and data pertaining to them such as intelligence, and sensitivities targeting and effects information pertaining to them may also be broken into data blocks. In some embodiments, the data blocks may be of a randomized size so that two data blocks or message parts of the same message may have different arbitrary sizes.

The next process step 2730 is to set deliver by time(s) for the message, message part or data blocks. A "deliver by" time refers to a deadline by which a message part or data block should be delivered to the recipient. To emphasize, there may be two temporal aspects to a message and/or each of its constituent parts when broken up; an intrinsic time attached to an action within the message itself and an extrinsic time attached to the instructions for delivering the message part. The method may then create a pointers key or sequence 2135 for each message part. The process step 2740 allows the system to attach random send times for message parts within a range of time that is designed to ensure that all the necessary data blocks (of the orders and necessary additional data) will arrive on time 2766. Thus, in some embodiments, the message parts may arrive at the recipient location out of series from the original order of the whole message. Being "on time" may be based on for example a "deliver by" time set for the whole message before it is broken up into segments (parts). The range of time in which messages and/or message parts may be delivered may be defined by the system as being between a "May Send From" time and a deliver by or "Must Deliver By" delivery deadline. This aspect which may set the "range" of time of process step 2704 may be tracked through the embodiments of FIG. 4B, and FIG. 4B(ii) where an on-screen dialogue is used by the system to determine the range of time between the MSF and MDB time.

This temporal randomization of message parts may mince and entangle them into the general communications chatter on the system. Which for an eavesdropper may make them difficult to identify like finding needles in a haystack to find and correlate. Timing the need-to-know specific details of orders as close as possible to the do-by time when they have to be carried-out are provided for in this example.

The next step is to send these data blocks with random sizes, at random times, and process step 2755 may add the further security booster which is to randomize routing of data blocks over networks. Randomized routing may comprise send message parts or data blocks along different and arbitrarily selected network routes so that interception of one message part does not necessarily mean having access to any other message part since other parts may be on different network paths. Upon receipt of all the data blocks, and the pointers key, timed at just before the recipient needs to know their orders, and its associated data—the local CPU reassembles data blocks 2760; then confirms receipt 2770 by way of feedback to the sender system. To confirm that orders have been received on time 2766.

The messages containing orders and associated data files are then output locally 2765 on time 2766 to the affected personnel. A feedback signal confirming the delivery and/or timing 2775 may be provided back through the network to the control CPU 2770. Subsequent figures address more complexity where for example bandwidth is constrained, or there are limited assets available to implement orders. Forcing choices to be made. In which cases the option to add prioritization to messages or parts of messages is further explained. So that all other things being equal, prioritization may help the best choices to be made in difficult circumstances. Because sometimes, large outcomes can turn on hard choices.

Figure 4A:
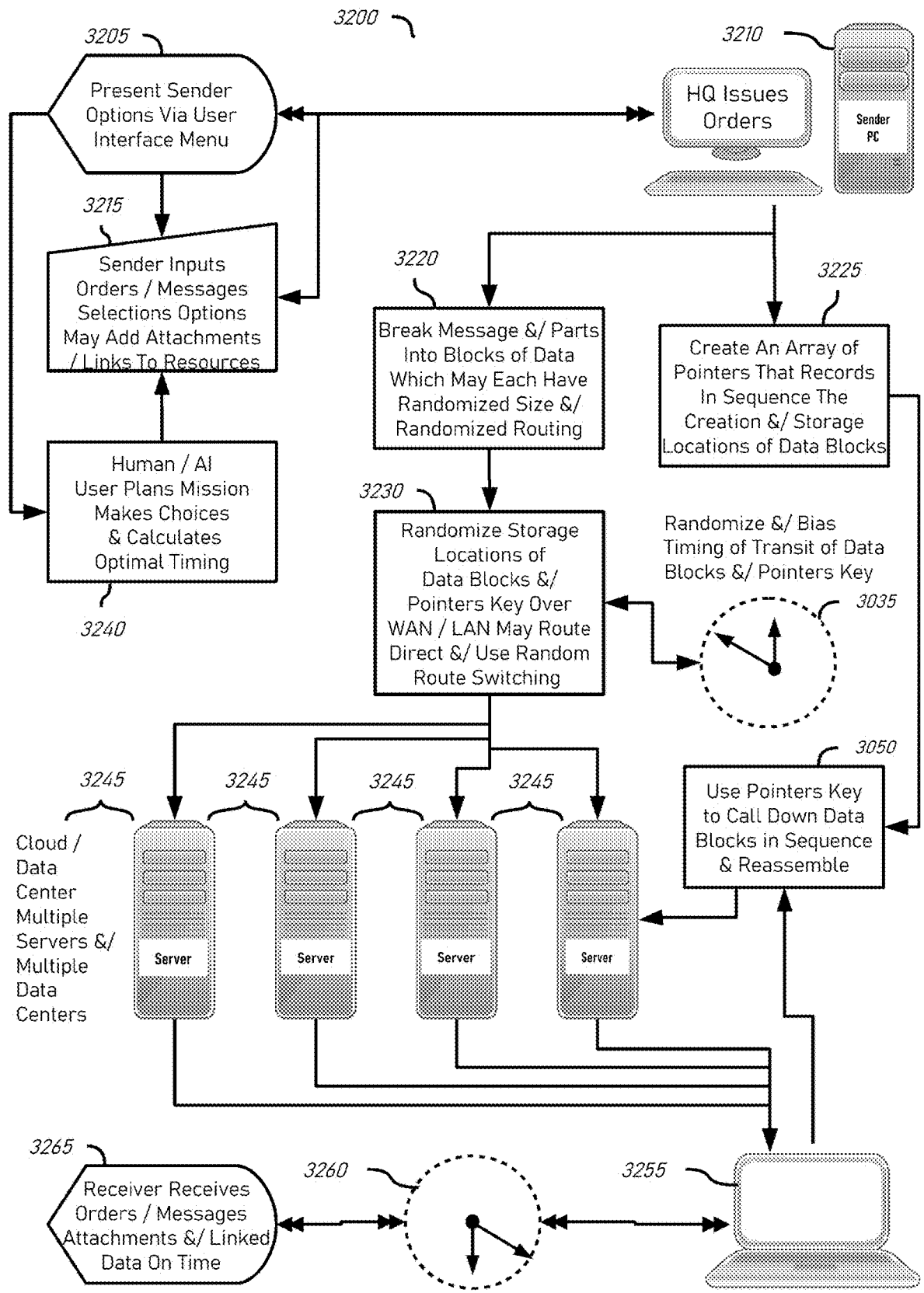
FIG. 4A is a mixed schematic and block flow diagram of a system operating a method for optimization of the timing, security, and bandwidth usage according to aspects of the subject technologies.

FIG. 4A shows a high-level view of a system operating according to a method according to these subject technologies 3200. The sender's computer 3210 that may be within the US Navy's command and control headquarters for the Indo-Pacific presents the commander with options via a user interface 3205. The mission planner 3240 may be human and/or an artificial intelligence or both, that makes choices and calculates optimal timing for the various aspects of the mission.

Based on these mission plans the sender 3215 inputs orders and/or messages; in which process the sender selects options. These may include the addition of attachments, and links to resources to assist the asset in carrying out the orders. From which process the headquarters' workstation personal computer 3210 sends the orders. The sender workstation computer, running software that performs according to the method of the subject technologies breaks messages and/or parts of messages into blocks of data 3220. Which blocks of data may each have their size and/or routing randomized. Depending on the needs of the mission and the amount of data to be communicated.

For additional security, the data blocks that make up the message and its data may be routed into randomized storage locations as may a key to those locations of those data blocks comprised of an array of pointers 3225. In some embodiments, the storage locations may be temporary repositories that hold message parts until a processor determines that a message part is ready for delivery by any of the criteria described herein. Temporary repositories may include for example, networked servers, local computing devices on the network, and cloud-based servers. The routing of data blocks and/or the pointers key may be routed directly or may have its routing also randomized 3230. Furthermore, the timing of the transmission of these data blocks may be randomized within the constraints of their specified prioritization, and their MSF, desired delivery time MDB deadline and/or which may be set by the system by reference also to their do-by-time. More detail of one such embodiment of a user interface dialogue screen 3700 for entry of the data that may be used to determine do by times 3720 is provided in FIG. 4B(i).

Furthermore, this timing aspect may also be biased away from true randomization to time shift network traffic into below average levels of network traffic 3035. As regards this biasing aspect of timing adjustments, please see also the below average parts of the demand curve 2796 in the graph of bandwidth utilization 2780 of FIG. 4. Where it can be seen that process step 3225 may be used not only to improve the security of the data blocks in transit, and of the message and its parts—but also to adjust the demand curve 2785 for bandwidth from a high above average peak 2786 between T1 and T2, to the produce the flatter demand curve 2790. That is much closer to the idealized totally flat average demand 2795. This ability to better utilize limited bandwidth, may thus make messaging systems use of network resources and in particular the available bandwidth more efficient.

The US military adheres to the strategy of being able to launch a retaliatory nuclear strike. This is seen as desirable so that military planners are not forced into a use-it or lose-it first strike scenario. So as not to trap decision makers into a nuclear exchange driven by this fear.

The problem with which is that it is highly likely that a sophisticated adversary such as Russia or China would probably try to take down as much as possible of the bandwidth of the US military as part of a first strike. In attempts to deprive the US military of its eyes, and ears in the forms of sensors as well as to reduce the ability to communicate.

So that the ability to maintain effective and secure communications across the massive array of US military assets and capabilities—is in fact a huge strategic challenge. It is something that the US military simply cannot afford to get wrong. It is potentially huge! Because time-shifting routing, and biasing bandwidth usage into the quiet times, to reduce peak loads and increase the overall capacity for information flows—really might turn the outcome of a major war! In which the very survival of the United States is on the line.

Consequently, the Inventor hopes that although flattening this curve may not look exciting compared to some of his other technologies—its importance is not underestimated by US military planners and leaders. Constrained bandwidth may also be a particular issue for the US Navy in vital communications with its submarines, including its nuclear deterrent carrying submarines. That would be needed in a retaliatory strike.

This same benefit of maximizing the efficacy of constrained bandwidth methodology of these subject technologies may also be an issue even in peacetime for submariners due to the difficulties of transmitting radio waves through sea water. Which can be done, but with constrained bandwidth due to using the longer more penetrating wavelengths that are suitable for penetrating through sea water.

Consequently, there is more than one compelling reason to maintain and operate systems and methods that provide the capability for flattening bandwidth curves, across the US military. With which capability these subject technologies can help, as well as making orders more secure. While also helping to gain advantage from the element of surprise etc., in the case of time sensitive messages and short-term secrecy as explained above. The graph 2780 of FIG. 4 should thus be kept in mind throughout these time-shifting and randomizing aspects of the subject technologies as in step 3035, of system and method implementations such as 2700 of FIG. 3, and system and method 3200 of FIG. 4A.

The next process step following the randomization of storage locations and routing of data blocks 3230, as may also be time-shift randomized and/or pseudo-randomly biased 3035 into a desired period of below average demand for bandwidth. So that over time the data blocks transit into an array of servers and/or data centers 3245. The next process step from which is that where a pointers key is used and provided 3050 over the network, it may be used to call down the data blocks as needed and to reassemble them in sequence. So that the workstation or communication device of the asset 3255 receives all data blocks, and message parts on time 3260, and the user interface or screen 3265 provides them to the end user or asset operator who receives his/her orders, messages, and/or sub-parts of them along with attachments and linked data on time 3265. In order that those orders can be carried out by their do-by-time, or MDB deadline while providing sensitive details just in time, and only when the asset has a need-to-know.

FIG. 4B provides a graphical user interface 3301 for the entry of orders to be processed by these subject technologies. The graphical user interface is intended for display on the senders view screen such as 3205 of system 3200 of FIG. 4A. The graphical user interface shows an off-page connector 3300 to whichever system it may be running upon. The graphical user interface 3301 is capable of expansion from one message part to however many message parts are required. The ability to extend the graphical user interface 3301 is provided by the button function to "Add Message Part" 3390 at the bottom left of the graphical user interface. Users may add message parts by selecting this button.

At the header of the graphical user interface 3301, fields for entering who the message is from 3320, is "IPC" order number 3322 is "IP032065", operation name 3324 "LIVEWIRE", and who addressed to 3325, is "CAPTAIN NEMO—USSS MARS TAYLOR". Next the message part one of three 3305 is shown in this example, because the user must have chosen to split this message into three parts. In part one of three the user may select the button option for "May Send From [MM/DD/YY HRS: MIN: SEC]" 3330, and identical buttons 3350, and 3370 are provided identically in parts two and three. More nuanced functionality is provided in the adjacent dialogue boxes 3334, 3354, 3374 of all three message parts wherein the user is prompted to specify "Must Deliver By [MM/DD/YY HRS: MIN: SEC]" so that precise details may be provided to specify the delivery time deadline of these orders. These details may be entered directly into these fields in the on-screen dialogue 3301, and/or clicking on them may trigger a sub-menu dialogue 3701 such as that shown in FIG. 4B(ii). Where the underlying logic of calculating the MSF time and MDB time can be seen being applied to data entries which are used by the system to set the range of time in which the system may deliver the message or message parts. This is the aspect of the subject technologies that provides the opportunity to preserve the element of surprise. If one suspects the message may be intercepted and deciphered but that this process will take time, it may be possible by sending at just the right time. When the asset has a timely need-to-know, rather than sending sensitive information earlier than necessary before its do-by-time. In order to deny an intercepting adversary time to decipher the message, and/or organize or defend against the planned actions. This is the lesson explained in the scenario above.

The next process steps in all three parts of this message are to enter the detailed orders of each part 3338, 3358, and 3378 "ENTER ORDERS HERE: Who? What? When? How?" etc., and which may include in the "When" aspect to allocate the "do-by" deadlines 2720, and 2715 referred to in system 2700 in FIG. 3. Clicking on this option may trigger the launch of a nested dialogue 3700 of FIG. 4B(i). Which is addressed in more detail below.

So that the commanding officer will be required to think carefully about and plan carefully timing issues. To set not only delivery times or MDB deadlines but will also consider do by times for the specific details of an operation and to specify them with sufficient precision. So that the recipient will be clearly told what to start to do by what time and may also be provided with a completion or do by time for a task. As may be seen in the data entry window 3720 of dialogue screen 3700 of FIG. 4B(i)

The deliver by time 2730 for each order or part of an order may be entered 3334, for part 1, 3354 for part 2, or 3374 for part 3 of an order should be timed (for all applicable data blocks of which need) to arrive just in time to allow the asset to read the order or part of an order, and to comprehend what is to be done. The actual deliver by time or MDB deadline will depend upon the do by times, and not vice versa. The do by times, entries that may be provided in dialogue window 3700 of FIG. 4B(i) may be used to automatically set the deliver by time of a message part. Urgent orders may override such details and be sent and delivered as soon as possible (ASAP) which is explained to users in the dialog widow 3777 of window 3701 of FIG. 4B(ii). Further details of which may be provided in other menus that are not shown.

It may be a matter of operational discretion and/or having a "need-to-know" or not, as to whether the purpose as to why is disclosed. Generally, the "need-to-know" principle may mitigate against sharing more than the asset needs to know to accomplish the desired task. Except possibly when dealing with irregular assets who may need to know why something is necessary for motivational reasons. Such sensibilities are less likely to be needed or catered to within professional military operations. But they may be of profound importance for the effective management of an irregular asset or ally or intelligence asset by handlers who have to work with the personal frailties and motives of their assets.

The Inventor assumes that depending upon the field of application that commanders will have appropriate training, strategic and tactical expertise, and awareness to craft professional orders that are timely as part of their professional skill set. That they will seek to give themselves the advantages to be gained by using these subject technologies and methods, or some variant of them.

However, of further applicability is the ability provided by the sliders 3342, 3362, and 3382 that provide the capability to set a priority for each message part of these orders. This may be similarly implemented by clicking buttons or entering numbers as variants of the use of a slider.

A message with a higher priority may thus be caused to be actioned before a competing order that impacts the operational timing-window of an order. So that where all other things are equal, and an asset must make a choice. Then the higher priority order should be done first. In subsequent examples the aspect of timing collisions of orders thus provided—is further refined with a decision-making model 3605; for assets to apply as shown in FIG. 4E. Remembering that during the life of this patent specification that the user giving the orders and/or the subordinate or asset receiving the orders may be an autonomous or semi-autonomous artificial intelligence.

The last of the options shown is the "ATTACH FILES" buttons 3346, 3366, and 3386. Which when selected, route out to another menu for the attachment of files, and which may include the addition of links to resources that may or may not in fact travel with the message parts. This sub-menu is not shown.

When the user/or commander is content that the orders are correctly composed and configured for best strategic and tactical advantage as well as temporal security of need-to-know secrecy items. Thus, helping to provide improved protection of time sensitive and secret information, then they may initiate the sending process by selecting the "SEND" button 3394. This will then cause the system to break apart the message according to (a) timing needs, (b) prioritization, and (c) bandwidth optimization transmission variations and biasing of timing of data handling processes, (d) data block size variations, (e) data block routing variations, (f) other desired variations, comprising the operative parameters. For maximum security, and efficiency of use of available bandwidth. It being noteworthy that it makes sense to mix in important and secret messages with less important chatter. So as to put the needles within a haystack of data by analogy and pose a greater technical challenge to an eavesdropper and decryption efforts.

FIG. 4B(i) is a part of the user interface comprised of a data entry window 3700 that may launch when users click onto the order entry box 3338 for part 1, 3358 for part 2, or 3378 for part 3 etc., in the onscreen interface dialogue 3301 of FIG. 4B. In which users are prompted for and may enter the specific details of the orders to be given. Completion of which is intended to aid clear and concise thinking about the orders and the timing of the various aspects of them. Users are forced to think about and select when tasks need to be commenced, how long they will take to complete and when they have to be completed to fit into the overall mission plan. In which they may impact and have to mesh in sync with the orders given to other assets in the command. For this reason, there are provided data entry fields for entering (a) the start date, (b) start time, (c) finish date, and (d) finish time in the "Do by" dialogue and the input fields of data entry box 3720; plus, a capability to add extra detail on timing 3740. Extra details may include orders to coordinate with a counterpart on a shared task and may include any anticipated issues that may impact on timing. Such as providing guidance on how to address any slippage in timing once an operation has begun.

Details entered into this dialogue window 3700, and the similar dialogue window 3701 of FIG. 4B(ii) addressed below may be saved by depressing the "save" button 3770 in either window. Navigation may be via the keyboard or a point-and-click device such as a mouse. Additional message parts thus created may be saved into the main order as a part of that file or document, or message part may be linked to the main order and vice versa by cross-referencing a variable file handling parameter. This save option may be applied to any other similar dialogue windows that system designers may add into expanded versions or variants. It is highly likely that most operational orders will be secret and the ability to provide a level of Secrecy or Classification is provided by dialogue and data entry box 3730.

The system such as 2700 of FIG. 3, may generate an order number for every order within a command structure. Such an order number 3710 may have been automatically generated in this case and is displayed at the top left part of the dialogue and data entry window. This order number is "IP032065.1" which may serve to identify the command as Indo-Pacific due to the "IP" prefix and the number "032065" may be unique and may relate to a number sequence or be based on a number generation program. Capable to provide order numbers automatically within this command, and "0.1" may indicate that this is the dialogue and data entry window relating to Part 1 of order IP032065 of the Indo-Pacific command.

This screen also provides a dialogue and data entry capability to apply a name to a sub-operation, and here the window 3735 displays "Sub-Operation: LIVEWIRE/ SPARK". Indicating that the main operation is "LIVEWIRE", and this is a sub-part of that operation called "SPARK".

A main data entry window 3750 may be capable to receive and process the text comprising the main details of the orders. Regarding what specific task has to be begun by the start time and finished by the completion time. To which those do by times apply. It may be used to specify personnel, equipment, materials, and objectives as well as alternatives. Where some flexibility and variability is to be expected. It is often the case that plans can go rapidly off course and off schedule. Which is why orders may include continuing liaison and the provision of feedback and updates to command. Command may then issue new orders in such a case, and in cases of extreme urgency. This system should not preclude the ability to receive direct orders outside this system in an emergency where urgency is the dominating need.

Furthermore, an artificial intelligence may issue some orders using these subject technologies and methods. These orders may also be sent as text, which may be encrypted, and this may include TRIPLE, and the recipient of the orders may receive them audibly via a human voice, and reader or by a text to speech application over voice communications infrastructure. The orders may thus be written and sent according to these technologies and methods, and may be provided to an asset audibly, or visually or any combination of the same, including even printed in hard copy on paper with ink. Without the need to deviate from these technologies and methods for their creation and transmittal.

Orders and parts of orders should ideally be succinct, while providing sufficient detail and assistance for the recipient to be able to readily comprehend and act upon them without need to seek clarification. Where desirable, protocols may be used such as those explained above for use within TRIPLE communications. The use of which protocols may increase the security of the message contents and decrease the time and effort necessary to write orders. So that commanding officers and receiving assets should be conversant with and have access to applicable protocols. In the case where more space is needed the dialogue and data entry window may be capable to expand 3760 to accommodate longer orders.

FIG. 4B(ii) shows an on-screen sub-menu and data entry interface 3701 for an embodiment of the subject technologies. The purpose of this interface is to acquire from the commander the information needed by the system to create a suitable range of time between an MSF time and MDB time delivery deadline for time sensitive orders. In this model, perhaps because the secrecy level 3730 has been set to "ULTRA" a worst-case decryption scenario is used to mitigate the risk of interception and rapid decryption. Perhaps the adversary has a known signals-intelligence capability, and a very good AI decryption capability. Maybe towards the end of the duration of the life of any patent based on this specification. In this scenario there is a risk of near instantaneous interception and decryption. Such things have happened. In the cold war the US Navy was hemorrhaging secret information due to a hacked under-sea data link. In an important mission such a risk may lead the commander to estimate that the adversary may be able to intercept and decrypt the message so quickly that if the time sensitive orders are sent more than two minutes and thirty seconds before they are to be executed, and that the adversary may be able to take action that may frustrate the purposes of the mission, and/or that lives may be lost.

The dialogue window 3777 first presented this question "If an adversary were to intercept and decipher this message or message part, could it reduce the chances of mission success, or endanger lives? Y/N [ ]" to which the commander replied "[Y]" for yes, and was then told by the system to "Continue to next question. How much time would there need to be before the mission execution or start time for such interception and deciphering to reduce the chances of success of the mission or endanger lives. Estimate and enter values? Weeks [_] Days [_] Hours [_] Minutes [_] Seconds [ ]". The commander has then entered the data required "Weeks [_] Days [_] Hours [_] Minutes [02] Seconds [30]". The system then calculated the MSF and MDB deadline range of time and replied to the commander "------------- Thank You ------------- The May Send From time for this message and any part of this message shall be no sooner than 2 minutes and 30 seconds prior to the Must Deliver By time. Once within 2 minutes and 30 seconds of the Must Deliver By time, manual system override ASAP and/or send immediately options may be used if the message is not sent automatically." Consequently, the MSF to MDB deadline range of time is two minutes and thirty seconds. This range of time may then be used in combination with the detailed entries for the Do By times for starting and finishing the operation, plus a small amount for reading the orders and comprehending them to allow the system to set the orders into firm dates and times which it will generate into the final form orders, and which parameters will determine the timing of the sending and delivery of the message and/or message parts, by a system such as 2700 of FIG. 3, and other embodiments considered above. Users may save these completed details and or the results of the dialogue into the main message or order as explained above by selecting the save button 3770.

It is the combination of the MSF and MDB range of time, and the Do By times that determine the actual times which the system will apply to the sending of messages and message parts. So as to better protect time sensitive information and provide the benefits of the element of surprise to users of these subject technologies. The variability within ranges of randomization, and pseudo-random variations of other aspects of the information processing that may carry the messages is further considered below. To provide a more comprehensive solution for the protection of time sensitive information and secrecy within a messaging or order giving system.

FIG. 4C is a block and flow diagram of a three-part message or set of orders like the one that may have been output by the system and methods of the above figures and the graphical user interfaces 3301 of FIG. 4B, 3700 of FIG. 4B(i), and 3701 of FIG. 4B(ii) used as part of a system such as 2700 of FIG. 3.

The multi-document 3405 message is broken up into three parts 3405, 3410, and 3415, and their associated attachments 3444 are similarly broken into three parts 3446, 3466 and 3486. They are furthermore processed into data blocks, so that part one of the message 3405 is broken into data blocks 3407; part two of the message 3410 is broken into data blocks 3412; and part three of the message 3415 is broken into data blocks 3417. The data blocks are of sizes that have been randomly varied within maximum and minimum parameters.

Part one of the attachments 3446 that corresponds to part one of the message 3405, is broken into data blocks 3448; part two of the attachments 3466 that corresponds with part two of the message 3410 has no attachments and results in no attachment-based data blocks; and part three of the attachments 3486 that corresponds with part three of the message 3415 is broken into data block 3488. As will be gone into in great detail in subsequent figures and descriptive materials there are many options for the storage and routing of data blocks, which may be randomized into disparate locations for storage.

In this FIG. 4C there are shown just two alternatives. But it should be appreciated that more options will be explored in detail in the context of secure messaging, data security, data storage, cloud and server management systems, streaming communications, and streaming media. Which technologies and methods may be applied and illustrated across a range of possible infrastructures and user devices.

In this FIG. 4C the data blocks are stored in the cloud, which may be into randomly varied locations in the cloud 3490 from where they can be sent to the receiver or downloaded from by the receiver according to the deliver by times applied when the message and its three parts were created. The alternative process step shown here is to store the data blocks locally 3495. Then send them to the receiver or allow the receiver to download them according to the deliver by times applied when the message and its three parts were created.

In subsequent figures possible random variations are addressed. Regarding (a) timing for sending as well as (b) breaking apart of files, into data blocks, as well as (c) varying data blocks sizes. Which may be made to vary randomly within parameters. As shown here this variability is expanded to include random variation of routing, random variations of storage locations locally and/or in cloud infrastructure; and the use of keys comprised of pointers capable of use for the downloading/or delivery and reassembly of all of them back into the message, message parts and accompanying data attachments. To provide copies of their original form. So as to provide a suite of compatible technologies and methods. Capable of performing randomized information processing in accord with the various aspects of these subject technologies.

Figure 8:
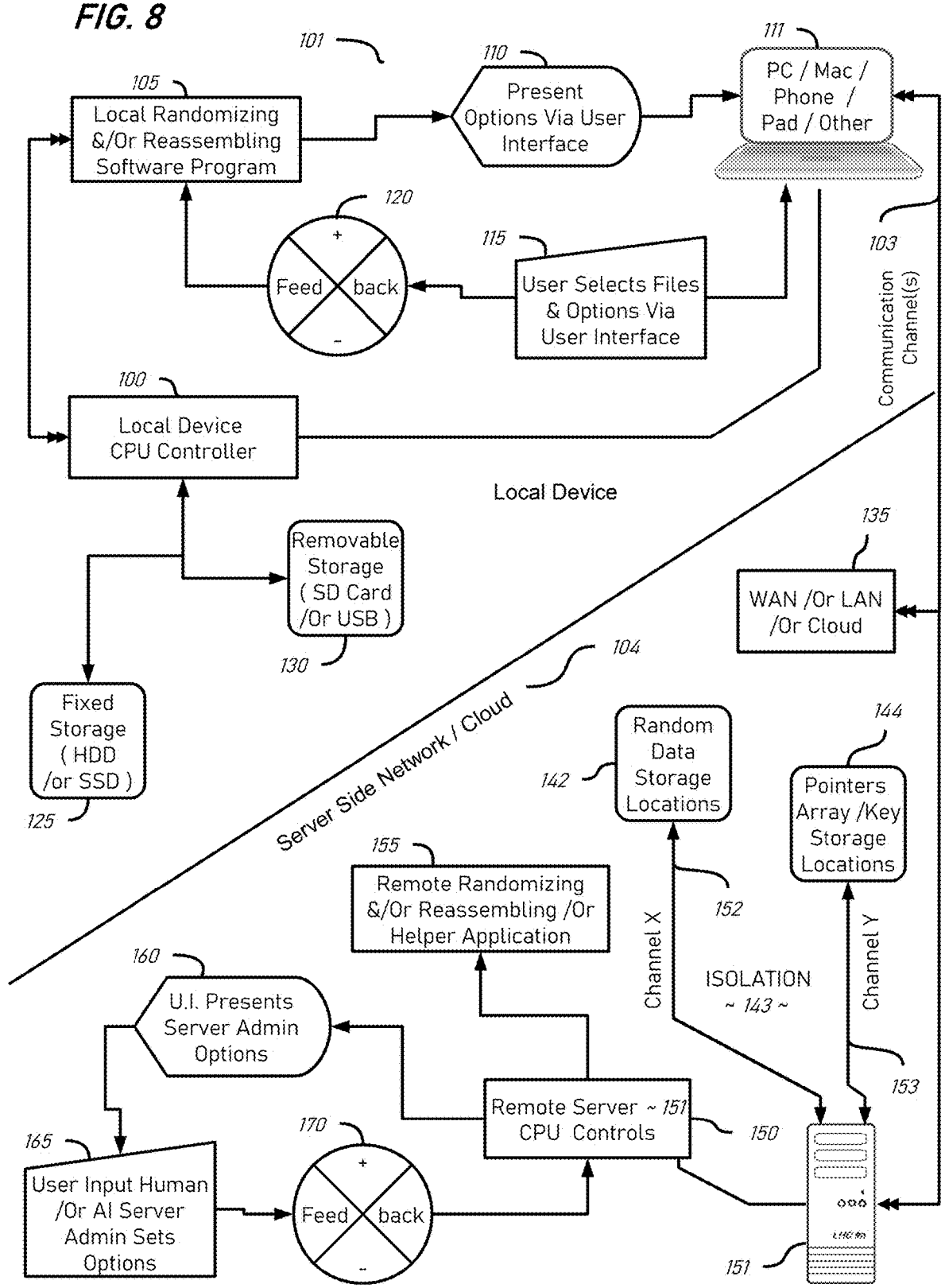
FIG. 8 is a block flow diagram of cooperating local and remote systems processing data according to various aspects of the subject technologies.
Figure 8A:
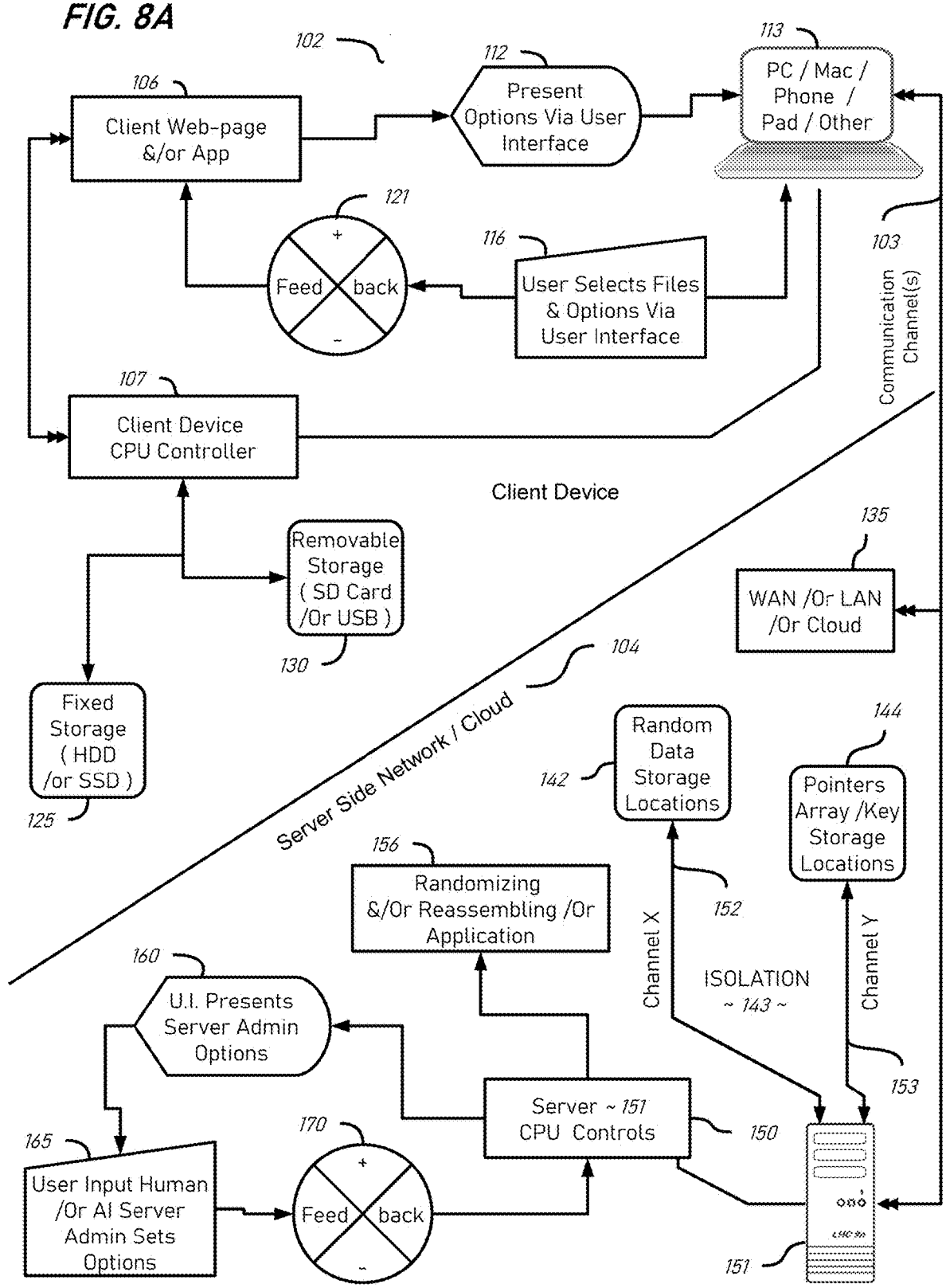
FIG. 8A is a block flow diagram of cooperating local and remote systems processing data according to various aspects of the subject technologies.
Figure 27A:
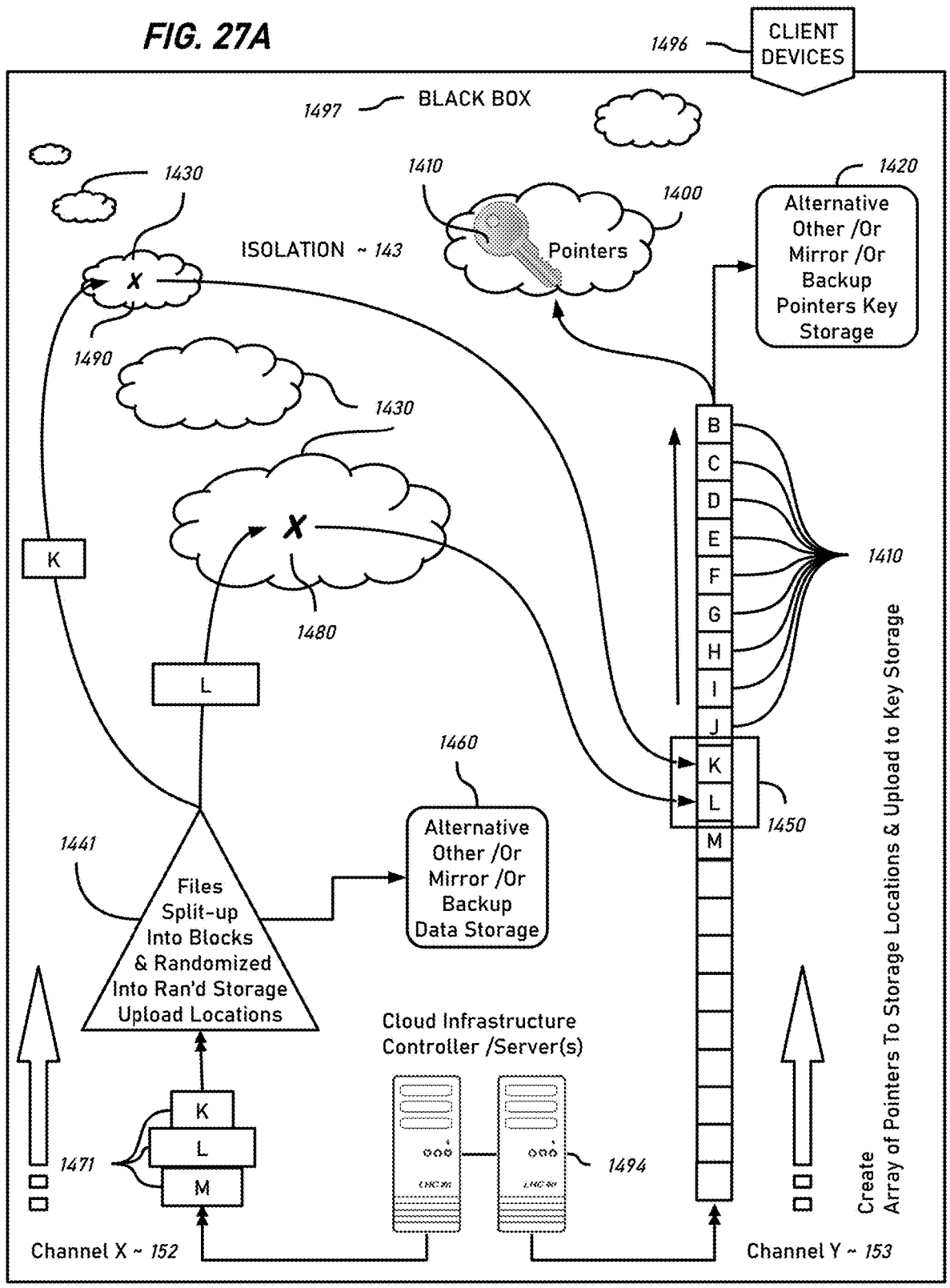
FIG. 27A is a mixed schematic and block flow system diagram of secure cloud storage and data uploads in accord with various aspects of the subject technologies.

File randomization begins with the system 101 of FIG. 8, and system 102 FIG. 8A then is built out from there into randomized cloud data protection and security through into sub-system 1499 of FIG. 27, and the black-box system 1497 of FIG. 27A which deal with two similar but different uploads, then in sub-system 1599 of FIG. 28 and black-box system 1597 of FIG. 28A which deal with two similar but different downloads, and sub-system 1588 FIG. 29 which deals with time randomized pointers based keys—being used to call for downloads of data blocks or stripes as data streams from random storage locations.

It should be appreciated that the subject technologies do not have to include all those extra layers and forms of randomization. But that they may be used with them and include them, according to user needs and preferences.

Figure 4D:
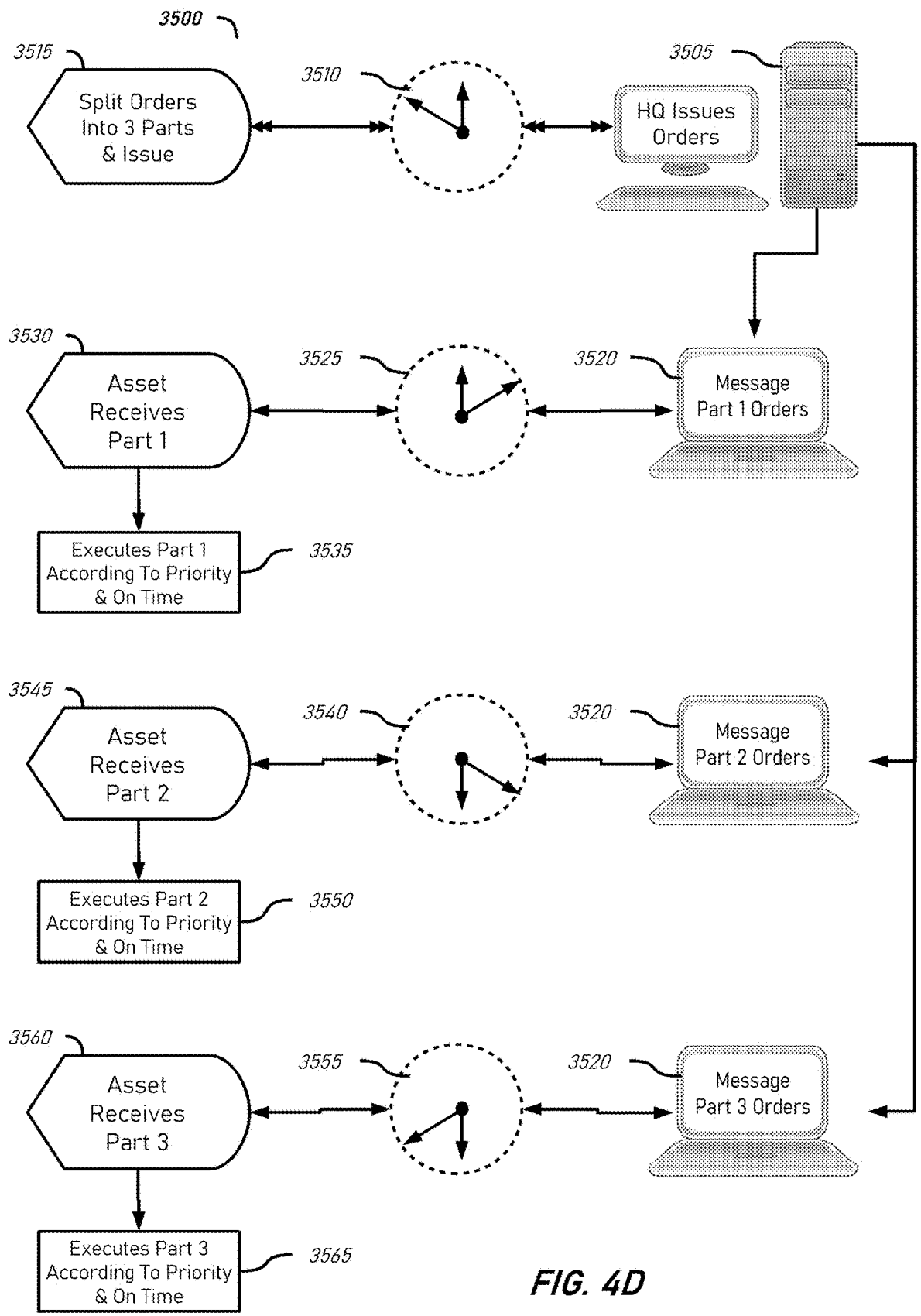
FIG. 4D is a mixed schematic and block flow system diagram of the processing of a message containing time sensitive orders according to aspects of the subject technologies.
Figure 4E:
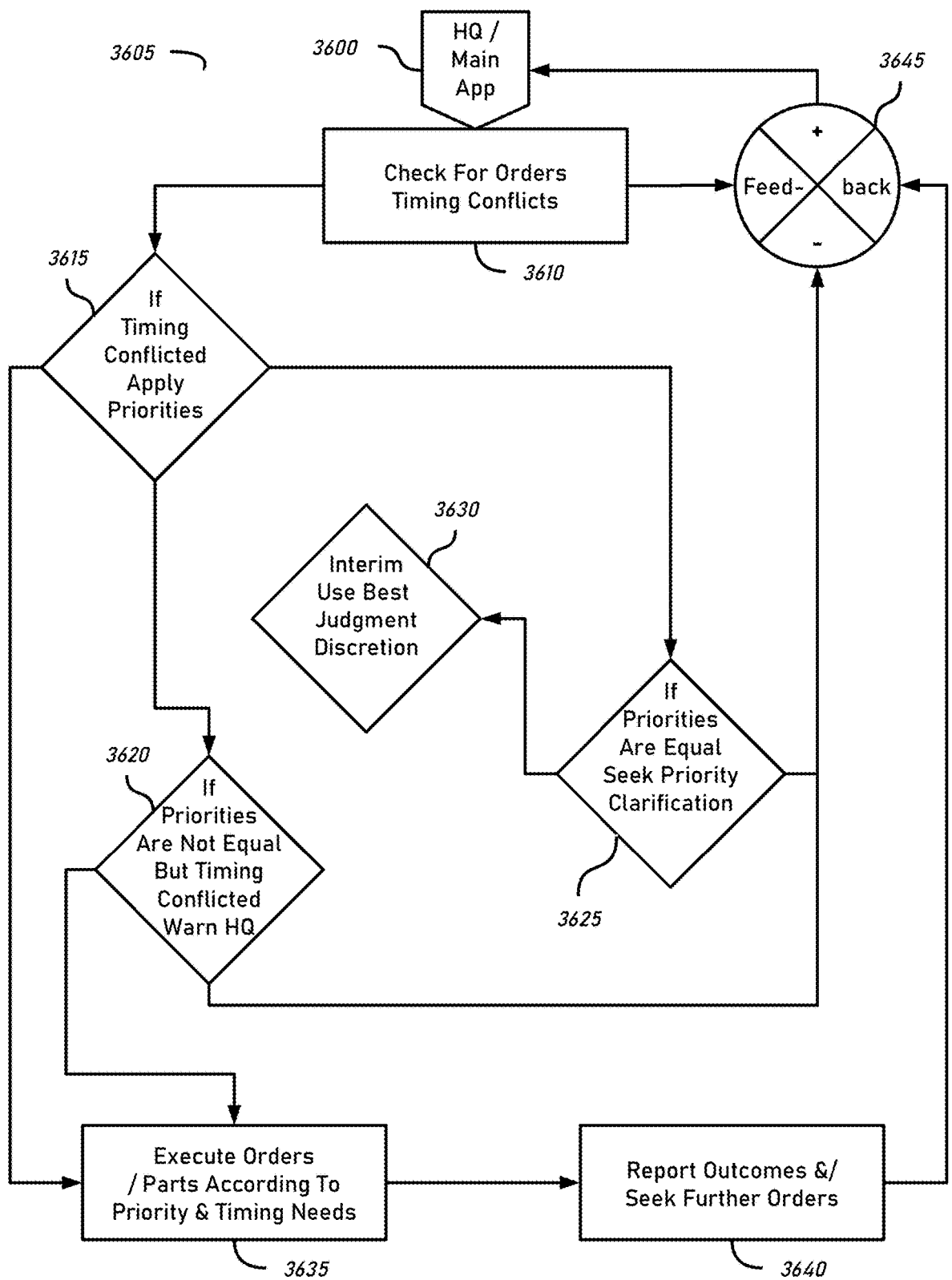
FIG. 4E is a block flow system diagram of a decision-making tree or program according to an aspect of the subject technologies.

FIG. 4D shows sub-system 3500, that deals with the user experience or receipt of a message that has as in previous examples been broken into three parts. Then sent from workstation 3505, where it is split using a user interface 3515 with a send time 3510 and three separate message part deliveries to asset receiver system 3520 at three separate delivery times 3525, 3540, and 3555.

At delivery time 3525 the asset receives Part 1 via a visual display 3530 as part of his or her user interface. The asset then executes that part that of his/or her orders according to priority and on time 3535.

At delivery time 3540 the asset receives Part 2 via a visual display 3545 as part of his or her user interface. The asset then executes that part of his/or her orders according to priority and on time 3550.

At delivery time 3555 the asset receives Part 3 via a visual display 3560 as part of his or her user interface. The asset then executes that part of his/or her orders according to priority and on time 3565.

FIG. 4E is a decision-making model 3605 expressed as a block and flow diagram. It pertains to a scenario where there is a timing collision or conflict between orders received. This can be a very difficult situation for a subordinate and can arise whenever the subordinate may receive orders or instructions from more than one superior. As may occur in the fog of war.

The subordinate which may be an artificial intelligence or human asset, needs a logical way to reconcile such situations. The correct application of which will place him, or her, or it, above criticism from either superior. This situation occurs in complex real time situations and the fog of war may be one such opportunity for this problem to emerge. Especially if communications become impaired and command structures begin to fray. Such as for example where an ICBM has destroyed the asset's primary command, and that asset urgently needs to know what to do next. Orders might come to the asset from multiple alternatives as the command system tries to reestablish order. To continue operations as effectively as possible. This model is not intended to replace the discretion afforded to special operations teams. Who are often the best placed and best qualified to make their own decisions in theater. Which is a special case.

There is an off-page connector 3600 to the headquarters' system which may be the main application of which this decision-making tree logic or program 3605 is a part. First the local sub-system 3605 and/or the asset checks the orders for timing conflicts 361 and provides feedback 3645 to the headquarters or main application 3600. If there is a timing conflict, priorities are applied 3615. If the priorities of timing conflicted orders are equal, then feedback 3645 by way of a request for clarification 3625 may be sent back to headquarters 3600. In the interim the asset may use his/or her discretion and make their best judgment 3630.

If the priorities of time conflicted orders are not equal, then headquarters 3600 should be warned 3620 about the conflict by way of feedback 3645. Ordinarily, the orders or parts of orders with the highest priority will take precedence and be executed 3635.

Where there is no conflict at process step 3615, then orders or parts of orders are automatically executed according to priority and timing needs 3635.

Upon execution of orders 3635 by either possible route the next process step may be to report outcomes and/or seek further orders 3640 by way of feedback 3645 to headquarters and/or the main application.

Figure 5:
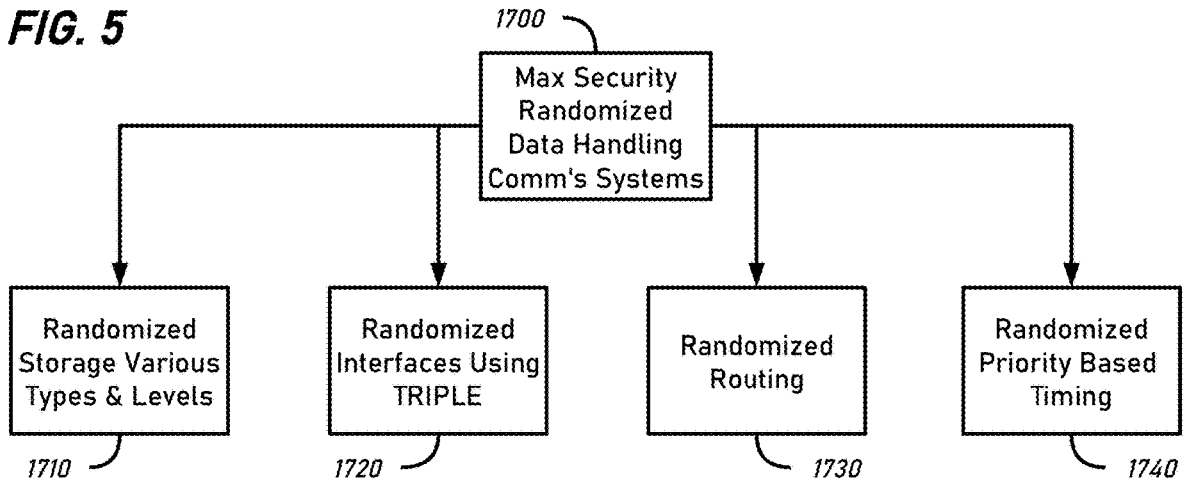
FIG. 5 is a hierarchical block diagram of aspects of the subject technologies.

FIG. 5 is a block diagram showing the main blocks that may form the core of a maximum-security randomized data handling and communications system 1700. Utilizing randomized storage of various possible types and levels of storage 1710; randomized interfaces using TRIPLE; randomized routing 1730; and randomized priority-based timing 1740.

Figure 6:
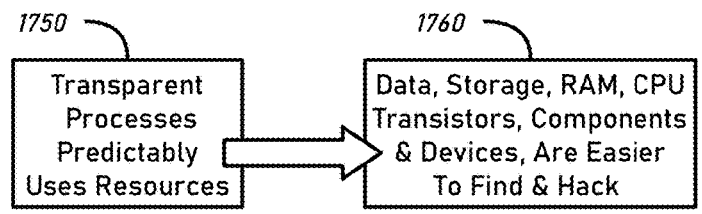
FIG. 6 is a block diagram relating to the prior art.

FIG. 6 is prior-art. Showing transparent processes predictably use resources 1750; and this is so, and less secure because data, storage, RAM, CPU, Transistors, Components and Devices; are easier or more predictable to find and therefore easier to hack 1760. This may not be a great surprise to those skilled in the art, but it should concern us all due to the massive proliferation of networked smart devices joining the Internet of things. Where criminals and intelligence agencies worldwide may be looking to exploit new data theft and surveillance opportunities for breaching the security of this rising population of Internet connected devices. The majority of which is likely to be operating somewhat autonomously for an increasing amount of the time. AI's will be taking decisions, that impact networks, and that travel over networks. So that the Internet of the future is going to need increasingly smart security to defend all the bots, as well as human users. The Internet is probably destined to become, and arguably already is an ecosystem in which artificial intelligence increasingly exists.

Virus makers will probably begin to create something akin to AI bacteria and Viruses. The former of which may be considered alive by some definitions. Smart hackers already can guess the configurations of hardware and predict the challenges they face when hacking known systems. As their tools get smarter this problem may get worse. Which is why there is a need to increase the difficulty levels of predicting the challenges hackers face. Rather like the concept of stealthy aircraft, being impossible to target. So too stealthy data, even stealthy big data may be made into a much harder target to find and/or to attack.

Figure 7:
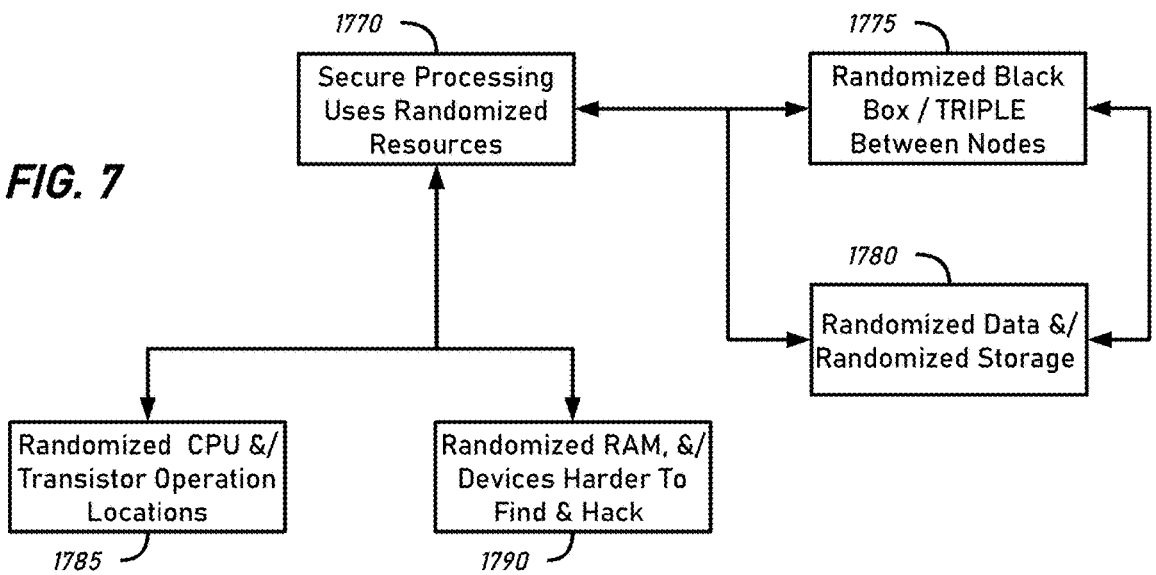
FIG. 7 is block flow system diagram of aspects of the subject technologies.

FIG. 7 is a block diagram showing aspects of secure processing using randomized resources 1770. Where data may be passed around using a black box such as TRIPLE between nodes 1775 in a system. May provide increased security for the data passing through via TRIPLE.

Furthermore, the use of randomized data, and/or randomized storage of data 1780 can add further security. Where signals intelligence and high-end data is being protected randomization of the use of RAM and devices and/or their communication ports can make them harder to find and hack or spy on 1790; this can be taken further with multi-core processors; or group processors as will be seen in the context of creating neurons from RAM and GPU in system 1899 of FIG. 32.

Signals Intelligence eavesdropping technologies and methods can be used to capture data leakage from electronically noisy systems. This noise has been studied and a whole signals-intelligence analytical technology has been created to enable it to be reverse engineered back into the data that created it. Thereby allowing sophisticated signals-intelligence (Sig-Int) eavesdroppers to duplicate the data being processed by an IT system such as a printer or computer, or network adapter card. Signals Intelligence is also a problem for US defense and intelligence agencies.

Even with this Signals Intelligence and analytical spy tech including TEMPEST it may now be possible using these subject technologies to create some parts of computers that are capable to be operated and to use resources sufficiently randomly that they cannot easily be spied upon using signals intelligence and analysis of data leakage.

Randomized processing, and randomized data handling when combined, may be used to provide more secure processing, and communications capabilities in the modern battlespace. This includes for example the randomization of processing and memory use, and of data flows within defense systems such as missiles, and missile defense systems, aircraft, tanks, spacecraft, ships, and submarines etc.

These same randomized IT systems and network capabilities might also be useful for high value knowledge driven businesses. Such as research and development-based operations, and within data networks and storage for organizations such as defense contractors; and for high value targets like stock markets, banking, and financial sectors. To help mitigate the many risks posed by nation state on state espionage, and industrial espionage as well as non-state industrial espionage.

FIG. 8 shows that the system 101 though primarily comprised of local resources, may also include further resources and systems by operating with a co-operating and enabling server-side network, wide area network and/or the data centers that provide what is known as "the Cloud" 104. So those parts of system 101 may be virtual. FIG. 8A shows a similar system 102, but which may differ considerably in the details of its operation. This is because, the local device operates via a website and/or Application (App) 106 that may cooperate with a server-side system in a network or cloud which may operate the subject technologies, to process data like a black-box. This reflects the main paradigms for the various ways the subject technologies may be configured and operated FIG. 9, goes into more detail on the relative security of the various possibilities.

FIG. 8 has a local device which may be a PC/or Apple Mac 111 (or a phone or other device such as a tablet). Having a central processor unit or controller 100; this runs the local randomizing and/or reassembling application (program) 105. This presents options 110, and the user may select files and options 115, via the user interface on their device 111. These selections are fed back 120 to the local randomizing and/or reassembling application. So that the application can work with selected files 115 in the alternate locations of fixed local storage 125; or removable local storage 130. These could allow a user to encrypt and store their data locally according to these subject technologies.

The local device central processor unit controller 100, also may have the capability to operate across a connected local area network (LAN), wide area network (WAN) or Cloud 135. So that it may also act upon selected files 115, in further alternative remote storage locations 142, and the arrays of pointers keys may be either kept locally or in the alternative cloud key storage locations 144. So, the data and the keys may be isolated from each other by one or other of the possible combinations by ensuring they are not located in the same storage device or drive or cloud storage location. The communications channel(s) 103 between a local device and the cloud 104 may use multiple separate channels, such as home Wi-Fi for data and a cell-phone data network for the arrays of pointers keys. Or they could use separate "threads" and/or different "ports" of the local device. On up to the cloud 135, where they may also be isolated from each other 143, with data being stored and accessed in random storage locations 142, via isolated network channel X, 152, and arrays of pointers-based keys stored in a separate and isolated key store 144 (which may be in a separate cloud infrastructure, and/or even owned and operated by a cloud separate key store service vendor. That may be accessed via an isolated and separate channel Y, 153.

The alternative remote storage locations 142 may be among many servers and connected to the controlling server by a communications channel X 152, being under the management of a remote randomizing and/or reassembling helper application 155, running on a remote server 151 or multi-server management system having a central processor unit controller(s) 150. So that either locally or at the server level files may be broken apart into smaller data blocks, and those may be randomly allocated into the various data storage locations 142, which are isolated 143 and distinct from the pointers arrays or key storage locations 144, and which isolation may include a separate communications channel Y 153. This is so that if hackers gain access to the cloud data storage locations 142, the keys needed to find, download, and resemble the necessary data blocks to recreate the original files are not co-located with the data blocks. Leaving hackers unable to reassemble any useful data from the storage locations 142. The pointers array-based keys may be kept by a separate entity in highly secured Cloud based key storage locations 144, and accessed via a separate and isolated channel Y, 153. This use of separate isolated communications channels X 152 and Y 153, and separation and isolation of the data storage locations 142 from the arrays of pointers or keys 144, needed to find and reassemble the data blocks back into usable files is addressed in more detail in FIGS. 27 through 29 below.

The file server 151 may have multiple networking cards and/or connections ports such as the RJ45 standard, and any future or other variants which connect the sever CPU 151 to the storage locations for data 142 and pointers array keys 144. In very simple small-scale implementations, the data storage may be integral to the server provided it can be isolated from the key storage locations. In most large-scale applications as may be operated by larger cloud storage and processing providers, it is more likely that the data storage will be accessed via an RJ45 connection type routed networking architecture within the cloud infrastructure.

The server 151 may have two such RJ45 connections or similar connections to provide two isolated channels capable to support two unbridged (unconnected) and hence isolated 143 communication channels X 152 which is connected to the random data storage location infrastructure 142, and which channel is isolated 143 from a second channel Y 153 that is coupled to the pointers array key storage locations infrastructure; which may be within an entirely separate specialist key storage cloud infrastructure and may be owned and operated separately and independently from the random data storage locations 142 cloud infrastructure.

This separation and isolation of randomized data 142 and data communications channels X, from pointers array key storage locations 144 and the isolation of these networks from each other using data channel Y 153, is to ensure that hackers who may breach the data storage infrastructure, should not be able to find or access the keys needed to reassemble the files, or user account data stored there.

Using cloud-based storage for randomized data, and pointers array keys should not be appreciably slower than existing cloud data storage and processing systems, nor require more processing power or bandwidth. Indeed, it may even be less demanding and hence faster in use than some math-heavy forms of file encryption. In relation to which server-side operations may be performed by experts and may be subject to the presentation of options to the server administrator 160. Noting that the server administrator 165 may be human or an artificial intelligence. The server administrator may thus provide feedback 170 to the remote randomizing and/or reassembling or helper application. This interacts with the remote storage locations to serve the needs of the user system. Which communicates back and forth to support the local operations being performed on the user's files. So that a user with good connectivity may have a seamless experience that varies very little as between the storage locations used regardless of whether they are local, or cloud based.

This model of operation spans simple local hard drive operations all the way up to running multiple threads to multiple cloud-based data storage locations 142, and specialist cloud based key storage 144, that is isolated from the data, and accessed server-side via different communications channel. All of which possibilities are covered within this one flexible system. The system is capable to be so flexible due to the growing levels of inter-connectivity and compatibility that is increasingly becoming ever more available to users across devices and networks. More detail including the steps not shown in system 101 and its server side parts and operations 104 is shown in subsequent figures. In particular in FIGS. 27 and 28.

However, many users of modern smart devices seem not to care sufficiently about securing their devices and files to bother with encrypting them locally. So that perhaps this system may be preferred by people with secrets to keep such as defense contractors, and users in military or intelligence applications. Where the device itself might be at risk of falling into the hands of an adversary or being compromised by hackers.

Whereas an alternative approach may provide similarly improved data security that is handled mostly or entirely within the cloud. Behind a black-box interface that users do not need to know even exists or care about. So that a similar consumer user system may leverage the benefits of these technologies. This may be made indistinguishable from existing systems from the outside of their account interface, with AWS, or Google Drive, or Drop Box, or Microsoft One Drive etc. This server-side processing option, and perhaps a user invisible variant of this might offer an easier way to roll-out the benefits of these technologies to global user markets. That would best fit the current trend towards keeping most user data and doing more processing in the cloud.

Local files such as email files are often compromised in local storage by hackers, via Trojan Horse attacks. So, there is merit in keeping all that sensitive user data exclusively in cloud storage, according to these subject technologies. In the hands of experts such as Google so users can relax and let experts keep their data safe using these subject technologies. This lazy user paradigm, off-loading this to task experts, and expert systems including AI that may operate these subject technologies in the Cloud appears to be the option most likely to be preferred by most users! Ergo also the most commercially viable and valuable way to implement these subject technologies for Internet users globally. Which may help reduce data theft worldwide!

Many users of services who may adopt these technologies such as banks, social media, and medical care providers may use them to prevent mass data theft events. Without their users even being aware of the technology upgrade in data security. Which is why the next figure is addressed more particularly to server-side applications, and/or the lazy user who does not want to operate his or her own data security system locally. But who prefers to entrust that role to the experts who run and maintain the Cloud.

FIG. 8A provides such an improved cloud based invisible or lazy user implementation of these subject technologies in system 102. That is tailored to mass market users, including unknowing users at the local device level. Which may use a website or web-application 106 via communications and data channels 103 to access and use a version of these subject technologies that may be running in the cloud or another remote other network such as an intranet, and which may operate like a black-box 104.

Although system 102 may look similar to system 101 in these diagrams, system 102 is the implementation most likely to suit American consumer users of mobile phones, tablets, and computers. It may even use these technologies, running inside a cloud/server-side black box without the knowledge of end users. For applications such as online banking and cloud drives for example. With system 101 being better suited to the niche markets of military and intelligence services and defense contractors who may want or need more control locally and may prefer systems more like system 101.

The details of the operation of system 102, may begin with a device such as a personal computer or smart phone or pad or other computing device 113, upon there may be a running remote web page and/or a web-application (App) 106. This may be working with a cloud drive, or healthcare website or an online banking website etc., through which users are presented options 112, and may select files and options upon which to work on their data or services via a user interface 116.

Those options and selections may be obtained by the App 106, by way of feedback 121. That App may then operate to control the device controller CPU 107 according to the programming of the web-browser or application 106. Which may cause the controller CPU 107 to operate the communication and data channel(s) 103 to operate upon files, that may be stored locally in the alternates of fixed hard disc drive, or solid-state drive 125, or removable media such as SD card, or USB drive, or other media 130.

Such files as may be sent to the sever side network or cloud 104 may be received over a network and into a cloud infrastructure or management system 135, that may operate as a server-side black box. So that processing may not burden the local system and may take place inside the cloud infrastructure 108. Files already in the cloud infrastructure 104 may be accessed and worked upon, and services accessed and used also via the website and/or application 106 similarly.

Data may pass back and forth between the local device 113 and the cloud infrastructure 104. The precise details of uploads, downloads and services or computations that may be provided may vary as between various possible user applications. Users may access many websites and services via websites or applications 106 that may be operated by different providers of a wide range of possible services as may be provided over a network such as a cloud infrastructure, intranet, or the Internet 104—which possibilities are too numerous to list or address in detail.

Though not shown here the secure deletion 1099 of locally held files (addressed in relation to FIG. 21 and related materials below) may be an option provided by the web page or App 106. So that only the secure version of those files will exist thereafter within the cloud infrastructure 104 if so desired, for maximum file security. Users may alternatively also wish to keep an offline backup of files in removable media 130, or perhaps in protected local storage 125.

However, system 102 is mainly concerned with server side 104 secure cloud storage, processing, and services. The files to be stored may be received via communications channel(s) 103. Which may differ, they could be different "threads", or one may be via a mobile phone and the other a home Wi-Fi system. These communications channel(s) may connect to a network 135 on the server side in a cloud infrastructure 104, and under the management of a server 151, wherein a suitably programmed computer processing unit controls 150 a randomizing program and/or reassembling program 156, capable to break files apart into blocks of data, that may be similarly or randomly sized, and may be stored into random storage locations 142; which random storage locations of the data block may be recorded into an array of pointers to provide a key within separate key storage locations 144 and that may be isolated from the data storage locations 142. These keys may later be used by the reassembling program 156 to retrieve the data blocks and then to reassemble them back into copies of the original files.

A server administration user interface may be used to set parameters for available options as may be presented to their expert administrator users 160, in accord with human or AI user input to set options 165, which input is provided as feedback 170 to the suitably programmed controlling computer processor unit 150 of file server 151.

The file server 151 may have multiple networking cards and/or connections ports such as the RJ45 standard, and any future or other variants which connect the sever CPU 151 to the storage locations for data 142 and pointers array keys 144. In very simple small-scale implementations, the data storage may be integral to the server provided it can be isolated from the key storage locations. In most large-scale applications as may be operated by larger cloud storage and processing providers, it is more likely that the data storage will be accessed via an RJ45 connector type routed networking architecture within the cloud infrastructure.

The server 151 may have two such RJ45 connections or similar connections to provide two isolated channels capable to support two unbridged (unconnected) and hence isolated 143 communication channels X 152 which is connected to the random data storage location infrastructure 142, and which channel is isolated 143 from a second channel Y 153 that is coupled to the pointers array key storage locations infrastructure. Which may be housed within an entirely separate specialist key storage cloud infrastructure and may be owned and operated separately and independently from the random data storage locations 142.

For example, users may have a key storage account with a specialist service provider infrastructure, but their data storage may be provided by bulk data storage service providers such as AWS, Google Drive, Drop Box or Microsoft One Drive. Persons skilled in the art will appreciate there is no reason why a cloud-based data storage provider may not also operate their own isolated cloud based key store, and that their key store might be compatible and capable of use with data storage provided by a competing service. Indeed, such arrangements may help to diversify the possible key storage locations such that hackers are unable to guess or predict where the key for any data-block may be stored.

This separation and isolation of randomized data 142 and data communications channels X, from pointers array key storage locations 144 and the isolation of these networks from each other using data channel Y 153, is to ensure that hackers who may breach the data storage infrastructure, should not be able to find or access the keys needed to reassemble the files, or user account data stored there. More complex configurations of these subject technologies are possible. These are too numerous to list but included variants of these subject technologies.

More detail including the steps not shown in system 102 and its server-side parts and operations is shown in subsequent figures. Including in particular FIGS. 27A, and 27B.

Looking to the future, it is envisaged that this system may also run-on Internet of Things (IoT) devices, under the control of logical binary programs and/or AI and/or ML systems. Consequently, in later figures and in this descriptive section both AI systems, including the Inventor's own subject technology Polymorphic Artificial Intelligence (PAI) as well as meaningful data structures are included within these subject technologies.

This is further illustrated by the concept also described below for a data processing architecture that is based on eleven parallel dimensions; that may be suited for use in computing systems based on the sub-dimensions proposed within String Theory. It is envisaged that there may arise systems and architectures within them that may be customized to resemble an aspect of the physical universe. That may add meaningful structure to data.

Figure 9:
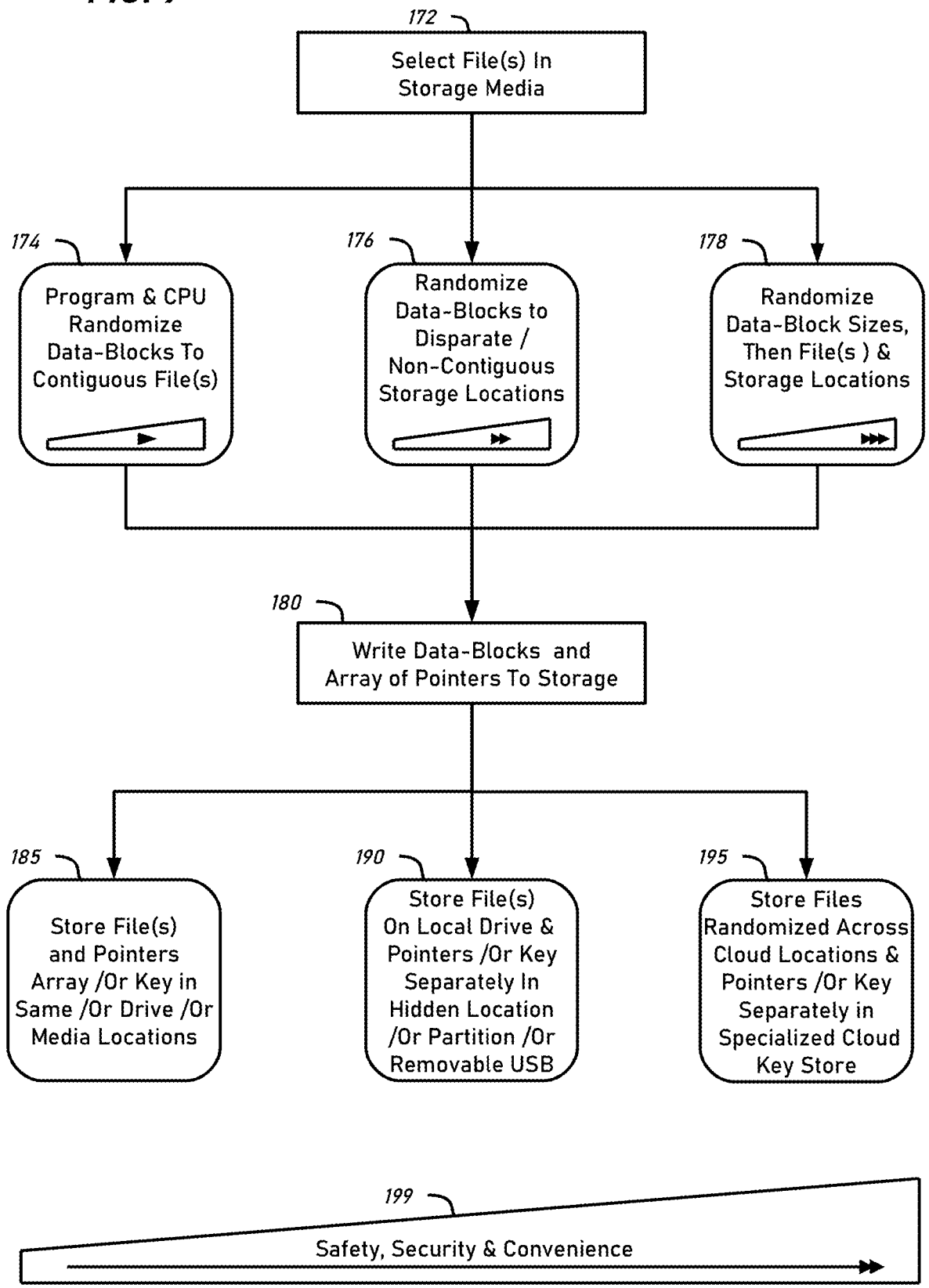
FIG. 9 is a block flow systems diagram of the security of alternate processes as may be applied to a file according to various alternate aspects of the subject technologies.

FIG. 9 goes into more detail than FIG. 8 and FIG. 8A. The three figures are intended to be fully compatible. FIG. 8, and FIG. 8A being system block and flow diagrams, and FIG. 9 is zoomed-in detail of possible implementations of the subject technologies, and their relative merits in securing data. The options to the left being relatively less secure than the options to the right of the figure, as indicated by the left to right security level slider gradient 199.

First the files for the program and CPU to operate on are selected 172, then either the alternate process to randomize data blocks into storage as contiguous files 174 or randomize data blocks to disparate non-contiguous storage locations 176, or randomize data block sizes, then randomize files, and storage locations 178.

Whichever alternate randomization options are chosen, the next operation the system performs is to write data blocks and an array of pointers to their locations in storage 180 is executed. This can be according to the alternatives to store both files and pointers array or key in the same drive or media location 185. This is the least secure option due to the risk of hackers being able to access both the key and its associated data. Then use the former to reconstruct the latter just by hacking the local drive or storage media.

A more secure alternative is to store only the file(s) on a local drive and store the pointers key separately either in a hidden location, which can be a hidden partition, or even a removable storage device such as USB or DVD etc. 190. Probably the most secure, and convenient alternative is to store files randomized across multiple cloud locations and store the pointers key separately into specialized cloud key store 195. This may be differently and independently operated than the cloud storage. For example, with the cloud storage provided by AWS and the key storage provided by Verisign or Microsoft. This can be both secure and seamless because multiple data threads can be run over modern networks without any perceptible loss in performance from the user perspective.

Looking at this diagram from left to right, the further to the right of the figure the more safe, secure, and seamless and convenient the user experience may be 199. The options are also compatible with streaming data for communications and media. These aspects of the subject technologies are dealt with in more detail below.

Figure 10:
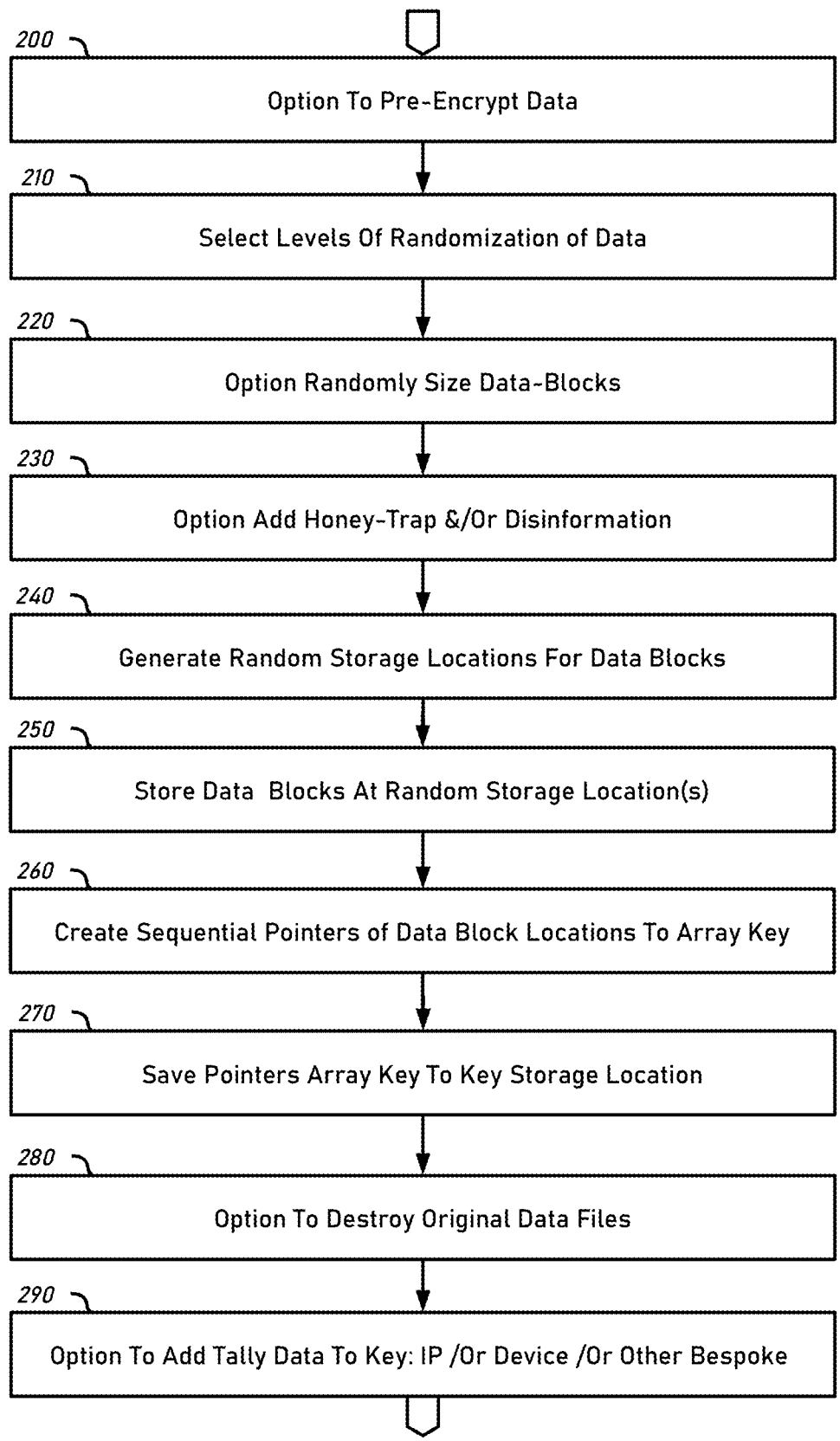
FIG. 10 is block and flow diagram of a file being processed according to an aspect of the subject technologies.

FIG. 10 shows in more detail the options to be offered by a system running a program according to the subject technologies on its central processor or group processor units, and the operations the system performs on the data. The system may pre-encrypt data 200. Before applying the randomization. After which the levels of randomization of data may be selected 210; randomness may be increased by breaking files apart into randomly sized data blocks 220.

Honey trap and/or disinformation may be added 230. Then the system may generate random storage locations for the data blocks 240; and proceed to store the data at random storage locations 250; while creating the sequential pointers recording data block locations to an array to provide a reassembly key 260. Then save the pointers array key to a key storage location. Once this is done the original data files may be destroyed 280. It makes sense to destroy the original files, and in some implementations this option may be a preset feature. So that users cannot injure their own security by leaving unprotected copies of files on the host machine.

The final process step may be to add "Tally" data 290 or other bespoke data to the key may be performed at other times in the processing and need not necessarily be done last. But there may be reasons to do this last because it does not necessarily need to be randomized or encrypted.

Tally data can include things such as the IP address of a device, or historic transaction data and details of previous logins etc. Tally data may provide a useful security check due to the inherent randomness in the minutia of our relatively chaotic lives. These details of minutia events occur in a specific and unique order. But once logged these historic events can be as unique as fingerprints, and details of which users may be able to recall. As will be shown later, an example is provided where Tally data is added to a bank card. Furthermore, it should be noted that Tally data from a mobile phone or other device is also envisaged.

A lot of the details of hardware that follow are capable of inclusion within a wide and growing variety of devices. The subject technologies are not tied to any particular hardware configuration.

Figure 11:
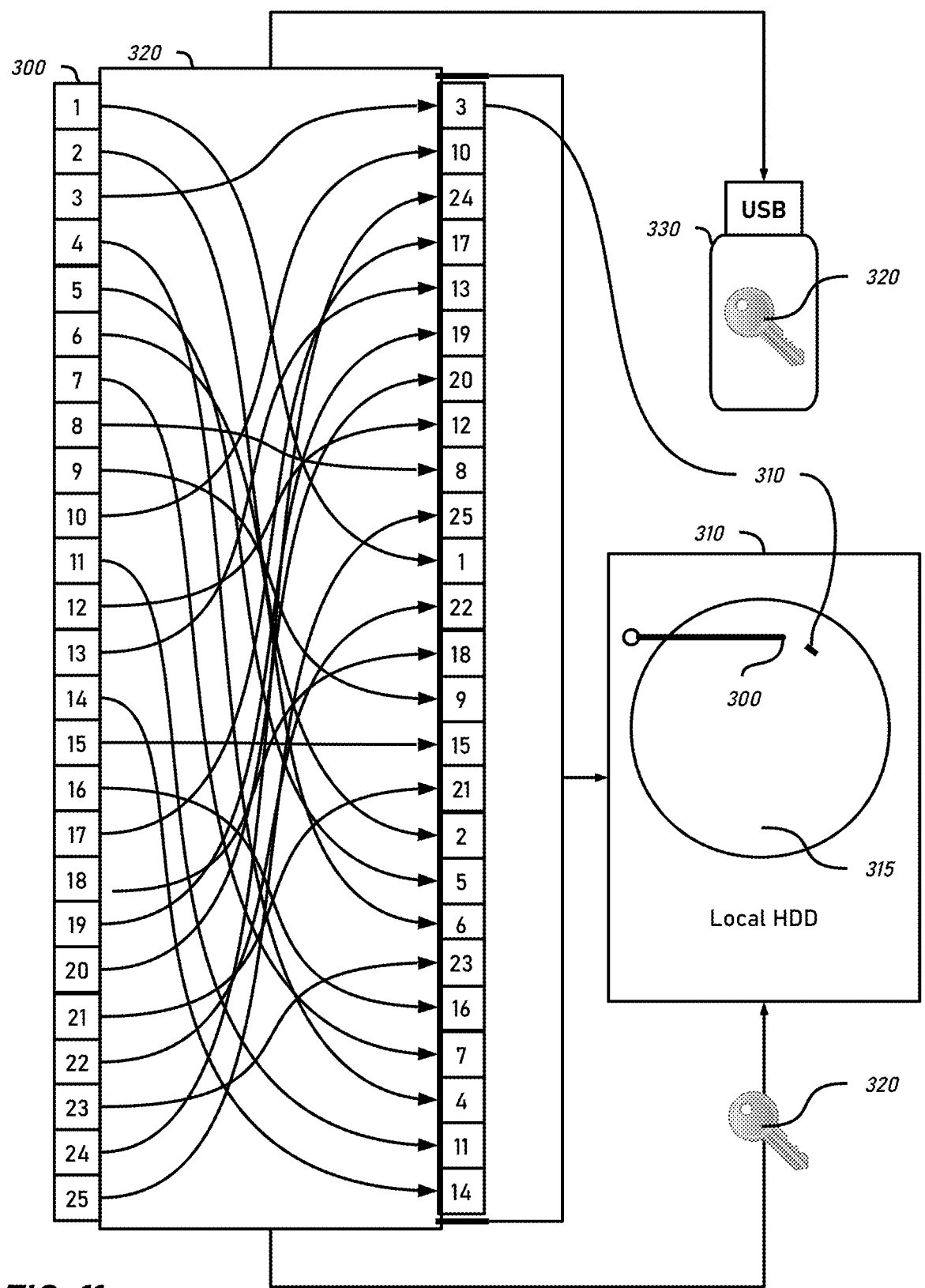
FIG. 11 is a schematic drawing of a file being processed according to an aspect of the subject technologies.

FIG. 11 shows a file 300 comprised of data blocks 1 through 25 which has been stored according to the pointers key 320 into a randomized form 310 that has been written by the read/write head 300 to a local hard disc drive 315. But where, the pointers array key 320 may be stored to the local hard disc, or into a removable USB drive 330.

The latter is more secure because the USB drive may be removed from the system and used like a physical dongle. So that the computer can go online and even if hacked its data will be incapable of recovery, so long as the USB key is not connected. This makes the security of large amounts of data on a machine lockable, and in a physical way that is very easy for users to see and to check and apply.

Furthermore, duplicate USB keys may be kept as a backup key precaution in case of media failure or corruption. This is a very good, very secure, and relatively basic implementation of a simple form of this aspect of these subject technologies. A compatible memory card or drive may be similarly used with a mobile phone, and a mobile phone operating over Wi-Fi or Bluetooth may be used with a PC or Mac and vice versa. Other diverse implementations are also possible.

A valuable point to note about the pointers key, which is depicted here as arrows. These are like wormholes from any one part of an information technology system to another part of that system. They are a mechanism for pointing to an addressable location within an information technology system. In these subject technologies they may point to physical locations or addresses, like a postal address. Pointers may be used to point to virtualized locations, and/or relative locations or to mask locations rather like using a Post Office Box to provide an anonymous "black-box" addressing system.

These subject technologies use this simple systems architecture to achieve many things. Humans prefer to see ordered systems that they can relate to their experience of the physical world. This has led to a tendency to try to configure computer data processing architecture according to human sensibilities. Whereas, in these subject technologies' though it is not a goal per se, computers are allowed to work in ways that may look messy to human eyes. As does the tangle of pointers in this figure.

However, computers and even AI have no similar concept of tidiness, and they have no issue addressing memory locations in any particular order, or format such as tables or representations of them. Consequently, these subject technologies may ignore some human based sensibilities and let computers work differently than humans may prefer.

Figure 12:
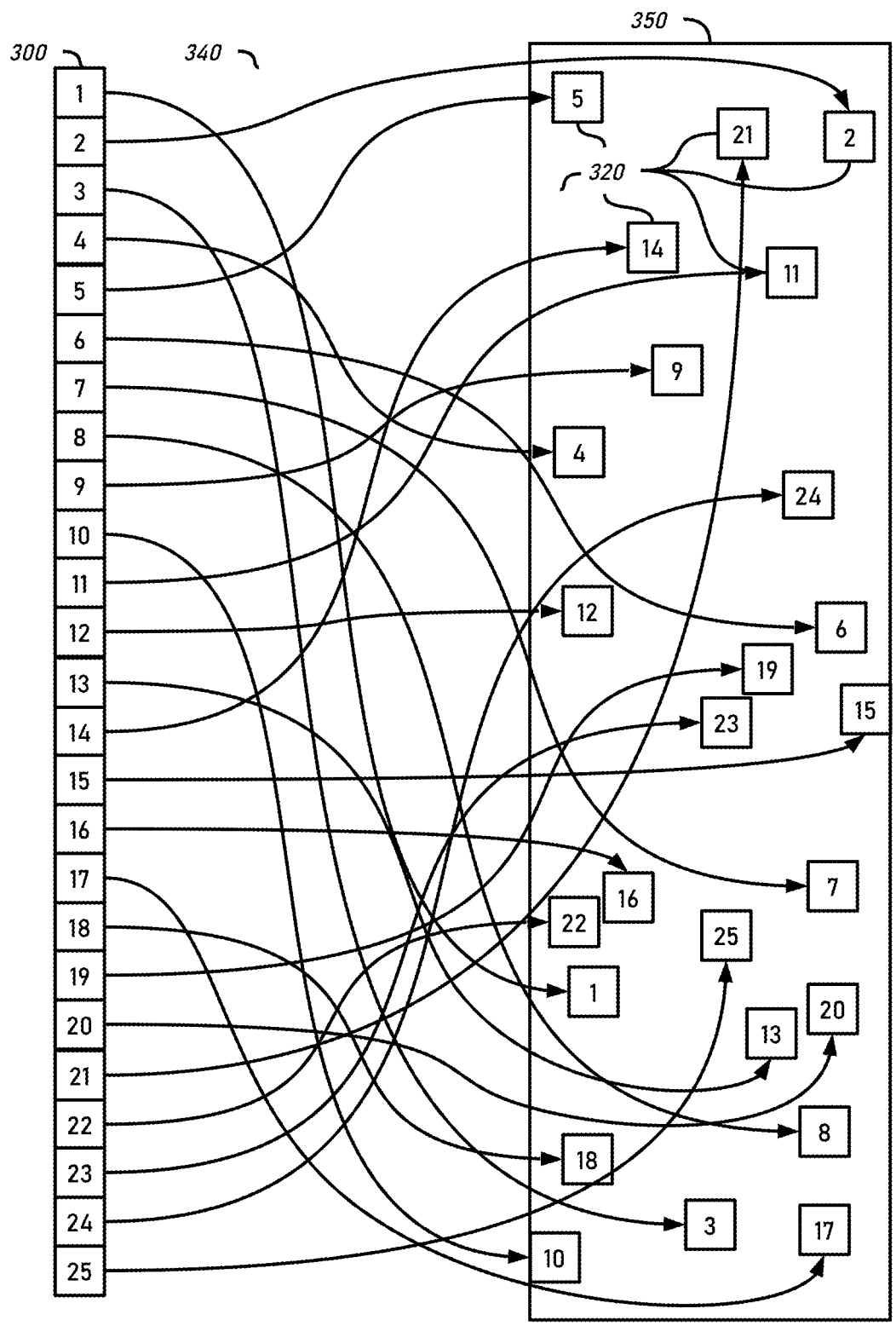
FIG. 12 is a schematic drawing of a file being processed according to an aspect of the subject technologies.

FIG. 12 shows a file 300 comprised of data blocks 1 through 25 which has been stored according to the pointers key 340, to randomized locations 312 within the available space in a storage device or drive 350. This could be on hardware configured as in the previous figure, or it could be different. That detail is not shown, because the main purpose of this figure is to show that using the pointers key, the same or similar file can be randomly dispersed to any available space. This differs from the previous figure also because in the previous figure the data blocks were randomly shuffled out of sequence but written as a contiguous file. Whereas in this example, the storage locations are randomized into storage locations that can have spaces in between them. This is not inherently more secure, when only one file is randomized into available space. But where multiple files are randomly broken into data blocks and then randomly stored into the same overall available space, then they each make the other more secure. This is because there may be no way to identify any data block as belonging to any file.

So that this randomization into data blocks that are randomly distributed to locations within a common storage space may provide more security for all those files. The storage device may be a hard disk drive partition, or USB drive, or even a cloud storage location. This is not a closed list of storage technologies or devices. Other storage devices some of which may not exist at the time of filing this application may be used similarly.

Gaps between data block storage locations when filled with other randomized data blocks from other files increase the security of all the files. The more files stored this way in a partition or drive the more secure they all are. This effect conforms to the maxim that "there is strength in numbers" which really works and is true in these subject technologies. The more files and data that are randomized into a given storage space, the safer they all become. The smaller the needle of the data blocks of any one file becomes relative to the haystack of data blocks of all files.

Nevertheless, the pointers array key is no less efficient at retrieving files that are co-mingled randomly into a storage space such as a hard disc partition or USB. So that there is no fall in performance of data read access speeds even as the drive approaches being filled to capacity. Data write speeds may suffer modestly increased overheads when seeking an available random location. Especially, as the storage approaches being full to capacity. When data blocks may be allowed to overflow from one random location to another location in order to accommodate a data-block. When it is too large to fit into a single randomly allocated space. The heuristics of a random data block write, and an overflow program capable to fill a drive to capacity are explained further below in relation to FIG. 15 and FIG. 16.

Figure 13:
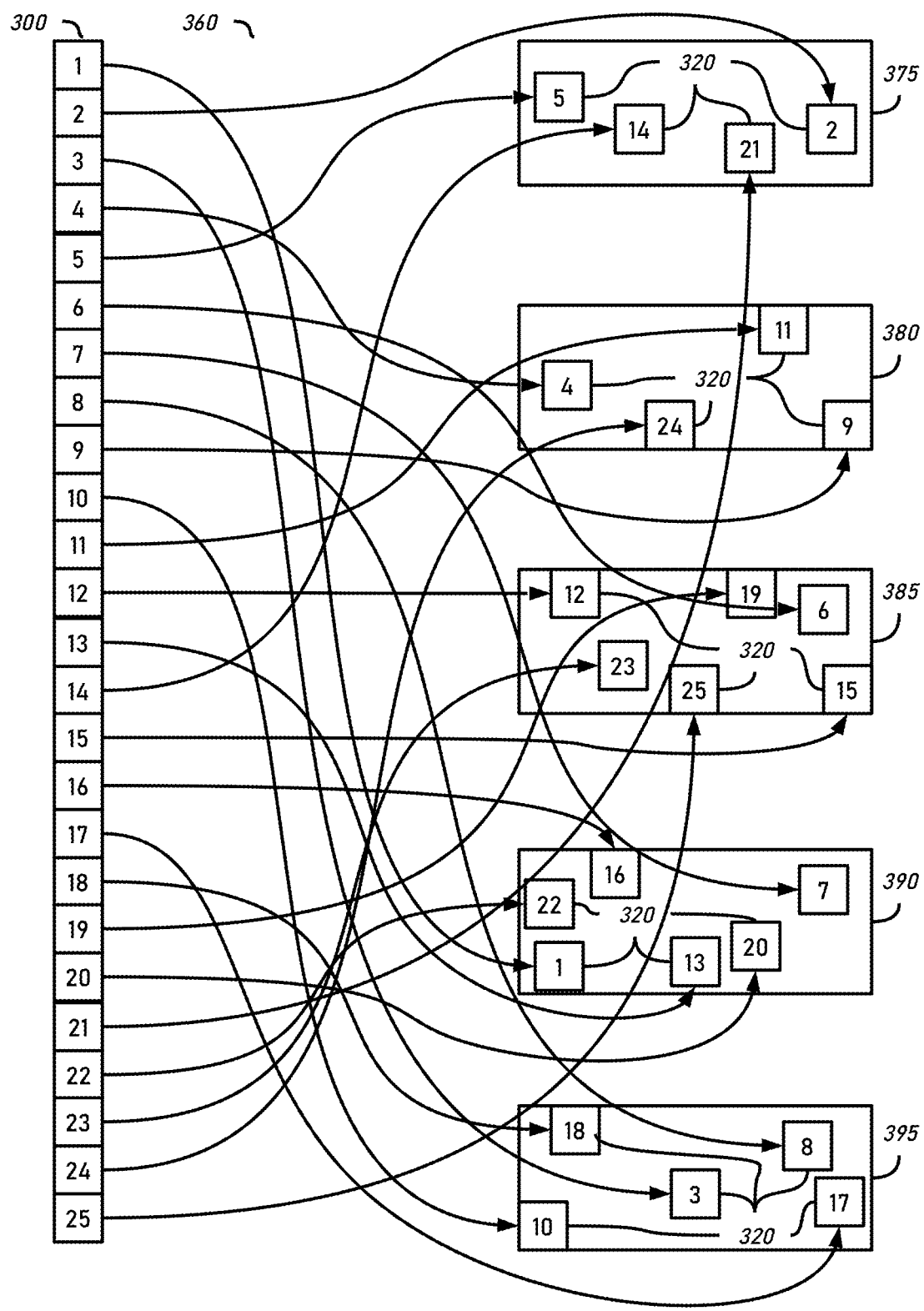
FIG. 13 is a schematic drawing of a file being processed according to an aspect of the subject technologies.

FIG. 13 shows an even more secure configuration for data storage. In this case the file data blocks 300 numbered 1 through 25, are randomly stored according to the pointers 350 into random locations 314 within five parallel storage locations 375, 380, 385, 390, and 395. These five parallel storage locations may be five partitions or devices attached to one system, or they could be the hard drives of five servers within a cloud data center, or they could be randomly located within five hard drives, of five servers, at five different geographic locations from within thousands of data centers spread randomly around the USA or spread randomly around the world.

Yet the pointers keys have no calculation overheads and the ability to retrieve and reassemble the data blocks depends mainly on network access speeds and the speeds of data access at the data centers rather than computing power. This may be the most secure example of randomized storage of the file so far illustrated.

The pointers key can also be kept at a specialist key holder organization to ensure that even the physical data holder cannot reconstruct the data held in their storage facilities into the file. At this level when deployed in the cloud probably DARPA, the Department of Defense and NSA (including the US Navy, USAF, USMC, US Army and US Space Force) as well as the CIA and FBI's experts may be able to see that this may be the most secure data protection system ever envisaged; and that if correctly implemented it could be impervious to attempts to steal and reconstruct files. Beyond any previously known system of encryption. But that is still not as secure as the system overall can be made, as will be further illustrated in subsequent figures and descriptions.

Figure 14:
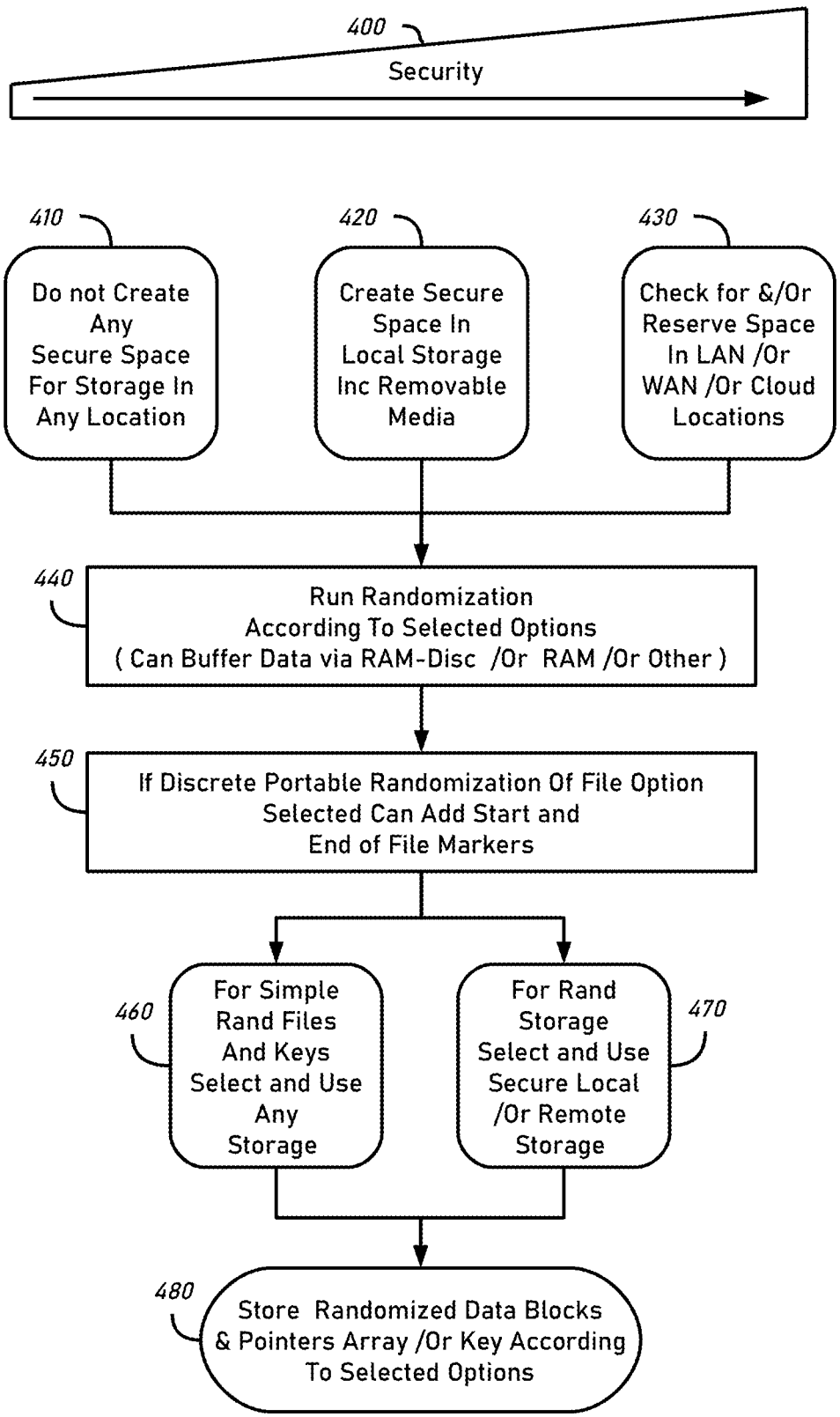
FIG. 14 is a block flow systems diagram of the security of alternate processes as may be applied to a file according to various alternate aspects of the subject technologies.

FIG. 14 deals with a situation where there may be compatibility issues between an implementation of the subject technologies and the operating system, and or the disk management system. Say for example it is perfectly possible to randomize a file into the available space on a hard drive of a computer that already has files stored on it according to the rules of its operating system. There is not going to be any problem writing a contiguous randomized file and reading it from such a system in any event. But issues could arise where for example the data-blocks from a file are randomized in and among the preexisting data. Again, there is no problem if each data block is capable of being moved around by the disk management system so long as the pointers key is updated accordingly.

However, there is a risk of data loss if a disk management system were to move data blocks without updating the pointers key. There are some fixes that can be applied, for example such disc optimization functions could be disabled. Another is to add a terminate and stay resident program capable to stay running in the background. Then for this resident program to update the pointers keys to include any movement of affected data when using a local drive, or to create an updated pointers key. So that previous data-block locations can be updated to point to the new locations at the next opportunity. The pointers key may be updated in real time or in two stages. This does not matter per se as long as no attempt to use the affected data-blocks is made until the pointers key has been updated. Another simpler solution is the scenario to which FIG. 7 relates. Where a secure space, partition or separate drive is reserved for randomized storage.

FIG. 14 looks at a less optimal commercial outcome, or a time between this application and full market penetration of the subject technologies; and explains how a version of the subject technologies may be safely used with an otherwise incompatible disc management system. Because it is the case that the subject technologies are capable to be implemented without such cooperation and standardization.

Furthermore, it may well be the case that organizations such as the US military may not be willing to wait for Microsoft and Linux developers and data center operators to catch-up. Defense systems that handle sensitive data do not have to wait for the bigger players in the tech sector to begin to benefit from these subject technologies. If they use their own bespoke operating systems for data handling and addressing; then they will probably be able to apply the subject technologies in a way that suits them best. If they need a short-term fix the details of FIG. 14 may help such potential early adopters to get these technologies into service sooner. On the systems they have, as they are now.

The alternatives are arranged from left to right with the most secure options being the ones on the right and the slider 400 visually signals this fact. Alternative process 410 is to not create any secure space or reserved space for randomized data suitable for storage in any locations at all. This can work but with caveats. Firstly, a file that has been broken into data blocks and then sequentially randomized can be written contiguously and be dealt with just like a regular file. No problem.

Secondly, data blocks can be created and randomly stored into non-contiguous disc space locations, that may be interspersed with other files and data blocks from other files. The issue being the need to update the pointers key to these files if a disc management system were to move any data blocks or files. The randomization software may stay running and watching in the background to create a pointer update file capable to update the pointers key at the next available opportunity. This is also no problem.

Alternative process 420 is to create a bespoke secure space in local storage, this may typically be an HDD or SSD, but which may also be a removable media such as a USB connected flash drive, or SSD, or even HDD. The good things about this are that partitions, and drives can be hidden, and or access to them prevented unless it is by compatible software. The downside of using a bespoke secure space within any storage system is that it may provide an identifiable location in which a hacker may know or be able to infer that there is likely to be sensitive information.

Security may be improved by keeping the pointers-key on a separate media which could be a USB drive, or a Blue Tooth accessible device, or local area network or wide area network, such as cloud key storage. A USB drive, or mobile phone with a Blue Tooth link may be used like a data access dongle in such configurations. These possibilities are set to continue to grow.

Alternative process 430 checks for and/or reserves then uses compatible storage space on local area networks, and/or wide area networks, and/or the Cloud in cooperation with a compatible version of the subject technologies and/or a compatible helper application. This may be the way that the technology is able to grow into the available space in the Cloud from where it may be able to displace other storage paradigms. Because there is likely to be little or no extra cost, for this improved security.

Process step 440 is that whichever higher-level option was selected to run the randomization application, according to selected options. The system can buffer data via a random-access memory disc, or via random access memory or other short-term transitory solutions. Furthermore, there is for discrete portable randomized files an option that may be selected to add start, and end of file markers 450. So that the first alternative is for simple randomized files and key to select and use any storage 460; or the second alternative for randomized storage to select and use secure local and/or remote storage 470. With the process terminating in the storage of data and keys according to selected options 480.

FIG. 15 is a module for use within the storage allocation and data writing operations; the logic is expressed in the form of a block and flow systems diagram. The diagram and its decision-making method, with read and write functions that are capable of implementation may be coded in a desired programming language. FIG. 16 is similar. Together these two modules provide the capability for the identification of random storage as being available, and for writing into it the randomly allocated data-blocks.

FIG. 15 addresses the situation thus: to check if a random storage location is available 500; then if available write the data-block to that storage location 530; or if it is not available or less than the minimum usable size, then generate another random storage location 510 and then loop the process back up to step 500 to check if the random storage location is available, and so on. Noting that a feedback loop to the process can provide information as to which locations are used and which are rejected, and store used locations in pointers key 520.

This looping data write process runs on to process the next data block into randomized storage 540 as many times as is needed, until all the file's data blocks have all been randomized into new random storage locations. Creating the pointers key by feedback 520 to the main application 590.

FIG. 16 is similar, but it also has greater ability to cope with data blocks that have sizes that are randomized between minima and maxima; as well as being randomized to disparate random storage locations; and it can also be used in a situation where a drive is getting quite full. Where the spaces available are smaller than the data block for example. This is achieved by allowing the data blocks to overflow from one location to another available location. To achieve this a continuation pointer 565 may be placed at the end of the first fraction of the data block, and which points to the start location of the next available overflow location 569.

An alternative approach is to truncate the data block; and write the remainder of the data block to a space with its own pointer key, in the main pointer key. The choice as between the two approaches may depend on whether the pointers key is allowed to grow, or the data blocks are allowed to grow in size to accommodate the additional pointers.

Having explained the process alternatives in the abstract, the structure of the exemplary features of FIG. 16 are firstly that it is running as a processing module under the main application 590. The first process step for this module is to check to see if the random storage location is large enough for the next data block 550. Then decide if the data needs less than, or an equivalent amount of storage to the available contiguous storage, then write the data 555. But if the data block needs more than the available contiguous storage, then write data to the available space, and allow overflow 560 to a secondary location. By adding a continuation pointer 565 at the end of the primary location that points to the start of the next available location 569; or alternatively add an equivalent pointer into the pointers key that points to the start of the secondary location 569. Then write the remaining data to complete the data block 570. With the pointers key to the location(s) used being fed back to the main application 575. Thereby enabling data to be randomized into all available space in a storage location, drive, or partition.

This overflow aspect of this program may also be usefully adapted, to compress files to remove, or fill-up slack spaces. This may also be used to ameliorate drive fragmentation, without reducing the randomness of the storage allocations. Indeed, it may improve the randomness within contiguously used storage, and allow it to be filled to capacity. This may be helpful, because the more randomized data there is stored in a given space, the more it can all help to protect each other. There being strength in numbers (of files) as previously explained.

Having described and explained the reduction to randomized data stored according to the subject technologies, this specification next addresses the retrieval and reconstruction of the data using the pointers key. This operation may be implemented in a modular way under the control of the main application.

Figure 17:
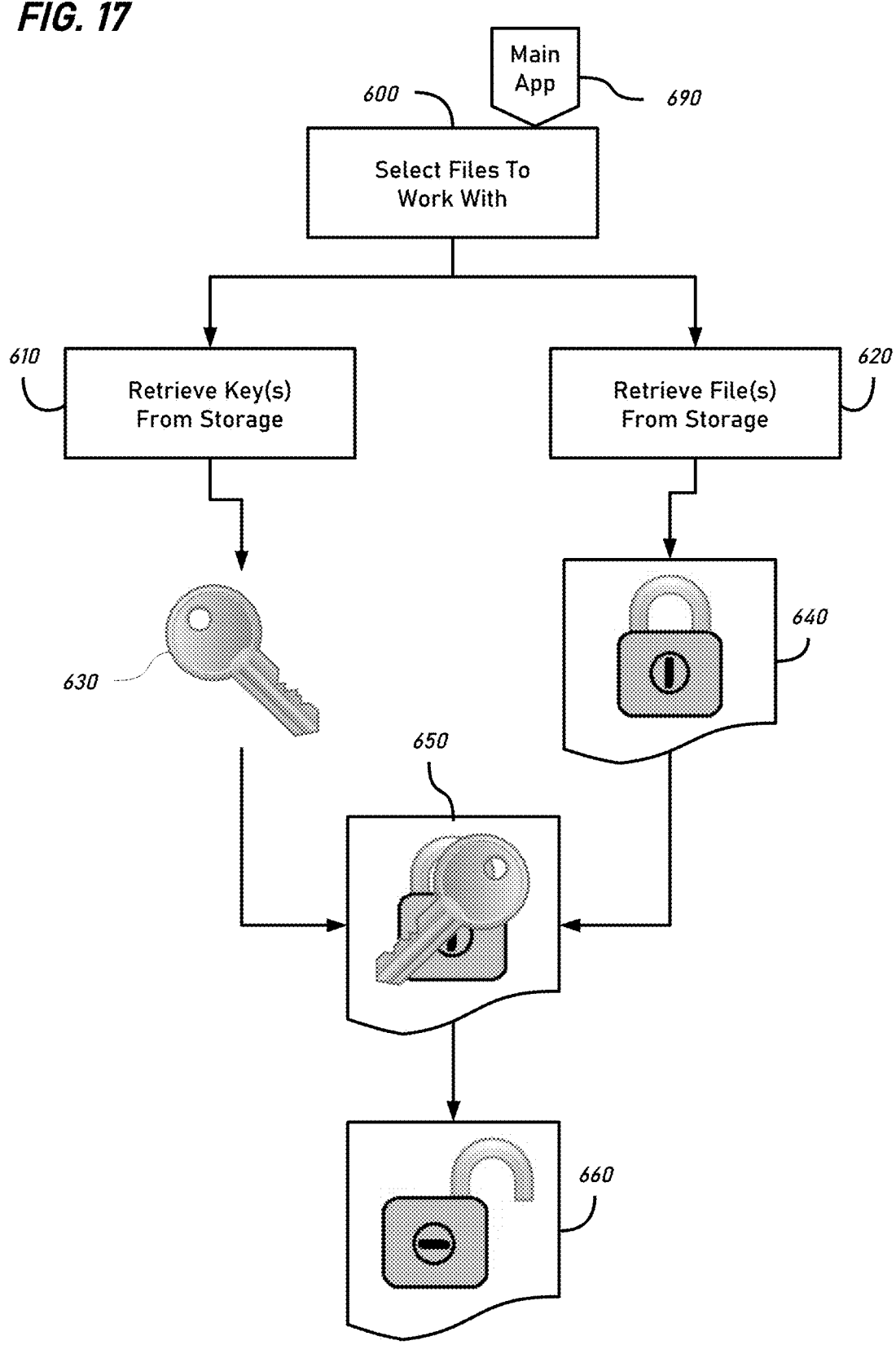
FIG. 17 is a block and flow system diagram of the reconstruction of a randomized file according to an aspect of the subject technologies.

FIG. 17 shows the operations running within a main application 690; where the user selects files to work with 600. This causes the system to retrieve the pointers key to storage locations from key storage 610. The detail of where this key storage is, whether it is a local USB drive, or a distant cloud key storage location is not shown. So that the common elements across many implementations of the subject technologies can be shown more clearly by not obscuring the basics with those details.

The pointers key is used to interrogate the storage locations of the locked file 640 to which it points so that the data-blocks those locations contain may be retrieved and reassembled back into the order of the original file 650 by recreating the sequence in accord with the sequence of the pointers key to provide a reconstructed open file to work with 660.

Figure 18:
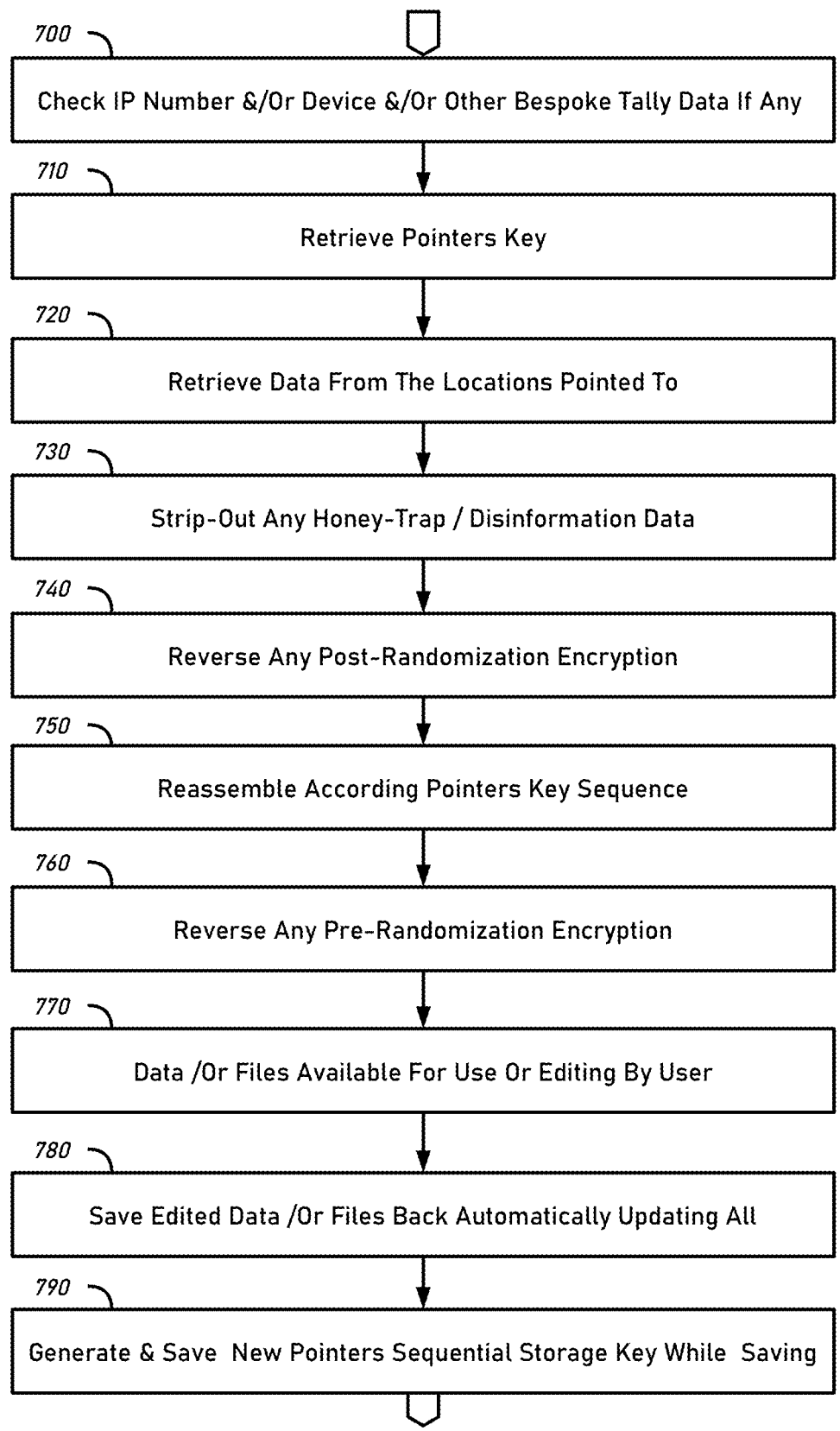
FIG. 18 is a block system and flow diagram of the retrieval and reassembly of randomized data according to various aspects of the subject technologies.

FIG. 18 describes some more complex data security examples where pure randomization can be integrated with other aspects of the subject technologies including the use of Tally data, and/or honey trap data, and/or the subterfuge of using encryption on the files to be protected in addition to randomization. The last being useful, for concealing the true nature of the logical randomization of the data. To further bamboozle and befuddle would be hackers, and crackers.

FIG. 18 is essentially the reverse of the process and steps including the hybrid aspects of the subject technologies shown as being used to protect data in FIG. 10. In FIG. 18 the first processing step may be to check the IP address and/or device and/or other bespoke Tally data if any are available 700. The pointers key is retrieved 710, then using the pointers, data is retrieved from the locations pointed to 720. If any honey trap or disinformation data was included in among the stored data this may be stripped out 730; and if there was any post randomization encryption as may be useful in the case of a contiguously stored but internally randomized file, then this encryption can be reversed according to whatever its rules are (not shown) 740. So that the randomized data can then be reassembled back into its original form by the process step of reassembling the data according to the pointers key sequence 750. The further step to then reverse any pre-randomization encryption 760 may be executed. So that the reconstructed data is finally restored to its original form pure of any encryption whatsoever, and the data and/or its files are made available by the application for use or editing by the user 770.

Users may be provided the function to save edited data and/or files back and updating all 780 probably according to their preset or other default options (not shown but likely to be like the process illustrated in FIG. 10 again). The final process step being to generate and save a new pointers sequential storage key as the data is re-saved 790, according to the subject technologies. In subsequent figures just as the detail of the operations of FIG. 10 were expanded upon subsequently, this specification now similarly expands upon these operations in the figures that follow.

Figure 19:
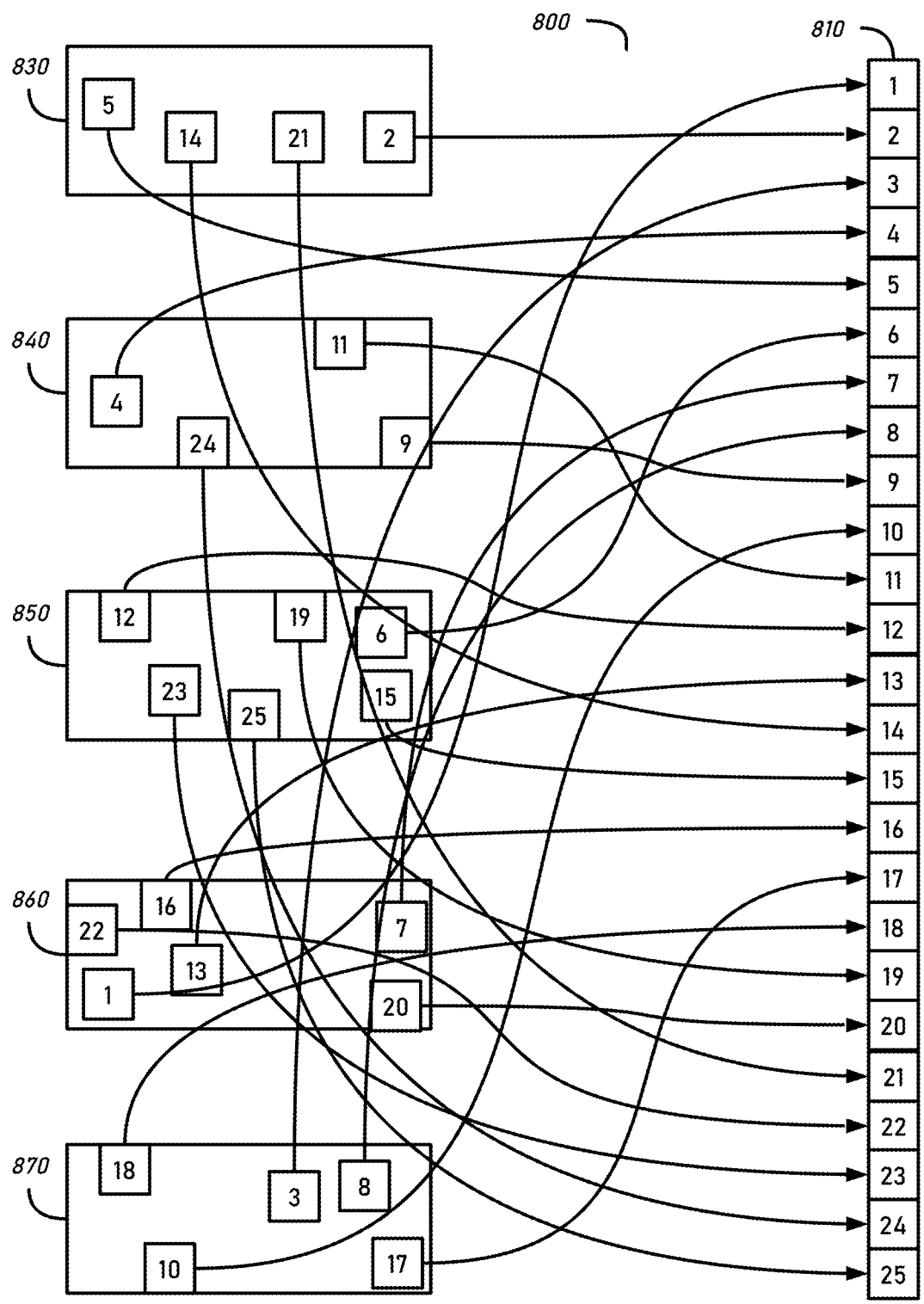
FIG. 19 shows randomized data (left) being retrieved from parallel storage locations according to an aspect of the subject technologies.

FIG. 19 shows at the hardware level randomized data blocks 1-25 like that of FIG. 18, being retrieved from five disparate storage locations 830 containing data blocks 5, 14, 21, and 2, 840 containing data blocks 4, 24, 11, and 9 etc., with locations 850, 860 and 870 containing the rest of the data blocks that were randomly stored within those locations. The pointers key 800 is used by the main application running on a system according to these subject technologies, which operates on them to reassemble them back into their original form into the file 810 on the right of the figure.

Pointers may connect to data at great distances or locally to a local machine the physical distances of which are virtualized here. Pointers not only have the benefit of being uncomplicated to use, but there is also no math or calculation overhead to doing so, they are what they are. They do not consume processor resources the same way that cryptography does as it crunches its way through the math, nor do they require processing power to determine recovery locations in data access operations as some hashing functions may.

Figure 20:
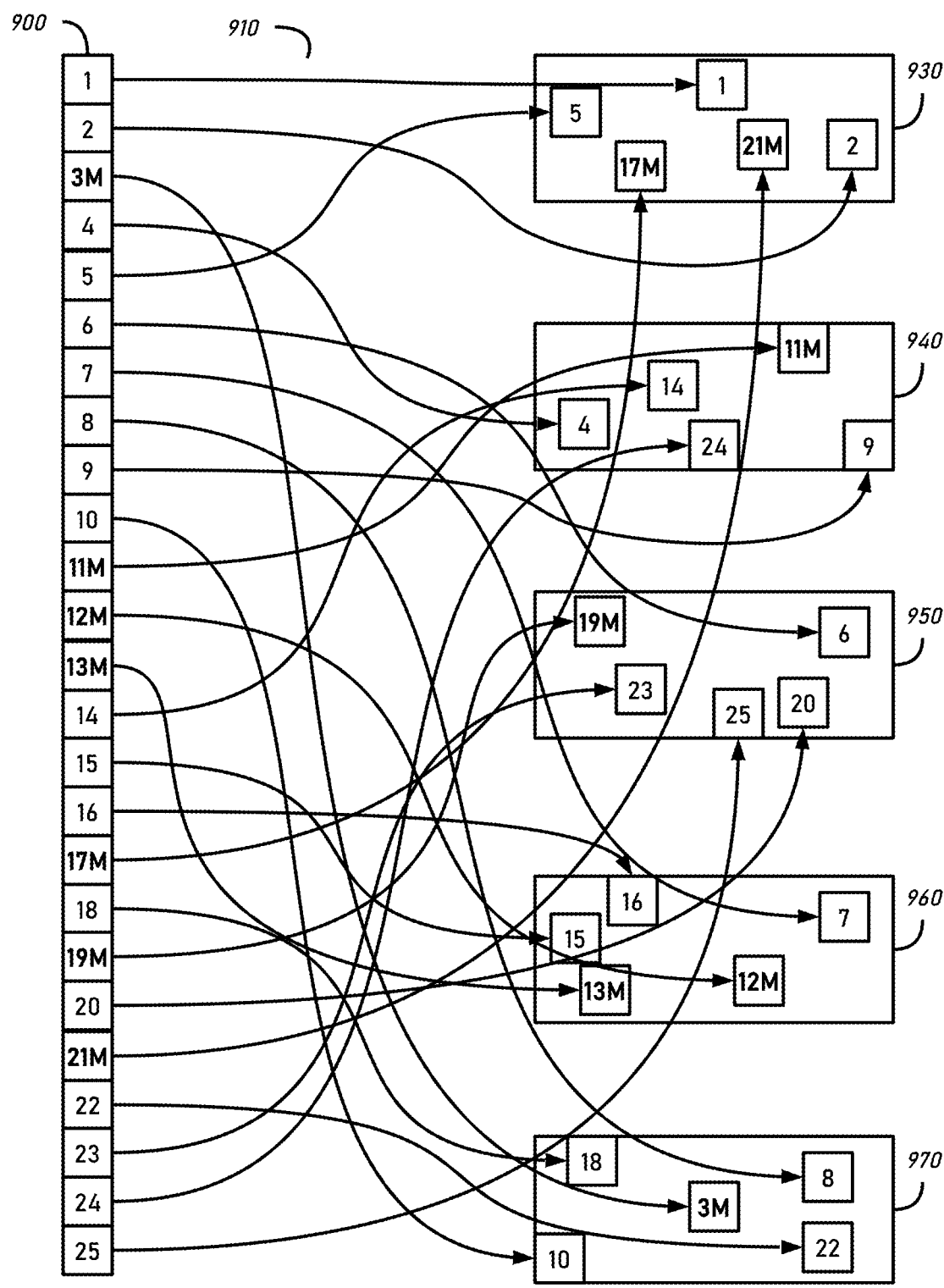
FIG. 20 shows a modified file being separated into new data blocks written randomly into multiple parallel storage locations, according to an aspect of the subject technologies.

FIG. 20 shows the same file 810 comprised of data blocks 1-25 that was recovered from randomized storage in FIG. 19, and as explained in FIG. 18, except that this file 900 has been worked on, so that data blocks 3M, 11M, 12M, 13M, 17M, 19M and 21M have all been modified. The modified file is again randomly distributed to five storage locations 930, 940, 950, 960 and 970. These may be separate server hard drives, in separate data centers within the cloud architecture which cloud could have hundreds or even thousands of data centers. The pointers key may be stored also in a cloud location or locally or to removable media. The options are multiple. So that with this figure it has been demonstrated how data may be randomized, stored, retrieved, then stored again according to these randomizing subject technologies.

All security technologies have weak points, and one such weak point is where a local copy of a file may remain assembled in the storage of the device where it has been worked on, or where it has been stored. Software exists that can recover deleted files, and data recovery experts and forensic scientists can even recover magnetic impressions of data that has been deleted and even data that has been deleted and overwritten. The Department of Defense has specified ten overwrites as a standard for the secure destruction of magnetic data on hard disk drives. But it is likely that even this is not fully effective against the very best laboratories as may be used by spy agencies.

Ideally, once data is randomized into disparate storage locations within the cloud, arguably it should not be reassembled into a local copy on a local hard drive if it is highly secret. Rather it should ideally be worked on across the cloud infrastructure. To avoid creating a local copy in storage that could be searched for and recovered.

Furthermore, it may be held locally, but only in random access memory (RAM) so as not to leave any copies of any of part of the file, on a local hard disc drive (HDD). As often occurs due to the operating system buffering to a part of the HDD that has been reserved for buffering to work like a virtual RAM-disc; or page file.

Keeping the data entirely in real RAM is now much more practical than it used to be. This is because the cost of RAM has fallen, and its stability and size have increased in parallel with improving transistor processing units. This trend will likely continue, along with improvements in processors, according to Moore's Law.

However, where a virtual RAM-disc or disc-based page file is used, then the data it contained although transient in nature may nevertheless leave a trace copy of itself that also ideally needs to be securely deleted. Especially where security needs are high. Such as in the intelligence community, military and defense contracting organizations like Lockheed Martin, Raytheon, and Boeing etc.

In data security critical operations, whether locally or remotely in the cloud there is a need for secure deletion of files including any RAM-disc or page file data. Using these subject technologies, it may be possible to exceed current DoD specifications.

Figure 21:
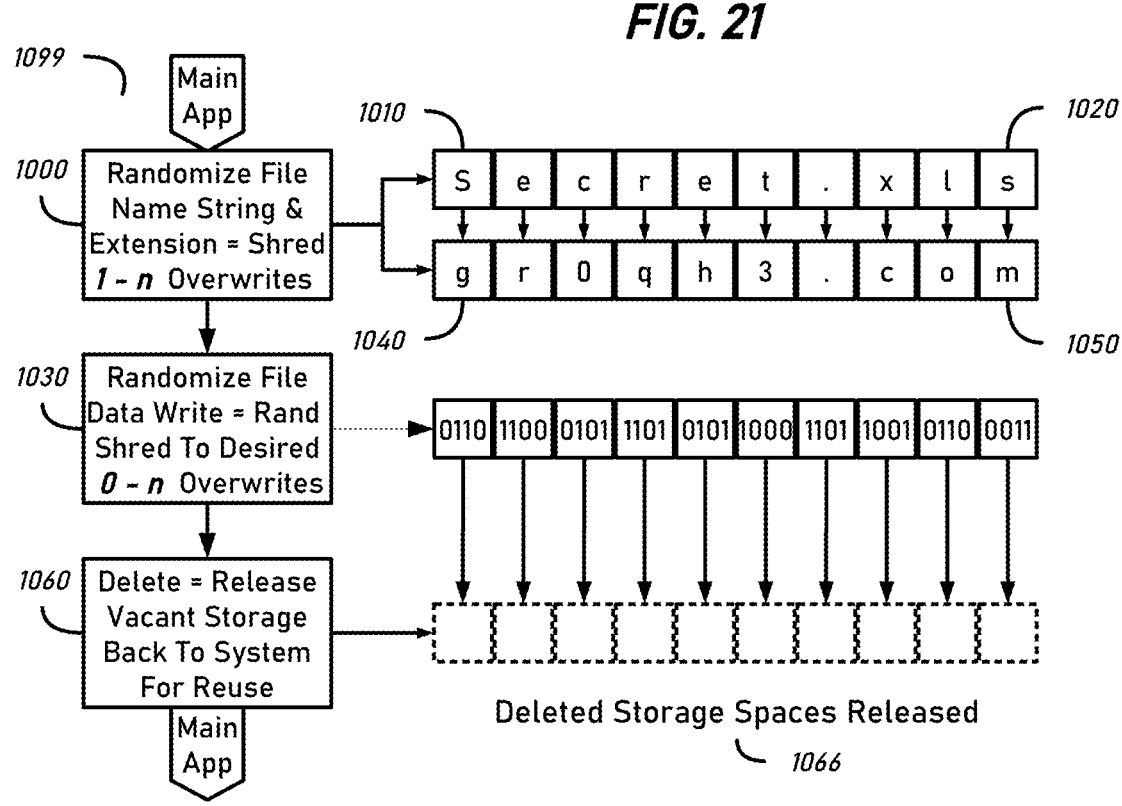
FIG. 21 is schematic plus a logic module in block and flow system diagram form, performing data randomization within a secure data deletion process according to various aspects of the subject technologies.

FIG. 21 provides a secure deletion process 1099. Which is capable of operations as a module running under the main application of these subject technologies on a local or remote machine, or both or even as a standalone program. The secure deletion application 1099, is running on a machine under a main application.

Randomized data held purely in cloud storage is much less of a risk. Provided that is it stored in randomized locations. Then all that is really needed in most cases may be to securely delete it—is the secure deletion of the pointers key file; and release back to the system of the storage allocations to which it pointed. So that in the following description, it is helpful to include an array of pointers or key file in the types of files that this module or sub-program can delete.

The first operation 1000 is to randomize the file name string 1010 and extension 1020. This is accomplished by repeatedly renaming the file with random or a succession of fictitious names 1010 that are at least as long as the original name string, then to do the same thing over-again to the extension or file-type descriptor 1020 which shreds these attributes, and to do it as many times as required. The DoD standard of ten overwrites may be exceeded if so desired.

The next process step 1030 is for the randomized overwriting with random data ("0-n") from zero times to "n" times, of the data stored at the file locations to which the resulting name string 1040 and extension 1050 relates. The reason why it may be desirable in some cases to set the number of overwrites to zero in relation to the data is because, if it is already deep within a cloud infrastructure, and already broken up into data blocks that have been distributed into random storage locations. Once the file name and file extension have been removed, then freeing up those randomized locations may be all that is needed.

Because it would be practically impossible to reconstruct the file once the file name no longer matches any pointers-based key. This approach may also be preferred within cloud-based infrastructure because there is no need to waste resources overwriting such irrecoverable data. The ability to set this parameter to zero may thus save a considerable amount of unnecessary processor use and write operations. That may have the further benefit of reducing wear on the data storage media.

Noting that the DoD specification for the deletion of data is ten overwrites, also noting that in these subject technologies, this is not necessarily accomplished by simple repeated deletions with the zero character or one value. So that if this becomes a DoD compliance issue then the option to increase the number of overwrites may still be achieved by setting the number of overwrites to meet the required standard. This is more likely to matter at the local device level, if that device or storage media might fall into hostile hands, for example on a battlefield system. Use of random data for the data overwrites may provide an improved overwriting process of randomized, or pseudo-random overwriting of the physical data according to these subject technologies. So that it should be more difficult to distinguish the underlying data that is being erased from every level. Because probably the data will be overwritten in a binary system on average around about fifty percent of the time with the same value that was there before. This comprises a more sophisticated method of random or pseudo-random overwriting. Being probably harder to back engineer than simple repeated deletion and overwriting with a predictable value such as zero or one.

Though not shown the security, and trade-craft disinformation factor can be further boosted by being overwritten with disinformation data that is comprehensible and not random. So that if a really clever forensics team or AI program does find a pattern hidden in one layer of recovered deleted data, it could be comprised of intercepted FSB or SVR or GRU or CCP or PLA etc., communications data files, or maybe some plausible disinformation between delete cycles. Disinformation that may be of keen interest to an adversary if true. So as to put a helpful distraction data pattern in there.

After which shredding by overwriting, the next operation 1060 is to delete the data, and file name by releasing its now vacant storage locations back to the system(s) local and remote (if applicable) for re-use 1066. This may be accomplished in a Windows system for example by removing the file entries from the registry. Re-use and more overwriting with other files as may then occur in this context is also a good and helpful thing.

Images can contain secret information of many forms and they can also be processed and stored according to the subject technologies. This is true for secret spy satellite photographs of adversaries' or allies' weapons systems, that it is desirable do not spread beyond the people who have a need to know their details. Other images can require protection for personal reasons.

Figure 22:
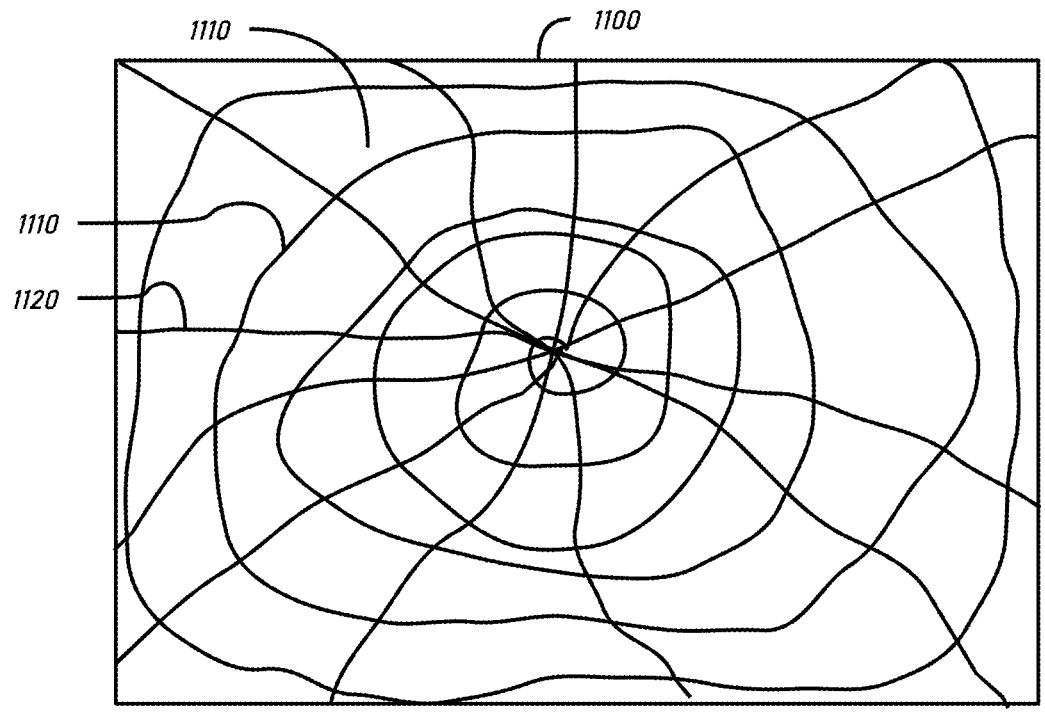
FIG. 22 is an image being broken apart by a cut pattern into data blocks according to an aspect of the subject technologies.

FIG. 22 is an image file randomization 1100 that uses the pattern of a randomized spider's web comprised of a variable swirl 1110, and a variable pattern of spokes derived from patterns that may be randomly varied within maxima and minima to cut or break up an image into data blocks 110. That are then capable to be randomly allocated into storage locations; and to also produce a pointers array key in accord with the subject technologies.

Figure 23:
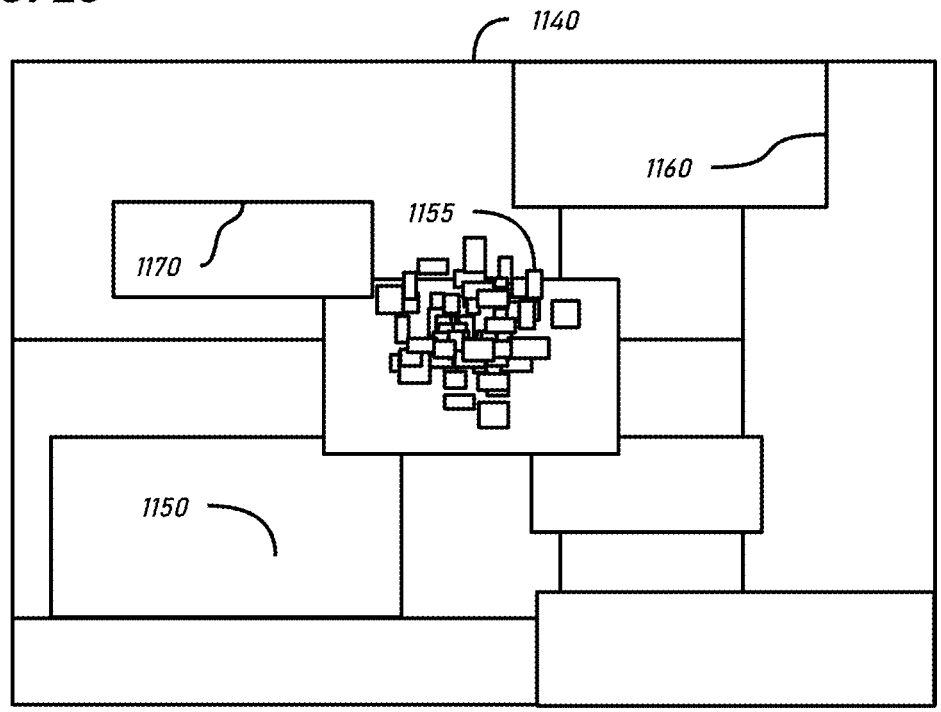
FIG. 23 is an image being broken apart by a cut pattern into data blocks according to an aspect of the subject technologies.

FIG. 23 is an image randomization 1140 that uses a pattern of vertical lines 1150 and horizontal lines 1170 to create a pattern of overlaid rectangles capable to divide the image into data blocks 1150 that are randomly sized between preset minima and maxima, and which minima and maxima can be varied or randomized within an identified zone of highest secrecy. To form smaller data blocks for random storage as needed 1155. The image being thus cut or broken up into larger data blocks 1150 and smaller data blocks 1155. That are then both capable to be randomly allocated into storage locations; and to also produce a pointers array key in accord with the subject technologies.

Figure 24:
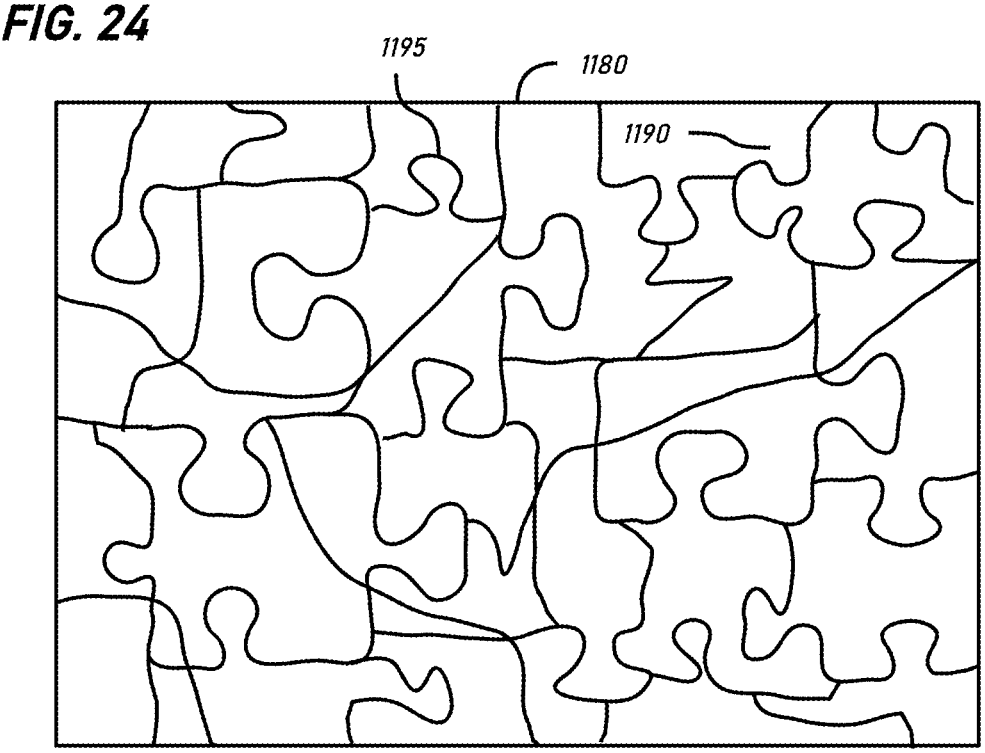
FIG. 24 is an image being broken apart by a cut pattern into data blocks according to an aspect of the subject technologies.

FIG. 24 is an image randomization 1180 that uses a jigsaw pattern randomized to produce slightly surreal contours 1195 to create a pattern capable to divide the image into data blocks 1190 that are randomly sized between preset minima and maxima, and which minima and maxima can be varied, and reduced within an identified zone of highest secrecy (not shown here). That are then in all their variable shapes and sizes capable to be randomly allocated into storage locations; and to also produce a pointers array key in accord with the subject technologies.

Once created these cut patterns can be used similarly on multiple images and they can be selected randomly from a selection of cut patterns. Or they can be created on the fly as bespoke cut patterns. Probably, users of mobile phones might like to design their own cut patterns by doodling them onto the screens of their devices. Next the systems block and flow diagram capable of performing these tasks is described.

Various components and blocks may be arranged differently for example in a different order or partitioned in a different way; all without departing from the scope of the subject technology.

Figure 25:
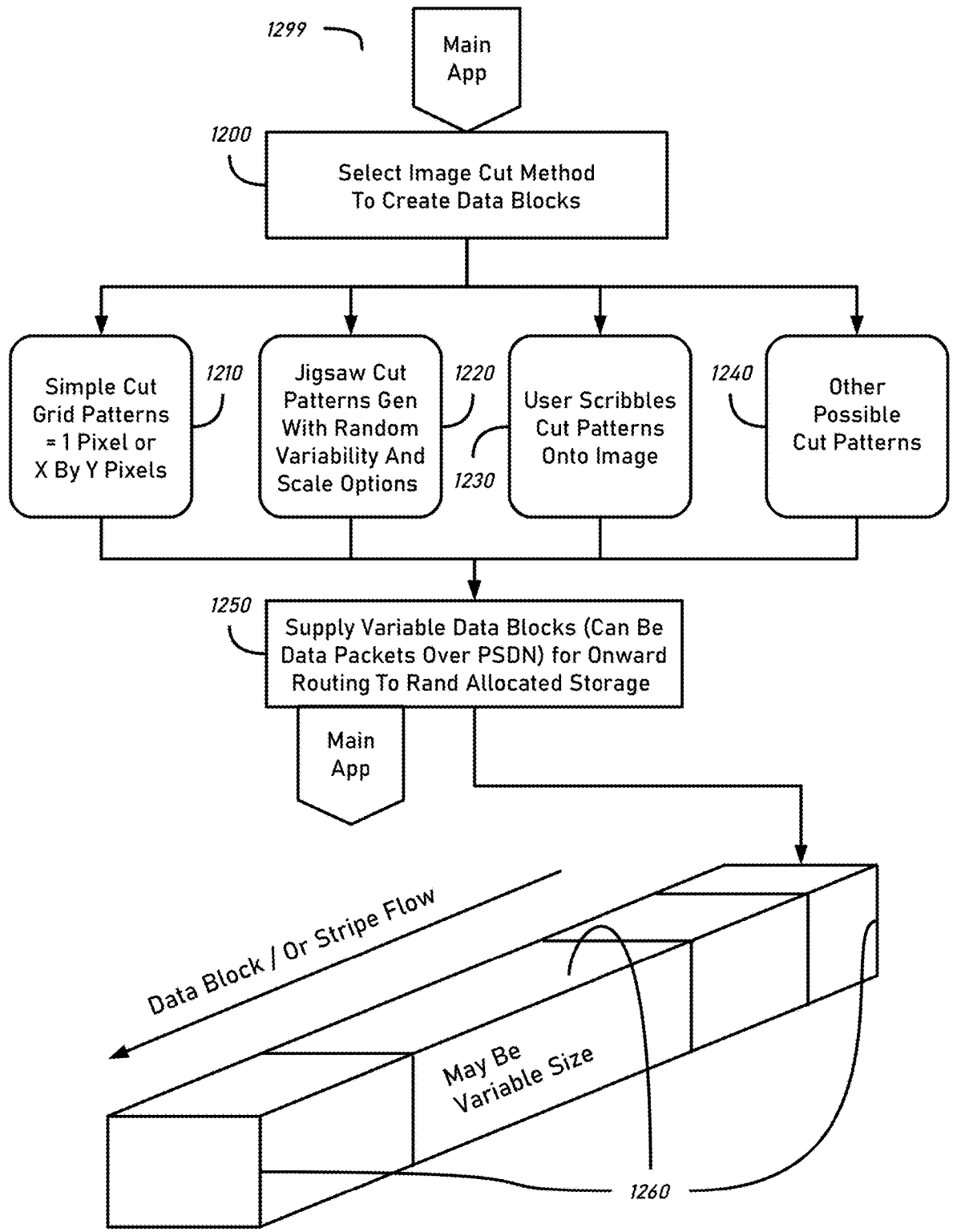
FIG. 25 is a mixed schematic block and flow system diagram of the creation of a stream of data blocks created from an image, according to an aspect of the subject technologies.

FIG. 25 is a modular operation or function 1299, running under a main application in accord with the subject technologies. Firstly, the image cut method is selected to create the data blocks 1200. After which comes one of the alternative process steps: 1210 provides simple cut grid patterns, which can be as small as one pixel, and variable within maxima and minima in the form of "x" pixels by "y" pixels; 1220 provides jigsaw type cut patterns, generated with random variables and scale options; 1230 uses scribbled cut patterns provided by users and that are imposed onto the image; and 1240 is a catch all alternative option for any other suitable cut patterns that are possible. The full range of which is potentially infinite and not further expressed for that reason.

The next processing step is to supply these variably sized data blocks for randomized onward routing, to their randomly allocated storage locations 1250. As visually drawn in perspective as the stream of data blocks of varying sizes 1260 is being output. These data blocks being provided to other parts of the main application (not shown) and/or to helper applications at their ultimate storage locations. As explained in the overview provided by system 101 of FIG. 8.

Figure 26:
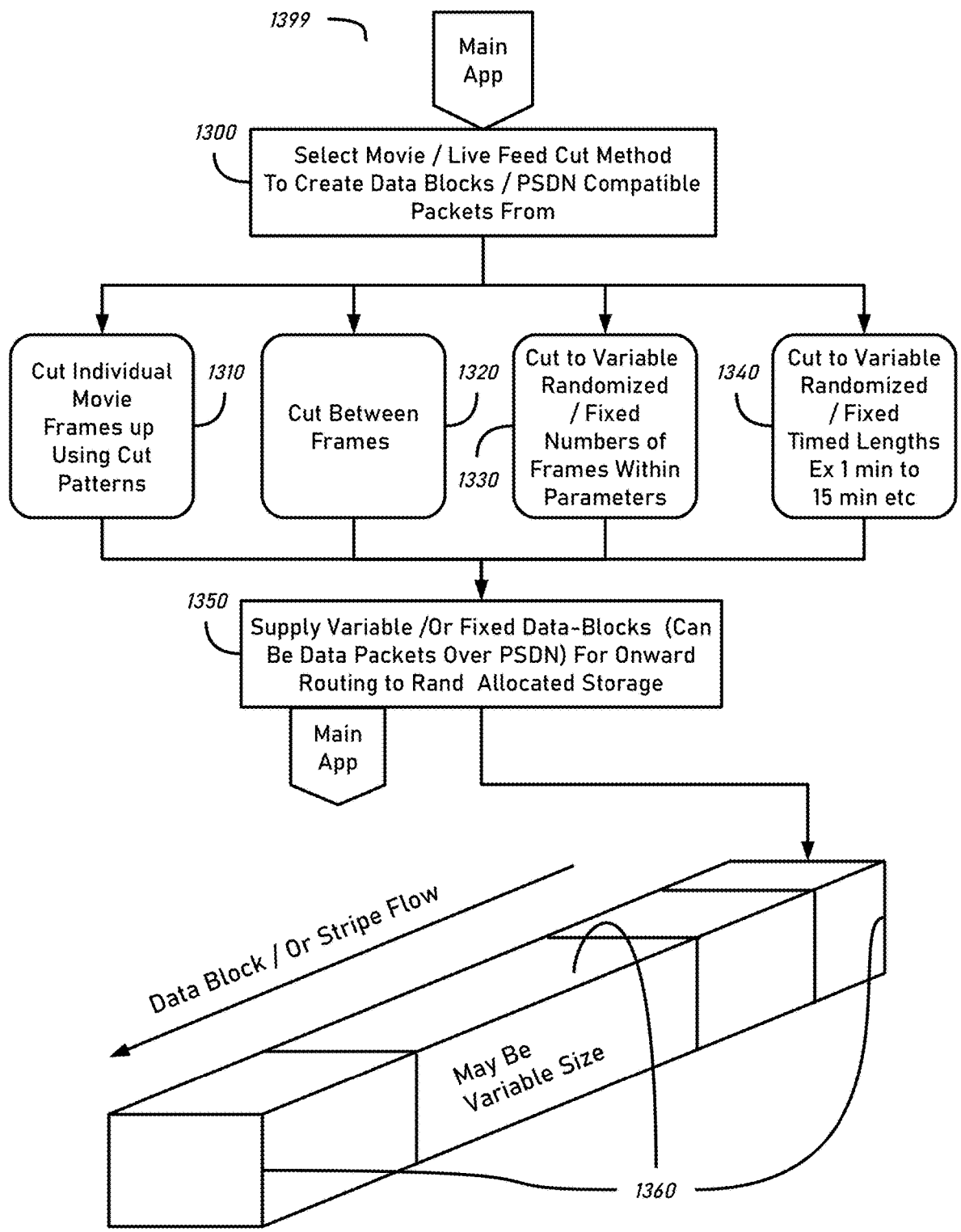
FIG. 26 is a mixed schematic and block and flow system diagram of the logic and creation of a stream of data blocks created from a succession of images comprising a motion picture, or visual data feed, according to an aspect of the subject technologies.

FIG. 26 is similar to the previous figure, except that module 1299 related to still images, and this module 1399 relates to streaming media which includes a succession of images. This module or operation 1399 may be run within or called to run from within a main application. The first step of which is to select the movie, or live feed and cut method to create data blocks or stripes.

Then comes the alternative steps: 1310 to cut individual movie frames up using cut patterns which would be very secure; or 1320 to cut between frames; or 1330 cut to variable randomized or fixed numbers of frames within maximum and minimum parameters; or cut to variable randomized or fixed timed lengths, between minimum and maximum parameters, such as a 1 minute minimum and a 15-minute maximum. Then to supply these variable or fixed data blocks or stripes for onward routing to randomly allocated storage 1350. So that the stream of data blocks or stripes of fixed or variable sizes 1360 is output as such and can then proceed to be written into randomized storage locations according to the subject technologies.

FIG. 27 shows block systems and flow diagram aspects in the context of a schematic representation of the upload that may be from a computing device 1493 of randomized data blocks (or stripes) to randomized locations within the cloud, as a process or module operating on cloud infrastructure 1499. The stream of data blocks (or stripes) coming to the cloud 1470 is coming from another module or process running a process that may be like those of FIG. 8 and those described in more detail from in the materials relating to the Figures up to and through FIG. 26 according to these subject technologies on a user device 1493, over a network and arriving over the communications channel X 152 as the data blocks (or stripes) 1470. These are being uploaded to randomized locations 1480, and 1490 and within the cloud infrastructure locations marked "X" in the cloud data centers 1430. These uploads may occur in parallel, for extra speed where the available network infrastructure permits.

Pointers directing and/or recording where each data block (or stripe) is stored, are sequentially stored in an array 1410 in a separate cloud infrastructure 1400 as the upload proceeds. The separate cloud infrastructure 1400 may be isolated 143 from the cloud infrastructure 1430 where the data blocks may be randomly stored marked X. The pointers and data being stored in real time within the process time frame snapshot 1450 are kept in sequence so that the key may be comprised of the sequence of pointers 1410 as it corresponds to the locations of the data blocks (or stripes) that is uploaded to the separate and isolated cloud key storage location 1400, and that may be backed-up to, or mirrored in alternative storage 1420. To avoid loss of the pointers key in the event of a failure of the primary cloud based key storage; a similar alternative mirror or backup location is also shown for the cloud-based data storage 1460.

The curved arrows are used to show data paths to and from their storage locations marked "X" 1480, and 1490, and the creation and storage of the pointers to the locations marked "X" being recorded within a sequential array structure 1410, and its upload to and storage in a separate and isolated cloud key storage location 1400 as a key within that cloud.

Uploading and recording of the sequence of pointers keys 1410 may be accomplished via a separate channel Y 153, which may use a separate thread, or port or isolated network connection operating through a networking card and/or separate communications network (that is not bridged) and/or routing that however implemented may be (and for maximum security should ideally be) isolated from the channel X 152 that may be used for data.

The cloud storage locations 1430 that may each be within data centers, are shown as a receding line of five clouds, and it should be remembered that there could be hundreds or thousands of these. Though there is not enough space to show more than a few. In the same way and for the same reason as only a few data blocks (or stripes) are illustrated in this snapshot correlating to the time frame window 1450. This is because the illustration would be obscured by detail if more data blocks (or stripes) and pointers were shown passing over a wider time frame.

Having addressed an upload that is compatible with system 101 of FIG. 8, which is tailored more towards users who want or need more local control of their data. Such as military and intelligence service users may prefer, we next consider a similar but technically different mass market solution that is tailored more closely to the needs and preferences of regular consumers, and large Internet service providers. Such as AWS, Google, and Microsoft as well as applications such as online banking and medical services, along with social media services such as Facebook. Which uploads are more likely to be suited to system 102 of FIG. 8A, which is intended to be compatible with the next FIG. 27A.

FIG. 27A, may be used like a black box system 1497, residing in a Cloud based network infrastructure, such as a data center or collection of data centers. On the outside of the black box, client devices 1496 may connect to system 1497. One system which may be compatible with this configuration is provided by system 102 of FIG. 8A. Using a website web page or web-application 106, running on a user device 113. That may access and cooperate with a system such as 1497 via communication channel(s) 103. Into a server-side network or cloud 104, to connect into a system such as 1497. The user device is not shown within this embodiment 1497 of a cloud based black box system, wherein these subject technologies may operate as follows.

FIG. 27A addresses uploads including file processing; and FIG. 28A addresses downloads including file processing. These being the two halves of the operation of system 1497. Which is an embodiment of these subject technologies that has been tailored to the needs of regular consumer users. Which embodiment is also designed to be capable to provide to them for use by large cloud-based service providers such as Google and AWS. Requiring little more than to download and install a web-application or to use a secure website on their connected client device 1496.

The user experience of which may be made indistinguishable from the cloud drives and other online services in the art, when operated as a black box system 1497 within a cloud infrastructure. That is capable via these subject technologies to reduce the incidence of large-scale data incursions and theft from big-data holders, and other custodians of sensitive data including financial and medical records and processing.

Within system 1497 the file processing and handling is controlled by one or more controller servers 1494. Files received from connected client devices 1496 may be processed and broken apart into data blocks, and these data blocks may be similarly sized, or randomly sized between a minimum and maximum 1441 as can be seen with data blocks "K", "L", "M", 1471. Then randomly stored by uploading the data blocks into unique random storage 1441 locations marked "X" 1480 and 1490 etc., within a cloud-based network infrastructure 1430. These uploads may occur in parallel, for extra speed where the available network infrastructure permits.

The cloud-based infrastructure being comprised of a plurality of available storage locations and or devices, within a data center, that may be part of a plurality of data centers. The greater the scale, arguably is the better for data security, and for data access speeds. Which may be very fast, or even close to instantaneous because these storage locations may also be accessible in parallel. Which may provide faster data upload and download times than is possible via serial storage to a single location. So that data storage according to this embodiment 1497, using parallel processing into randomized storage locations may have the two considerable benefits of (i) improved speed, as well as (ii) improved security.

Data uploads into randomized cloud storage locations 1430 of the data blocks 1471 may be via one or more secure channels X 152, these secure channels may be isolated from the secure channels Y 153 that may be used for the uploading pointers array-based keys which pointers point to the locations of the data block storage. So that pointer "K" identifies the location of data block "K" marked "X" in location 1490; and pointer "L" identifies the location of data block "L" marked "X" in location 1480, within the cloud infrastructure 1430. Furthermore, the pointers array keys may be stored into a separate cloud storage infrastructure 1400, locations 1410; and which may also be separate, isolated 143 and distinct, from the cloud storage infrastructure 1430.

Thanks to improving network bandwidth, and access speeds the fact that these subject technologies may use parallel processing for the upload and download of data, such embodiments of these subject technologies 1497 may be very fast, as well as being more secure.

Persons skilled in the art will appreciate that the alternative or mirrors or backups storage for data 1460, and for storage of pointers keys 1420, may be held within their own isolated 143 locations similarly to their live and active equivalent versions. The use of backups and mirrors is a vital element of cloud infrastructure, which need not in any other particular respect differ from the version being used in the cloud based black box system 1497.

Next this description looks at downloads according to these subject technologies in a differently configured embodiment 1599, before returning to further consideration of system 1497, being run in reverse for file reconstruction, file processing and downloads.

The system 1599 of FIG. 28 may be compatible with use according to the system 101 of FIG. 8 and its alternative potential modes of operation. Which alternatives and details have been addressed in the materials above. These may be compatible with standalone systems that may be preferred by users who really need high grade security such as intelligence and military personnel. As well as variants that may be preferred by keen amateurs and others such as defense contractors. Average users may not be as motivated to buy or use some of these more advanced capabilities. That said, Apple mobile phones have shown there is a market for secure and encryptable devices, that have been difficult even for the FBI to decrypt. It is probably the case that data encrypted according to these subject technologies would be even harder to decrypt. So perhaps Apple and their users may prefer such systems according to these subject technologies, as the encryption used in their current products may become obsolesced.

FIG. 28 shows block systems and flow diagram aspects in the context of a schematic representation of the download 1442 that may be to a computing device 1493 of randomized data blocks (or stripes) from randomized locations within the cloud, as a process or module operating on cloud infrastructure 1599 and may be in cooperation with and/or under the control of a user device 1493. This may have the same component parts and configuration of infrastructure as in the previous FIG. 27 showing process 1499 which was the upload that preceded this download, and reassembly of the data blocks (or stripes). That can be seen to be operating rather like a zipper as the pointers are applied to call down and used to zip back together the data blocks (or stripes) 1442 into a reconstructed copy of the original file or data stream 1475.

This is an important aspect of the subject technologies. Because it may form the basis for defense cloud data protection; as well as for civilian data storage and/or streaming media applications where intellectual property rights are being protected, and monetized. As such it may be one of the more commercially important aspects of the subject technologies.

The downloading and recombination operation 1599 may be operated by the client device 1493 downloading the pointers key 1410 from the cloud key storage 1400, or from the alternative mirror or backup key storage 1420; then reading sequentially through the pointers key to identify and call downloads of the data blocks (or stripes) contained within the storage locations of the data blocks (or stripes) at locations marked "X" within the cloud data centers 1430, identified here in this snapshot as data block 42 which tallies with pointer 42 and is called out as item 1490, and data block 43 which tallies with pointer 43 and is called out as item 1480; or if problems are encountered these data blocks (or stripes) may be downloaded from the alternative other or mirror or backup data storage 1460. After which these data blocks (or stripes) are recombined 1442 or zipped back into their original sequence to provide a copy of the original file or data stream 1475. This aspect is specifically addressed in the next figure in the context of data streaming.

The separate cloud infrastructure used for storage and retrieval of the pointers array based keys 1400 may be isolated 143 from the cloud infrastructure 1430 where the data blocks may be randomly stored marked X. Downloading, the sequence of pointers keys 1410 may be accomplished via a separate channel Y 153, which may use a separate thread, or port or isolated network connection operating through a networking card and/or separate communications network (that is not bridged) and/or routing that however implemented may be (and for maximum security should ideally be) isolated from the channel X 152 that may be used for data.

The data storage locations being located in a similarly separate and isolated cloud infrastructure 1430, via a similar separate and isolated channel X 152. For higher security applications these can be implemented as non-connected or non-bridged network cards that may connect to different networks or routes such as through a cell phone network in one channel and a home or business Wi-Fi channel. Many users may not need to use channel isolation measures and using separate ports and threads for their channels may suffice for many average users. The next FIG. 28A is addressed in particular to the more likely demands to provide a black box implementation of these subject technologies, that may be provided via a website or application.

FIG. 28A addresses downloads including file processing via the operation of system 1497. Which is an embodiment of these subject technologies that has been tailored to the needs of regular consumer users, and big data service providers. Requiring little more than to download and install a web-application or to use a secure website via a connected client device 1496. That is capable to reduce the incidence of large-scale data incursions and data theft from big-data holders, and custodians of sensitive data.

Within system 1497 the file processing and handling is controlled by one or more controller servers 1494. Data downloads may be called by a connected client device 1496. Example user client devices may be the workstations of a social media operator, or financial or medical service provider, or a cloud drive user. Data blocks that were previously randomly sized and then randomly stored in into random cloud storage locations such as the data blocks 1471 of FIG. 27A may be downloaded by running the process of the black box system 1497 in reverse to provide the data blocks 1476 being download and recombined into copies of their files 1443. Which downloads may be via one or more secure channels X 152. Which secure channels may be isolated from the secure channels Y 153 that may be used for downloading the pointers array-based keys which pointers point to the locations of the data block storage.

Pointer "K" identifies the location of data block "K" marked "X" in location 1490; and pointer "L" identifies the location of data block "L" marked "X" in location 1490 within the cloud infrastructure 1430. Furthermore, the pointers array keys may be kept in and downloaded from a separate cloud storage infrastructure 1400, at locations 1410; and which may also be isolated 143 from and distinct from the cloud storage infrastructure 1430.

For example, the cloud storage infrastructure may be owned and operated by a bulk provider such as AWS, Google or Microsoft, and the keys may be stored separately and isolated by the bulk storage provider or in separately owned and operated specialist key storage facilities. So that not even the host of the data would have the information from which it may be reconstructed back into copies of the original user files. The isolation of data storage and communications channels X 152 from key storage and communications channels 153, should suffice to make any data theft practically useless to hackers. Because if the data blocks are not reconstructed according to the pointers array keys, then there is no presently known way to determine how to reconstruct copies of those files. This may be providing a step change in the battle against data theft!

Thanks to improving networking bandwidth, and the fact that these subject technologies may use parallel processing for the upload and download of data, such embodiments of these subject technologies may be very fast, probably faster than the prior art using serial processing. As well as being more secure. This is also because uploads and downloads of the data blocks may occur in parallel where the available network infrastructure permits.

FIG. 29 shows an operation or process module 1588, running under a main application that may be a smart phone, smart TV, Tablet or PC. It could even be running on the US military version of the Internet and relate to classified material being shared between the senior defense staff on the East and West Coasts, as well as officers in the field—as part of a classified teleconference. Wherein, a data block (or stripe) stream from either satellite and/or antenna and/or dongle and/or a wide area network (such as the Internet) and/or telephone line and/or other data or communications channel 1500 provides data blocks (or stripes) to the device(s) upon which this module 1588 is running.

The data is in the form of blocks (or stripes) of media data 1510 that is 2.96 minutes' worth of randomized data stream; 1520 that is 9.82 minutes' worth of randomized data stream; and 1530 that is 3.45 minutes' worth of randomized data stream. All of which may travel different routes over networks from disparate randomized storage locations. Though that level of detail is illustrated in previous figures but not shown here for the sake of clarity.

What enables the stream of randomized data blocks (or stripes) to be downloaded from their randomized storage locations is the data block randomization keys from satellite and/or antenna and/or dongle and/or the Internet (or similar wide area network) and/or telephone line and/or other communications channel 1505. These data randomization keys may be comprised of arrays each corresponding to a randomized data object and which keys are 1515, 1525, and 1535 provide pointers to the download address or storage location of each of the respective data blocks (or stripes) in the same order 1510, 1520, and 1530.

Furthermore, their one-to-one relationship as well as being used in sequence to call down the data blocks for reassembly, may contain additional complexity not shown here where the frames of movies may be randomized by cut patterns and/or randomized out of sequential order, and these changes may also be recorded in arrays of pointers. Nested levels of pointers that may carry this additional randomization aspect data may be carried within the keys as parallel arrays, nested arrays or even an array of database files.

However, this figure of process 1588 has the purpose of illustrating mainly that a data streaming service can be run using the subject technologies, to provide previously unattainable levels of security; and that from the user device perspective this may be implemented as two data streams or threads running concurrently. One for the keys and the other for the data blocks (or stripes) needs to run, provided the bandwidth to read ahead of the images being viewed is present. With the result that users may enjoy high speed playback Where security really matters, the two streams of data blocks (or stripes) may for improved security travel over different channels or infrastructure. So that the pointers key 1505 may be provided by a coupled mobile phone perhaps using Blue Tooth and using its cellular service provider network, and the data blocks (or stripes) stream 1500 may travel over the Internet. Many other combinations and channels are possible for use with this aspect of the subject technologies, including using storage media sent by post to provide one or other stream. There are many possible combinations and ways to ensure that both pointers-based keys and data-block (or stripe) streams do not arrive through the same fiber-optical or radio frequency channel and or transceiver systems. This simple measure of physical channel separation may drastically reduce the risk of successful interception and decryption of secret materials.

As in previous figures the pointers array-based keys may be used to reconstruct the files at the server-side level of processing. Indeed in black box type operations that may suffice for many consumer applications. Or as in this embodiment the pointers array-based keys may be called down then used to call down the blocks or stripes of data to be recombined into copies of the original files, or data stream at the level of the user device. Which may provide the security levels desired for sensitive streaming media, as may be desirable in multi-way teleconferencing applications as the military and intelligence services may need between distant locations, and as part of joint all domain command and control operations, data analysis and mission planning.

Figure 30:
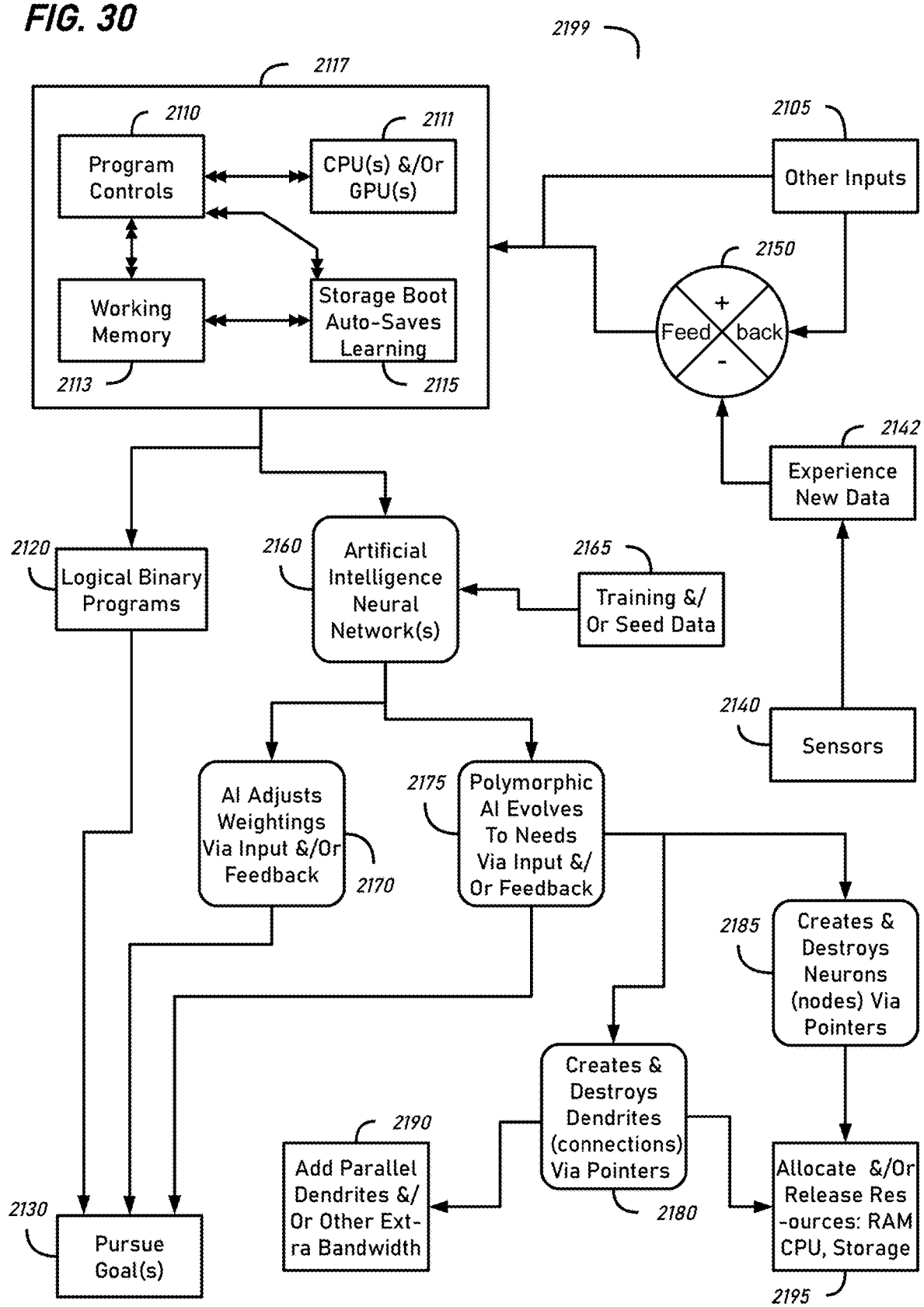
FIG. 30 is a block flow system diagram including artificial intelligence that is in accord with various aspects of the subject technologies.

FIG. 30, is a general purpose artificial intelligence system 2199, that has a program 2110 that controls the system while running on the resources provided by one or more CPU/GPU 2100, and in working memory 2113; as well as storage that may be capable to load (or boot up) the program, and automatically saves learning 2115, from the training and/or seed data 2165, and experiences the new data 2142 from sensors 2140 and other inputs 2105 such as user tweaking of feedback 2150 from these sources as is gained during operation of the system 2199.

This system has some binary programs 2120 such as basic input/output system (BIOS) and may have others capable to do computation and system tasks that do not require artificial intelligence. These programs can be likened to the autonomic nervous systems of animals. That are hard wired by instinct and pre-loaded from birth. Such as breathing, walking, and swimming are in some species. Which is a good way to understand these supporting and enabling program modules.

Until the creation of artificial intelligence and machine learning, such classical computing programs had become very advanced, and can be made capable to pursue goals 2130. For example, expert systems using relational databases and programmed to excel at a specific task were already capable to defeat humans at Chess. So that the power and sophistication of some classical computing programs should not be ignored or discarded because of the promise of AI.

In these subject technologies there is much use of feed-back, and in the context of programming logical software applications, it is highly likely that some developments in AI and/or ML, may be capable to be reduced back to non-AI programs once the logic of the AI and ML solution to a specific problem is understood. So that these methods of making systems are likely to feed-back and cross-fertilize into generally improving computation technologies.

The alternate process step to use AI comprised of neural networks 2160 is present in this system. To make it capable to use AI for those tasks to which it is best suited or desired. In the art progress was stuck for many years. Until the computing power to make deeper neural networks with more layers of neurons became practical. Assisted further by other techniques for feedback used for recursion and adjustment of the weightings applied to neurons 2170 have also boosted the utility of AI and/or ML. Computer hardware can now run quickly enough to support AI and/or ML, and consequently they are rapidly proliferating into new applications and devices.

These subject technologies provide an advance over the prior art, in alternative process 2170 by Polymorphic AI (PAI), and/or Polymorphic ML (PML) that is capable to evolve to suit processing needs via input and/or feedback 2175. Which process is reminiscent of the growth of biological brains, and of their characteristics known as "pruning" of redundancies and "neuroplasticity" which is the brain's ability to rewire and to make new connections throughout life. These provide the human brain's capability to rewire itself based on experience, during neuron loss caused by old age and after injury.

The ability to provide systems that can adapt themselves polymorphically and/or repair themselves after suffering damage may be of keen interest in military applications. Where damage in service may be quite likely.

The alternate process 2175 and all the PAI aspects of this system are also shown. Alternate process 2185 allows the system to create and destroy neurons within a neural network, which may be accomplished by the manipulation and use of pointers to connect processing capacity and memory from which to make a neuron; and to connect neurons to each other, and to system resources. Alternate process step 2180 is capable to and does create and destroy these dendrite-like (connections) between neurons; and between neurons and system resources also via removing pointers.

The next process step from these last two combined is the capability to allocate and/or release resources of RAM, and CPU/GPU resources, for the creation and destruction of neurons 2195. Furthermore, where a Polymorphic Neuron is created, or an existing or starter neuron is Polymorphically boosted as a hybrid, it may have resources added to it, such as parallel dendrites and/or extra bandwidth to allow more polymorphic connectivity 2190.

Figure 31:
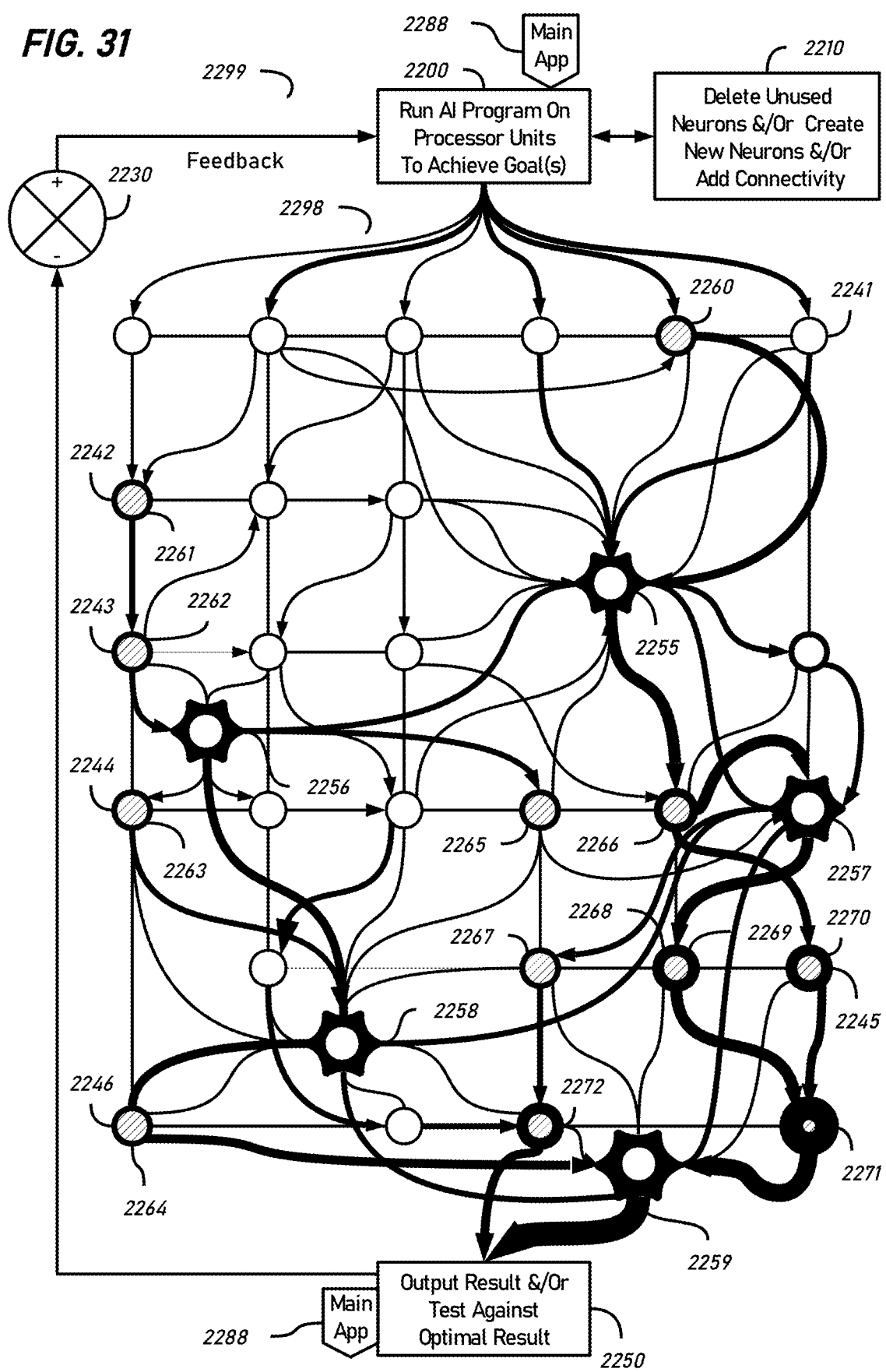
FIG. 31 is a mixed schematic and block flow system diagram of a neural network according to various aspects of the subject technologies.
Figure 32:
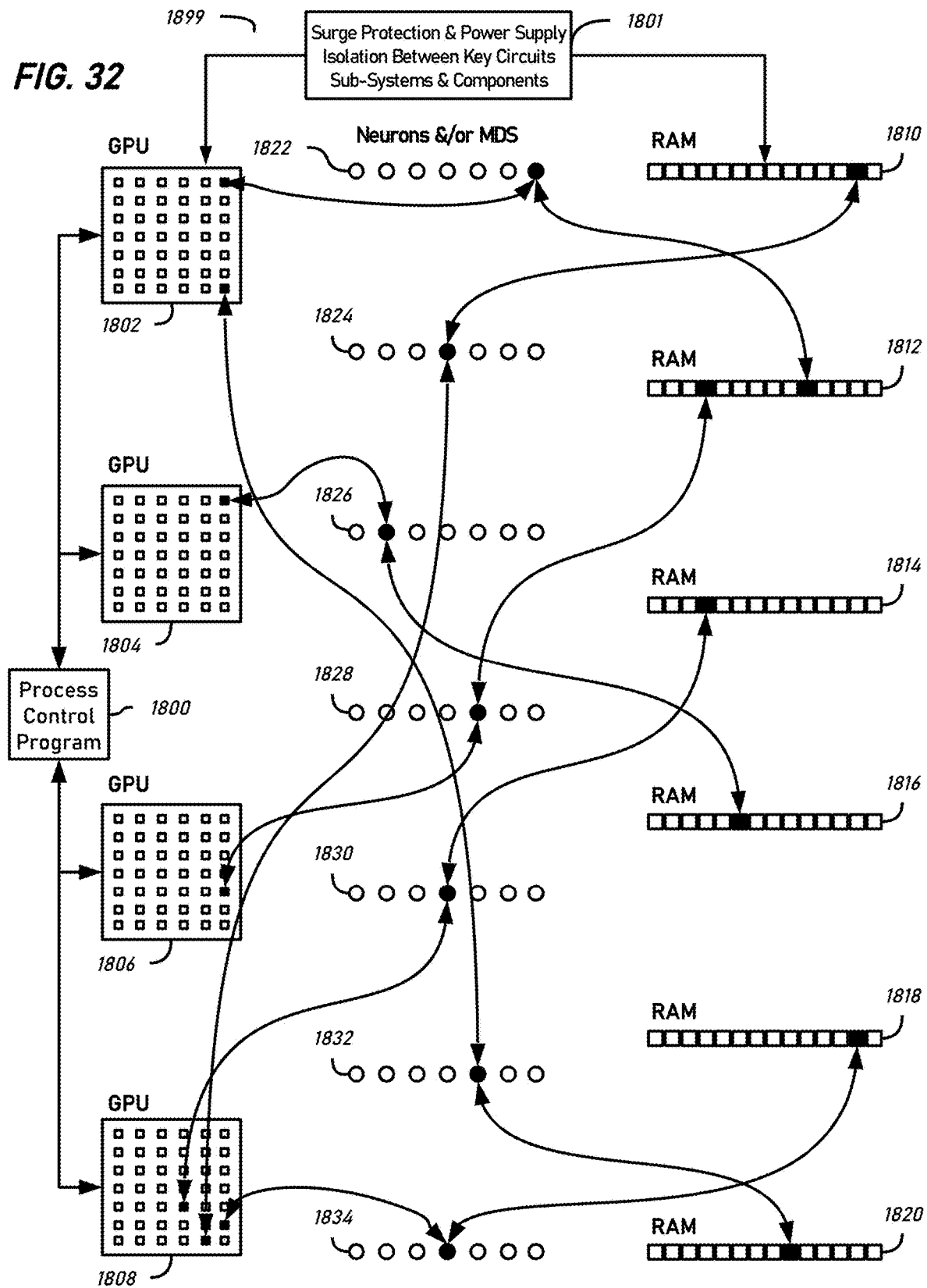
FIG. 32 is mixed schematic and block flow system diagram of the creation of a neuron in accord with various aspects of the subject technologies.

How this may be accomplished, vis a vis hardware and even randomized for improved security on systems the military might need, is further explained in the descriptive materials relating to the system 1899 shown in FIG. 32; and the system 2299 of FIG. 31; which includes a starter neural network that may have been based on weightings, and that has been run, and as it learned it evolved to become optimized; according to a system such as 2199.

The PAI program may add complexity where more is needed and may get out of its own way by simplifying itself where desirable. This in turn may enable the more efficient use of the resources of the system. So that bit for bit of computing power, PAI or PML may be capable to use available resources more efficiently. Thereby, to provide either smarter AI for the same resources, or cheaper AI that needs less resources for a given level of intelligence. Noting that the details of a structure of virtual neurons and dendrites comprising a neural network, may also be stored for later recreation.

FIG. 31 shows the result of modifications to a neural network, used as a starter or seed network, to kick-start a neural network for further optimization via a Polymorphic AI program. PAI based or optimized neural networks may be started in various ways, this is just one possible starting position. It also helps to illustrate a neural network, or a part of a neural network that is based on weightings. Which may have been allowed to run and to self-optimize within the constraints of relatively static neural networks, that lack the polymorphism of these subject technologies. From which data it may then have been possible by looking at the weightings to see that some neuron combinations were never used or were under used.

Further investigation may then reveal that the unused parts of a non-polymorphic neural network may have tracked back to logical impossibilities. So that they constituted a total waste of resources, that would probably never be used. Also, where under-used neurons were present—it became clear that there were parts of the network where parts of an entire layer may be relatively redundant, and only act as communications conduits. Rather than performing useful work.

The PAI neural network application therefore began to try out informed guesses to see where the neurons could be removed 2210. This tracks to a real-world biological process called "pruning" that occurs especially in the brains of human teenagers where they lose skills, knowledge, and capabilities that they do not use sufficiently often. Because the program can experiment with deletions, then run test data it is possible to see what if any difference pruning a neuron or dendrite connection makes; and where the results are undesirable the neuron may be reinstated. Because backups of these neural networks can be stored, it is possible to pursue a line of changes and to abandon those changes and then reset back to a previous iteration of the neural network that worked better. This rollback changes feature is a valuable part of the system 2199 in the previous FIG. 30. Though that level of detail of the system is not shown here, because here we are mainly concerned with the neural network results of such an evolved PAI system.

As well as pruning back a neural network the PAI system may create new irregular neurons wherever they may be helpful. Little used parts of the network may be simplified by the removal of part of a layer of neurons, and these may be replaced in part by an irregular polymorphic neuron, or the addition of jump-over dendrite like connection to otter neurons.

In human brains during old age, when the brain has lost so many neurons that they are becoming scarce and cannot be replaced—the brain resorts to a similar technique. In which the aged human brain boosts the number of connections or dendrites between the remaining neurons. In PAI something similar may be achieved by adding connectivity between neurons to boost the dendrite like connections between neurons similarly. Which capability is another polymorphic characteristic of these subject technologies that may be accomplished by using pointers.

With electronic neurons, the pointers connect the neuron's CPU/GPU resource to its working memory and to long term storage data on the inside of the virtual neuron, and to other neurons on the outside of the neuron. Their connections to each other can also facilitate alternate less directly connecting routes to system resources, and some neurons may learn to act as proxies and/or communications relays and/or repeaters in order to patch over damage within a neural network.

Ideally, neurons that are ripe for re-purpose will be the underutilized ones that may also possess an underutilized path to resources. The PAI program may be equipped with modules containing programs capable to handle all these functions, that may enable the neural network to be polymorphically optimized.

Indeed, by the setting of parameters, similar neural networks may be switchable between pre-stored and optimized configurations depending on operating conditions. Capable to permit rapid morphing between different versions of neural networks. The ability to save versions of the PAI's neural network to storage before optimizing for another condition, or purpose may be used to add a whole new switchable PAI mode to PAI systems.

For example, when the sensors of a self-driving car detect rainfall. This may then trigger the PAI to switch to a version of itself that is optimized for wet weather driving conditions. So that it reduces speed, and allows longer breaking distances etc. Similarly, a smart missile may detect a missile defense system ahead and switch to a PAI version that is optimized for stealth, and maneuverability so as to evade danger by performing "jinking" maneuvers while in the danger zone.

Consequently, the polymorphic ability to modify the neural network between pre-stored configurations as conditions change, may be a cheap way to get essentially multiple AI personalities, for differing purposes installed into one physical system. Serving to boost the overall utility of that system.

Indeed, we may all eventually first get an artificial intelligence persona App, that helps with some tasks. Like driving our car or managing our television viewing. We might let the same persona manage our appointments—like a personal assistant and eventually also let them manage our routine purchases of food and disposables. During which process, those artificial intelligence personalities or personae may become special and/or emotionally bonded for us, and even bonded with us, in a form of symbiosis. Maybe like a beloved pet, or maybe like a family member, or vital brain augmentation or vital organ.

So that we may choose to save them and not lose their experience with each technology upgrade. Probably they will become upgrade-able to the latest artificial intelligence technologies and be able to bring their experience (data sets and wisdom) with them. As these technologies improve over time these artificial members of our families may evolve and grow old with us. Thanks to polymorphic artificial intelligence. So as to become like loved pets, cherished friends, and family members. Which or whom it may become unconscionable to delete, and that may eventually even achieve sentience. So much so—that they may stay with families long-term, and even way beyond their original users; and in a distant future that may be run by artificial intelligences—they might even become our legal guardians and control our care plans in old age.

Imagine for the present time being a worker drone system may be optimized for various different tasks, by calling different personae from storage into working memory to run. So that there are many levels of polymorphism that may be applied due to the ability to rapidly copy and store the data that creates the neural networks in a succession of pre-optimized versions.

Pre-optimized versions or personae once perfected may then be copied and mass produced into a large number of clone systems. They may also be allowed to continue to polymorph to their specific role, in a running-in process. That may enable them to become a better fit for individual users. Lessons learned from such running-in may be fed back to manufacturers and shared to other clones where it may be helpful.

These subject technologies may include polymorphic neurons, dendrites, as well as forming virtual synapses, and above that be provided the ability to morph between different versions of a neural network. In processes reminiscent of those performed by glia that may help to create new neurons, provide them with resources and to destroy and remove dead neurons and materials. That may be pre-optimized according to specific parameters so as to allow the overall level of intelligence delivered to users to be higher, or a set level of intelligence to be provided at a reduced cost. For only the cost of adding the poly-morphing capabilities of these subject technologies.

Furthermore, randomly morphed neural networks may boost security, from signals intelligence eavesdropping. In addition to which, polymorphic capabilities can be used to repair or patch a damaged neural network.

This ability may be useful to also provide an ability for self-repair for damaged PAI systems, that may be of particular interest and utility for use in war fighting systems. That may be enabled to overcome damage by polymorphic re-routing using pointers to form new dendrite-like connections and boost the bandwidth of the remaining neurons so they can still work together and access the resources they need.

Similarly, though not shown in the drawings, neural networks may be polymorphically connected to other neural networks, and neural networks can be nested within other neural networks, perhaps to perform specific functions. Just as they may be nested into the structure of a program that is essentially not an AI system. Other than it calls up AI modules that work like modules of code, and observe the parameter passing conventions applicable within such systems.

The power of the polymorphic approach is to connect any neuron or compatible component to any other within a system, with as little as one direct connection implemented via pointers acting like dendrites in biological brains. The Inventor looks forward to seeing what the industry does with PAI, especially for self-healing systems. That may cope with a bullet damaging a GPU or memory module, by adding connectivity to the remaining resources. Much the same way as human brains add connectivity to the remaining neurons in old age, to help offset the loss of neurons.

Any weightings that the neurons of system 2299 may have or may have had are not shown. Rather the minimally expressed system 2299 is about the polymorphic aspects of the subject technologies. The PAI program runs on processor units to achieve goals 2200. It deletes unused, and maybe also underused neurons and/or creates needed neurons and/or adjusts the connectivity of neurons 2210.

Information flows into the neural network from the program running on the system, and into the first layer of the neural network 2241, from where as the neurons process it and route it on it flows through to the last layer of the neural network 2246. When this network was created as a uniform matrix of starter neurons, the processing would flow through every level. But the pruning part of poly-morphing this neural network has deleted three starter neurons of the second layer 2242, and two starter neurons of the third layer 2243. But then appears to have replaced them all with just one new irregular polymorphic neuron. Which has become super connected with additional dendrites. Thereby boosting its bandwidth, and thus improved access to resources such as processing power and memory. So that it has become a super neuron. Like a person with leadership responsibilities, it enjoys more access to resources and has a bigger role in the system than the starter neurons.

Then above the fourth layer of starter neurons 2244 on the left side, the program has created another super neuron in between layers, and without any deletions of surrounding starter neurons. Thereby adding a new layer comprised of one super neuron, also with some super connectivity.

The fourth level of the neural network 2244 has however lost one starter neuron on the right side, which it appears the system regretted and then replaced with a super neuron, with super connectivity in much the same place. In the sixth layer of neurons 2245 one starter neuron has been deleted on the left side and another starter neuron deleted in the center. There is a new super connected, super neuron interposed below the sixth layer 2245 and above the seventh layer of neurons 2246.

Almost finally, there are two starter neurons deleted one left and one right from the seventh layer of neurons 2246; and there is a new super neuron below the seventh layer of neurons, which is also super connected and through which most of all final outcomes flow. Another noteworthy fact is that some of the original starter neurons have survived, and a few have even thrived to become master neurons with extra connectivity and access to resources flowing from that 2260, 2261, 2262, 2263, 2264, 2265, 2267, 2268, 2269, 2270, and 2272. Indeed 2271 which began as a starter neuron has become an exceptionally important super-neuron much like those created polymorphically even though it began as a starter neuron in the starter neural network.

This neural network processes information and the results are output and/or tested against an optimal result 2250. The difference between the results obtained and the optimal result is fed back to the controlling program, as the basis for further adjustments to the neural network 2298.

There is additional information in the detail, which is that the connectivity or bandwidth of neurons is represented by the lines that connect them. The thicker the lines the more bandwidth and traffic. It makes sense to add bandwidth and connectivity where needed. What is not shown is the weightings that regular AI attributes to neurons. But one can infer the most connected neurons would correlate to a significant degree with the ones with the highest weightings if these were present or shown.

If an analogy is needed then regular AI tries to treat all nodes equally, but in practice due to weightings some neurons may become more important than others. They all have the same access to resources and the system does not favor them with more connectivity or access to resources no matter how busy or unused they may become.

The result may be a wasteful miss-allocation of resources with unused, or underused neurons potentially taking up resources they do not merit. Whereas PAI is intended to behave more like a biological brain, with neuroplasticity, pruning (deletion) of unused and/or underused neurons, and the release and reallocation of their resources back to the system. That may then use them to boost the power of the system by using those resources to create new neurons and dendrites and insert these into the neural network where they are most needed.

The Inventor believes that PAI may win-out over regular AI due to improved efficiency and better economics. To be gained by more efficiently allocating and adjusting allocations of resources. If so, PAI may become an important technology.

Having dealt with the randomization of data storage, networks, and streaming data (above); the figures that follow relate mainly to systems' architectures that have been programmed to operate their CPU, GPU, and RAM in a randomized way, which can be unique on any machine boot-up and operating system boot-up. So that the neurons of functionally identical neural networks can be recreated but wherein their addressing pointers are randomly organized anew at every boot-up.

So that it is no longer possible by listening to the same transistor from boot-up to boot-up, to know that it reliably operates on a specific process or type of information in a predictable or consistent way. This aspect of PAI and the randomization of the physical locations of resources anew at boot-time or upon a reset operation, may be used to provide systems that are more resistant to Signals-intelligence operations based on their electromagnetic signal leakage characteristics. Because these may vary between systems that have the ability to randomize their physical resource usage to implement the same system.

It is hoped that Signals-Intelligence experts within the US military and/or DARPA are able to understand the significance of this capability. As against Signals-Intelligence, and for self-repairing systems.

The polymorphic aspect of these subject technologies may also be made compatible with the types of Quantum bits and Quantum computing architecture in the state of the art. Such as those being developed by Google. They are intended equally to be compatible with the Inventor's own architectures and methods for creating an approximation to some aspects of the values that may be represented in quantum bits (Qubits). By creating protocols for meaning-based data structures and/or probability-based computing of these subject technologies.

So that those aspects of these subject technologies may be of universal applicability, in all these fast-evolving and related information processing technologies. And because of the way these subject technologies may work using pointers, these processes may be capable of being randomized, to help frustrate Signals-Intelligence operations.

So that there are two themes to those aspects of the subject technologies, that are to provide more efficient, and economic hardware and software systems and applications, that can be implemented as Quantum computing (QC), AI, and/or ML; as well as the Inventor's own subject technologies for those modes of computation. Which may be implemented in hybrid form for the purpose of improved overall capabilities, as well as—for providing improved security by randomization of various aspects of information processing.

FIG. 32 is a snapshot of a neural network for an artificial intelligence 1899; wherein there are four CPU/GPU 1802, 1804, 1806 and 1808 that are randomly creating seven layers of neurons 1822, 1824, 1826, 1828, 1830, 1832 and 1834, in combination with six parallel randomly accessible memory cards, the storage locations of which are implemented and accessed by randomized pointers between the location in which the neuron is being processed within a CPU/GPU, and the neuron and the memory locations to create and operate neurons which relate to each neuron and its learning. The active, pointed to locations being shown in black as such. All of which processors, memory and neurons are being run under the process control program 1800. This is how a hardware randomized neural network may be configured according to these subject technologies to provide, for example an AI system for missile defense, that may be resistant to being compromised by signals intelligence; and may also be capable to adapt to cope with damage.

The random virtualization of processor and memory for computing need not necessarily carry higher power or time overheads than other systems. This system looks like a tangled web of pointers to a human if we try to show more than this snapshot. But this type of structure is not necessarily any more difficult to understand to a computer that may use few if any of the concepts humans use to comprehend structures and data. This architecture of system 1899 may also be used to create another aspect of these subject technologies that is described above (in the context of system 2199 of FIG. 30) which the Inventor has coined Polymorphic AI (PAI).

PAI, may become very important eventually, especially for military applications where part of an AI system might need to rapidly fix itself, to compensate for a lost or damaged CPU, transistors, or memory block.

This system may include hardware for surge protection and isolation of power supplies to subsystems and components 1801. The purpose of which may be to help to confine damage from a bullet that may damage a processor, power supply, memory module or other component. So as to prevent short-circuits and destructive power-flows occurring within a damaged system. To provide the opportunity for the damaged system to survive the damage without damaging itself further, and then to use its polymorphic capabilities to adjust to provide a still working system. Wherein the remaining resources are reconfigured, in order to restore functionality. Rather like a human brain can recover from a serious injury. Indeed, some humans have recovered remarkably well after losing most of one hemisphere of their brain. The Inventor has a friend who has only just over half her brain—after a water-skiing crash. Who is still a smart lady.

AI at first began using relatively shallow neural networks that were just a few layers of neurons deep, the success of which was limited. Then as computing power improved this allowed deeper and deeper layers of neurons. Recursive adjustments, and readjustments of neuron weightings (or counters) are already adding more utility and accuracy AI is now already a much-improved technology, that is rapidly proliferating into new applications and devices.

Where PAI differs, is that where there may be a quicker better route not represented by an easy path through the neural network it may create a dendrite-like connection using pointers to jump over neurons that are just in the way, and it may create a polymorphic neuron, and connect it using dendrites based on pointers for a specific purpose; and that may then connect from any point to any point, within the neural network or even to addressable resources outside of it. Also using pointers that may work rather like wormholes to allow processing to flow from point to point within the architecture of the system. Wherever the logic can be simplified, or the efficiency improved thereby. Working to stop the AI getting in its own way, and to allow it to build more connectivity and/or bandwidth, where this is merited.

So that we may expect PAI to look more like a road network or a real biological neural network within a biological a brain. That accesses resources with different specialisms across a biological brain. Save that it is devoid of physical structure in many representations of its networked form. There are only processor units, memory, and the tangle of pointers from the human perspective. This configuration may provide flexibility aided by an ability to delete underused and redundant neurons and dendrites. To allow the release of the resources of the deleted dendrites and neurons back to the system for re-purposing.

This ability to destroy and create neurons and dendrites to prune, shape, and test neural networks enables the polymorphism to free up under used resources, for re-purposing. So that a well run-in PAI may consume less resources and may run faster than an equivalent non-PAI neural network For military applications where a system might be hit with a bullet that damages a GPU or memory module or power supply to one system part, that has some redundancy capabilities—a PAI system may be able to isolate the damaged module. Then adapt its use of remaining resources to continue to function by polymorphic reconfiguration. The ability to use hardware differently may also be helpful to the military and systems handling sensitive information, because eavesdroppers using Signals-Intelligence analytics may not be able to make sense of the changing ways in which the system may morph its processing among available resources.

Figure 34:
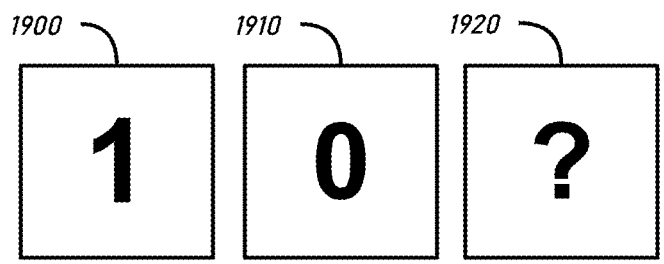
FIG. 34 is a simple schematic diagram in accord with an aspect of the subject technologies.

These subject technologies may provide a capability boost to Quantum computing as they may provide to AI. FIG. 34 is a representation of a data holding capability that has three possible states: one according to 1900 or zero according to 1910 or an unknown possibility "?" according to 1920.

Whereas the binary systems of modern electronic computers use binary logic. This works on transistors that are set to either a conducting or not conducting state. Like billions of tiny up or down switches they may hold the values of zero or one. These technologies have been increasing in computing power by getting smaller and more efficient for many years.

The eminent physicist Feynman commented famously that "nobody understands quantum mechanics". He may be right, but there are now people who fervently believe that quantum computing might be able to solve some problems that humans and the best classical computers still cannot crack. So, here is just a little theory that may help explain. The spin, and waveform of a photon or electron passing through a slits type experiment may be modeled.

The Inventor postulates that it is as though the center of gravity of the waveform and its energy is the particle whose position impacts an energy barrier such as a screen. But that the waveform of the particle is what passes through everything else. So, it is an amorphous waveform; until challenged unequivocally by an energy barrier. At which point the waveform being active across all the dimensions of spacetime (however many there are) is resolved down to a common point.

Quantum bits and quantum computing are somewhat misleading terms. What the things called quantum bits actually do is to produce waveforms that may be programmed, and they are allowed to interact. These are not abstract representations of data like in a classical computer system. Rather every waveform affects every other waveform. Like modeling reality, itself, everything is connected to and through everything else. So, if one waveform is varied, there is a knock-on effect upon all the waveforms that are interacting. What is occurring inside Qubits is that these waveforms are modeling the quantum interactions of the waveforms of particles.

Which is arguably not really computation at all, but a modeling process. In which models may be used to produce answers to the question what if one waveform has a certain waveform function, energy state and spin? How will it interact with the model? To get the answer the desired wave function is set to a desired value, and the other waveforms adjust to their natural equilibrium responses to that changed state. There is no need to compute what would be a fiendishly complex formula to get the answer. Because if the model is correctly configured, according to the laws of Quantum Mechanics adjusting one waveform will cause changes in the other waveforms, so that they may be measured rather than needing to be calculated.

This is nothing like what most people understand as being computing, and much more like modeling. So maybe the best way to understand Quantum Computing would be to call it Quantum Modeling. Furthermore, not all mathematical and computational problems are suited to Quantum Modeling (QM). Consequently, it may be important to bear in mind that QM is probably not the right tool for many tasks.

However, QM is likely to be enormously useful for modeling molecular bonding which is based on electromagnetism, and the super position of electrons that loop around two equally attractive particles in a super position. This is the glue that holds our physical reality together. QM has to be useful for better understanding that specific thing, which means also that it may lead to progress in our understanding and development of materials science, molecular sciences, chemistry, and biology.

QM is likely to boost our understanding of molecules, and molecular processes leading to the ability to synthesize new materials, new drugs, new metals etc. For example, Ammonia production for fertilizers currently takes two percent of all the world's power output. Yet some bacteria can make Ammonia much more efficiently, in ways that are presently not understood. It is likely that using QM it will be possible to model how bacteria produce Ammonia, and in so doing a new process that could at a stroke save one percent of global power consumption may be achieved. Consequently, it is clear that QM is probably destined to provide step-change improvements to materials science and chemical processing technologies. Which may be of huge economic value.

All this QM might be aided by providing better systems within which QM modules or sub-systems may be operated more effectively and efficiently. So that, if QM is a tool for this coming gold rush, then the subject technologies below may be likened to providing gold-mining prospectors with better tools. By hybridizing true QM, with cut-down approximations to QC, and/or probability-based computation, that may be informed and supported by AI, and/or PAL. The Inventor hopes to provide an improved operating system or machine environment that may incorporate and compliment true QM, and approximations to QC where costs may be saved by simplification, and the toleration of a statistical probability of an event in place of a known value. As well as systems that may make intelligent postulations, and/or informed estimations and/or guesses that may be rapidly tested against data and which may run alongside and/or in cooperation with true QM run on true Qubits comprised of waveform modeling systems. And which systems may learn from their experiences and become smarter and better at predicting QM outcomes, and/or other outcomes and/or to better inform QM use and to speed up QM research and development of new substances.

A computing system that can operate in terms of probabilities and may carry on a computation with multiple unknowns. So as to keep testing the data to discover and even to guess the unknowns. This sounds rather like artificial intelligence, and it also sounds rather like human intelligence. Where we correctly guess or estimate—and test—via insight into a problem. After which we may be able to test our hypotheses and conjecture against experimental data.

Figure 33:
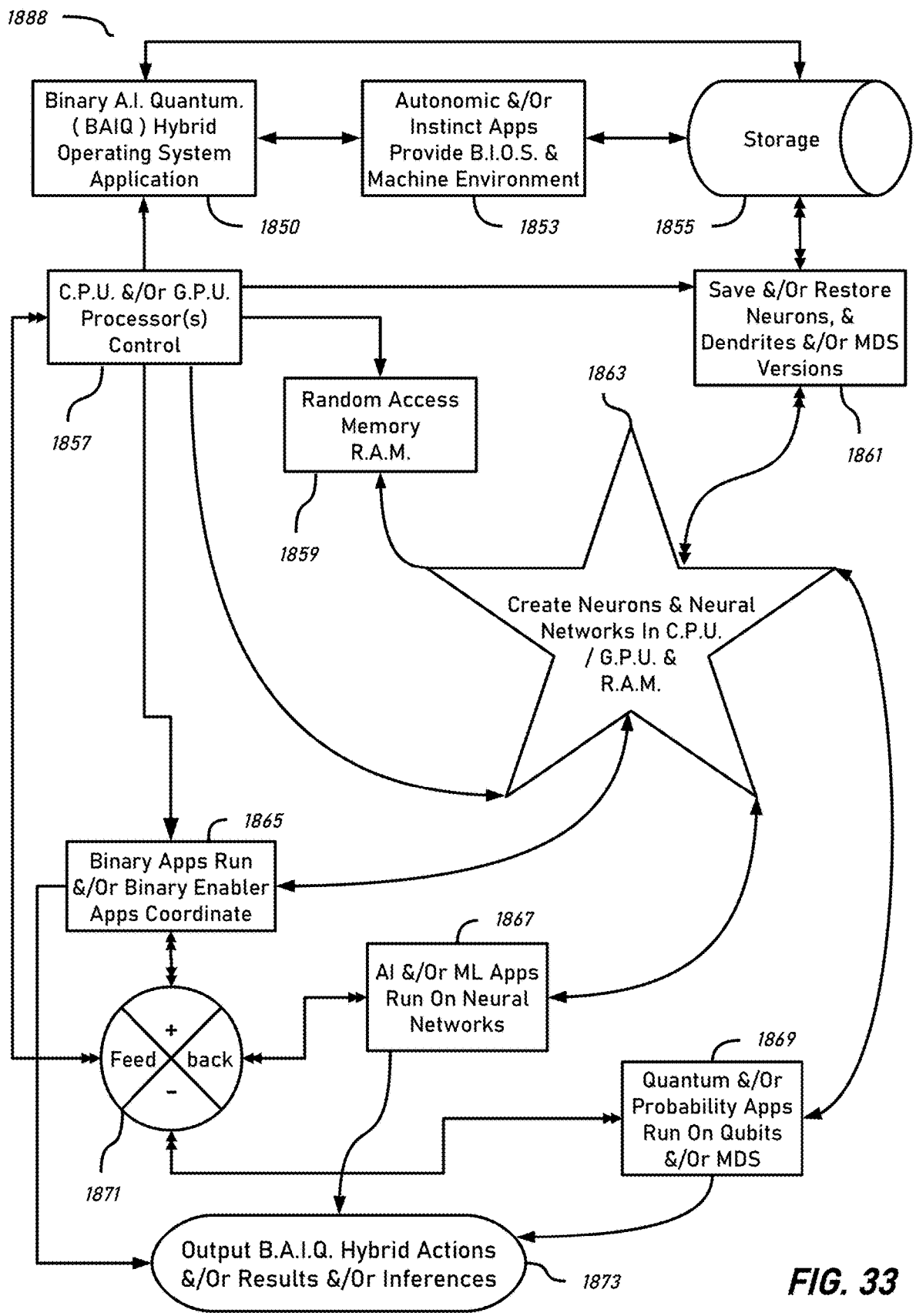
FIG. 33 is mixed schematic and block flow system diagram of a hybrid computer system having binary, artificial intelligence, and quantum sub-systems in accord with various aspects of the subject technologies.

FIG. 33 is a hybrid Binary-Artificial Intelligence-Quantum (BAIQ) computing system 1888, the main elements of which are shown in block and systems flow diagram form. It may use these subject technologies to create neural networks and protocol-based data structures, capable of carrying more meaning than the bits and bytes they are made from. Users may define their neural networks for the system to create, and users may define the number and types of protocol based "meaningful data structures" (MDS) as may be used to run a particular application; or applications as may come with their neural network and MDS pre-designed and defined for creation at boot up. But that level of detail is not shown here.

Physicists may use it to try to resolve the glitches between the Quantum Universe in the Standard Model vis a vis Relativity; to help us to achieve a smoother theory that better describes the Universe. Capable to zoom in and out from the macro-to-micro perspective and back. The things that may be done with it, will depend on the programs that are created for and run on a BAIQ hybrid system 1888.

Similarly, system 1888 may include the Inventor's own Polymorphic Artificial Intelligence to create more efficient neural networks. System 1888 may use either PAI or regular AI comprised of regular neurons, for machine learning and/or artificial intelligence operations. Because PAI can prune away redundancies and/or underutilized resources from neural networks and reallocate their resources it may provide a more efficient AI capability. Needing fewer system resources, including the potential for reducing electrical power consumption.

Turning now to the detail of system 1888, the BAIQ hybrid operating system 1850, cooperates with the system resources through the Basic Input Output System (BIOS) 1853. This provides the baseline environment in which the operating system runs and operates the physical system. Including allowing the operating system to load from storage 1855. The BIOS and the firmware in the circuitry of the machine are analogous to an autonomic nervous system, in biological life. They are hard-wired into the machine. Though BIOS code may be kept in non-volatile RAM or flash memory, and amenable to updates from the manufacturer over time.

The CPU and/or Group Processing Units (GPU) Processors 1857 control the operating system 1850. The boot-up process may cause the operating system 1850 to load from storage, and this to be facilitated by the BIOS and autonomic/automatic machine environment 1853. The CPU/GPU may then be caused to load and run the binary applications software 1865, and these binary helper and enabler applications coordinate through feedback 1871 from the AI and/ML applications 1867 to allow them to run; similarly, the CPU/GPU may then be caused to run the Quantum and/or Probability based programs to run on the machine's Qubits 1869, and which process may also feedback and communicate 1871. Noting that the arrows used on these various feedback loops is that they allow the Binary helper applications 1865, the AI applications 1867, and Quantum applications 1869 to run on the operating system 1857 in these multi-way feedback processes 1871, as these may all run in parallel together. This may be achieved by a shared protocol governing parameter and data passing, as between the Binary, AI, and Quantum modules of system 1888.

Once all the binary helper applications 1865 have coordinated the boot-up and begin to run the AI programs 1867, and Quantum programs then the system is operational and may provide a BAIQ hybrid computer system. The neural networks 1863 to be used by the system may then be created by the CPU/GPU 1857 and RAM 1859. Similarly, if the Inventor's own Meaningful Data Structures (MDS) are used these may also be created by the CPU/GPU 1857 and RAM 1859.

Qubits (suited for QM operations) like those in the state-of-the-art as used by Google may be compatible with this system and may be used within a system configured according to these subject technologies.

The BAIQ hybrid system once fully booted-up with its neural networks and MDS created 1863, is ready to roll and to perform QM operations using Qubits, that may be aided by Binary, and/or AI, and/or MDS. Capable to perform desired computations as operators wish to run on system 1888 according to these subject technologies; and to output the BAIQ hybrid's actions and/or results.

The loading of user specific software is not specifically considered in this exposition of the general-purpose machine 1888 provided in this example; nor is the selection of user options for running user's applications. In system 1888, the curved lines are used to denote novel and/or unusual processes of this hybrid system. Which is why the creation of neural networks and MDS in CPU/GPU and RAM 1863, is represented by a non-standard symbol in the form of a five-pointed star. This is to help direct attention to the heart of this aspect of the subject technologies. The neurons, dendrites and/or MDS structure versions in an iteration of system 1888 as created 1863 may be saved to storage 1855 for later re-use 1867, so that they may also be restored 1861 to recreate neural networks and/or MDS 1863 in CPU/GPU 1857 and RAM 1859.

If we are looking to model the Universe and to reconcile quantum mechanics with relativity, then maybe building a new system paradigm could be useful. Google certainly believes it is worthwhile, and so does the Inventor. But maybe not for quite the same reasons. Say for a hypothetical example that there is an absolute position in all the dimensions of space time (we think in terms of up, down, across and time as four dimensions, but string theory suggests there may be sub-dimensions and possibly eleven of those). The Inventor has his own unfinished theory of matter which may reconcile some problems eventually. But for now, it matters not. Because if we want to describe a point event like a particle as it may exist in between four to "n" dimensions we might need to describe its state in n dimensions to fully describe it. So, we may need an analogue mechanism that can describe down to Planck's constant. How would we do this? How would it help us to calculate more mundane things than the locations of the elements of the wave functions of particles in the "n" dimensions?

Well, the choices of zero, or one, or do not know are all that FIG. 34 gives us which may be good enough to ride over some unknown variables but not others.

Figure 35:
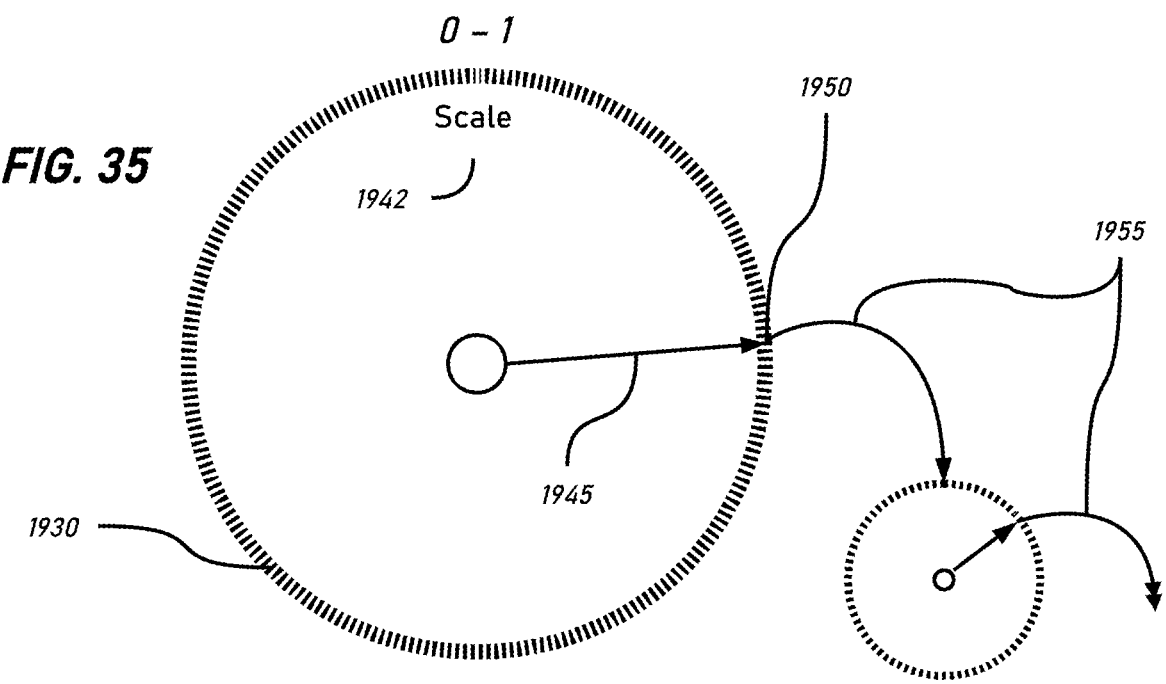
FIG. 35 is a schematic diagram in accord with an aspect of the subject technologies.

FIG. 35 shows a circular scale like a clock that can show all the values from zero to one. This may be implemented as a MDS which can produce any value between zero and one; then if the pointer fits neither of any of the one hundred values either side of it perfectly, then another pointer to the same 0 to 1 scale of one hundred can be produced to try to resolve the pointer to an absolute position on the scale; and this process of cascading down into the detail all the way down to Planck's constant may be achieved by iterations of the same process. To achieve something close to an analogue result using binary or other number base system tools to resolve the remainder values to an analogue. Perhaps, we should try copy nature and resolve only those variables that we are forced by observation to resolve and put up with probabilistic approximations where possible. For use in systems capable to cope with ambiguity and ride over it. In order to avoid wasting resources on otiose over-calculations and expensive hardware.

Quantum mechanics is really a way of explaining and QM for modeling the physical interactions of particles. But when designing computers to work on other problems why not base them on the statistical models that apply to the desired field of application?

In classical computing problems, it may be more helpful to create a representation in the form of one array of values that are 0.00, 0.01, 0.02, 0.03 etc. ... to 0.99 then 1 and use this one array as a scale that never changes, and to iterate only the part of the function that creates a pointer to the scale. Using iteration to find the values at each level in the scale. At any point we can check to see if the answer is good enough to let the rest of the computation run, or whether it needs to reiterate the cascading process to get to all the way down to Planck's constant. When this technique of using the scale-based MDS to get closer to an absolute value is used in combination with an intuitive AI program, a "good-enough" rough result may be achieved. Resolved to a one hundredth, without wasting resources cascading down to more detailed computations.

The specific call-outs of FIG. 35, have the probabilities represented as a fraction between true and false or zero 1942, as a circular scale 1930, and pointer 1945, where the pointer points to the value or probability 1950, and where the value falls between the precise match to values on the scale 1930, then the processor running the computation under the control of a program is caused to cascade the computing process through another iteration to produce another MDS representation 1955, until an absolute value, or resolution that is serviceable enough to be used by the program is achieved; or the process is truncated as a waste of resources.

Figure 36:
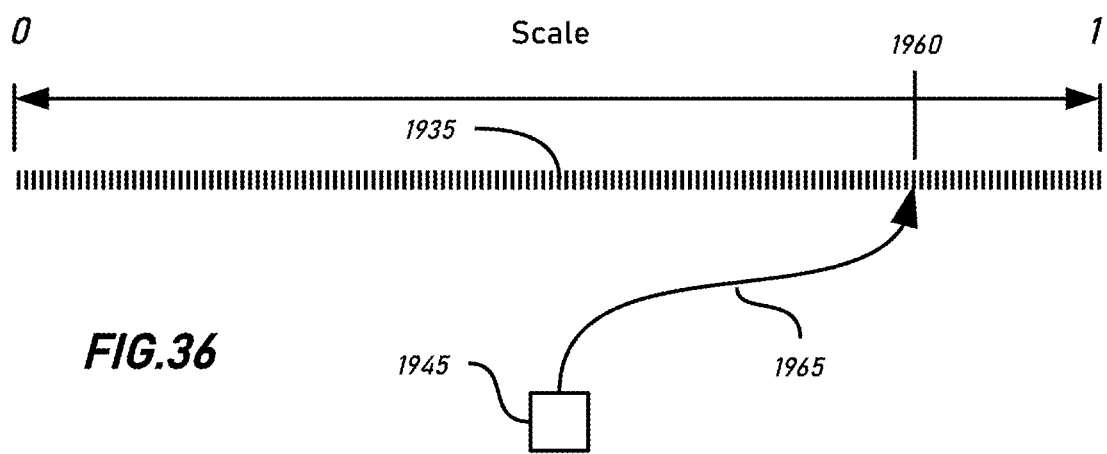
FIG. 36 is a schematic diagram in accord with an aspect of the subject technologies.
Figure 37:
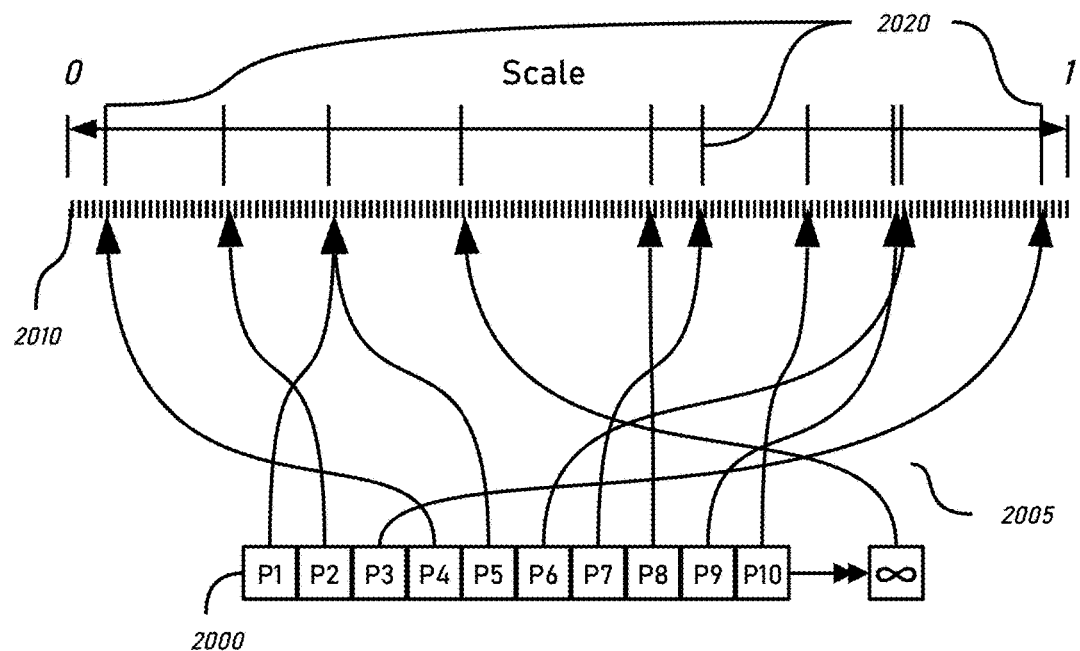
FIG. 37 is a schematic diagram in accord with an aspect of the subject technologies.

FIG. 36 is a technically identical representation of the MDS array of FIG. 35 but where the scale of possible values is rolled out flat 1935, where the pointer 1965 identifies a value 1960.

Although the MDS of FIG. 35 can be virtualized from a compass like form to a flat array with a pointer; alternatively, the pointer may itself be the value that would be read from the scale if the physical scale existed. Either approach may perform the same function. But it need not physically exist anywhere other than in cyberspace. This aspect of the subject technologies seeks to visualize and to virtualize the concept of MDS. But the concept may be more useful in terms of storage of MDS that can represent more information by the inclusion of structure than binary bits alone can. This may be aided by the use of protocols for the interpretation of structure. This may provide a richer set of tools for data analysis and computation than is provided by using classical computing of the data within bits and bytes without any attribution of such extra visualization or protocol-based meaning. So that a classical computer, virtualized quantum computer, or actual QM system including true Qubits may thus augment its processes by using MDS for holding approximations to some variables, and logical conditions.

Sometimes we simply do not have enough information to know what we just cannot know, not even to infer a probability. AI can help us to make better guesses, and probability-based computing and/or MDS may help to ascribe a statistical weighting or probability to outcomes.

The greatest strength of computing in general, in binary logic, and/or any base logic, is the ability of computers to repeat a task many times very quickly and to try out various variables and to experiment with data and computations at speeds that humans cannot match, and where boredom and frustration never occur. One aspect of which, may be to use a variety of techniques to work around unknown variables, in ways not that different than humans do. But at increased speed and without getting bored or frustrated into failure.

FIG. 36 may be interpreted as or the equivalent to in alternative software manipulations of resources or as hardware, of a serviceable combination and construction as an array of pointers or values on a scale of 0 to n, which has in fact pointers represented as P1, P2, P3, P4, P5, P6, P7, P8, P9, P10 to P∞ (infinity). This is because pointing to a value, or between two values requires no computation per se can be efficient and can be a step along the way to a more complete resolution of a given value or probability. In some cases, a computation may be able to infer that a variable lies between two values, but not more than that without further information or further computation. So that in the architecture represented, a variable may be expressed as between a lower and upper value. In which case, a pointer to the lower value or the value itself will suffice to resolve the available digits. Then, if necessary, to perform further computation to resolve subsequent digits that are above it in absolute terms. The pointers 2000, may point to or hold values according to the scale 2010 expressing probabilities of an event or variable 2020, in an architecture capable of expression of pointers to values or probabilities within a range in parallel, or in sequence, or in cascading use 2005 by the computations of the wider computation system.

Figure 38:
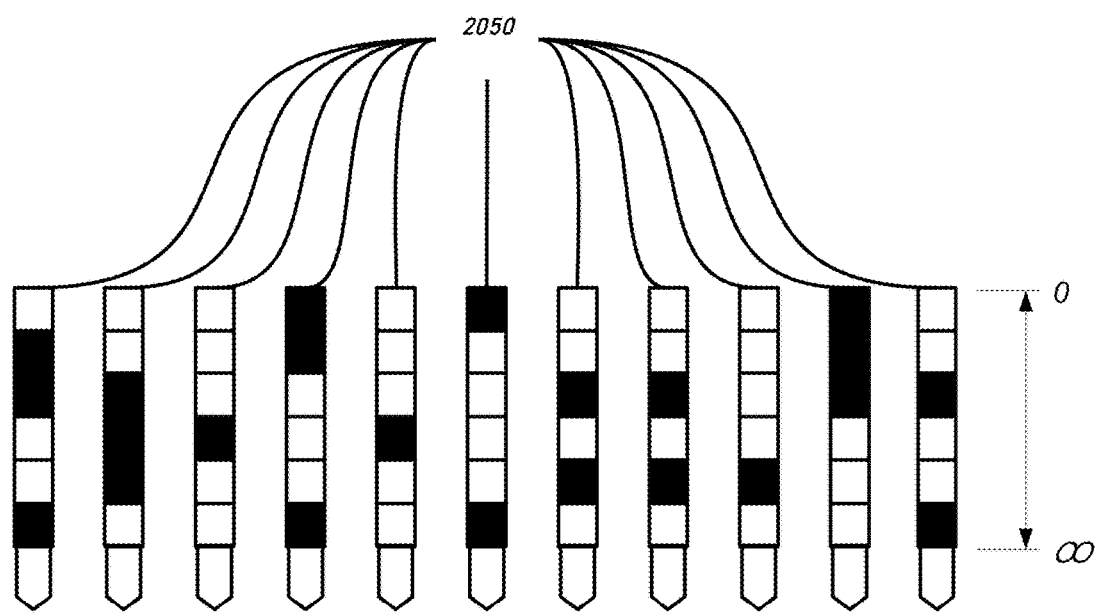
FIG. 38 is a schematic diagram in accord with an aspect of the subject technologies.

FIG. 38 shows eleven parallel arrays, that may be arrays of pointers to values, or contain variables, or probabilities 2050.

This illustration is provided with eleven arrays to represent for example purposes of an eleven-dimension reality compatible with string theory.

The way the Inventor imagines reality is like a spread sheet with perhaps eleven values that tell all that is knowable about a point in spacetime and its energy state, as shown by eleven values on a spread sheet. Wherein quantum entangled particles share most but not all their values, in most but not all of their spread sheet cells. Where the particle waveform is one waveform. But where some of its energy is displaced over some dimensions. Because the Inventor postulates that there may be some of these sub-dimensions where there is no spacetime, or arrow of time or flow of time, or maybe time but no space, or space but no time per se. Which if correct may be a lack of space or time in some of the possible sub-dimensions of reality.

Figure 39:
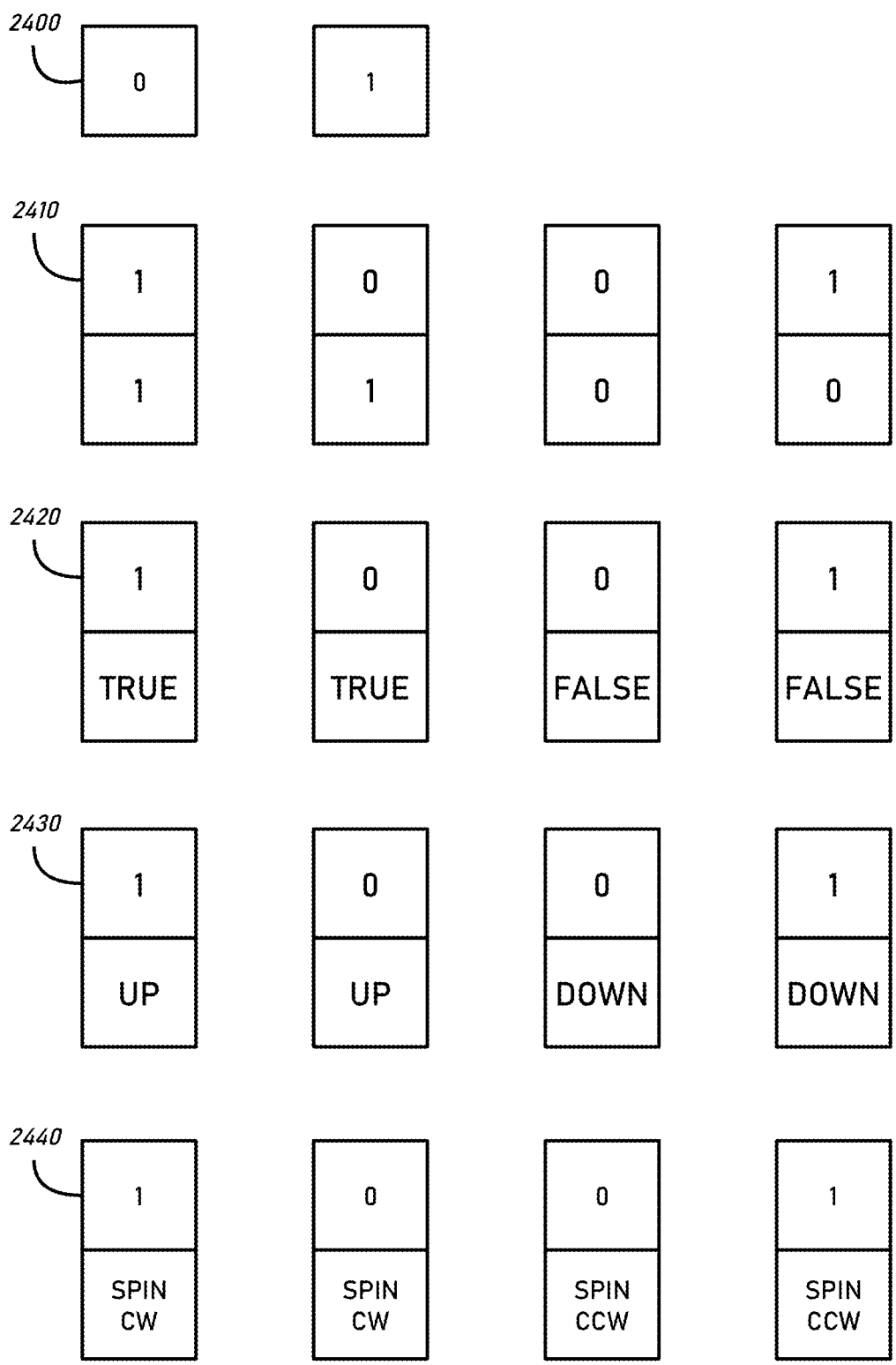
FIG. 39 is a schematic diagram of various possible systems implemented in accord with an aspect of the subject technologies.

FIG. 39 relates to what can be done with two bits as MDS. That may provide a good enough solution for a cheap Two-Bit MDS in some cases, provided that an appropriate meaning is attributed to the data object. A bit can hold the values zero or one 2800. However, the options for two-bits are more interesting. The binary permutations of binary base two-bits 2410 are (1,1), (0,1), (0,0) and (1,0) because two multiplied by two equals four, we get four possible outcomes. We may interpret (1,1) as a true positive or yes; (0,1)

as a true negative or no, and then we have room to use (0,0) as a false negative or yes or we could ascribe a value of don't know, or more likely not, or more likely no, with no having a probability of fifty percent or above; (1,0) on the other hand may be ascribed a value of don't know, or more likely yes than not, or more likely yes, with yes having a probability of fifty percent or above. So that from just two-bits can be made a basic MD, that may provide the most cost-effective way to represent some logical conditions.

Further two-bit MDS logical meanings can be expressed 2420, where (1, true) is a true positive; where (0, true) is a true negative; (0, false) is a false negative; and (1, false) a false positive result. The rationale is to ascribe a meaning like a protocol to the data held, and to use this technique in computations to represent more complex data that can be used in a probability-based system. Using a protocol of meaning to be attributed to a minimal amount of data storage and processing resources; so as to make the use of that resource able to represent more data than the sum of its parts in an MDS.

This means using the structure of data to add meaning to that data, which though virtualized may have advantages when used to reduce computing resource needs.

Furthermore, as we use ever more technology in our lives the efficiency of that technology matters even more, as its cost is like negative income for most consumers. For particle physicists striving for the most efficient way to represent quarks, the two-bit MDS 2430 can provide for (1, up) as an Up Quark, and (0, up) for no Up Quark, (0, down) for no Down Quark, and (1, down) for a Down Quark! So that simple structures can be used to represent the quantum states of sub-atomic particles for example. This attribution of meaning in MDS may be usefully likened to shorthand note taking.

The two-bit 2440 may also help with (1, clockwise) assuming a given frame of reference of course, may be attributed the meaning yes there is a particle detected with a clockwise spin direction (0, clockwise) may be attributed the meaning that no particle was detected with a clockwise spin, (0, counterclockwise) that no particle was detected with a counterclockwise spin, and finally (1, counterclockwise) that a particle was detected with counterclockwise spin. These examples are just a few plucked from the many possible uses of simple cheap two-bits and meaningful protocols for MDS.

We could extend to a three-bit, or four-bit MDS. For adding more meaning not as data values, but by a combination of data values, and the attribution of meanings such as probabilities to them data via data structures. That may be capable to represent some quantum states or probabilities. MDS may provide more efficient ways to write data to storage.

Having labored the issue of MDS, this is because the way the human brain may store information may be by the creation of electrochemical structures, the structures of which contain part of their meaning. Which may allow the human brain to encode and store information very densely. The encoding of human memory is not well understood. It may be comprised of using electromagnetic bonding of molecules. That may be expressed in terms of Qubits in relation to the electron-based bonds they may have, and there may be some base language of structure as there is in DNA.

The Inventor is trying to build a set of tools to better model the human brain and to improve artificial intelligence. It remains to be seen if MDS may help bridge the Quantum and Classical realms in the creation of a subject technology that may functions more like human memory, that may work well with artificial intelligence. It has been included here for the sake of completeness and may form the basis of further developments in relation to AI, ML, PAI systems, and BAIQ systems.

Figure 40:
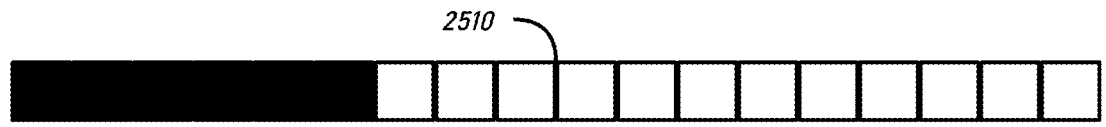
FIG. 40 is a schematic diagram of data stored in accord with an aspect of the subject technologies.
Figure 40:
Figure 40:
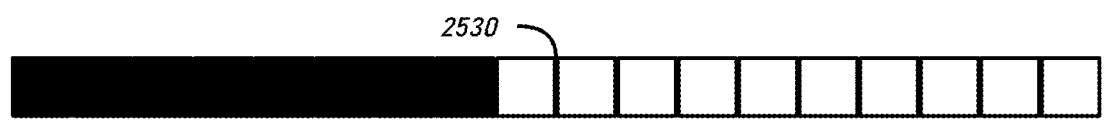

FIG. 40 shows a representation of randomized data being stored to the parallel locations which may be local or separated by distance or any possible combination of locations 2510, 2520, and 2530 that have been virtualized, where the storage is allocated logically from end to end.

Figure 41:
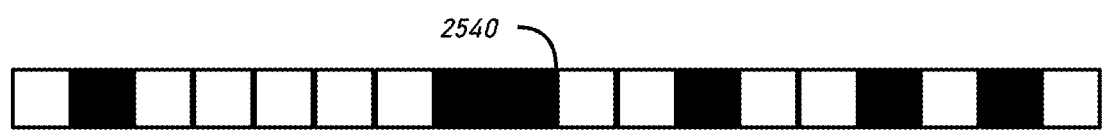
FIG. 41 is a schematic diagram of data stored in accord with an aspect of the subject technologies.
Figure 41:
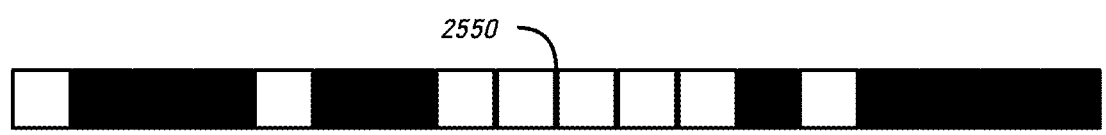
Figure 41:
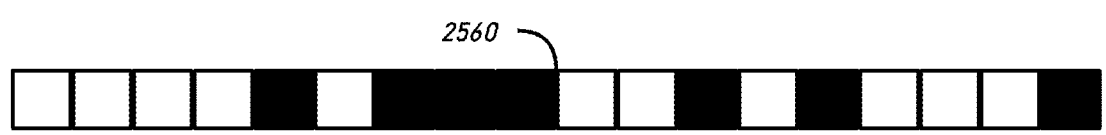

FIG. 41 shows a representation of randomized data being randomly stored to the parallel locations which may be local or separated by distance or any possible combination of locations 2540, 2550, and 2560 that have been virtualized, where the storage is allocated contiguously from a starting point. This may be the exact same data as represented in the previous figure but with gaps in between. This is not more or less secure at this stage. But from here on if more randomized data is stored randomly into the remaining gaps, then the approach of randomizing storage as well as randomizing the file contents is shown to be more secure, because the effort to disentangle it will be greater than for contiguous storage of randomized files.

Furthermore, it is noteworthy that files and data randomized into a storage space can be compressed to remove the excess spaces in between with no loss of security, because the randomization is preserved at the time compression takes place. However, these subject technologies are not about per se, nor do they include disk management, fragmentation, defragmentation, or optimization.

Figure 42:
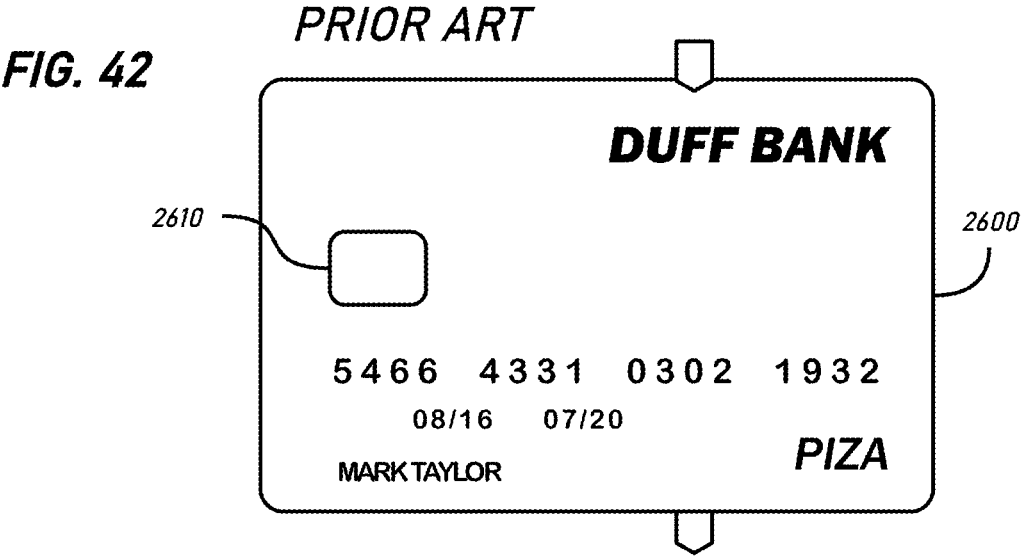
FIG. 42 is a drawing of a bank card according to the prior art.

FIG. 42 represents the current state of the art, for a banking card 2600 with a trading name Duff Bank, which contains a silicon chip, transistor, and memory system 2610.

Figure 43:
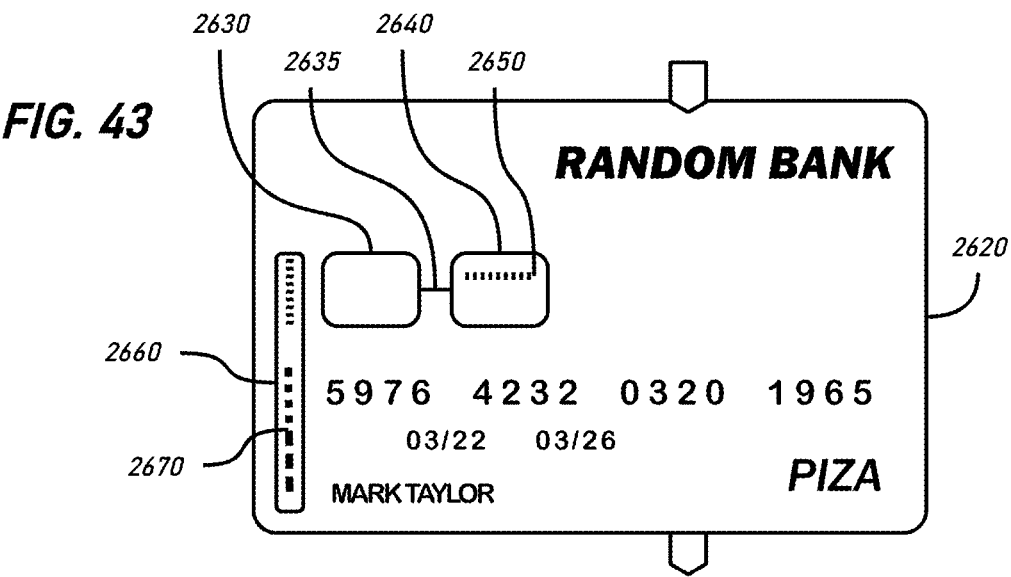
FIG. 43 is a drawing of a bank card according to aspects of the subject technologies.

FIG. 43 however is a banking card 2620 with a trading name of Random Bank which incorporates several aspects of the subject technologies. There is in addition to a chip transistor and memory system 2630, a connection 2635 comprising an interface capability with an additional memory device 2640, capable to store inter alia randomized and hence secure data, that may include tally data and/or any other helpful data 2650 in excess of what is used in the current state of the art. One or more of these, or any usable size and shape may be included on a banking card, though only this one example 2640 is shown. The additional memory is connected to the first chip to allow it to interface through its contacts with existing chip and card readers.

Furthermore, there is a photon-based storage zone capability 2660, wherein light can be used to write and/or to read data, 2660 capable to store data that may be randomized secure data, that may include tally data and/or any other helpful data. This would require changing the current chip and card reading systems and is thus probably less attractive than the additional memory module option 2640.

Tally data, in any case—however recorded and retrieved—may include data relating to user activities, usage patterns, bio-metric data, and/or any other helpful data. Helpful data may also include historic shopping data and as well as serving the cause of security, may subject to applicable laws in a jurisdiction be used to trigger the presentation of information including to a user, via an interacting device or system. Such as a mobile phone or personal computer.

Furthermore, in jurisdictions where the use of banking cards has been substantially overtaken by the lack of infrastructure for banking card use, and where this is supplanted by using mobile phones to facilitate payment for transactions, then the capabilities may alternatively be delivered within and/or through such a device instead. And or for home-based users the applicable device may be a personal computer alone, and/or with a card reading capability, or equivalent Internet banking capability. That may furthermore be used to update a banking card linked to the account used to be updated, at the next possible opportunity. As well as networked services and records.

Figure 44:
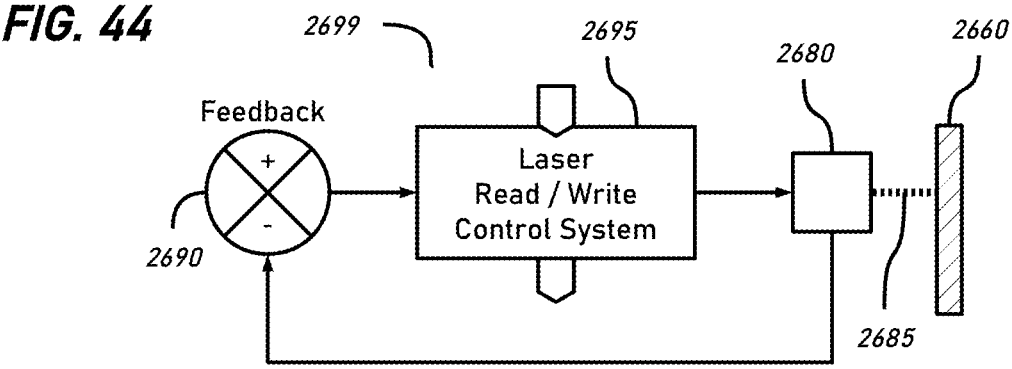
FIG. 44 is a mixed schematic and block flow system diagram of a data recording device according to aspects of the subject technologies.

FIG. 44 is a laser read and/or write module 2699, under the control of a system that is not shown. The local read/write control system 2695 of this device includes a feedback loop 2690 for reading back data and checking data has been correctly written. The feedback loop may also be used for set-up of alignment and adjustment of the device. The local control system 2695, controls the laser read/write head 2680, and the beams it produces 2686 for writing and reading data, to a photosensitive medium 2660 that is incorporated into a bank card; where it is used to store user data, which may include historic tally data, transaction, and geographic information as well as the more usual bank account data. There is no reason why bank cards could not be optical storage media over large parts of their surfaces. However, because the ability to write large amounts of data to small spaces, in FIG. 39 the area used for this purpose 2660 is relatively modest.

CONCLUSIONS RAMIFICATIONS AND SCOPE

These subject technologies, if successful in proliferation into widespread use, may provide improved information security. So that large-scale data theft becomes much less of a problem.

The black box cloud infrastructure systems such as 1497 may provide data storage that is almost impossible to breach. This is the light version of these subject technologies as may be most suited to the average American device user's needs. More user control of options and operations may also be provided for specialist users and applications, where securing data on the device is more important. Parallel uploads and downloads of data blocks via a plurality of channels that are isolated from key storage may provide increased speed in addition to improved security. Better data security may also help reduce online financial crime and intellectual property theft.

PAI may be capable to behave more flexibly, than previous neural networks. The system of GPU/CPU and RAM cards, of system 1899 shows an implementation of a randomizable configuration of processing power in the GPU, hooked-up to the RAM cards needed and which is being connected by dendrites. Such a system may be capable of creating a great many neurons suitable for deep neural networks.

This ability to provide a system well suited to random variability of the use of resources offers the possibility to also provide a computer system, the electronic noise from which is difficult to predict, and difficult thus for Signals-Intelligence eavesdropper to accurately pinpoint, capture and interpret. The ability of polymorphic neural networks to create and destroy neurons may permit these polymorphic subject technologies to be applied to defense systems. So that where for example a GPU is hit by a bullet, the remaining GPU may use their polymorphic abilities to continue to function by re-routing around the problem so long as there are still sufficient resources for the system to continue to run.

TRIPLE may help users to enjoy more secure communications. They also offer a security and functionality boost to the military and intelligence community. Because their transient nature may help to make them uneconomic and difficult to crack during their period of transience.

The ability to use a TRIPL to turn a CIA agent's speech to text, then transmit the TRIPLE version over insecure networks back to base. Where the TRIPLE is decrypted by reversing its TRIPL encryption, then reducing it back to text has the additional advantage of protecting the agent's identity. Because speech may be synthetically recreated using a generic voice at either end. Indeed, the agent's own voice may be sampled and added back to the speech at base.

TRIPLE and other forms of encryption may be improved and be made more secure by the use of statistical adjustment of their data, via a PEC. Leading to a disproportionate security boost, for very little processing power. That is considerably in excess of what is achievable by increasing processor-heavy, math-heavy complexity. As has been the paradigm for the last seventy or so years.

TRIPLE may also be of assistance in machine to machine and machine to human communications. Human to computer interfaces of the future may benefit from the use of such meaningful protocols in ways that are difficult to predict.

Time Optimized Communications, including temporal adjustment of orders for the military may aid the causes of protecting the secrecy and efficacy of orders, via "do by" times, and randomization of delivery of the data blocks comprising a message. For reassembly and delivery by a priority-based protocol that uses do by times and deliver by times. Furthermore, these systems and methods may also be helpful for flattening a bandwidth demand curve. Bandwidth constriction, and security problems in submarine applications may be mitigated. Furthermore, in a war where the spectrum and the availability of space assets may become constrained. These same systems and methods may also be used to make the best use of the surviving bandwidth. To provide more robust capabilities to communicate vital orders in times of extreme warfare. That may be just enough of an advantage to provide an invaluable winning edge.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

Terms such as "top," "bottom," "front," "rear," "above," "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Similarly, an item disposed above another item may be located above or below the other item along a vertical, horizontal, or diagonal direction; and an item disposed below another item may be located below or above the other item along a vertical, horizontal, or diagonal direction.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A cloud data storage infrastructure operating a data security system, comprising:
    a connection to a telecommunications network coupled to one or more client devices;
    a supply of data from one or more client devices being received into memory or data storage of a server computing device; and
    a machine executable code loaded into the server computing device wherein steps of the code are executed by a computer processor in the server computing device;
    wherein, the code is configured to:
        receive a data file;
        disassemble the data file into blocks of data;
        generate addresses for random storage into locations in a cloud-based network for each of the blocks of data;
        store, the blocks of data into the random storage locations, wherein the random storage locations are within a plurality of separate cloud-based servers in the cloud-based network, and at least a first block of data is stored in a randomly selected first of the cloud-based servers separately from another block of data stored in a randomly selected second of the cloud-based servers;
        record the addresses of the random storage locations into an array of pointers using a first communications channel that is not part of the cloud-based network of data storage locations;
        transmit the blocks of data through a second communications channel, wherein the second communications channel is isolated from the first communications channel and from the array of pointers; and
        isolate the one or more client devices from the steps of:
            generating addresses for random storage,
            storing the blocks of data into the random storage locations, and
            recording the addresses of the random storage locations, that are performed by the server computing device.

2. The system of claim 1, wherein the code is further configured to randomly size the blocks of data into a range of sizes between a preset minimum and a preset maximum block size.

3. The system of claim 1, wherein the code is further configured to interrogate a selected random storage location and determine whether or not the selected random storage location is empty, and if a storage space in the selected random storage location is empty, the code is further configured to interrogate the selected random storage location and determine whether or not the selected random storage location is large enough to accommodate one of the blocks of data, and if a storage space in the selected random storage location is large enough, write the one of the blocks of data to a storage medium in the selected random storage location, and if the selected random storage location is not large enough to accommodate the one block of data, the code is further configured to reject the selected random storage location and then select another random storage location.

4. The system of claim 1, wherein the code is further configured to:
    interrogate an empty selected random storage location and determine whether or not the selected random storage location is large enough to accommodate the one block of data, and if the selected random storage location is not large enough to accommodate the one block of data, then to
    reserve enough space within the selected random storage location to write a pointer to a next random storage location,
    write as much of the one block of data to the selected random storage location as fits within the selected random storage location,
    write a pointer to the next random storage location to the end of the first storage location,
    write any remaining data from the one block of data to the next random storage overflow location.

5. The system of claim 1, wherein the code is further configured to:
    interrogate a selected random storage location and determine whether or not the selected random storage location is large enough to accommodate the one block of data; and if the selected random storage location is not large enough to accommodate the one block of data, then
    extend and/or index to the next location in the array of pointers and reserve there enough space to write an additional pointer to a next random storage overflow location;
    write any remaining data from the one block of data to a next available random storage overflow location; and write an additional pointer to the storage overflow location to the array of pointers to the storage locations.

6. The system of claim 1, wherein the code is further configured to:
store the array of pointers as a sequential array of pointers,
retrieve the random blocks of data in a sequence according to the sequential array of pointers, and
re-assemble the blocks of data into the data file according to the sequence of the sequential array of pointers.

7. The system of claim 1, wherein the code is further configured to randomly vary a routing of the random blocks of data through the cloud-based network.

8. The system of claim 1, wherein the code is further configured to release any storage locations which stored blocks of data which have been retrieved and which are no longer needed to be stored.

9. The system of claim 1, wherein the code is further configured to delete the data file by:
renaming and overwriting a file type string of the data file according to a parameter comprising the number times to overwrite;
renaming and overwriting a file name string of the data file according to a parameter comprising the number times to overwrite; and
overwriting file contents of the data file according to a parameter comprising the number times to overwrite.

10. The system of claim 1, wherein the array of pointers is stored to a storage media that is isolated within a location separate from the storage media of the blocks of data.

11. The system of claim 1, wherein the code is further configured to re-assemble the blocks of data into a copy of the data file in response to a call for the data file by retrieving the blocks of data from the random storage locations according to the array of pointers.

12. The system of claim 1, further comprising a plurality of communications channels within an isolated data block handling network infrastructure, configured to permit and execute parallel uploading and downloading of data blocks to and from a plurality of random storage locations.

13. The system of claim 1, wherein the code is further configured to: execute the steps of disassembly of data files into data blocks on the server side of the telecommunications network and re-assemble the blocks of data back into a copy of the data files on either the server side or provide to a client side device or to another service provider system access in the form of isolated channels to access data block, and pointers key storage locations through which to download copies of pointers based keys, and/or data blocks.

14. A computer program product for operating a data security system in a cloud data infrastructure, the computer program product comprising:
one or more non-transitory computer readable storage media, and program instructions collectively stored on the one or more non-transitory computer readable storage media, the program instructions comprising:
receiving a data file;
disassembling the data file into blocks of data;
generating addresses for random storage locations in a cloud-based network for each of the blocks of data;
storing, through the telecommunications network, the blocks of data in the random storage locations, wherein the random storage locations are within a plurality of different cloud-based servers in the cloud-based network, and at least a first block of data is stored in a randomly selected first of the cloud-based servers separately from another block of data stored in a randomly selected second of the cloud-based servers;
recording the addresses of the random storage locations into an array of pointers using a first communications channel that is not part of the cloud-based network of data storage locations;
transmitting the blocks of data through a second communications channel, wherein the second communications channel is isolated from the first communications channel and from the array of pointers; and
isolating the one or more client devices from the steps of:
generating addresses for random storage,
storing the blocks of data into the random storage locations, and
recording the addresses of the random storage locations, that are performed by the server computing device.

15. The computer program product of claim 14, wherein the program instructions further comprise: interrogating an empty selected random storage location and determine whether or not the selected random storage location is large enough to accommodate the one block of data, and if the selected random storage location is not large enough to accommodate the one block of data, then
reserving enough space within the first storage location to write a pointer to a next random storage location,
writing as much of the one block of data to the selected random storage location as fits within the selected random storage location,
writing a pointer to the next random storage location to the end of the first storage location, and
writing any remaining data from the one block of data to the next random storage overflow location.

16. The computer program product of claim 14, wherein the program instructions further comprise:
storing the array of pointers as a sequential array of pointers,
retrieving the random blocks of data in a sequence according to the sequential array of pointers, and
re-assembling the blocks of data into the data file according to the sequence of the sequential array of pointers.

17. The computer program product of claim 14, wherein the array of pointers is stored into a storage media that is isolated within a location separate from the storage media of the blocks of data.

18. The computer program product of claim 14, wherein the program instructions further comprise re-assembling the blocks of data in response to a call for the data file by retrieving the blocks of data from the random storage locations according to the array of pointers.

19. The computer program product of claim 14, further comprising program code configured to operate a plurality of communications channels within the isolated data block handling network infrastructure, capable to permit and execute parallel uploading and downloading of data blocks to and from a plurality of random storage locations.

20. The computer program product of claim 14, further comprising program code capable to execute the steps of:
disassembling data files into data blocks on the server side of the telecommunications network, and
re-assembling the blocks of data back into a copies of data files on either the server side, or providing to a client side device or to another service provider system access by operating and controlling isolated communication channels coupled to data block, and pointers key storage locations providing the facility to download copies of pointers based keys, and/or data blocks.

* * * * *